US010895979B1

(12) United States Patent
Boyers

(10) Patent No.: US 10,895,979 B1
(45) Date of Patent: *Jan. 19, 2021

(54) METHODS AND USER INTERFACES FOR POSITIONING A SELECTION, SELECTING, AND EDITING, ON A COMPUTING DEVICE RUNNING UNDER A TOUCH-BASED OPERATING SYSTEM, USING GESTURES ON A TOUCHPAD DEVICE

(71) Applicant: David Graham Boyers, Los Altos, CA (US)

(72) Inventor: David Graham Boyers, Los Altos, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 16/278,084

(22) Filed: Feb. 16, 2019

Related U.S. Application Data

(60) Provisional application No. 62/641,174, filed on Mar. 9, 2018, provisional application No. 62/710,622, filed on Feb. 16, 2018.

(51) Int. Cl.

| | |
|---|---|
| ***G06F 3/048*** | (2013.01) |
| ***G06F 3/0488*** | (2013.01) |
| ***G06F 3/0482*** | (2013.01) |
| ***G06F 3/0354*** | (2013.01) |

(52) U.S. Cl.
CPC ...... *G06F 3/04883* (2013.01); *G06F 3/03547* (2013.01); *G06F 3/0482* (2013.01)

(58) Field of Classification Search
None
See application file for complete search history.

(56) References Cited

U.S. PATENT DOCUMENTS

| | | | |
|---|---|---|---|
| 7,856,605 | B2 | 12/2010 | Ording et al. |
| 8,201,109 | B2 | 6/2012 | Van Os et al. |
| 8,255,830 | B2 | 8/2012 | Ording et al. |
| 8,370,736 | B2 | 2/2013 | Ording et al. |
| 8,510,665 | B2 | 8/2013 | Ording et al. |
| 8,570,278 | B2 | 10/2013 | Kocienda et al. |
| 8,584,050 | B2 | 11/2013 | Ording et al. |
| 8,610,671 | B2 | 12/2013 | Ording et al. |
| 8,650,507 | B2 | 2/2014 | Westerman et al. |
| 8,661,362 | B2 | 2/2014 | Kocienda et al. |
| 8,698,773 | B2 | 4/2014 | Westerman et al. |
| 8,756,534 | B2 | 6/2014 | Ording et al. |

(Continued)

OTHER PUBLICATIONS

Vim, "Highlight Current Line," 2004, Vim Tips Wiki, Published on Web; http://vim.wikia.com/wiki/Highlight_current_line.

(Continued)

*Primary Examiner* — Sunit Pandya

(57) ABSTRACT

A method, comprising: at a computing device running applications under a touch-based operating system: receiving data from a touchpad device; detecting a contact on the touchpad device; in response to detecting a contact comprising a tap gesture or click gesture, displaying a selection of length equal to zero within editable text content; in response to detecting a contact comprising a long-press gesture or long-click gesture, displaying a selection of length equal to one character within read-only text content; detecting a contact on the touchpad device; and in response to detecting a change in a position of the contact on the touchpad device, changing a position of the selection.

25 Claims, 142 Drawing Sheets

(56) References Cited

U.S. PATENT DOCUMENTS

| | | | | |
|---|---|---|---|---|
| 9,032,338 | B2 | 5/2015 | Murrett et al. | |
| 9,207,855 | B2 | 12/2015 | Kocienda et al. | |
| 2008/0048980 | A1 | 2/2008 | Love | |
| 2009/0167700 | A1 | 7/2009 | Westerman | |
| 2009/0174679 | A1 | 7/2009 | Westerman | |
| 2009/0228842 | A1* | 9/2009 | Westerman | G06F 40/166 715/863 |
| 2011/0279384 | A1 | 11/2011 | Miller | |
| 2012/0017147 | A1 | 1/2012 | Mark | |
| 2012/0306772 | A1* | 12/2012 | Tan | G06F 3/04842 345/173 |
| 2012/0311507 | A1 | 12/2012 | Murrett | |
| 2014/0078056 | A1 | 3/2014 | Yu | |
| 2014/0109016 | A1* | 4/2014 | Ouyang | G06F 40/166 715/856 |
| 2015/0074578 | A1 | 2/2015 | Liang | |
| 2016/0274686 | A1* | 9/2016 | Alonso Ruiz | G06F 3/03547 |

OTHER PUBLICATIONS

Head Minion, "Scroll a Word Document, Without Moving the Cursor," Aug. 23, 2010, Bitter Minion Development, Blog Article Published on Web; http://www.bitterminion.com/2010/08/23/stationinary-scrolling-in-microsoft-word/.

* cited by examiner

METHODS AND USER INTERFACES FOR POSITIONING A SELECTION, SELECTING, AND EDITING, ON A COMPUTING DEVICE RUNNING UNDER A TOUCH-BASED OPERATING SYSTEM, USING GESTURES ON A TOUCHPAD DEVICE

RELATED APPLICATIONS

This application is related to U.S. patent application, "Methods and Graphical User Interfaces for Positioning the Cursor and Selecting Text on Computing Devices with Touch-Sensitive Displays" (application Ser. No. 15/040,717), filed by the applicant.

This application claims priority from U.S. Patent Provisional Application, "Methods and User Interfaces for Positioning a Selection, Selecting Text, and Editing, on a Computing Device Running Applications under a Touch-Based Operating System, Using Gestures on a Touchpad Device," (Provisional Application Number 67/710,622), filed by the applicant on Feb. 16, 2018.

This application claims priority from U.S. Patent Provisional Application, "Methods and User Interfaces for Positioning a Selection, Selecting, and Editing, on a Computing Device Running Applications under a Touch-Based Operating System, Using Gestures on a Touchpad Device," (Provisional Application No. 62/641,174), filed by the applicant on Mar. 9, 2018.

TECHNICAL FIELD

The disclosed embodiments relate generally to computing devices running applications under a touch-based operating system, particularly to computer-implemented methods and user interfaces for enabling a user to conveniently position a selection, select text, text-objects, image-objects, and the like, and edit on such a device using gestures on a touchpad device.

BACKGROUND

Mobile computing devices with touch-sensitive displays such as smart phones and tablet computing devices are two of the fastest growing categories of computing devices. These devices threaten to displace notebook and desktop computers as the preferred platform for many tasks that users engage in every day. Developers of these mobile devices have eschewed mouse and touchpad pointing devices in favor of on-screen graphical user interfaces and methods that have the user select content and edit content on touch-sensitive displays using direct manipulation of objects on the screen. Ording, et. al. describe one example of this current approach in U.S. Pat. No. 8,255,830 B2. However, the performance and usability of these current solutions is generally inferior to the mouse and/or touchpad based solutions commonly employed with conventional notebook and desktop devices running applications designed for a pointer-based operating system. Whereas these current solutions support a simple task such as quick selection of a single word or an entire content, they do not support quick selection of a character, group of characters, or group of words. In addition, they do not support equally well tasks performed at any position on the display ranging from tasks near the center of the display to those near the edge of the display. These existing solutions also do not support user setting of key control parameters to meet user preferences and user needs. Finally, these existing solutions do not support user accessibility settings to enable the broadest set of users to access applications on these powerful devices.

A mobile computing device with a touch-sensitive display can be linked to an external keyboard. The link can be wired or wireless. This arrangement offers two benefits: 1) it provides an enhanced user experience in text intensive applications by replacing the on-screen keyboard with a hardware keyboard, and 2) it eliminates the display of an on-screen keyboard and nearly doubles the area available for display of content, However, connecting an external keyboard to a mobile computing device still fails to provide a user experience comparable to that available with a notebook or desktop computer, with a pointer-based operating system, linked to a touchpad or mouse. In these pointer-based operating systems a touchpad or mouse is used for moving the pointer and performing actions with the pointer. With a typical tablet computer, with a touch-based operating system such as iOS developed by Apple, there no separate pointer. In these devices, the user's finger is the pointer.

A tablet running a touch-based operating system, and linked to an external keyboard, can support the following example actions: 1) A user can tap on the screen to place the insertion mark at the tap location within editable text and move the insertion mark with direct finger gestures on the screen, 2) A user can tap on the screen to place the insertion mark at the tap location within editable text and tap on the keyboard up/down and left/right arrow keys to move the insertion mark, 3) A user can select editable text by first double-tapping on the screen to select a word at the double-tap location and display starting and ending drag handles for the word; the user can then select multiple words and characters by positioning the first displayed drag handle at a selection starting position and by positioning the second displayed drag handle at a selection ending position, 4) A user can select editable text with a tap on the screen to place the insertion mark at the tap location within editable text; the user can then extend the selection to desired end position by holding the keyboard shift key and tapping the arrow keys until the selection end point is positioned at the desired location, 5) A user can long-press on the screen to select a word at the long-press position within read-only text and display starting and ending drag handles for the word; the user can then extend the selection using on-screen gestures to position the two drag handles, This solution has a number of deficiencies including the following: 1) The use of on-screen gestures on a tablet linked to an external keyboard, to display the insertion mark, position the insertion mark in editable text, or to select text, is slow, extremely awkward, and error prone, 2) The use of keyboard arrow keys, to position the insertion mark in editable text, and to select editable text, is slow, 3) These existing solutions do not enable a user to display the insertion mark, position the insertion mark in editable text, or select editable or read-only text, without using on-screen gestures, 4) These existing solutions do not enable a user to select a spreadsheet cell (a text-object as defined herein), position the selection anywhere within a spreadsheet (text-object content as defined herein), and edit a spreadsheet cell, without using on-screen gestures, 5) These existing solutions do not enable a user to select a spreadsheet cell, position the selection anywhere within a spreadsheet, and select multiple spreadsheet cells, without using on-screen gestures, We have developed methods and user interfaces for positioning a selection, selecting, and editing on a computing device with a display linked to a keyboard and touchpad that not only overcome the deficiencies of existing solutions, but also add valuable new functionality for the user of any computing device running applications under a touch-based operating system. We have developed methods and user interfaces for positioning a selection, selecting, and editing not only within text-content such as found in word processing, email, web-browsing, note-taking, text-messaging, and database applications, but also within text-object content such as found in spreadsheet applications. These methods and user interfaces for positioning a selection, selecting, and editing can also be used within image-object content and other content types.

SUMMARY

A computing device, comprising: a display; a processor; a memory configured to store one or more programs; wherein the processor is configured to execute the one or more programs to cause the computing device to: receive data from a touchpad device; display a zero-length selection within editable text content; display a one-character-length selection within read-only text content; detect a contact on the touchpad device; and in response to detecting a change in a position of the contact on the touchpad device, change a position of the selection.

A method, comprising: at a computing device with a display: receiving data from a touchpad device; displaying a zero-length selection within editable text content; displaying a one-character-length selection within read-only text content; detecting a contact on the touchpad device; and in response to detecting a change in a position of the contact on the touchpad device, changing a position of the selection.

A non-volatile computer readable storage medium storing one or more programs, the one or more programs comprising instructions, when executed, cause a computing device with a display to: receive data from a touchpad device; display a zero-length selection within editable text content; display a one-character-length selection within read-only text content; detect a contact on the touchpad device; and in response to detecting a change in a position of the contact on the touchpad device, change a position of the selection.

A user interface on a computing device with a display wherein: data from a touchpad device is received; a selection of zero-length is displayed within editable text content; a selection of one-character-length is displayed within read-only text content; a contact on the touchpad device is detected; and in response to detecting a change in a position of the contact on the touchpad device, a position of the selection is changed.

BRIEF DESCRIPTION OF THE DRAWINGS

For a better understanding of the embodiments of the invention, reference should be made to the detailed description, in conjunction with the following drawings in which like reference numerals refer to corresponding parts throughout the figures.

FIGS. 22U-22CC illustrate an exemplary user interface and method for dragging-and-dropping selected text from a position within a first application to a position within a second application, with drag-lock off, on a mobile computing device with a display, using gestures on a touchpad in accordance with some embodiments.

DETAILED DESCRIPTION

Figure 1:
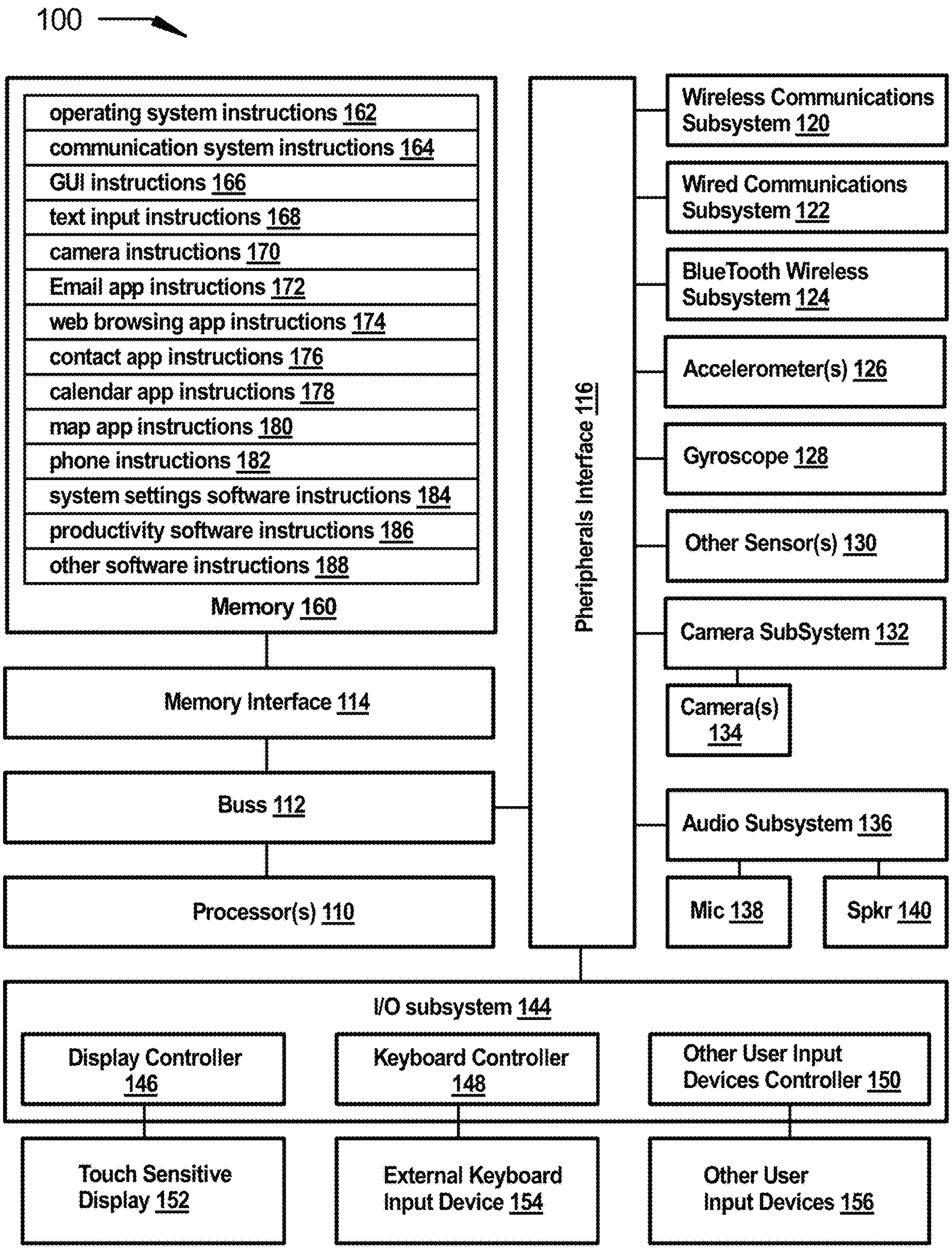
FIG. 1 is a block diagram illustrating a mobile computing device with a touch-sensitive display and optional external keyboard and optional external touchpad.

Reference will now be made in detail to embodiments, examples of which are illustrated in the included drawings. In the following detailed description, many specific details are set forth in order to provide a thorough understanding of the present invention. However, it will be apparent to one of ordinary skill in the art that the present invention can be practiced without these specific details. In other embodiments, well-known methods, procedures, components, circuits, and networks have not been described in detail so as to not obscure aspects of the embodiments.

The terminology used in the description of the invention is for the purpose of describing particular embodiments only and is not intended to be limiting of the invention. As used in the description, the singular forms "a", "an", and "the" are intended to include the plural forms as well, unless the context clearly indicates otherwise. It will also be understood that the term "and/or" as used herein refers to and encompasses any and all possible combinations of one or more of the associated listed items.

Embodiments of computing devices, user interfaces for such devices, and associated processes for using such devices are described. In some embodiments, the computing device can be a handheld mobile computing device such as a smart phone. In some embodiments, the computing device can be a handheld mobile computing device such as a tablet. Examples of such handheld mobile computing devices include, without limitation, the iPhone by Apple computer, the Windows phone by Microsoft, and Galaxy phone by Samsung, the Pixel phone by Google, the iPad by Apple computer, the Surface by Microsoft, and the Galaxy Tab by Samsung, and the Pixel tablet by Google. The device can support a variety of applications including a web browser, an email application, a contacts application, and productivity applications included with the device when sold. The device also supports a variety of applications (apps) developed by third parties that are available for purchase and download from an application store. Typically, an application store makes available applications written to run on a particular mobile operating system. Exemplary operating systems for handheld mobile computing devices include, without limitation, iOS by Apple, Android by Google, and Windows by Microsoft.

It should be understood that the solutions presented below for positioning a selection, selecting, and editing on a computing device using gestures on a touchpad and keyboard could also be implemented on any desktop or notebook-computing device without a display to enable such devices to run applications designed for a touch-based operating system. This is in contrast to existing desktop and notebook applications designed for a pointer-based operating system.

In the discussion that follows, a computing device that includes a display and touch-sensitive surface is described. In the discussion that follows the computing device can include one or more physical user-interface devices, such as a physical keyboard and a touchpad. In the discussion we will often refer to an external keyboard and external touchpad. Whereas both the physical keyboard and touchpad can be external to the computing device with a display, one or both could be integrated with computing device. Attention is now directed towards embodiments of mobile computing devices with displays.

1.0 Block diagram: FIG. 1 is a block diagram illustrating a computing device 100 with a touch-sensitive display in accordance with some embodiments. The device includes processor(s) 110 connected via buss 112 to memory interface 114 to memory 160. The memory will typically contain operating system instructions 162, communication system instructions 164, GUI (graphical user interface) instructions 166, and text input instructions 168. The memory can contain camera instructions 170, email app instructions 172, web browsing app instructions 174, contact app instructions 176, calendar app instructions 178, map app instructions 180, phone app instructions 182, system settings software instructions 184, productivity software instructions 186, and other software instructions 188. The device also includes processors(s) 110 connected via buss 112 to peripherals interface 116. Peripherals interface 116 can be connected to a wireless communications subsystem 120, wired communications subsystem 122, Bluetooth wireless communications subsystem 124, accelerometer(s) 126, gyroscope 128, other sensor(s) 130, camera subsystem 132, and audio subsystem 136. The wireless communication system includes elements for supporting wireless communication via Wi-Fi or cellular or any other wireless networking system. The accelerometers provide information regarding device orientation to the GUI instructions to enable the change of the orientation of the graphical user interface to match the orientation of the device as the device is viewed in portrait or landscape orientation. The camera subsystem is connected to camera(s) 134. These cameras can include one or more cameras for supporting real time video conferencing over a network connection. The audio system can be connected to microphone 138 and speaker 140. The peripherals interface 116 is connected to I/O subsystem 144 comprising display controller 146, keyboard controller 148, and other user input devices controller 150. Display controller 146 is connected to touch-sensitive display 152. Keyboard controller 148 can be connected to other physical keyboard input device including external keyboard input device 154. Other user input devices controller can be connected to other user input devices 156, including, but not limited to a mouse, a touchpad, a visual gaze tracking input device, or other input device. For the purposes of this disclosure, the other input device 156 is a touchpad. The touchpad can be a standalone device or integrated with a hardware keyboard. The touchpad can be linked to the computing device with a wired or wireless data connection. Touchpad 156 can include a means for detecting a mechanical click gesture. The means for detecting a mechanical click gesture includes, but is not limited to, a mechanical switch or pressure sensitive surface that provides tactile feedback when a "click" is detected. The touchpad can include means for detecting a tap gesture on the touchpad surface. The touchpad can include a means for interpreting a tap gesture to be the same as a click gesture. The touchpad can include a means for detecting a long-press gesture or long-click gesture with a duration in the range of 0.25 to 1.0 seconds. The duration can be preset or user selectable. The touchpad can include a means for detecting a double-tap gesture or double-click gesture with a time between taps or clicks in the range of 0.25 to 1.0 seconds. The time can be preset or user selectable.

It should be understood that the device 100 is only one example of a computing device 100, and that the device 100 can have more or fewer components than those shown, can combine two or more components, or can have a different configuration or arrangement of components. The components shown in FIG. 1 can be implemented in hardware, software, or a combination of hardware and software.

Figure 2A:
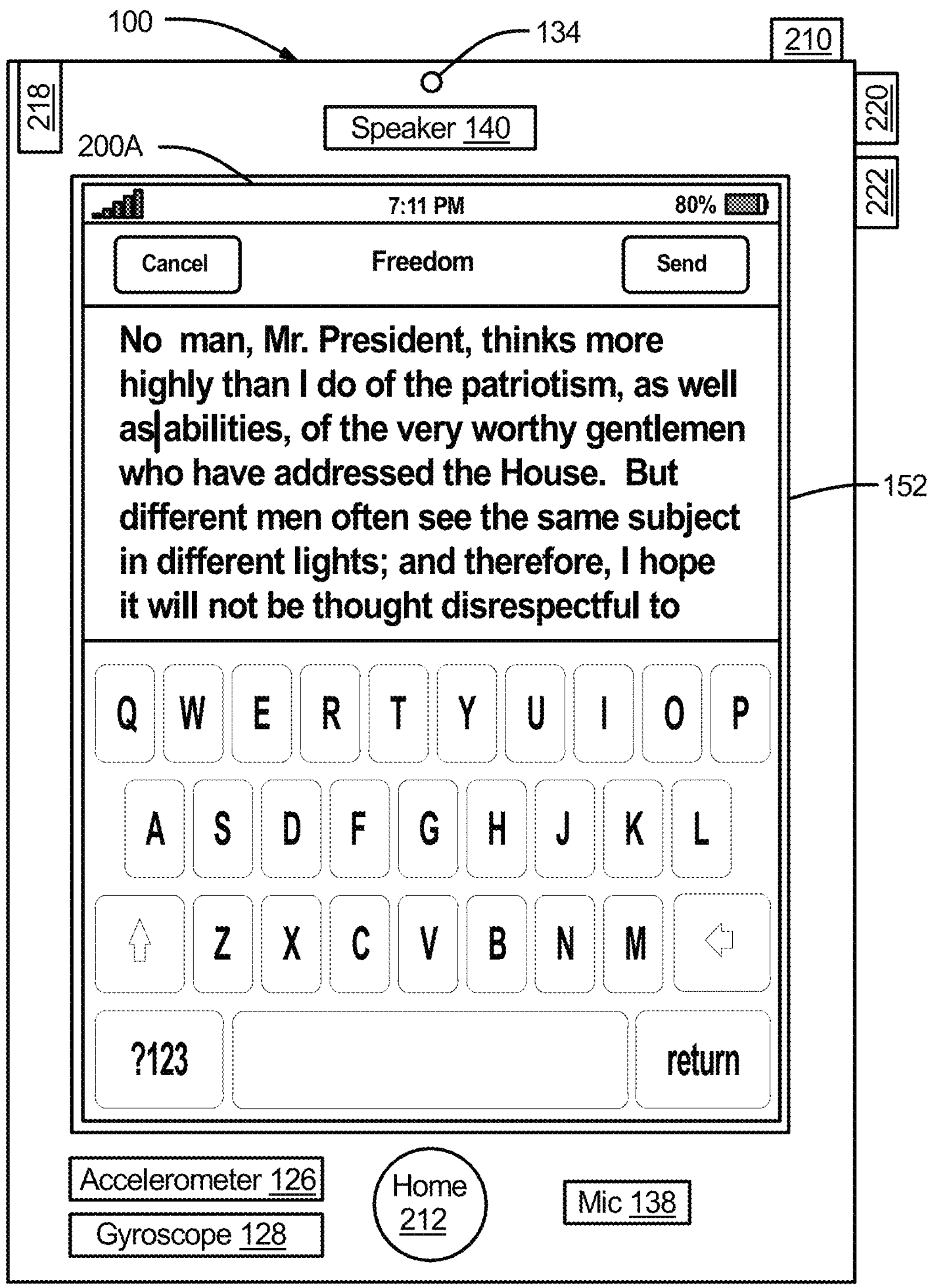
FIG. 2A illustrates a computing device in portrait orientation having a touch-sensitive display and on-screen keyboard.
Figure 2B:
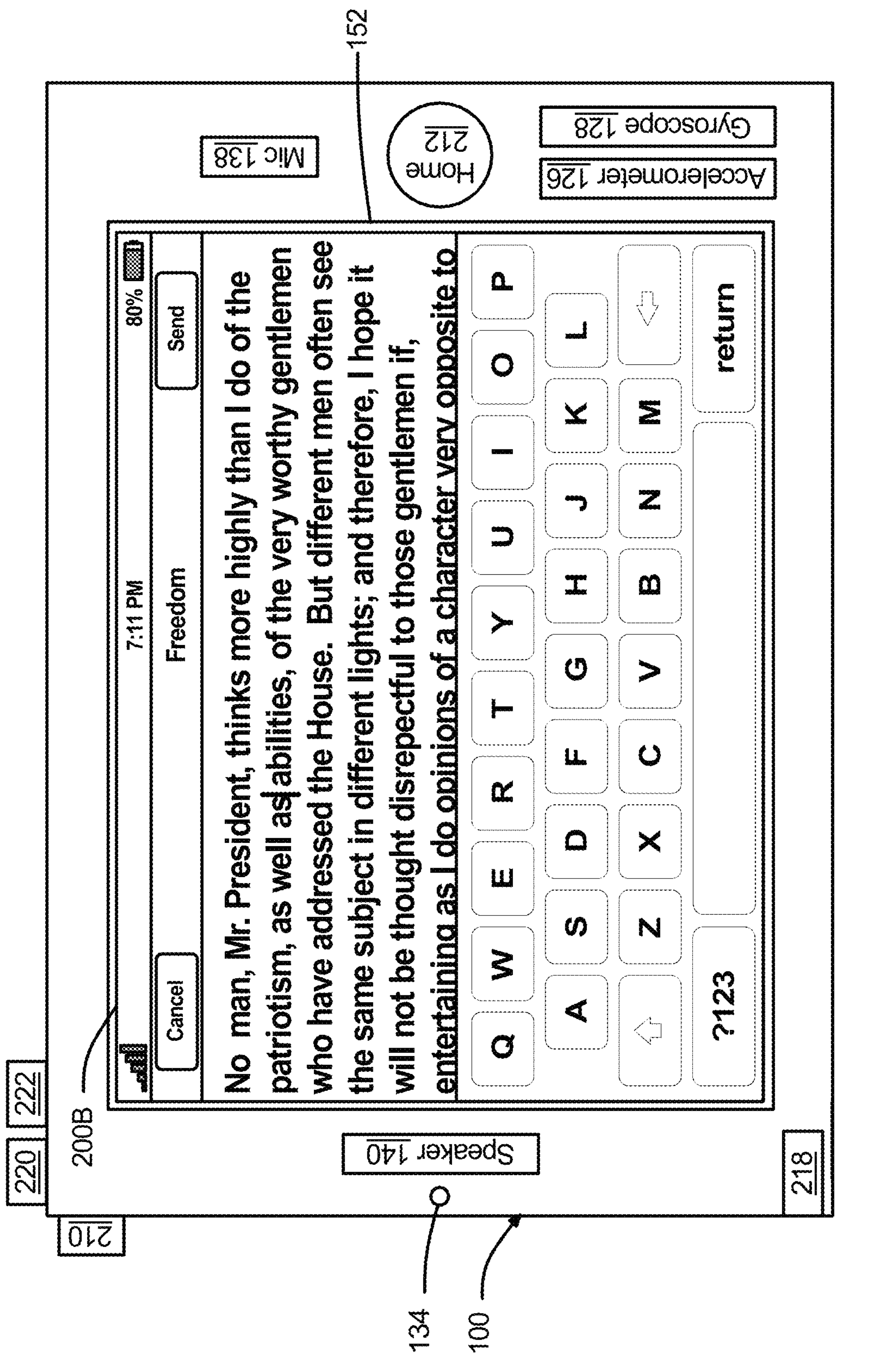
FIG. 2B illustrates a computing device in landscape orientation having a touch-sensitive display and on-screen keyboard.
Figure 2C:
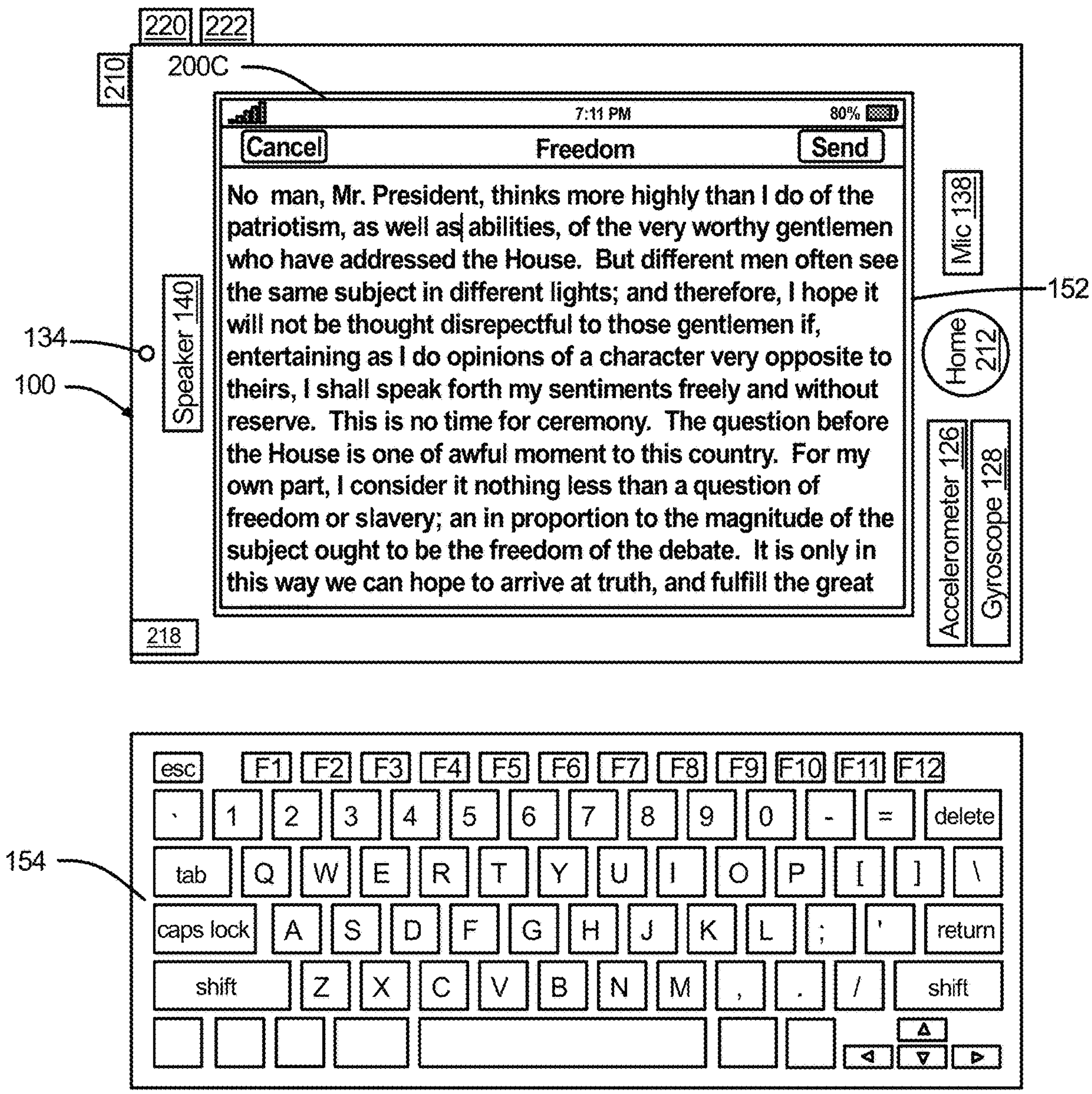
FIG. 2C illustrates a computing device in landscape orientation having a touch-sensitive display with an external keyboard.
Figure 2D:
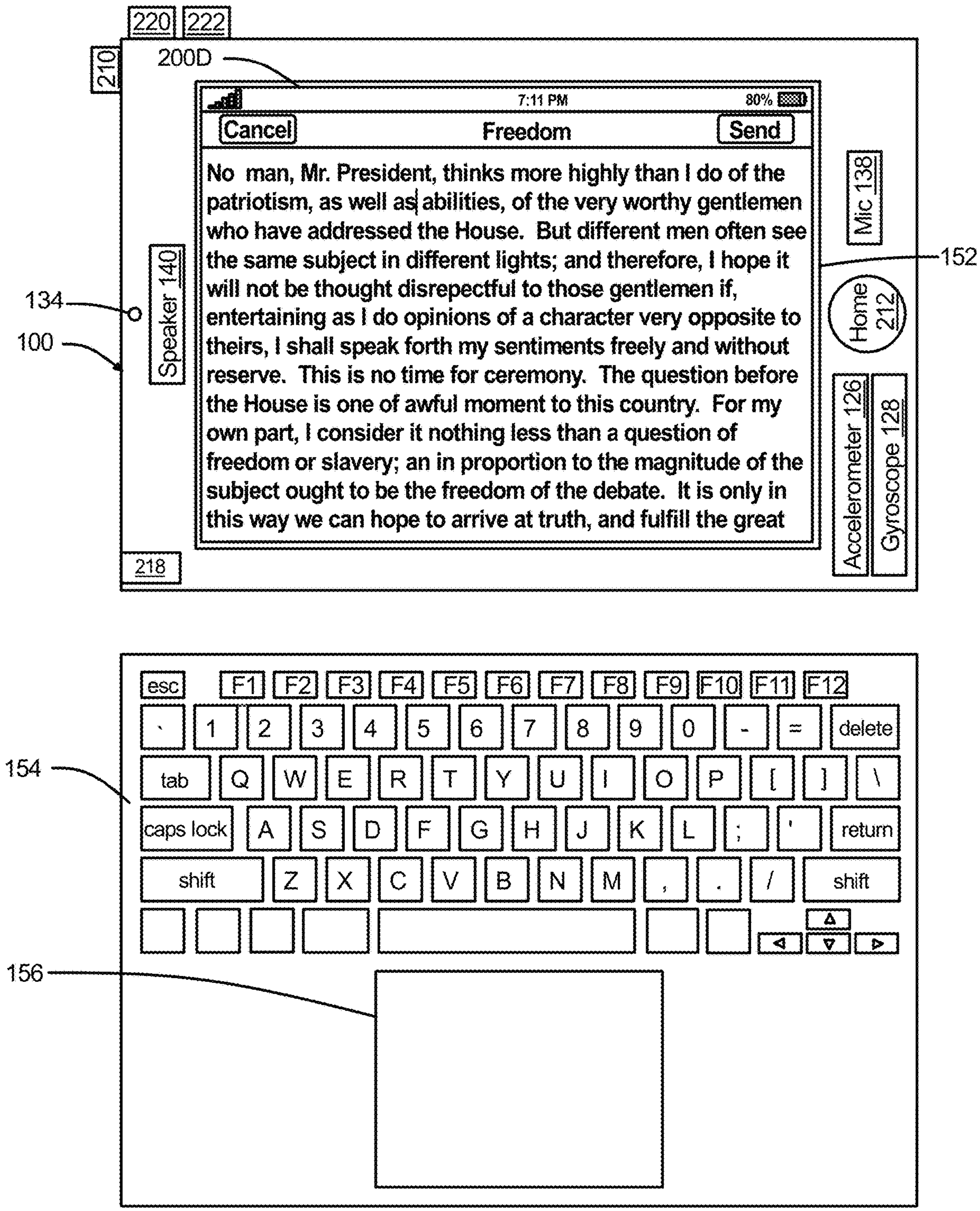
FIG. 2D illustrates a computing device in landscape orientation having a touch-sensitive display with an external keyboard with an integrated touchpad in accordance with some embodiments.
Figure 2E:
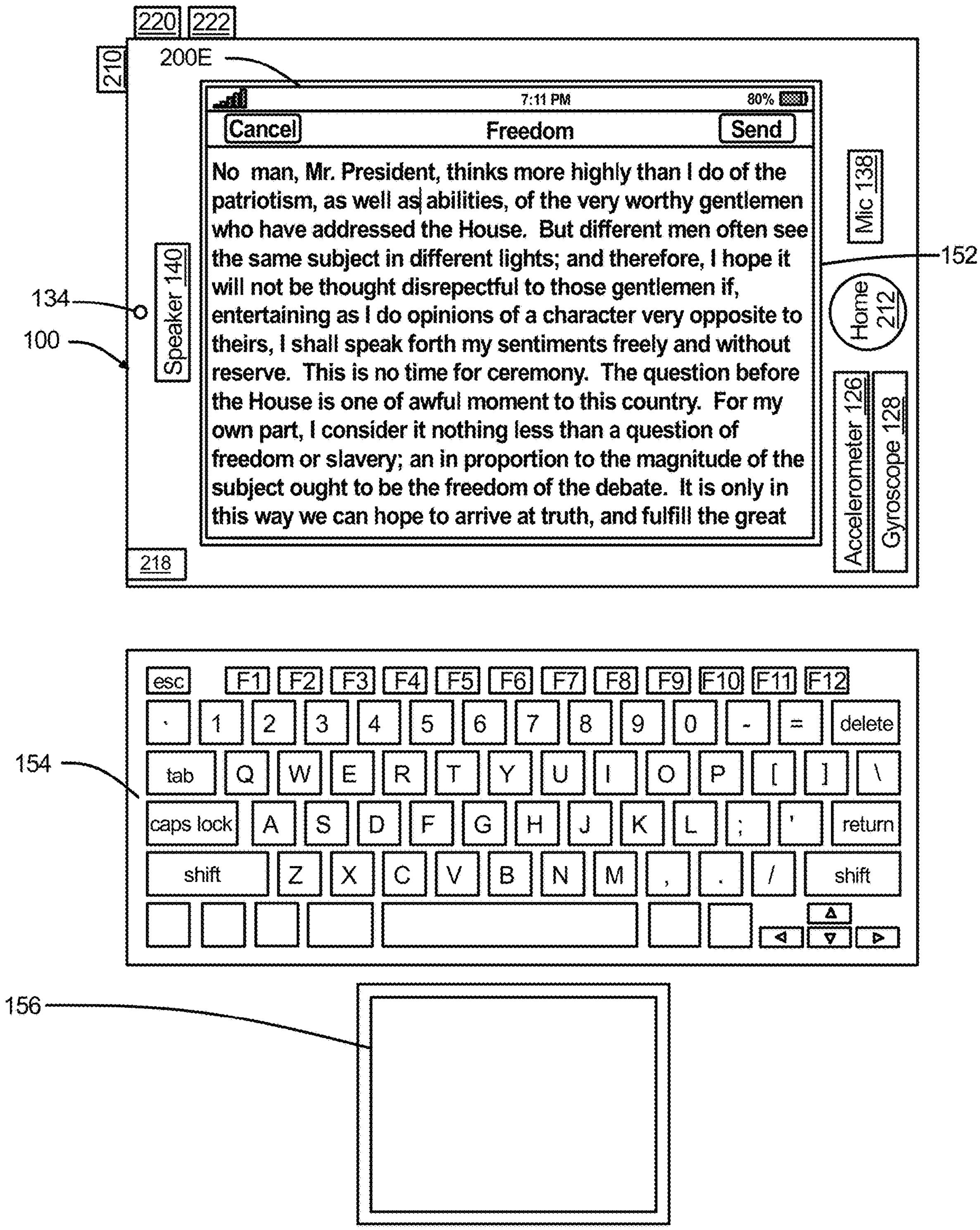
FIG. 2E illustrates a computing device in landscape orientation having a touch-sensitive display with an external keyboard and with an external touchpad in accordance with some embodiments.
Figure 2F:
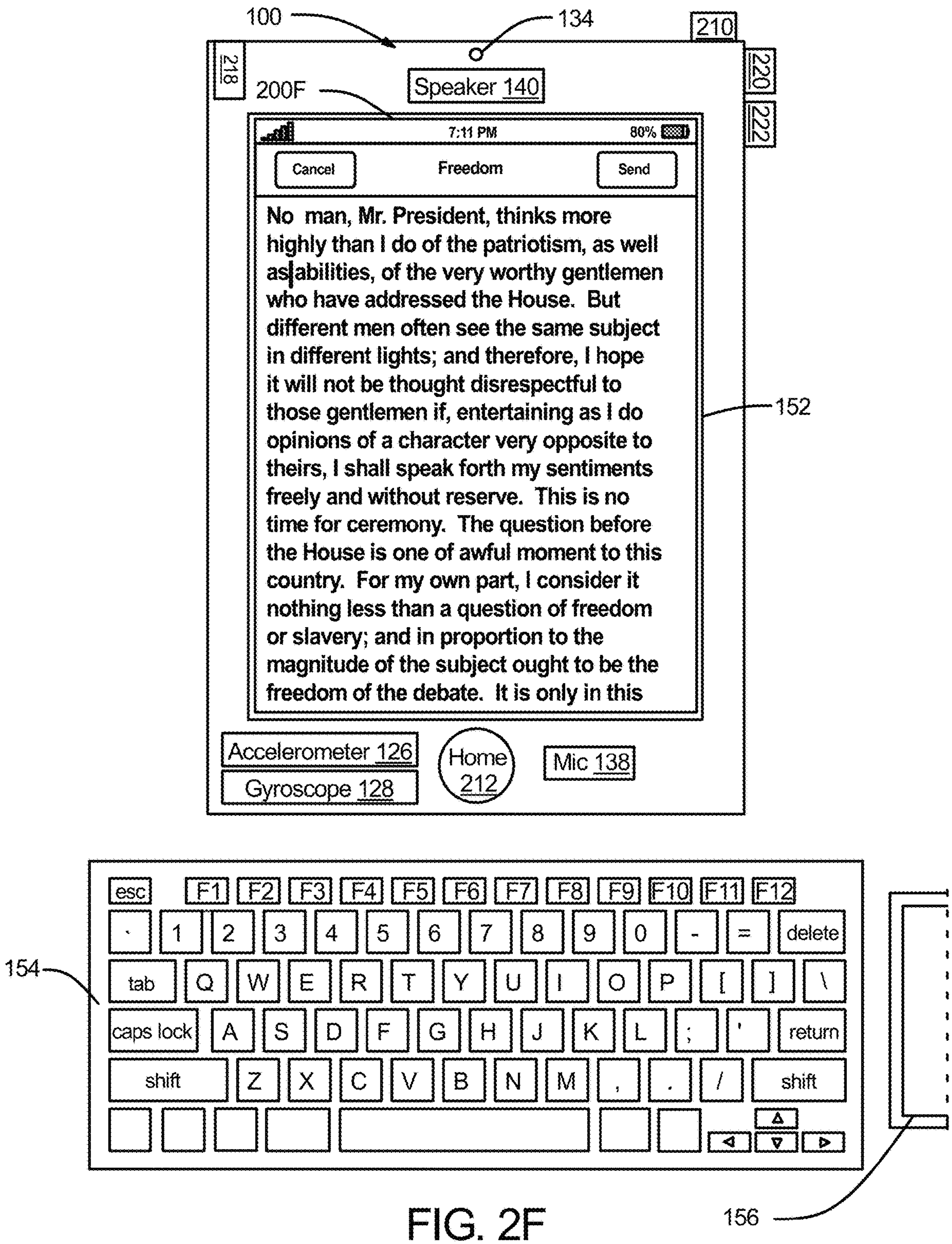
FIG. 2F illustrates a computing device in portrait orientation having a touch-sensitive display with an external keyboard and with an external touchpad in accordance with some embodiments.
Figure 2G:
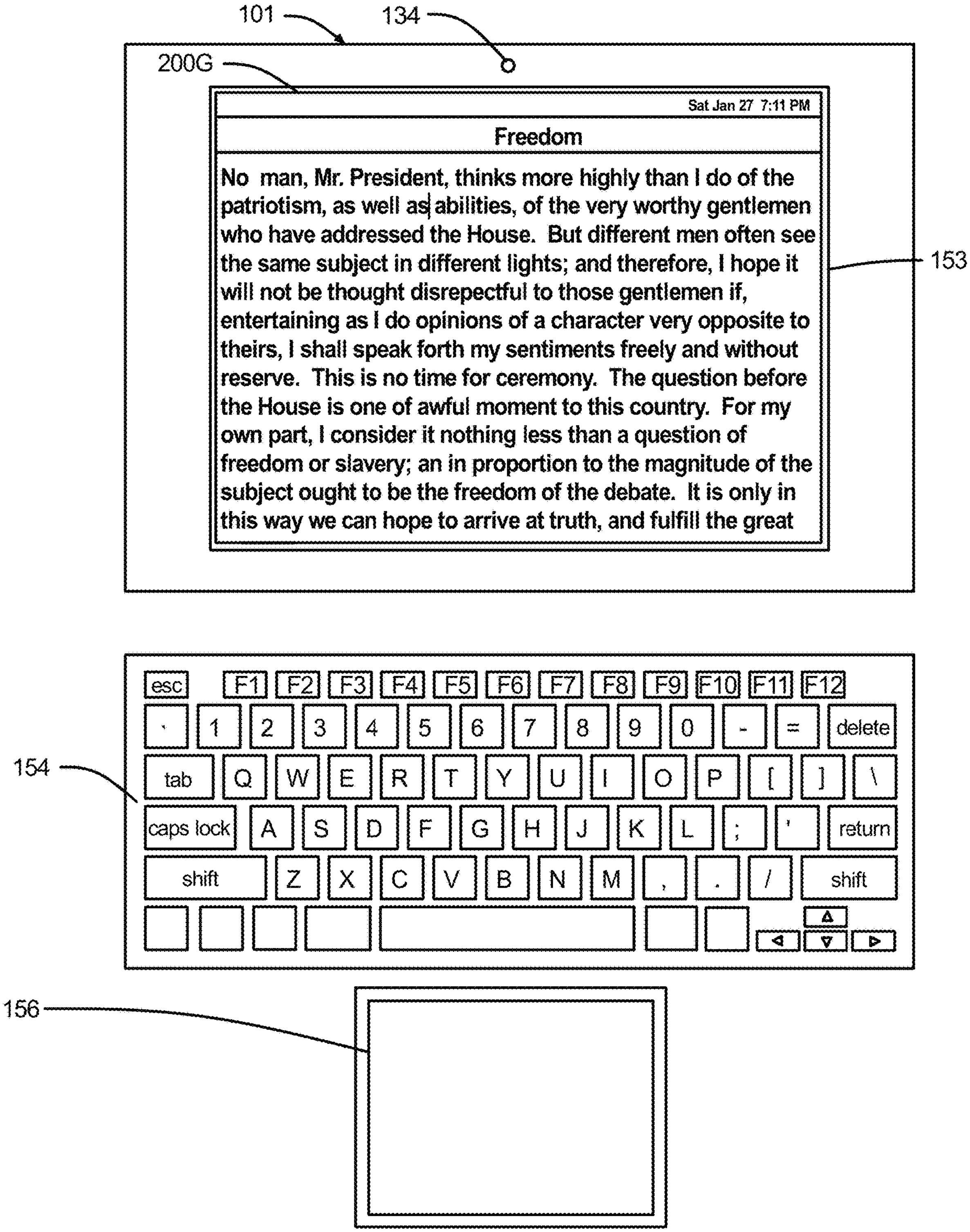
FIG. 2G illustrates a desktop-computing device having a display with an external keyboard and with an external touchpad in accordance with some embodiments.
Figure 2H:
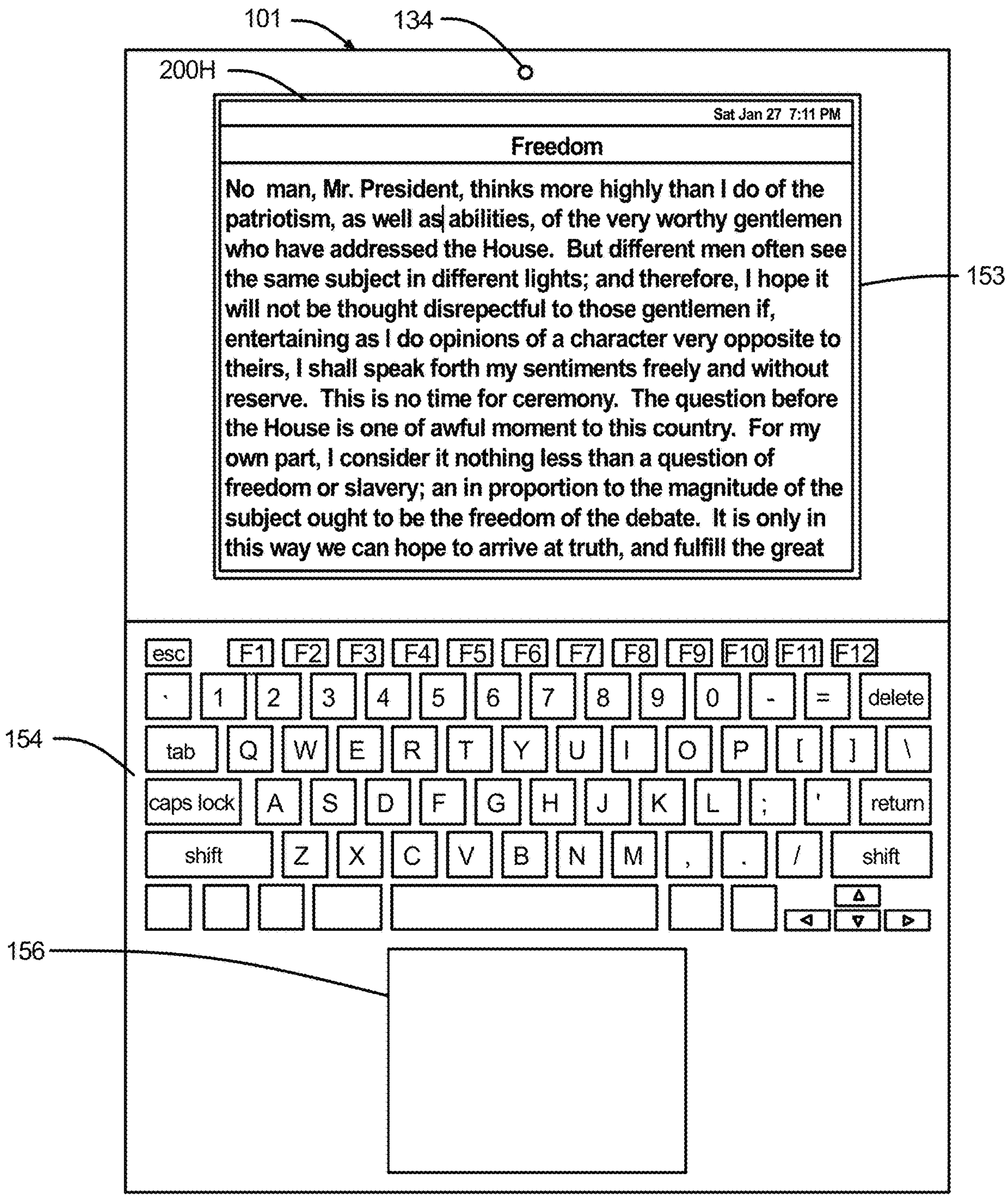
FIG. 2H illustrates a notebook-computing device having an integrated display with an integrated keyboard and touchpad in accordance with some embodiments.

2.0 Example computing devices: FIGS. 2A-2F illustrate examples of a computing device 100 having a touch-sensitive display 152 in accordance with some embodiments. Handheld computing device 100 can be a smart phone or a tablet. The touch-sensitive display can display one or more graphics within a user interface on touch-sensitive display 152. In this embodiment, as well as others described below, a user can select one or more graphics (in many instances these graphics are in the form of icons), by making contact with or touching the graphics, for example, with one or more fingers. In some embodiments, selection occurs when a user breaks contact with one or more graphics. In some embodiments, the contact can include a finger gesture, such as one or more taps, or swipes. A swipe finger gesture can be used to drag one icon to the location of another icon, for example. The device 100 can include one or more physical buttons such sleep/wake or power off/on button 210, home button 212, and volume up and down button pair 220 and 222. The device can include one or more accelerometers 126, a gyroscope 128 for sensing the position of the device position in space. The device can include a microphone 138, and speaker 140. The device can include earphone/microphone jack 218 for connection to an external headset. The device can include camera 134, status bar, and soft keyboard 240. FIG. 2A illustrates a computing device in portrait orientation having a touch-sensitive display and on-screen keyboard. FIG. 2B illustrates a computing device in landscape orientation having a touch-sensitive display and on-screen keyboard. FIG. 2C illustrates a computing device in landscape orientation having a touch-sensitive display with keyboard 154. FIG. 2D illustrates a computing device in landscape orientation having a touch-sensitive display with keyboard 154 with integrated touchpad 156 in accordance with some embodiments. FIG. 2E illustrates a computing device in landscape orientation having a touch-sensitive display with keyboard 154 and with touchpad 156 in accordance with some embodiments. FIG. 2F illustrates a computing device in portrait orientation having a touch-sensitive display with keyboard 154 and with touchpad 156 in accordance with some embodiments. FIG. 2G illustrates a desktop-computing device having display 153 with an external keyboard and with an external touchpad in accordance with some embodiments. FIG. 2H illustrates a notebook-computing device having integrated display 153 with an integrated keyboard and touchpad in accordance with some embodiments.

Attention is now directed towards embodiments of user interfaces and methods that can be implemented on computing device 100. The device detects the location of a finger contact and movement of a finger contact, across touchpad 156. In some embodiments the finger contact is part of a finger gesture. The device can detect the location of a finger gesture and type of finger gesture. Example finger gestures include, but are not limited to, a tap finger gesture (momentary contact of a single finger on touchpad 156 with no motion across touchpad 156, a long-press finger gesture (extended contact of a single finger on the touchpad 156 with no motion across touchpad 156 with the duration of the finger contact being approximately 0.5 seconds for example), a two-finger-tap finger gesture (momentary and simultaneous contact of two fingers on touchpad 156 with no motion across touchpad 156), a slide finger gesture (extended and uninterrupted contact of a single finger on touchpad 156 together with motion across touchpad 156), and a tap-and-slide finger gesture (momentary contact of a single finger on touchpad 156 with no motion across touchpad 156, followed by extended and uninterrupted contact of a single finger on touchpad 156 together with motion across touchpad 156 which begins at the location of the initial tap). The device responds to user gestures and displays a UI based upon the location and type of gesture that the device detects.

In each section of description below, we describe user interfaces and methods for positioning a selection, selecting, and editing within text content, using gestures on touchpad 156. (This includes the description in reference to FIGS. 3A-3Z, FIGS. 4A-4U, FIGS. 5A-5I, FIGS. 6A-6O, FIGS. 7A-7I, FIGS. 8A-8I, FIG. 9A, FIG. 9B, FIG. 10A, FIG. 10B, FIG. 10C, FIG. 11A, FIG. 11B, FIG. 11C, FIG. 12A, FIG. 12B, FIG. 12C, FIGS. 13A-13V, FIG. 14A, FIG. 14B and FIG. 14C.) In some instances we describe user interfaces and methods for positioning a selection, selecting, and editing within text content, using gestures on touchpad 156 and on keyboard 154.

3.0 Positioning a unit-length selection within read-only content: This is first described for the case of using gestures on a touchpad. This is then described for the case of using gestures on a touchpad and keyboard.

3.1 Using gestures on touchpad: FIGS. 3A-3E illustrate an example of displaying unit-length selection 310 and changing the horizontal position of unit-length selection 310 with gestures on touchpad 156. FIGS. 3F-3G illustrate an example of changing the vertical position of unit-length selection 310 with gestures on touchpad 156. FIGS. 3H-3I, FIGS. 3J-3M, and FIGS. 3N-3Q illustrate examples of changing both the horizontal and vertical position of unit-length selection 310 with a diagonal slide finger gesture on touchpad 156. FIGS. 3R-3S illustrate an example of scrolling up the content with a two-finger vertical finger gesture on touchpad 156. In this disclosure we will often refer to "selection 310 of length equal to one character" simply as "unit-length selection 310" or "selection 310".

Figure 3A:
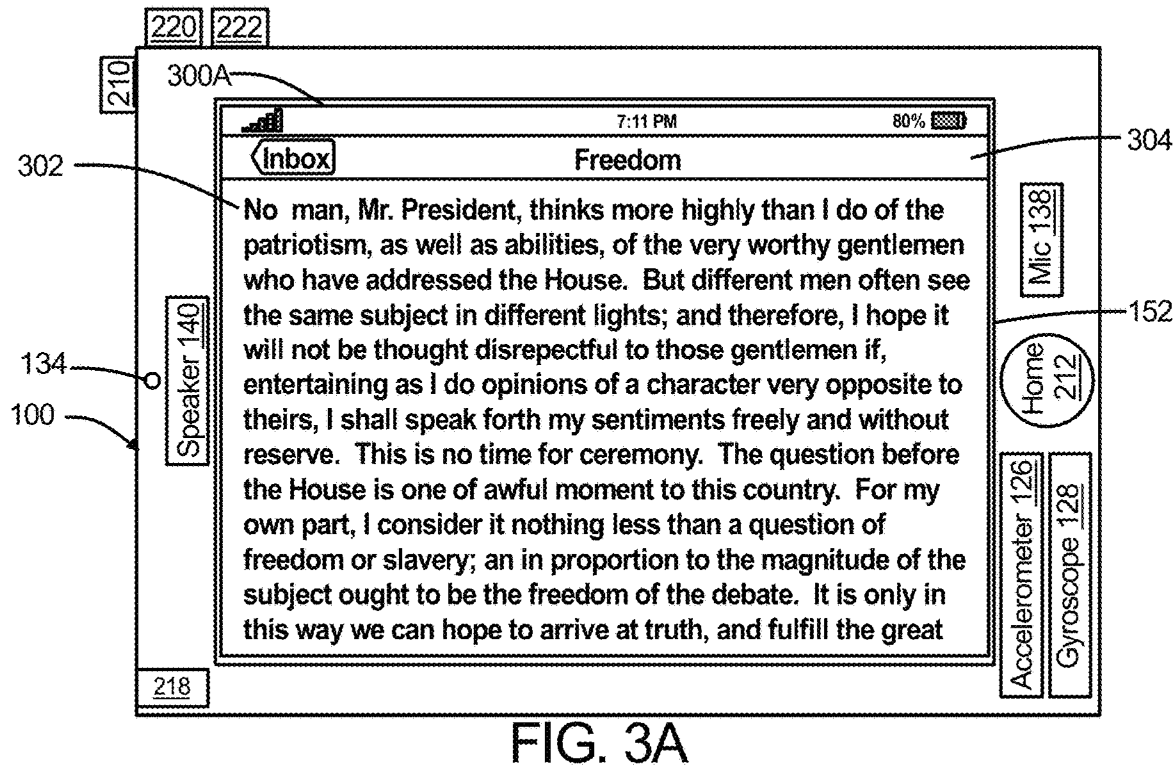
FIGS. 3A-3U illustrate an exemplary user interface and method for displaying and moving a selection of length equal to one character within read-only content, on a computing device with a display, using gestures on a touchpad in accordance with some embodiments.
Figure 3B:
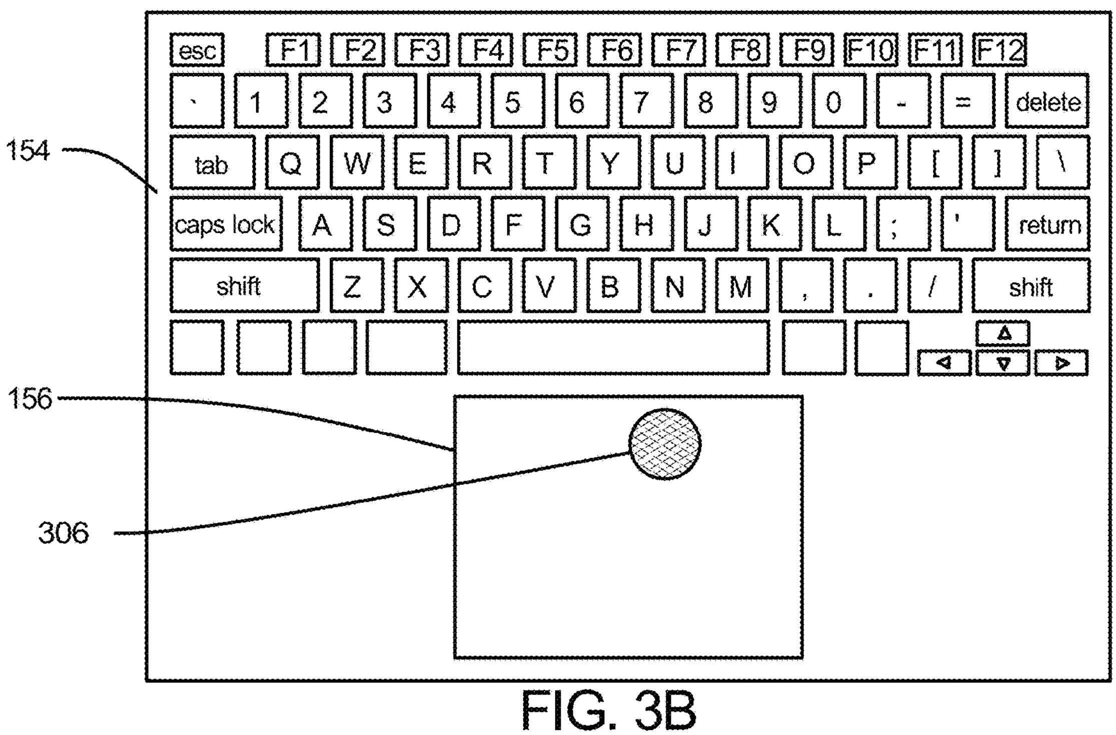
FIGS. 3V-3Z illustrate an exemplary user interface and method for displaying and moving a selection of length equal to one character within read-only content, on a mobile computing device with a display, using gestures on a touchpad and keyboard in accordance with some embodiments.
Figure 3C:
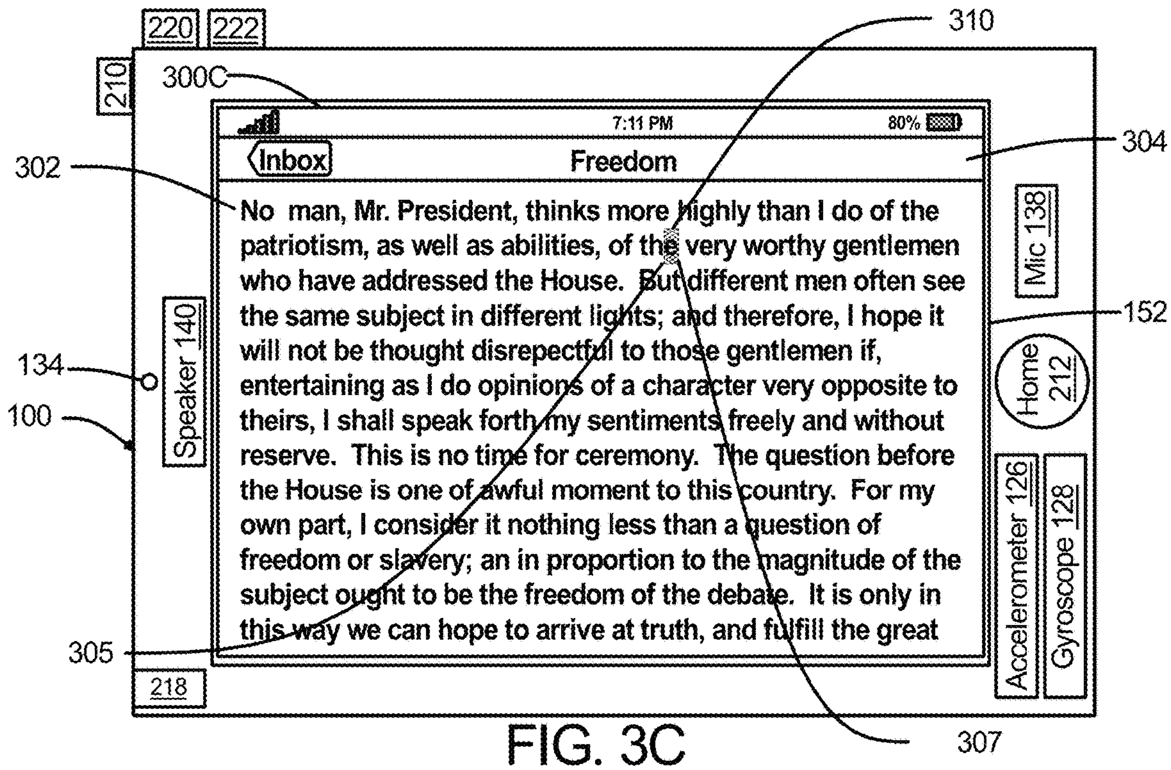

The device can display read-only text content 302 as illustrated in FIG. 3A. The device can also display application navigation bar 304. A user can perform a finger gesture 306 (a long-press or long-click finger gesture for example) on touchpad 156 as illustrated in FIG. 3B. In response to detecting finger gesture 306 on touchpad 156, the device displays unit-length selection 310 at a first selection position as illustrated in FIG. 3C. (If no read-only content is present at or near that position on the display, then the device does not display selection 310.)

The selection has a selection start point 305 and a selection end point 307. In one exemplary embodiment, the first selection position is at approximately the same relative position on the display as finger gesture 306 on touchpad 156 as illustrated in FIGS. 3B-3C. In other exemplary embodiment, the first selection position is at the first or last character in read-only text content 302.

Figure 3D:
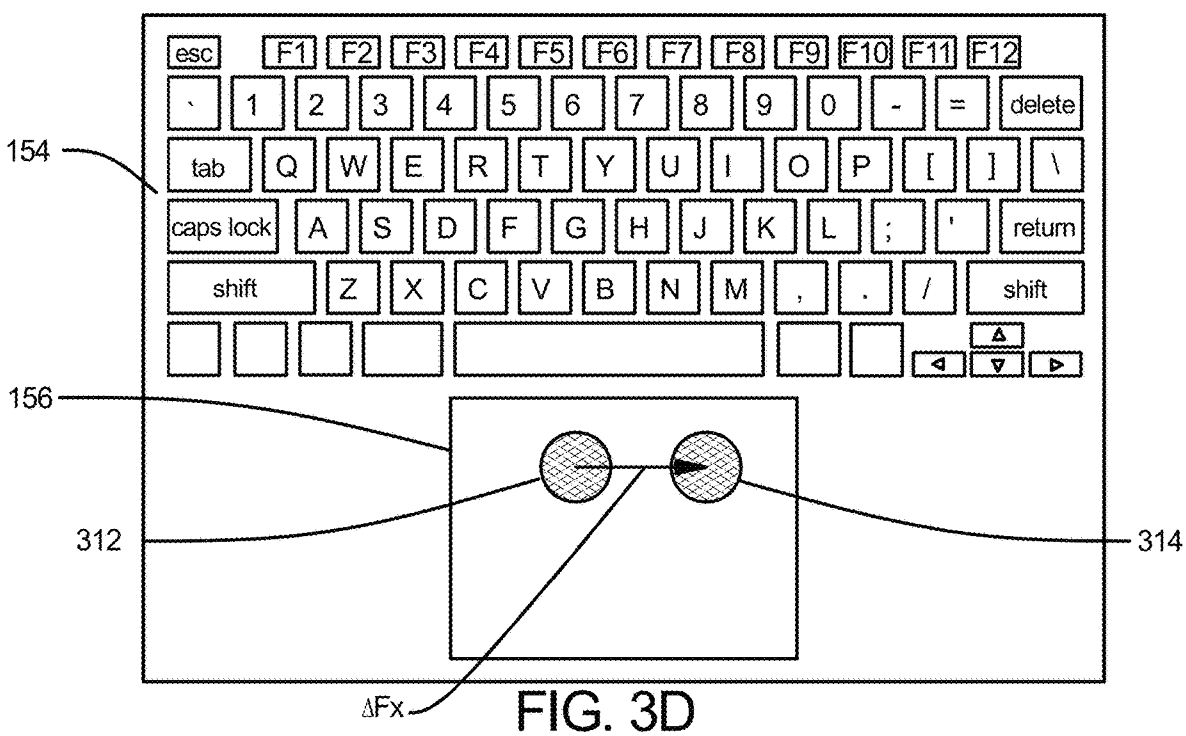
Figure 3E:
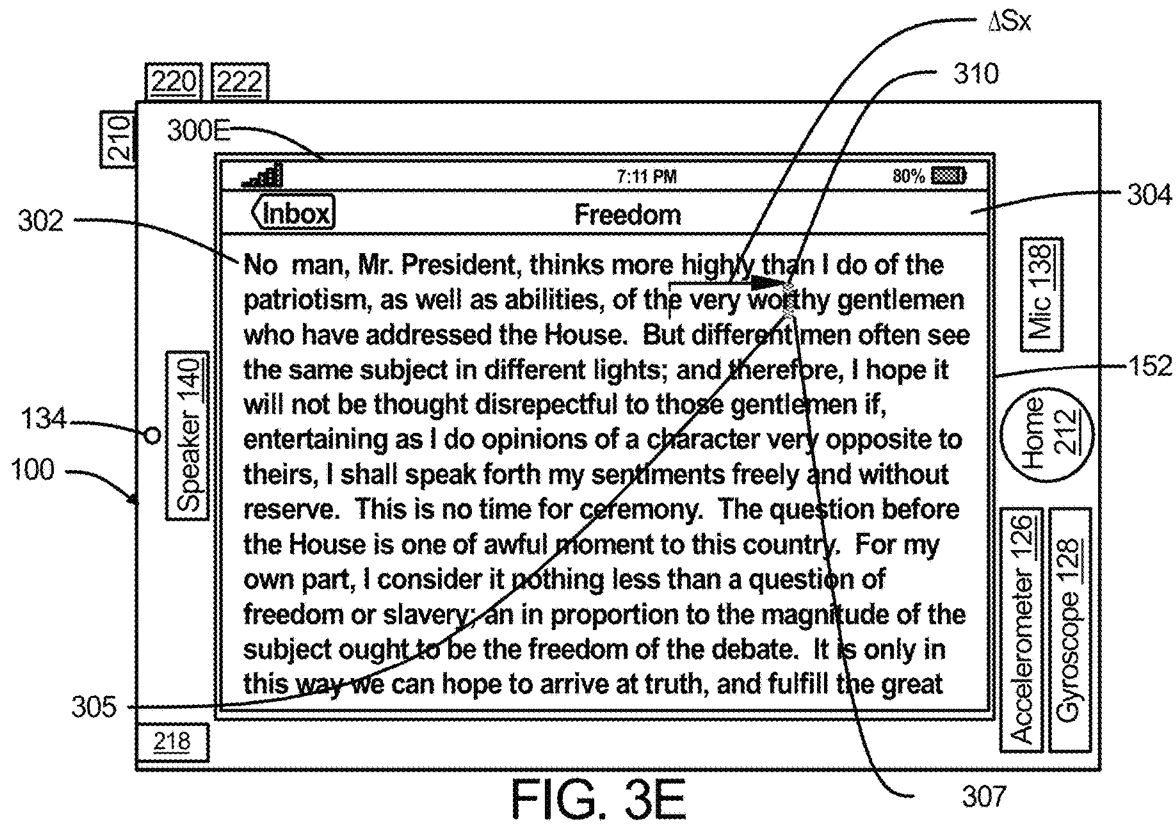
Figure 3F:
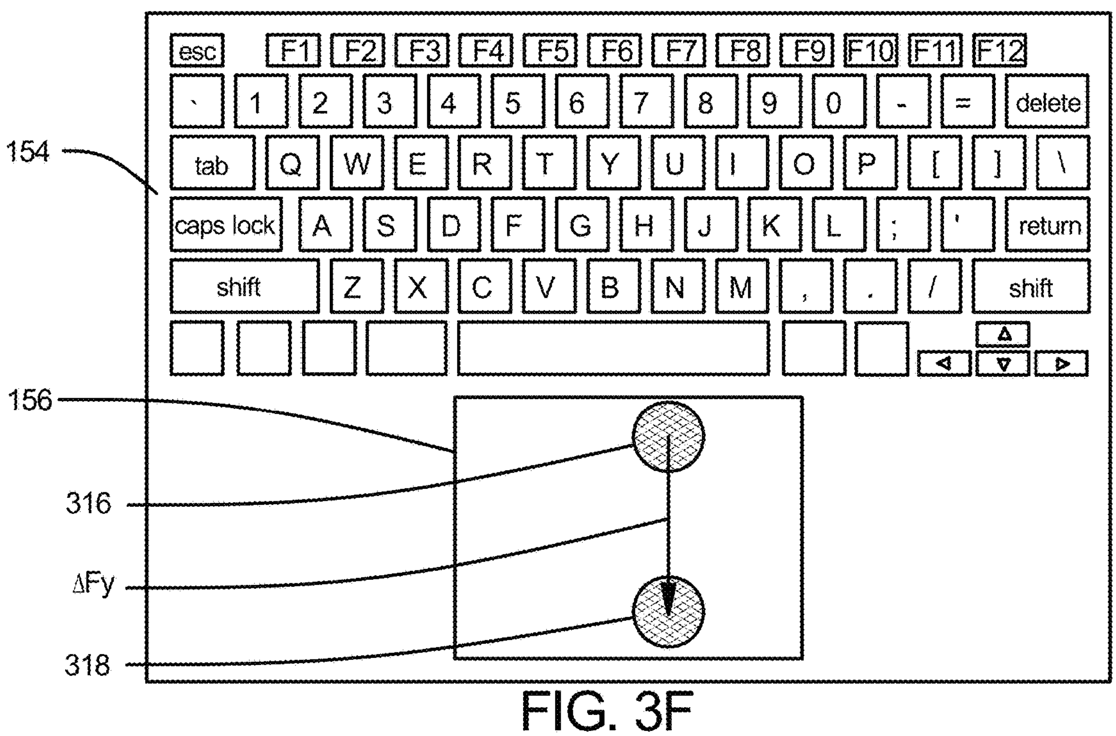
Figure 3G:
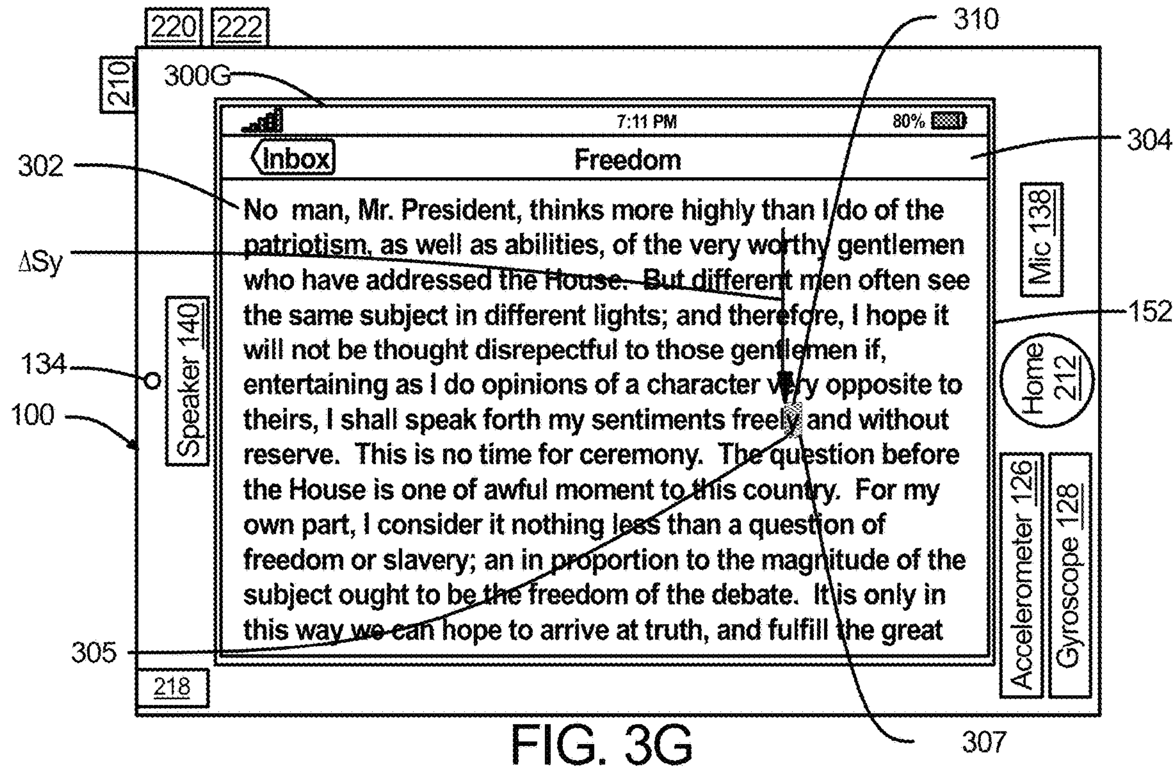

A user can perform a horizontal slide finger gesture 312 to 314 on touchpad 156 as illustrated in FIG. 3D. In response to detecting ΔFx (a change in the horizontal position of an uninterrupted finger contact), the device changes the horizontal position of unit-length selection 310 on the display from the first selection position to a second selection position as illustrated in FIG. 3E. In one exemplary embodiment ΔSx (the change in the horizontal position of selection 310) is approximately proportional to ΔFx as illustrated in FIGS. 3D-3E. This can be written as ΔSx=KxΔFx where Kx is a proportionality constant for the x-component of the finger motion. ΔSx is not exactly proportional to ΔFx because the selection moves in discrete steps corresponding the horizontal distance between characters in text. The value of Kx can be less than one, equal to one, or greater than one. In some embodiments, Kx can be a function of the x-component of the slide gesture speed. In this example, Kx~1.

With unit-length selection 310 at a first position, a user can perform a vertical slide finger gesture 316 to 318 beginning anywhere on touchpad 156. In response to detecting ΔFy (a change in the vertical position of an uninterrupted finger contact), the device changes the vertical position of selection 310 as illustrated in FIG. 3G. In one exemplary embodiment ΔSy (the change in the vertical position of unit-length selection 310) is approximately proportional to ΔFy as illustrated in FIGS. 3F-3G. This can be written as ΔSy=KyΔFy where Ky is a proportionality constant for the y-component of the finger motion. ΔSy is not exactly proportional to ΔFy because the selection moves in discrete steps corresponding the vertical distance between lines of text. The value of Ky can be less than one, equal to one, or greater than one. In some embodiments, Ky can be a function of the y-component of the slide gesture speed. In this example, Ky~1. The device displays user interface (UI) 300G (FIG. 3G) with unit-length selection 310 at a new position.

Figure 3H:
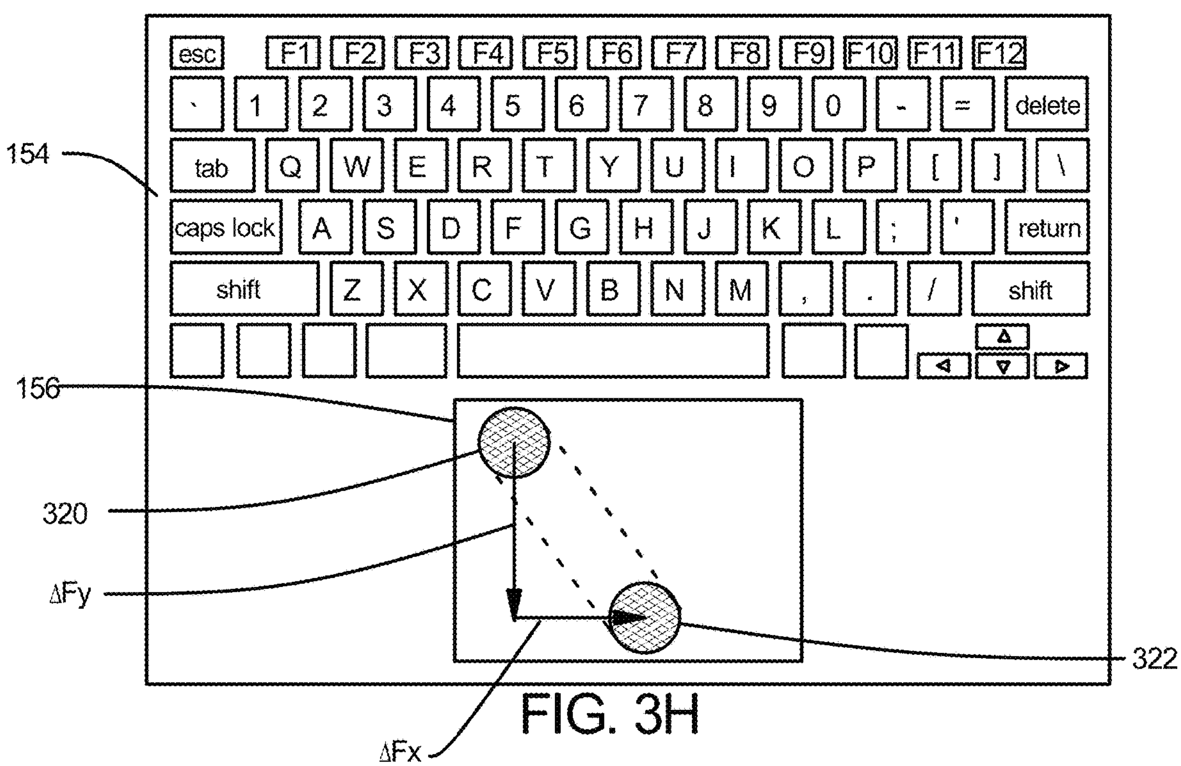
Figure 3I:
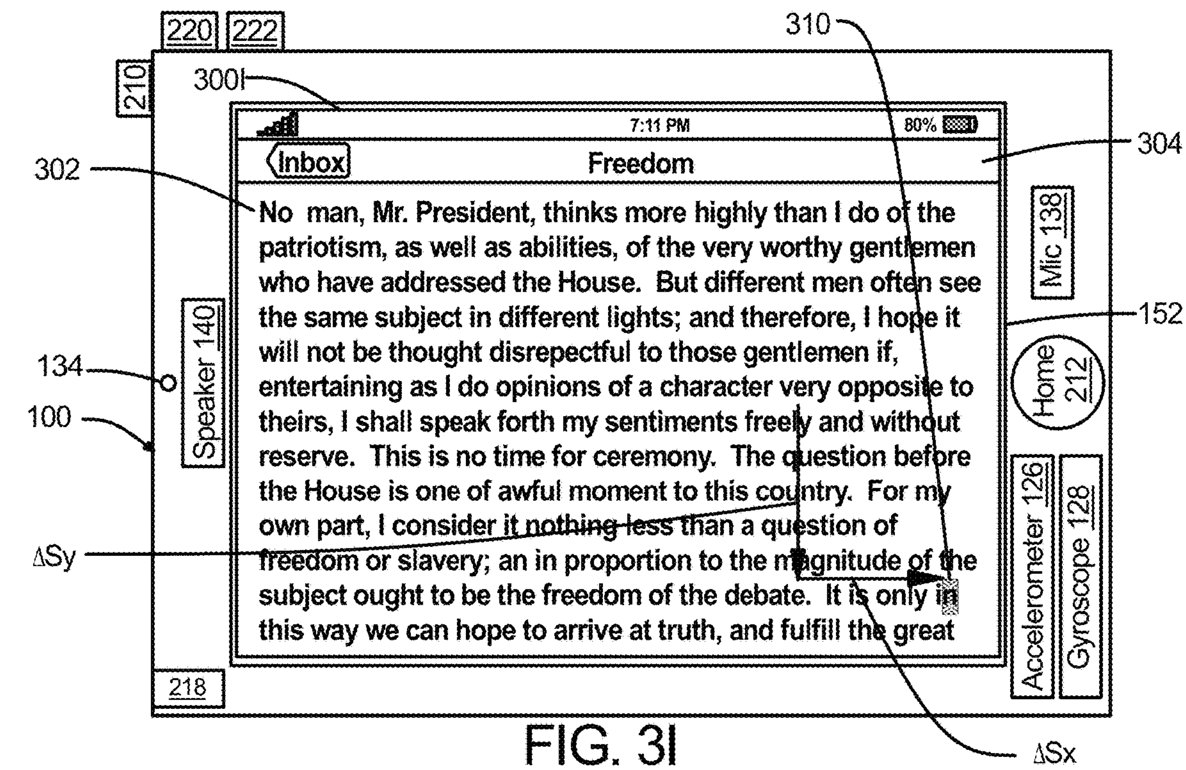

A user can move both the horizontal and vertical position of unit-length selection 310 with a single diagonal-slide finger gesture as illustrated in FIGS. 3H-3I. With selection 310 at a first position, a user can perform a diagonal-slide finger gesture 320 to 322 beginning anywhere on touchpad 156. In response to detecting ΔFx (a change in the horizontal position) and ΔFy (a change in the vertical position) of an uninterrupted finger contact on touchpad 156, the device changes the position of unit-length selection 310 on the display from a first position to a second position. In this exemplary embodiment ΔSx is approximately proportional to ΔFx and ΔSy is approximately proportional to ΔFy as illustrated in FIGS. 3H-3I. The device displays UI 300I (FIG. 3I) with selection 310 at a second position. In this example, Kx~1 and Ky~1

In some embodiments where, Kx, the proportionality constant for the x-component of the finger motion, is a function of the time rate of change of finger position in the x-direction (the x-component of the slide gesture speed), and Ky, the proportionality constant for the y-component of the finger motion, is made a function of the time rate of change of finger position in the y-direction (the y-component of the slide gesture speed). This approach enables a user to quickly and accurately move unit-length selection 310 within read-only content. A user can quickly move unit-length selection 310 with a high-speed slide gesture where Kx>1 and Ky>1 and accurately move unit-length selection 310 to its final position with a low-speed slide gesture where Kx<1 and Ky<1.

Figure 3J:
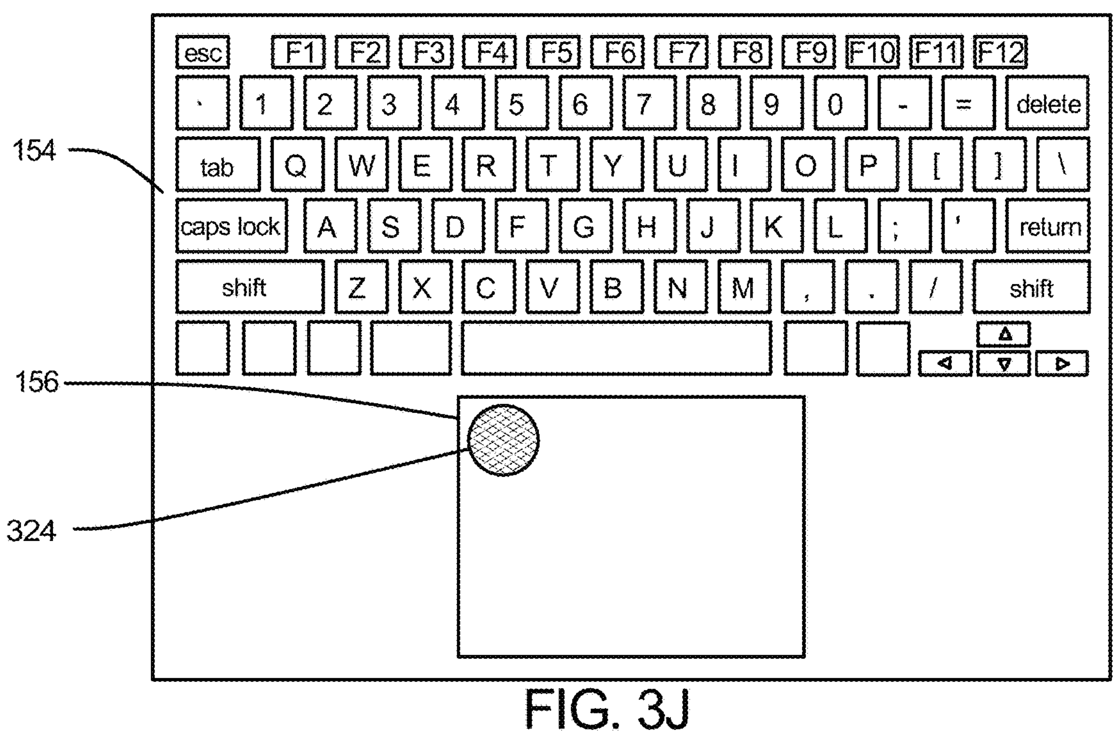
Figure 3K:
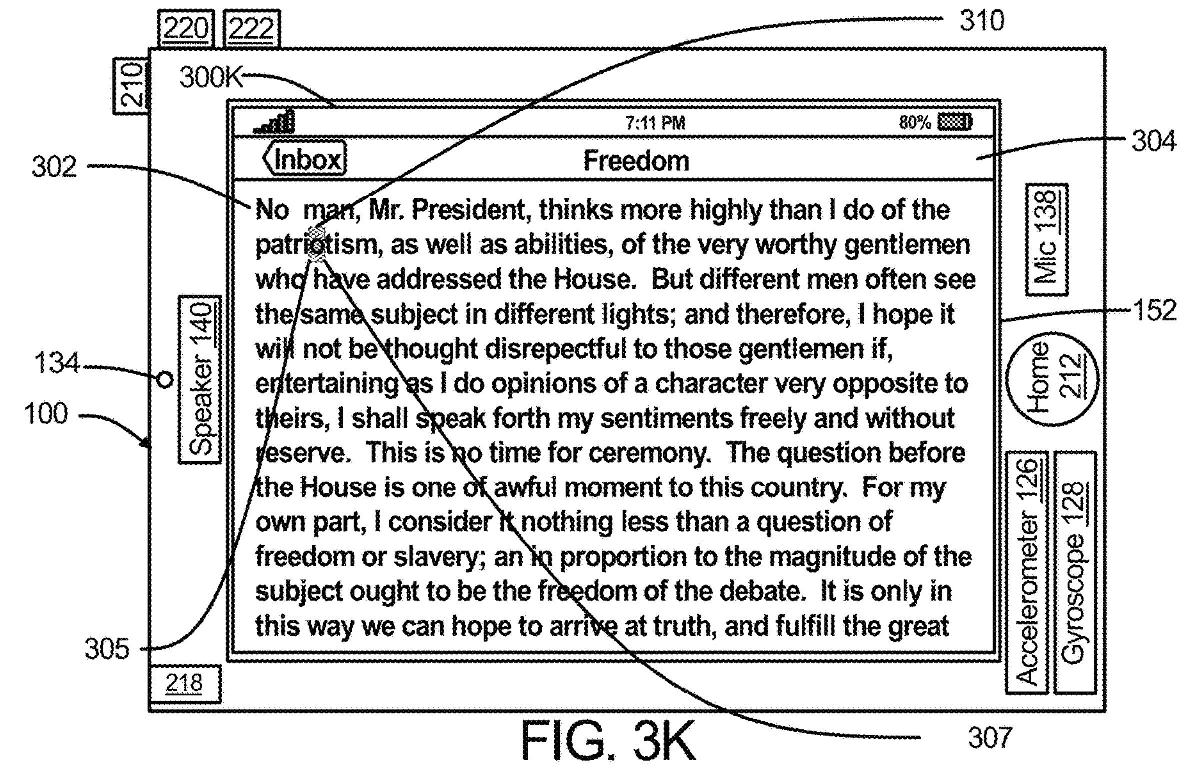
Figure 3L:
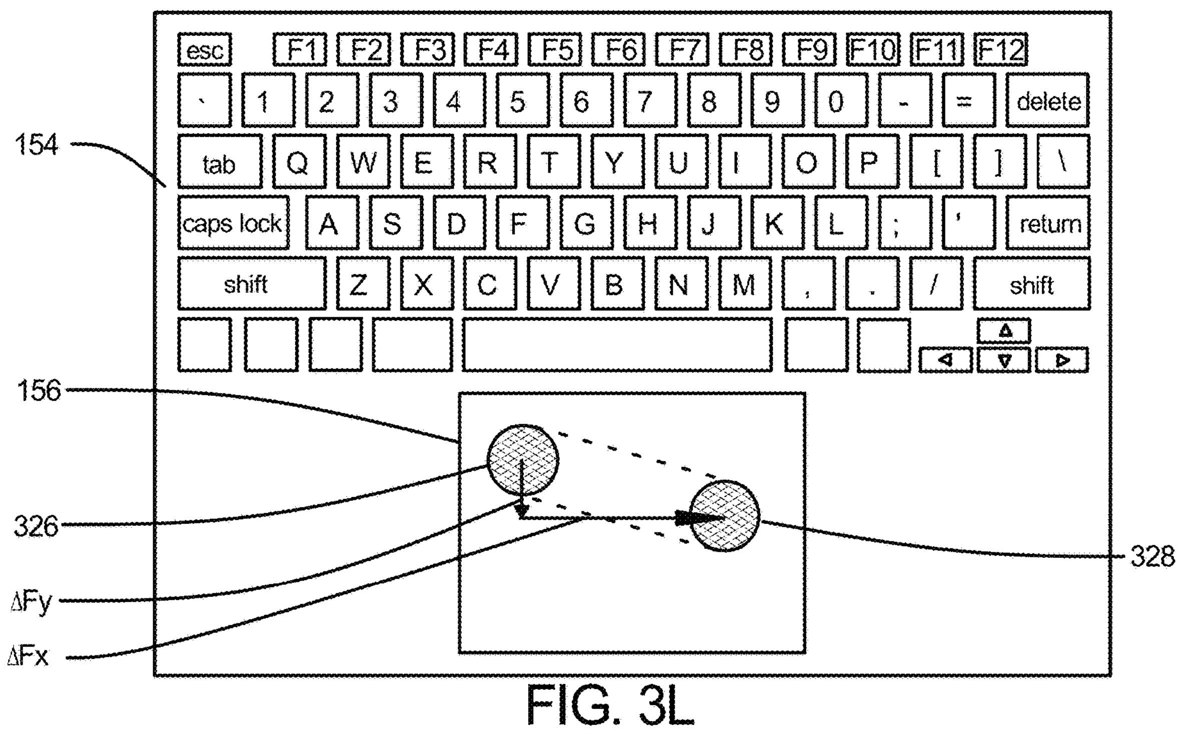
Figure 3M:
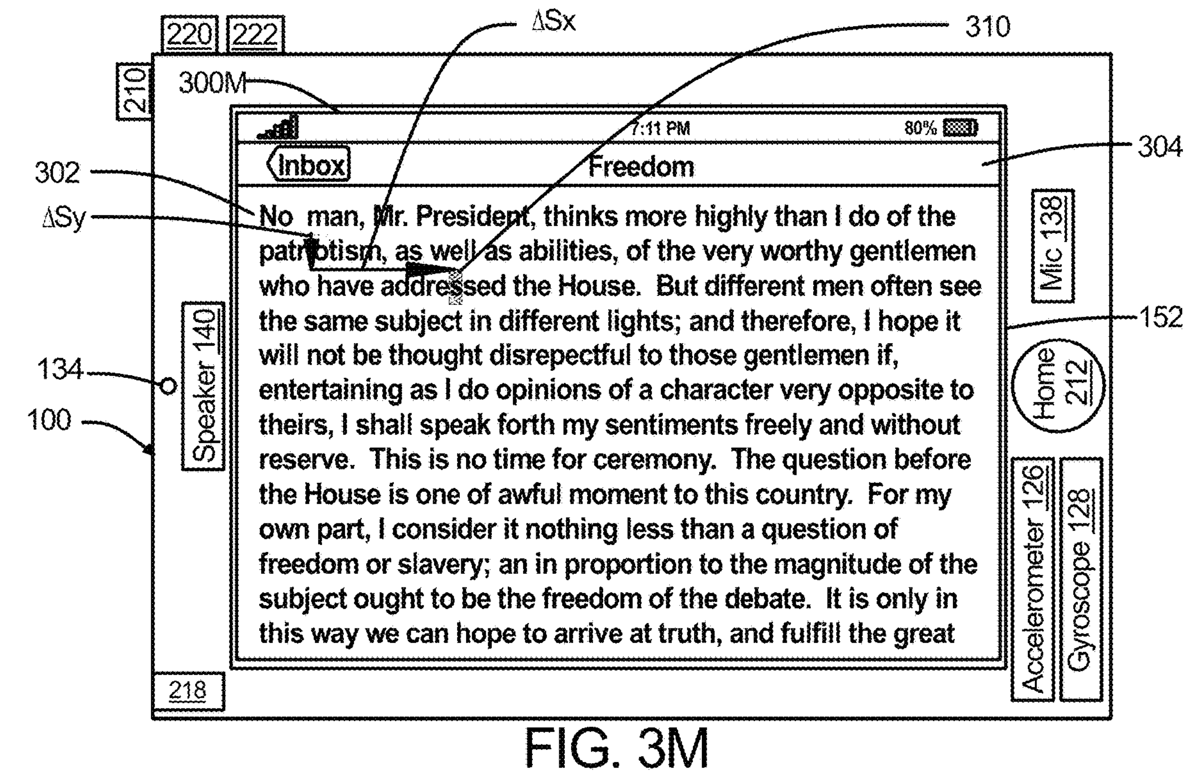

For example, a user can perform a long-press or long-click finger gesture 324 on touchpad 156 as illustrated in FIG. 3J. In response to detecting the finger gesture on touchpad 156, the device displays unit-length selection 310 at a first selection position as illustrated in FIG. 3K. With selection 310 at a first position, a user can perform a relatively low-speed diagonal-slide finger gesture 326 to 328, where Kx<1 and Ky<1, beginning anywhere on touchpad 156. With Kx<1 and Ky<1, the change in the horizontal position of selection 310 (ΔSx) is less than the change in the horizontal position of the finger contact (ΔFx) and the change in the vertical position of selection 310 (ΔSy) is less than the change in the vertical position of the finger contact (ΔFy) as illustrated in FIGS. 3L-3M.

Figure 3N:
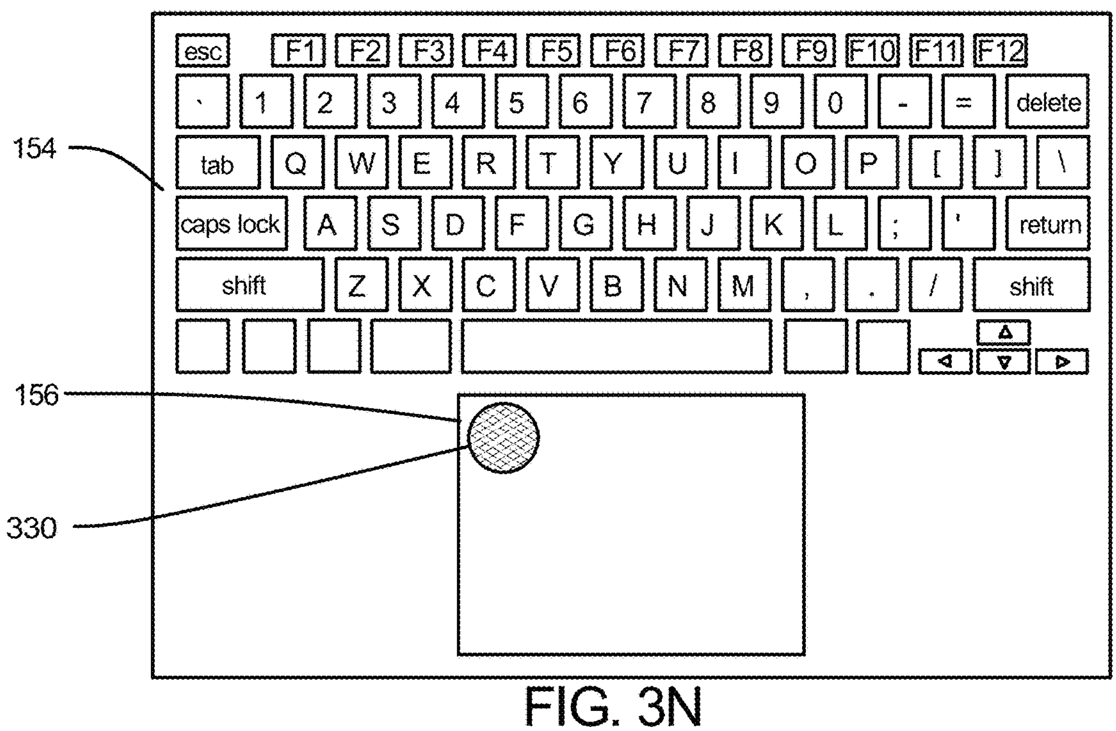
Figure 3O:
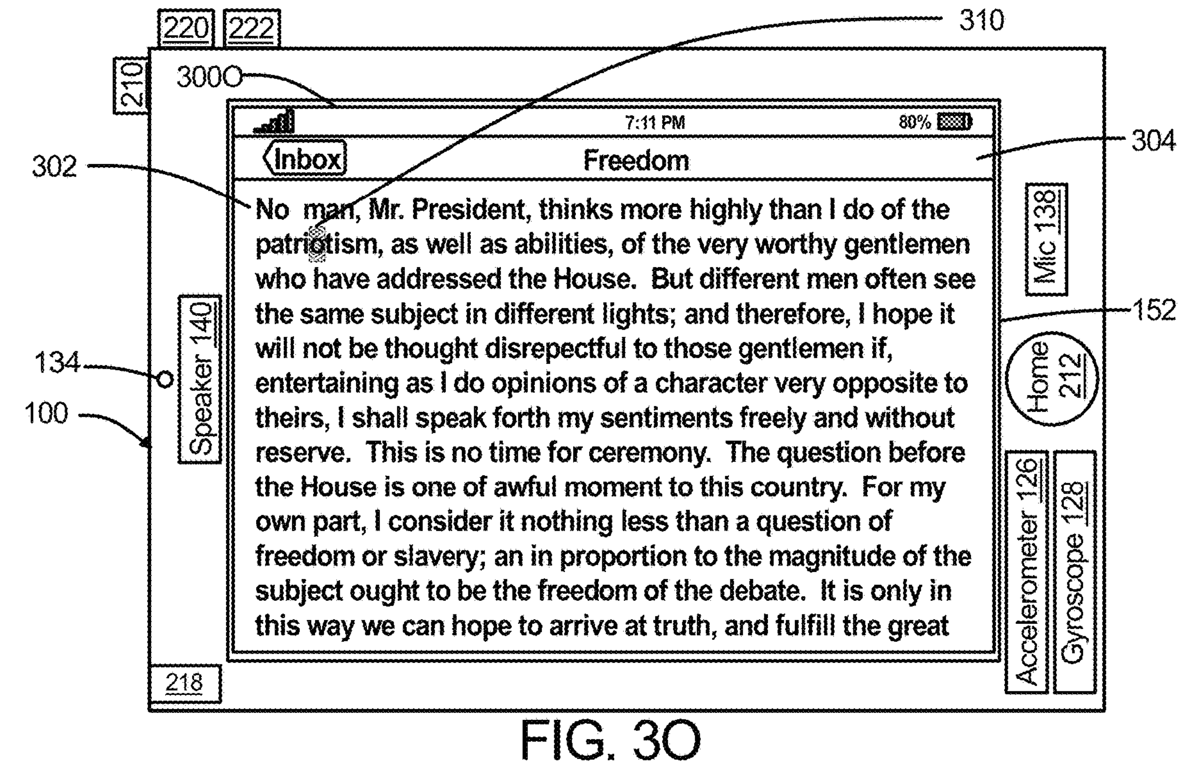
Figure 3P:
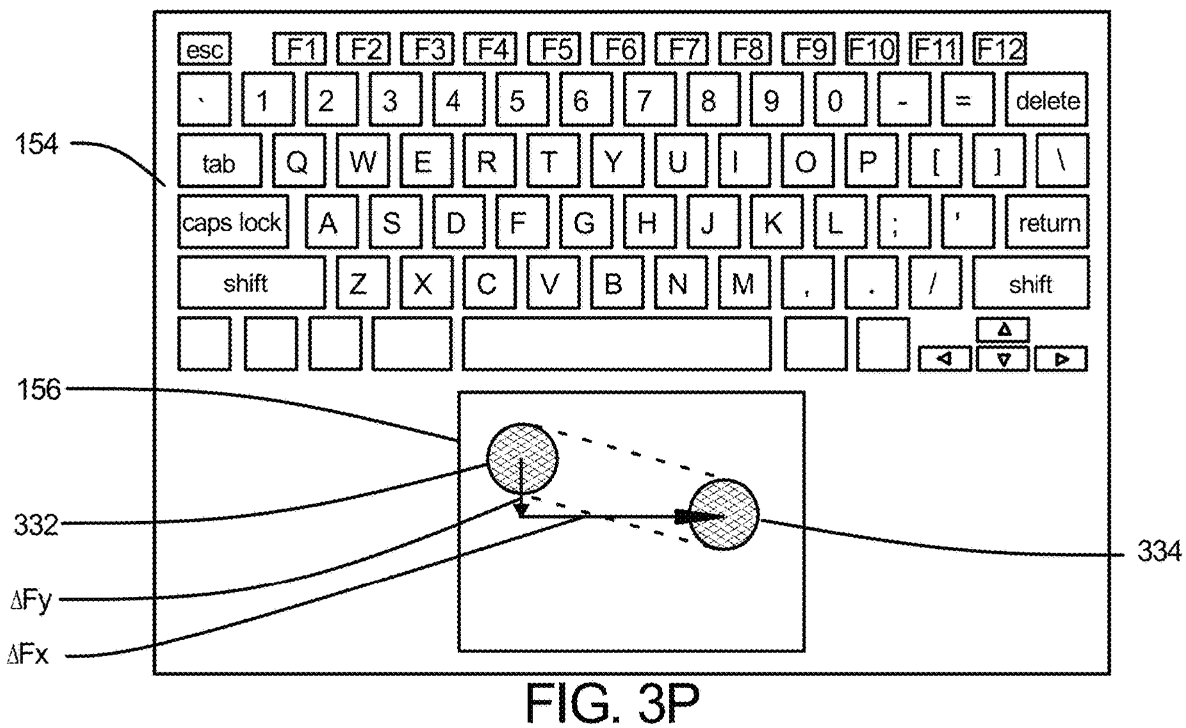
Figure 3Q:
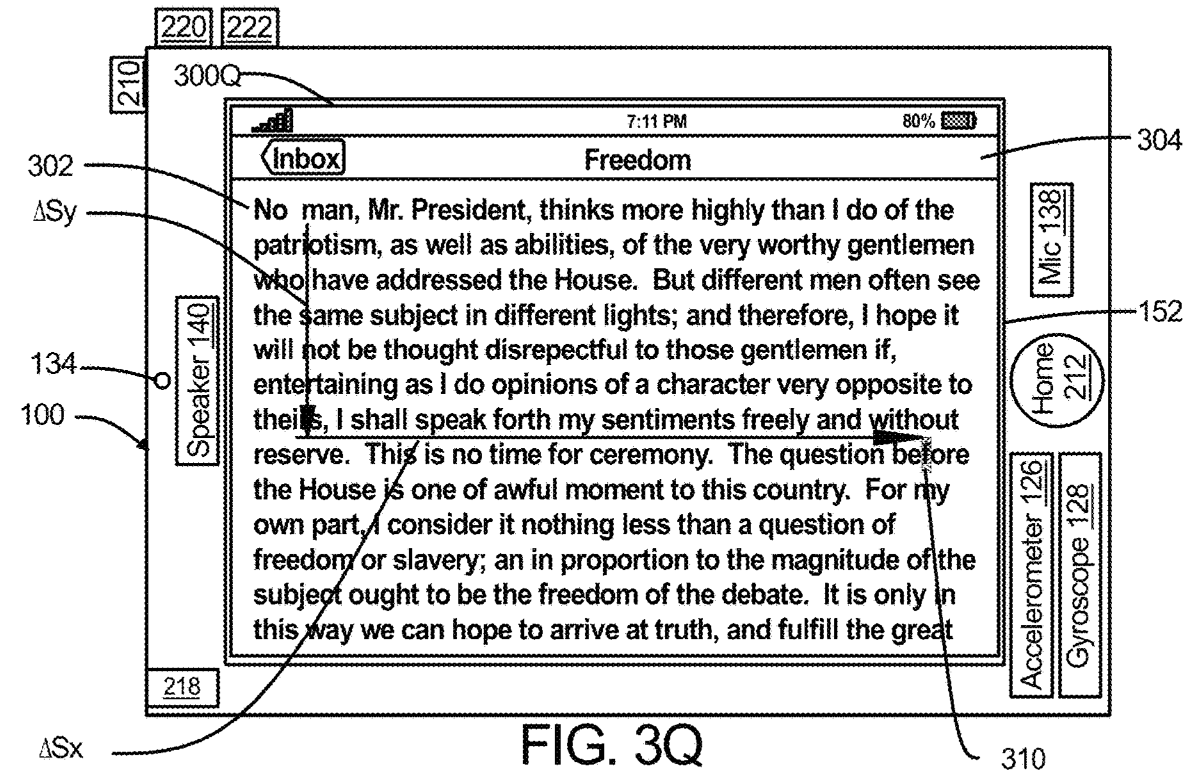
Figure 3R:
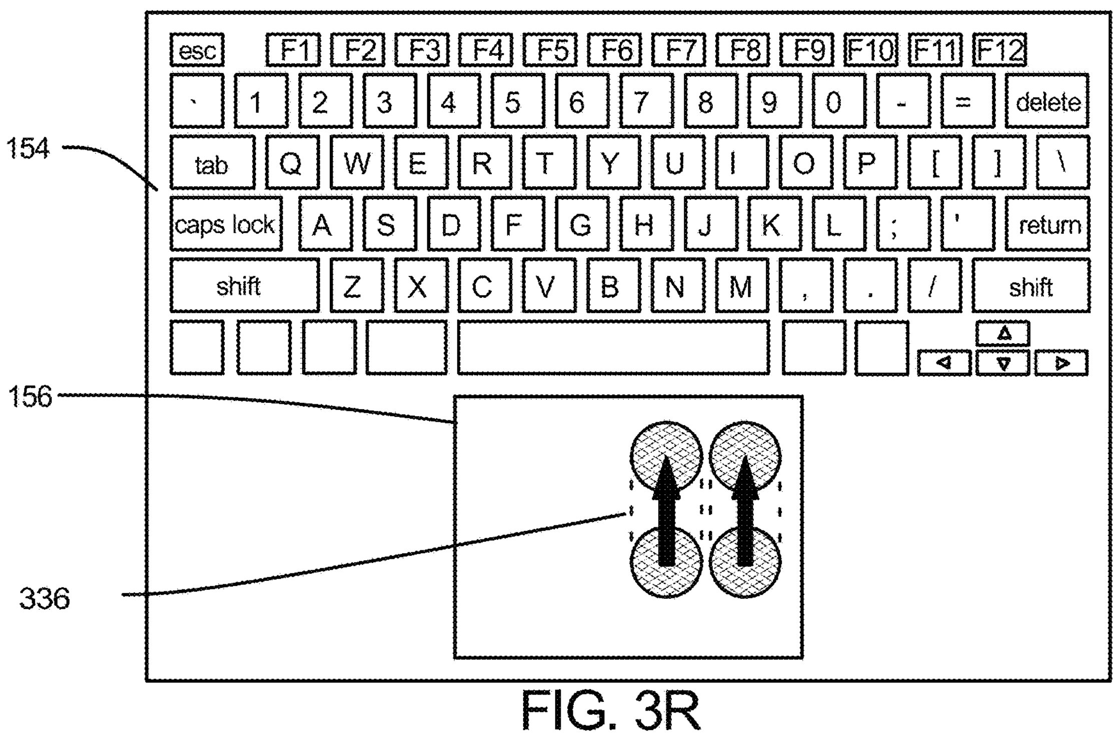
Figure 3S:
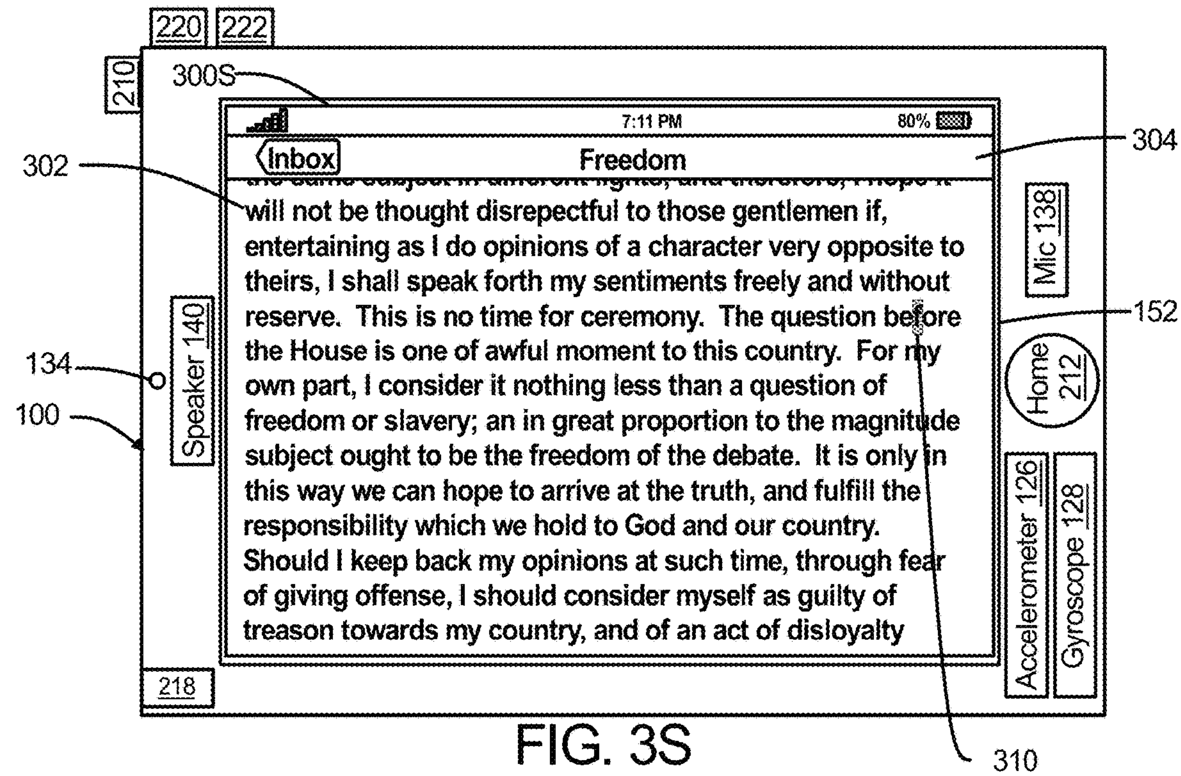
Figure 3T:
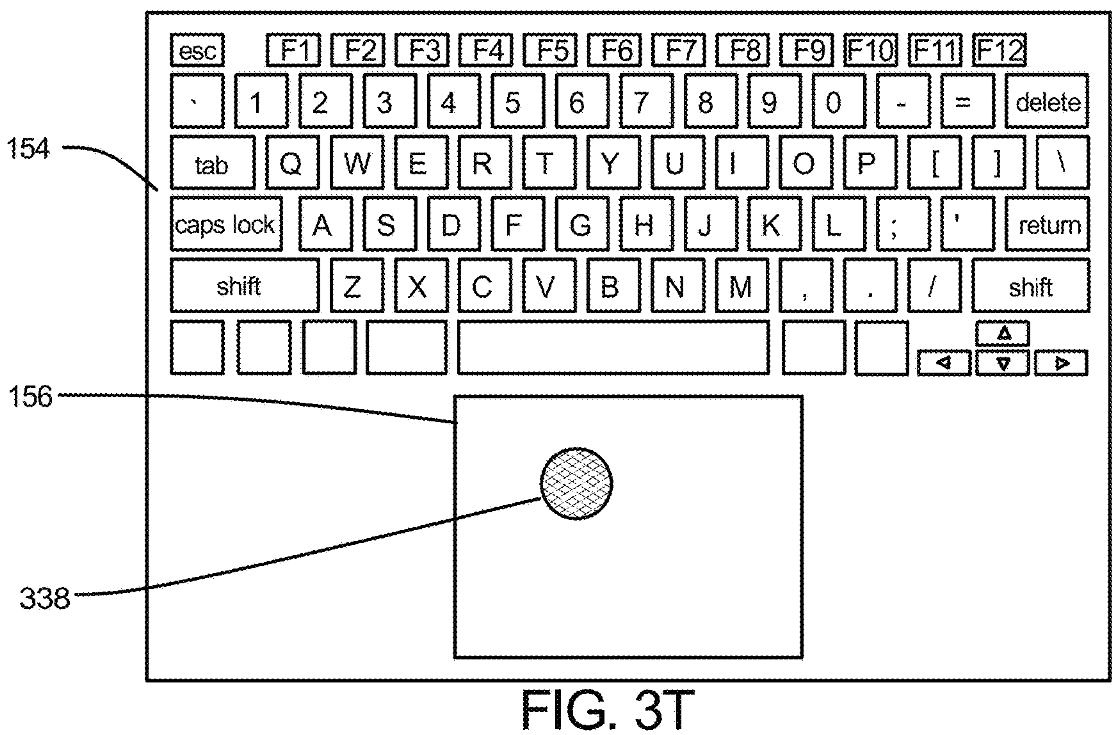
Figure 3U:
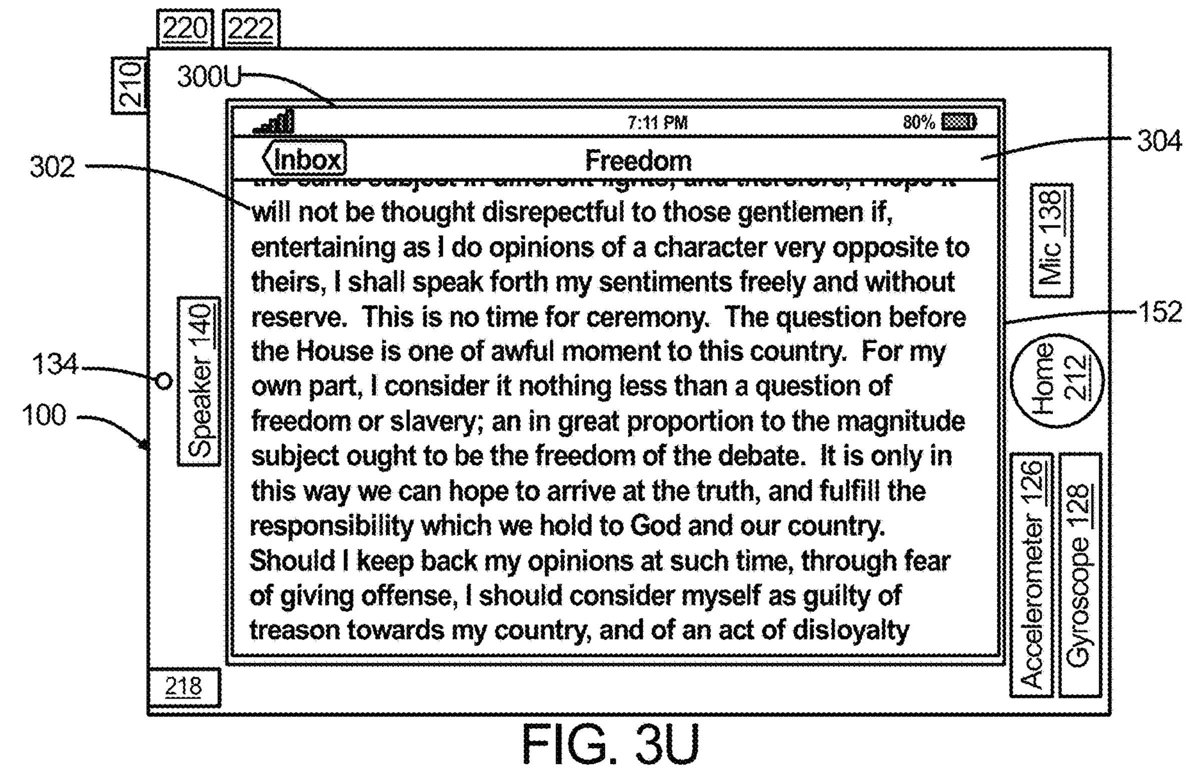

For example, a user can perform a long-press or long-click finger gesture 330 on touchpad 156 as illustrated in FIG. 3N. In response to detecting finger gesture 330 on touchpad 156, the device displays unit-length selection 310 at a first selection position as illustrated in FIG. 3O. With selection 310 at a first position, a user can perform a relatively high-speed diagonal-slide finger 332 to 334, where Kx>1 and Ky>1, beginning anywhere on touchpad 156. With Kx>1 and Ky>1, the change in the horizontal position of selection 310 (ΔSx) is greater than the change in the horizontal position of the finger contact (ΔFx) and the change in the vertical position of selection 310 (ΔSy) is greater than the change in the vertical position of the finger contact (ΔFy) as illustrated in FIGS. 3P-3Q A user can perform two-finger vertical scroll gesture 336 on touchpad 156 as illustrated in FIG. 3R. In response to detecting scroll gesture 336, the device can scroll up the content as illustrated in FIG. 3S. A user can cancel selection 310 within read-only text content 302 with a tap or click finger gesture 338 at any position on touchpad 156 as illustrated in FIG. 3T. In response, the device displays UI 300U (FIG. 3U) with selection 310 no longer displayed.

Figure 3V:
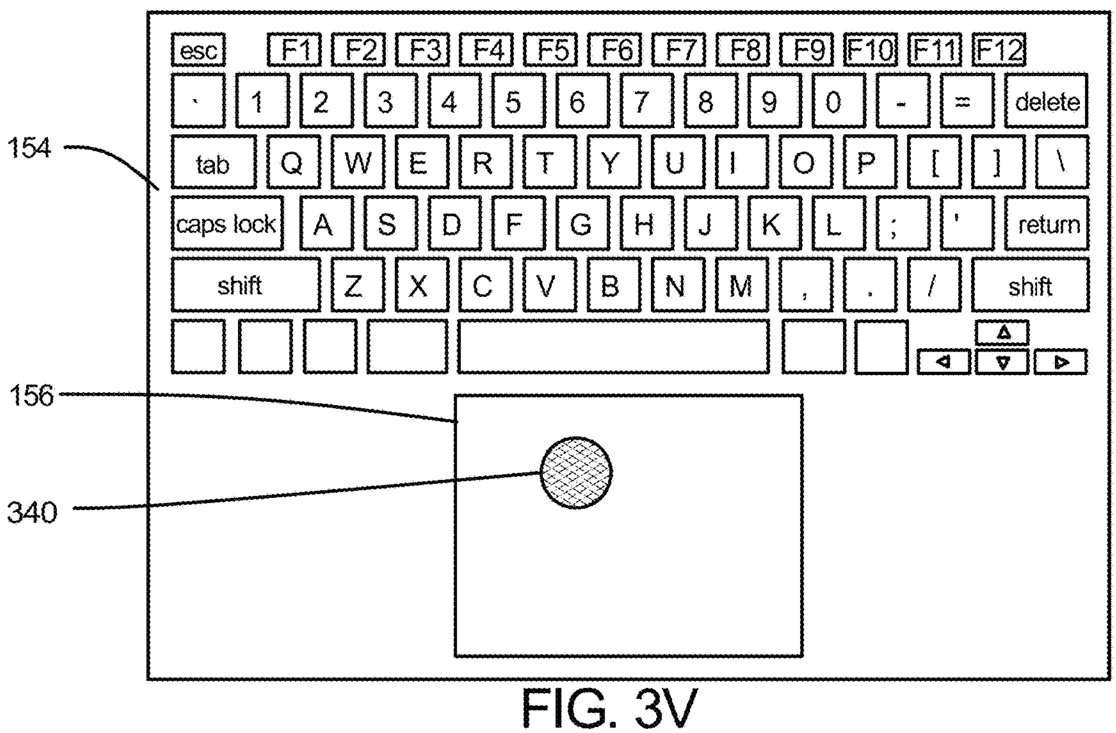
Figure 3W:
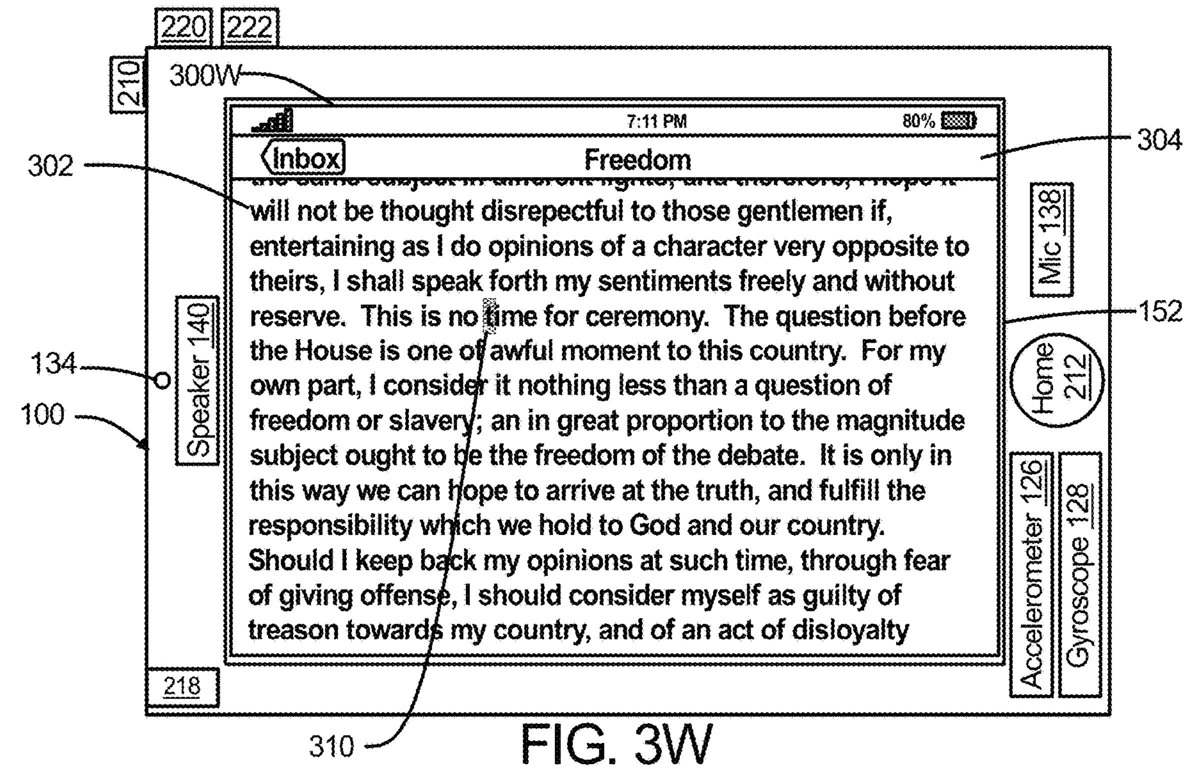
Figure 3X:
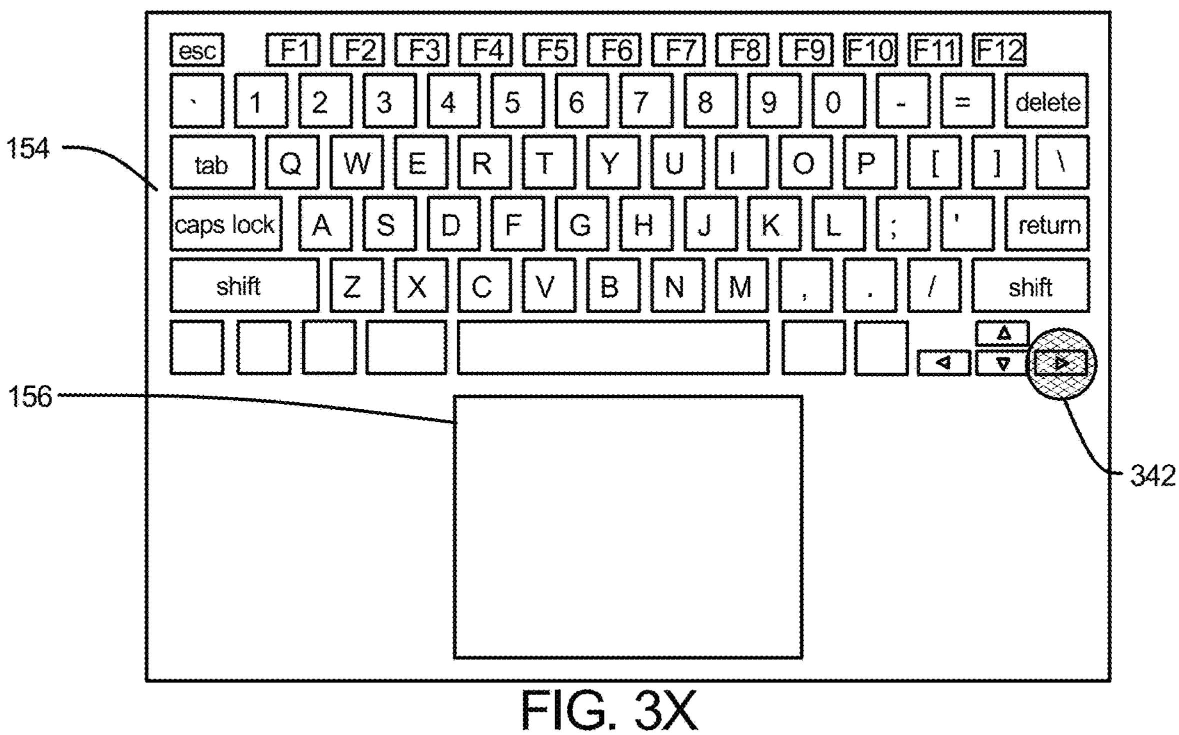
Figure 3Y:
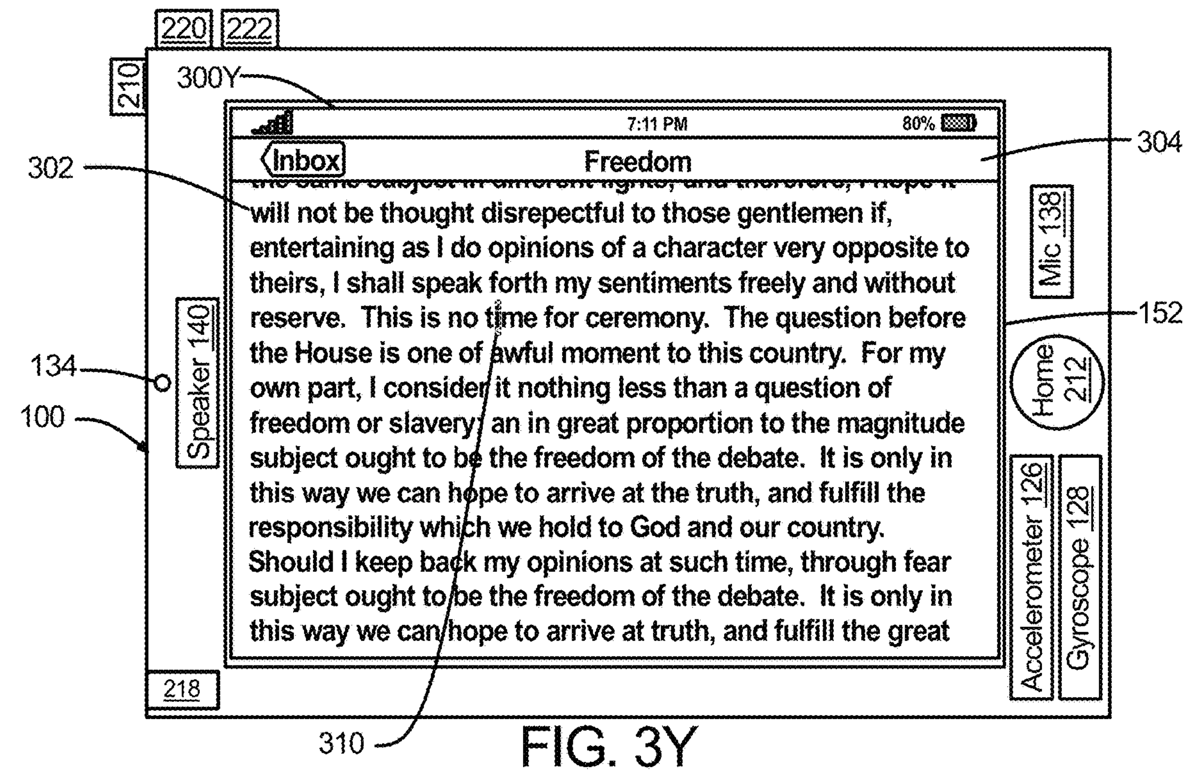
Figure 3Z:
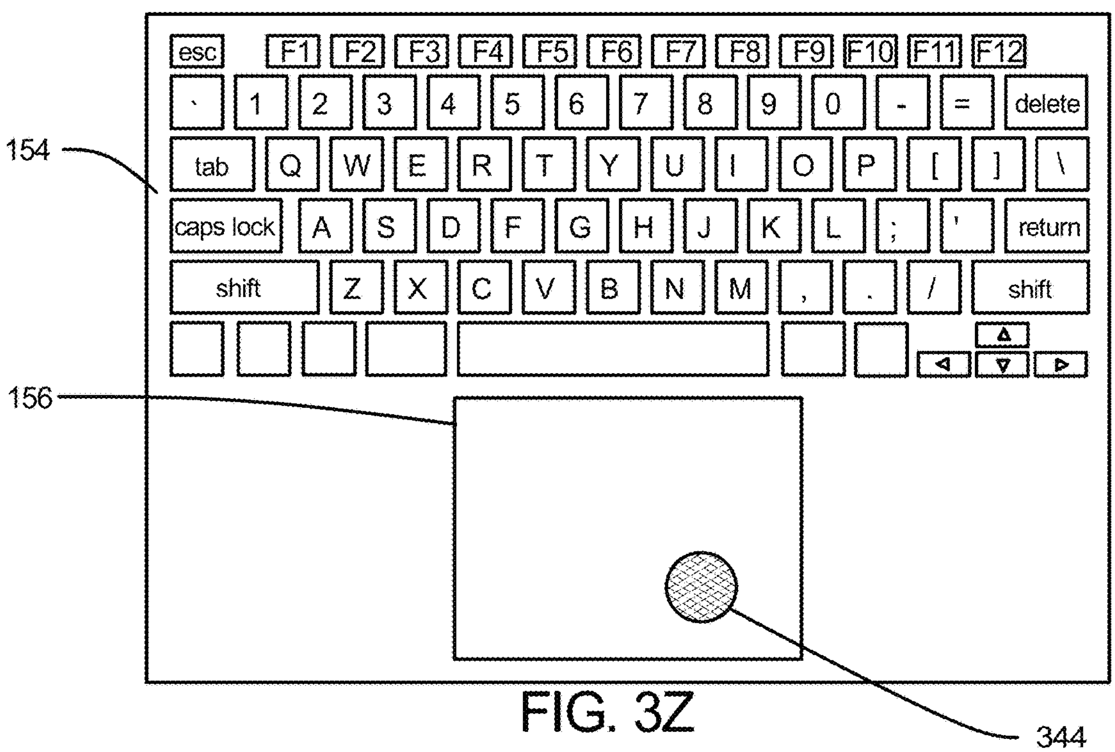

3.2 Using gestures on touchpad and keyboard: FIGS. 3V-3Z illustrate an exemplary user interface and method for displaying and moving unit-length selection 310 within read-only content, on a computing device with a display, using gestures on touchpad 156 and keyboard 154. A user can perform a long-press or long-click finger gesture 340 on touchpad 156 as illustrated in FIG. 3V. In response to detecting finger gesture 340 on touchpad 156, the device displays UI 300W (FIG. 3W) with unit-length selection 310 at a first selection position as illustrated in FIG. 3W. A user can perform tap 342 on the right-arrow key on keyboard 154 as illustrated in FIG. 3X. In response to detecting a single tap on the right arrow-key, the device moves unit-length selection 310 by one character position to the right as illustrated in FIG. 3Y. Unit-length selection 310 can be moved in a stepwise manner left/right with taps on the left/right arrow keys and up/down with taps on the up/down arrow keys. A user can cancel selection 310 with a tap or click gesture 344 anywhere on touchpad 156 as illustrated in FIG. 3Z.

4.0 Positioning a unit-length selection and selecting text within read-only content w/drag-lock OFF: This is first described for the case of using gestures on a touchpad. This is then described for the case of using gestures on a touchpad and keyboard.

Figure 4A:
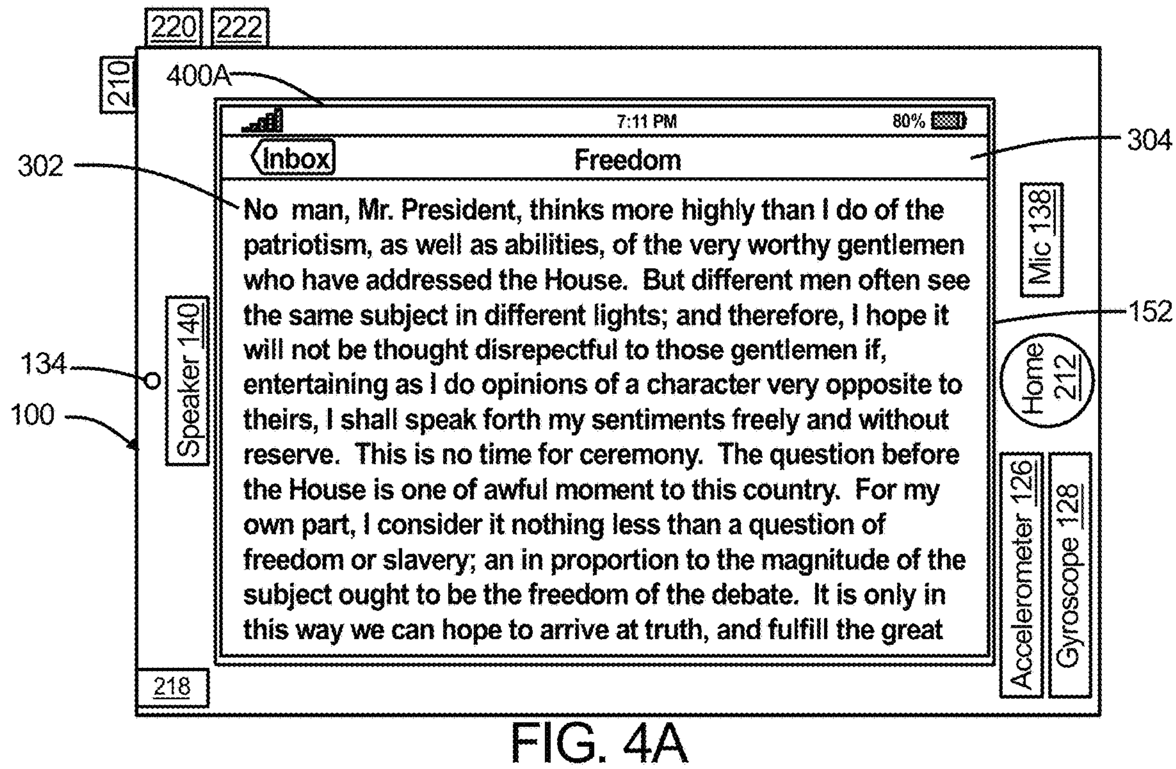
FIGS. 4A-4O illustrate an exemplary user interface and method for displaying and moving a selection of length equal to one character and selecting text within read-only content with drag-lock off, on a mobile computing device with a display, using gestures on a touchpad in accordance with some embodiments.

4.1 Using gestures on touchpad: FIGS. 4A-4O illustrate an exemplary user interface and method for displaying and moving a selection of length equal to one character (a unit-length selection) and selecting text within read-only content with drag-lock off, on a computing device with a touch-sensitive display, using gestures on a touchpad. The device can display read-only text content 302 in UI 400A (FIG. 4A). The device can also display application navigation bar 304.

Figure 4B:
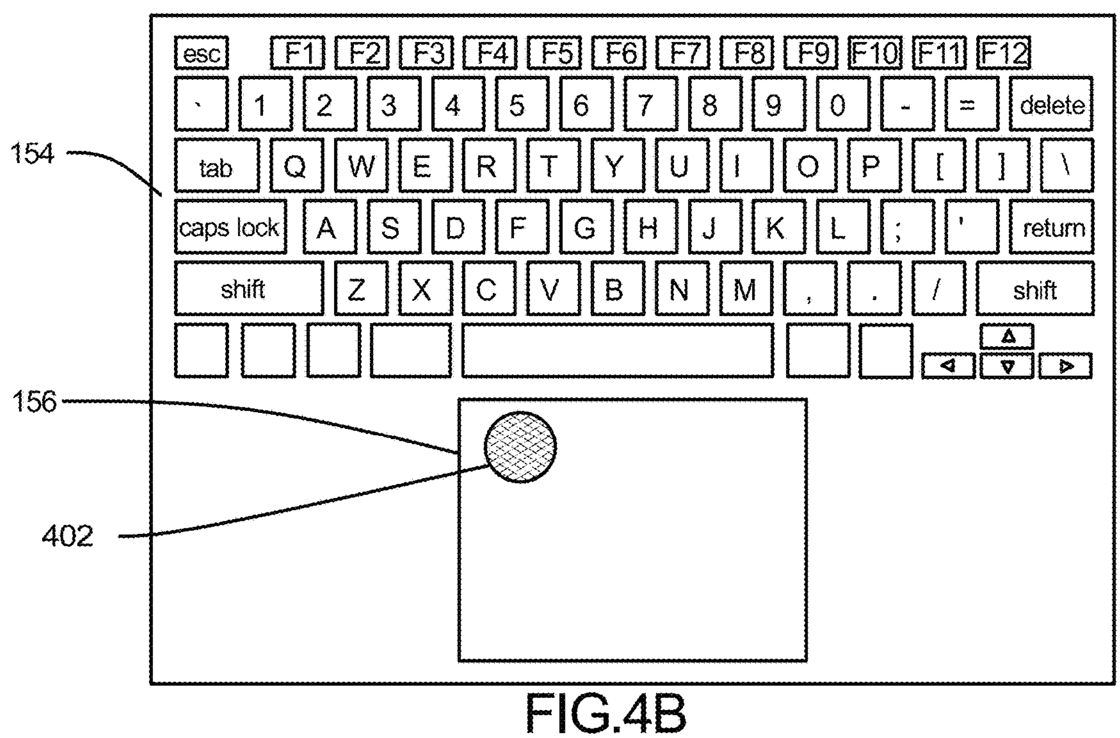
FIGS. 4P-4U illustrate an exemplary user interface and method for displaying and moving a selection of length equal to one character and selecting text within read-only content with drag-lock off, on a mobile computing device with a display, using gestures on a touchpad and keyboard in accordance with some embodiments.
Figure 4C:
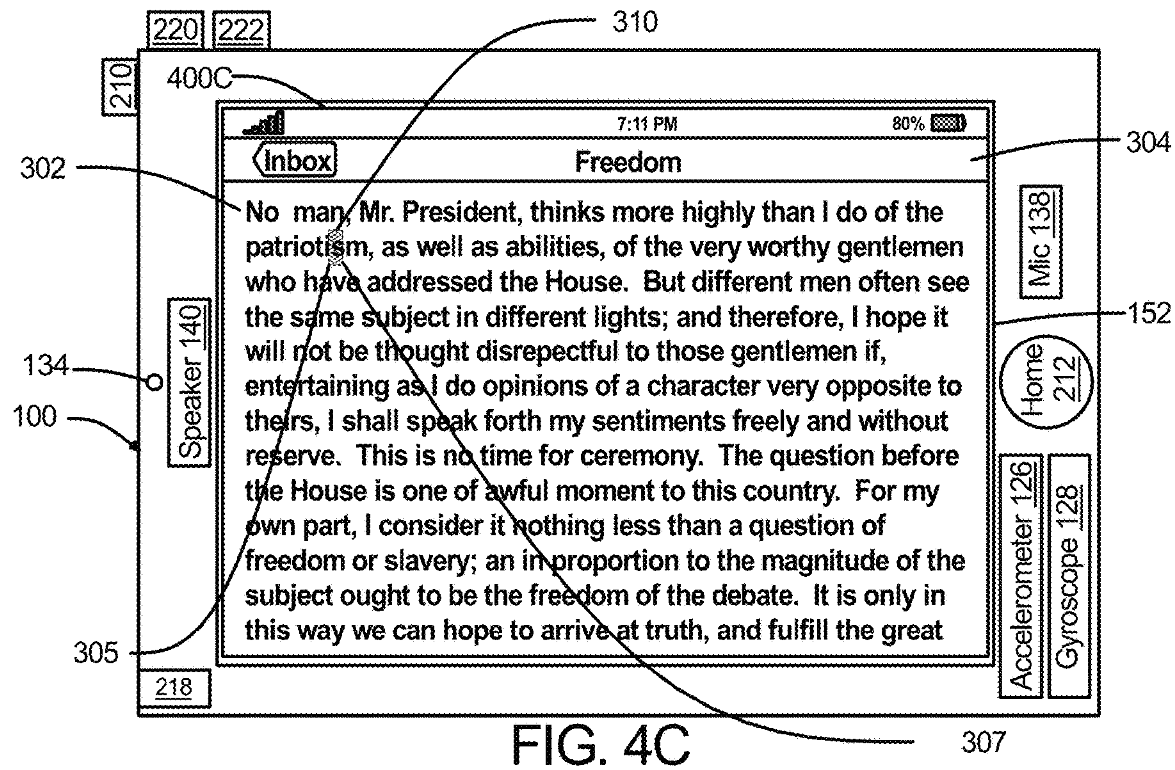

A user can perform finger gesture 402 (a long-press or long-click finger gesture for example) on touchpad 156 as illustrated in FIG. 4B. In response to detecting finger gesture 156 on touchpad 156, the device displays unit-length selection 310 at a first selection position as illustrated in UI 4000 (FIG. 4C). (If no read-only content is present at or near that position on the display, then the device does not display selection 310.)

The selection has a selection start point 305 and a selection end point 307. In one exemplary embodiment, the first selection position is at approximately the same relative position on the display as the long-press or long-click gesture on the touchpad as illustrated in FIGS. 4B-4C. In other exemplary embodiments, the first selection position is at the first or last character in read-only text content 302.

Figure 4D:
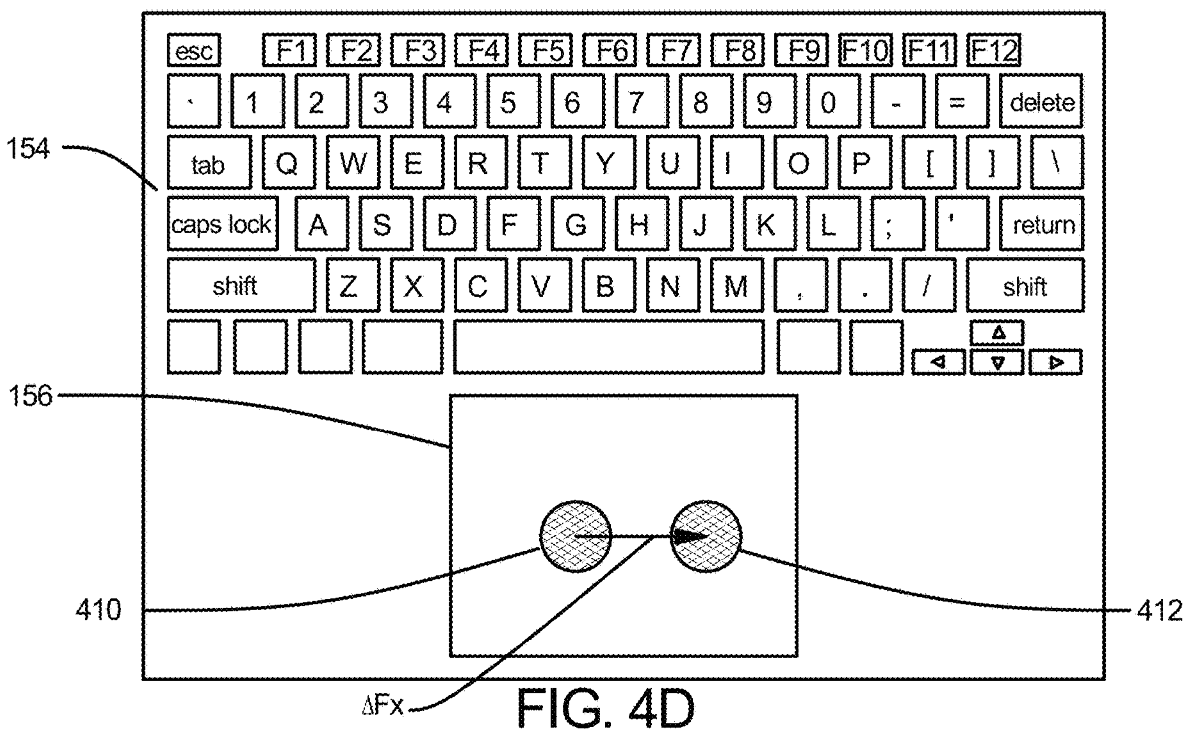
Figure 4E:
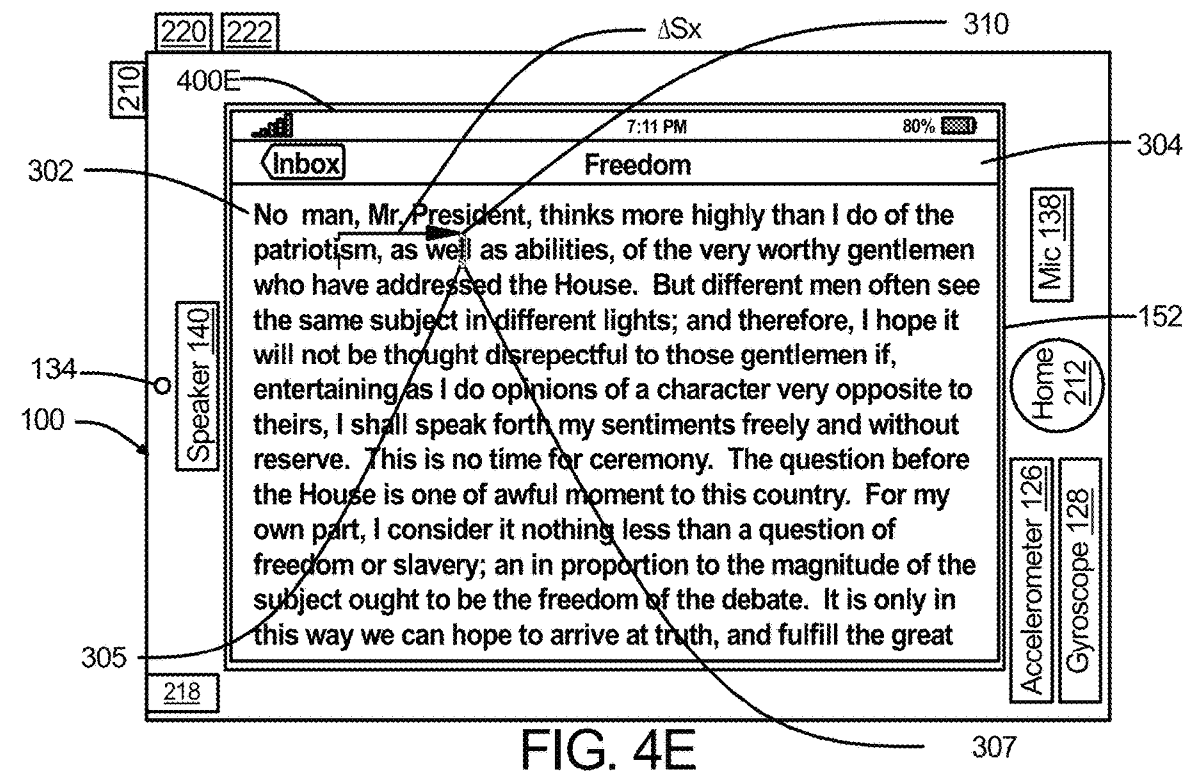

A user can perform slide finger gesture 410 to 412 beginning anywhere on touchpad 156 as illustrated in FIG. 4D. In response to detecting ΔFx (a change in the horizontal position of an uninterrupted finger contact), the device changes the horizontal position of unit-length selection 310 on the display from the first selection position to a second selection position as illustrated in UI 400E (FIG. 4E). In this exemplary embodiment, ΔSx (the change in the horizontal position of selection 310) is approximately proportional to ΔFx as illustrated in FIGS. 4D-4E. In this example, Kx~1.

Figure 4F:
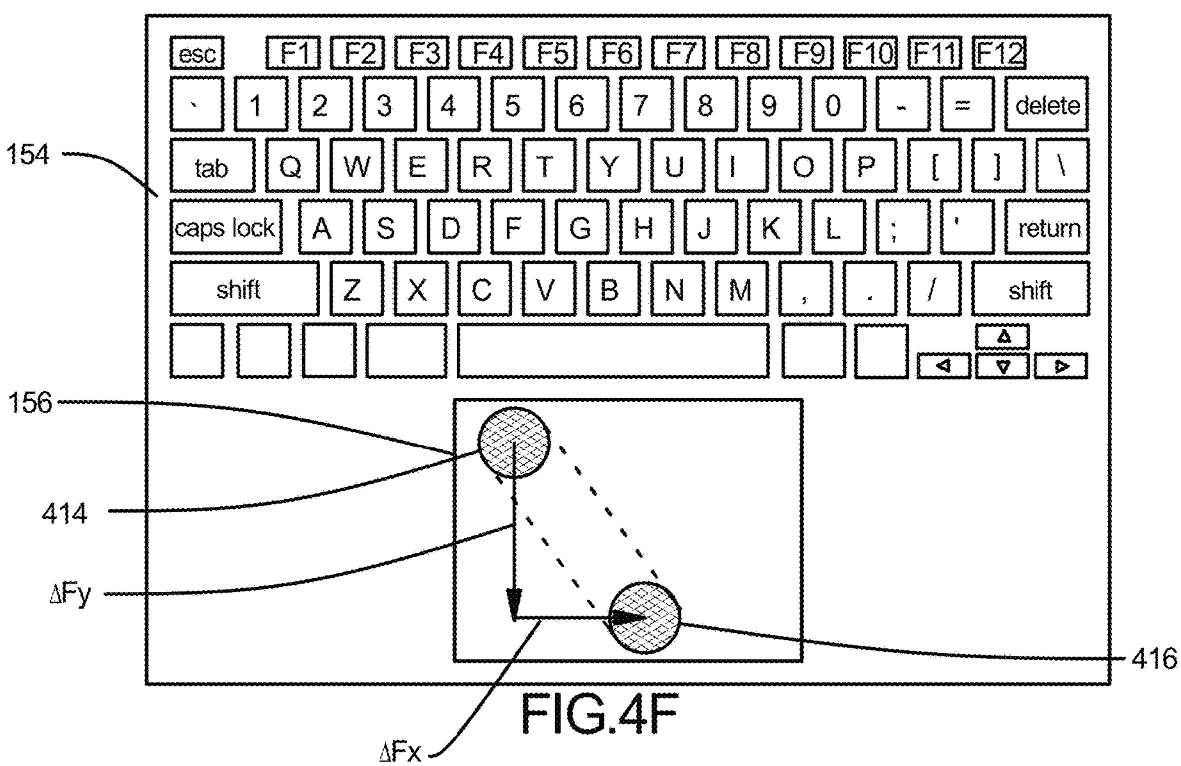
Figure 4G:
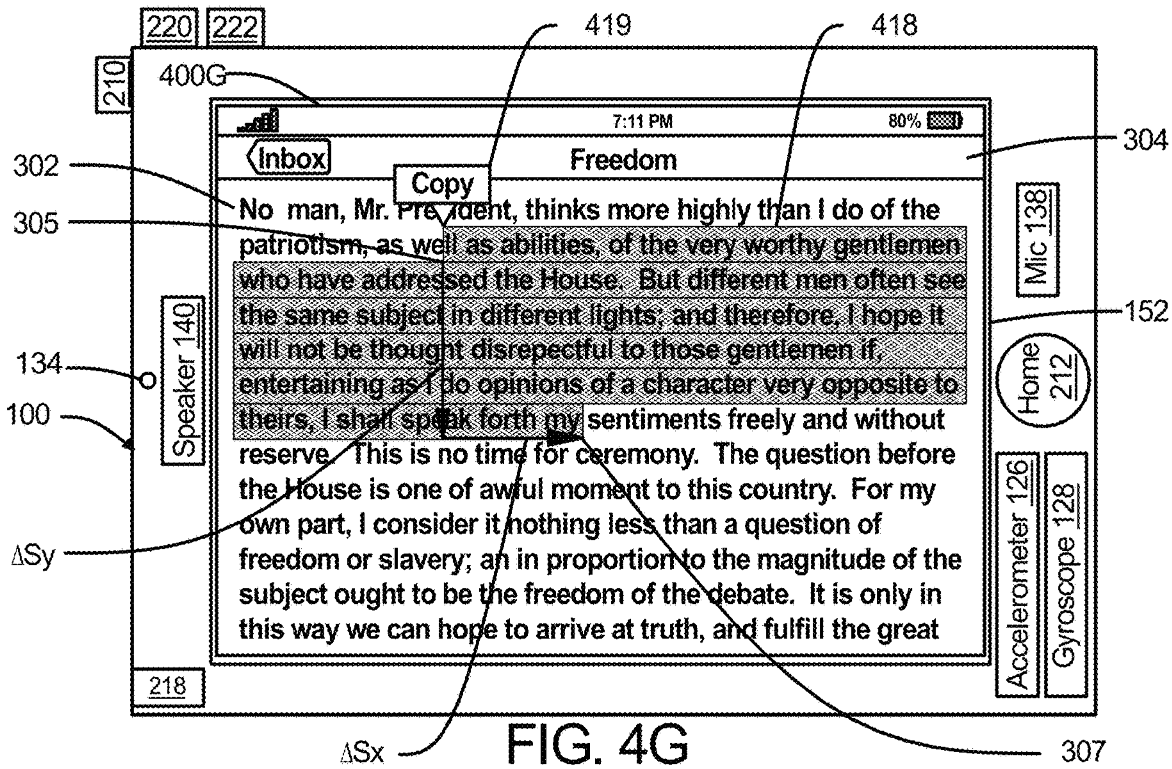

With unit-length selection 310 at a first position, a user can perform a diagonal tap-and-slide or click-and-slide finger gesture 414 to 416 beginning anywhere on touchpad 156. In response to detecting a tap and change in horizontal position (ΔFy) and vertical position (ΔFy) of an uninterrupted finger contact on the Touchpad 156, the device changes the position of selection end point 307 on the display from a first position to a second position as illustrated in FIG. 4G. In this exemplary embodiment ΔSx is approximately proportional to ΔFx and ΔSy is approximately proportional to ΔFy as illustrated in FIGS. 4F-4G. The device displays UI 400G (FIG. 4G) with selection end point 307 at a second position. In this example, Kx~1 and Ky~1. The device can also display menu 419 for the selection 418. The menu displays available actions with respect to the selection. In the case of selected read-only text, copy can be an action. A user can tap on-screen on a menu item to perform an action with respect to the selection. Alternatively, a user can enter a keyboard shortcut to perform an action with respect to the selected read-only text. For example, a user can type Command C (iOS or OSX) or Control C (windows OS) to copy the selected text to the clipboard.

Figure 4H:
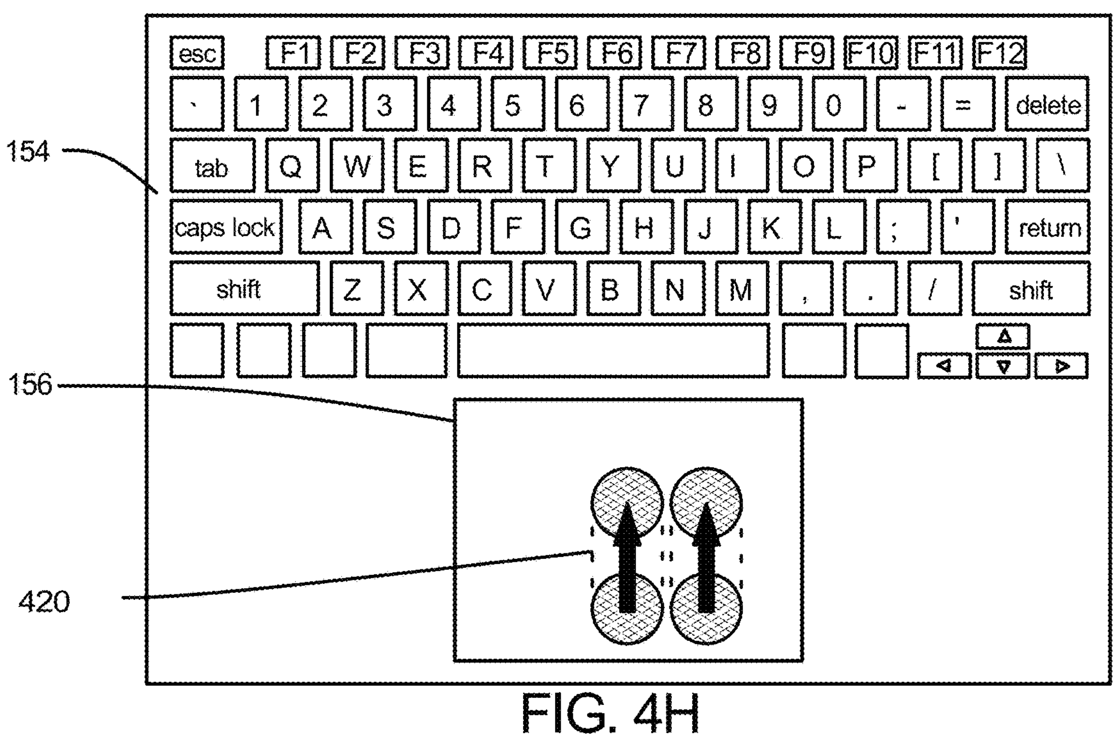
Figure 4I:
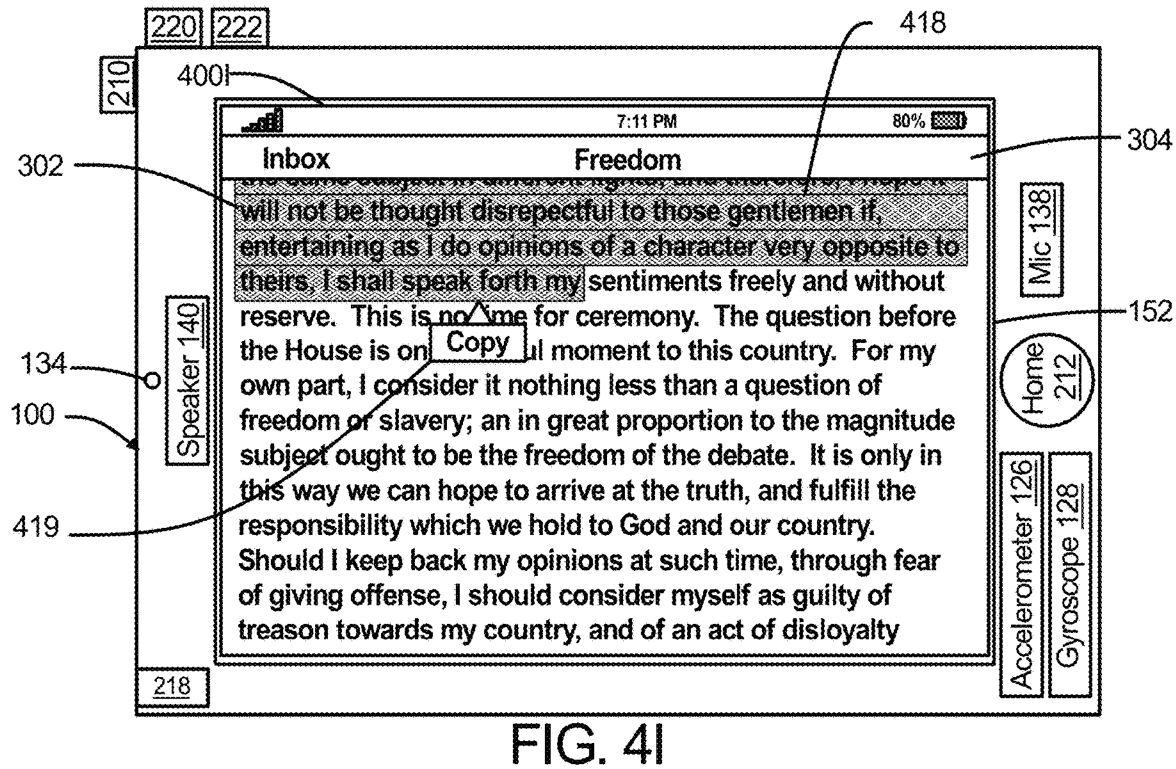
Figure 4J:
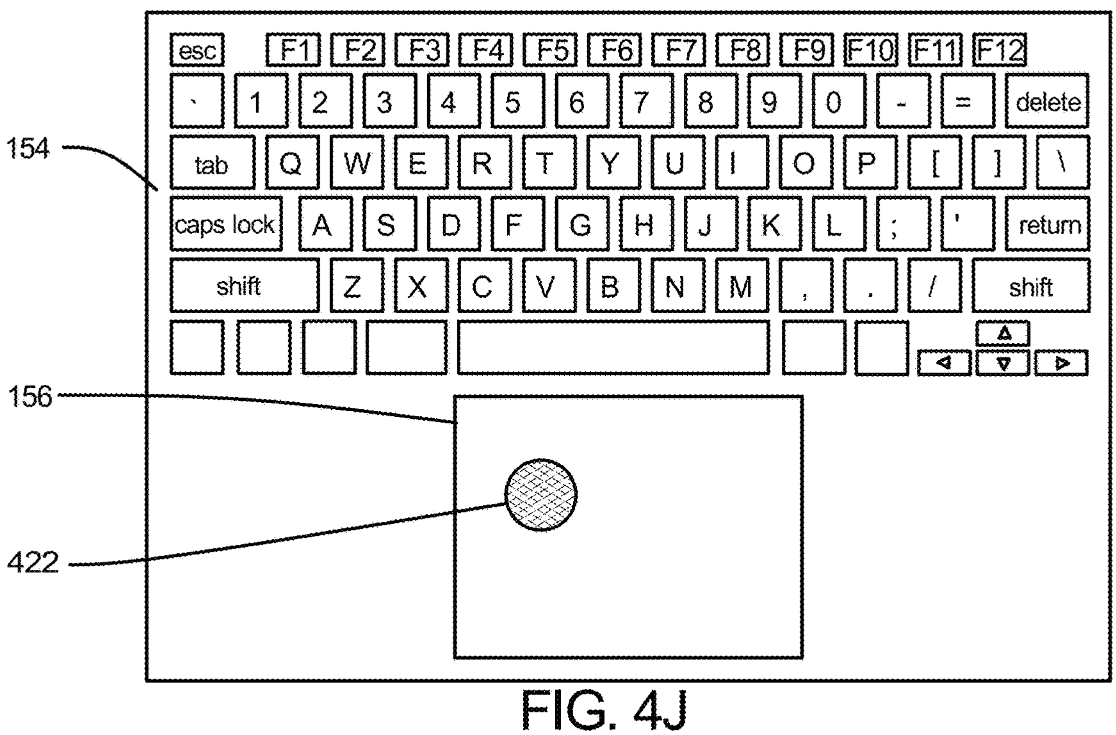
Figure 4K:
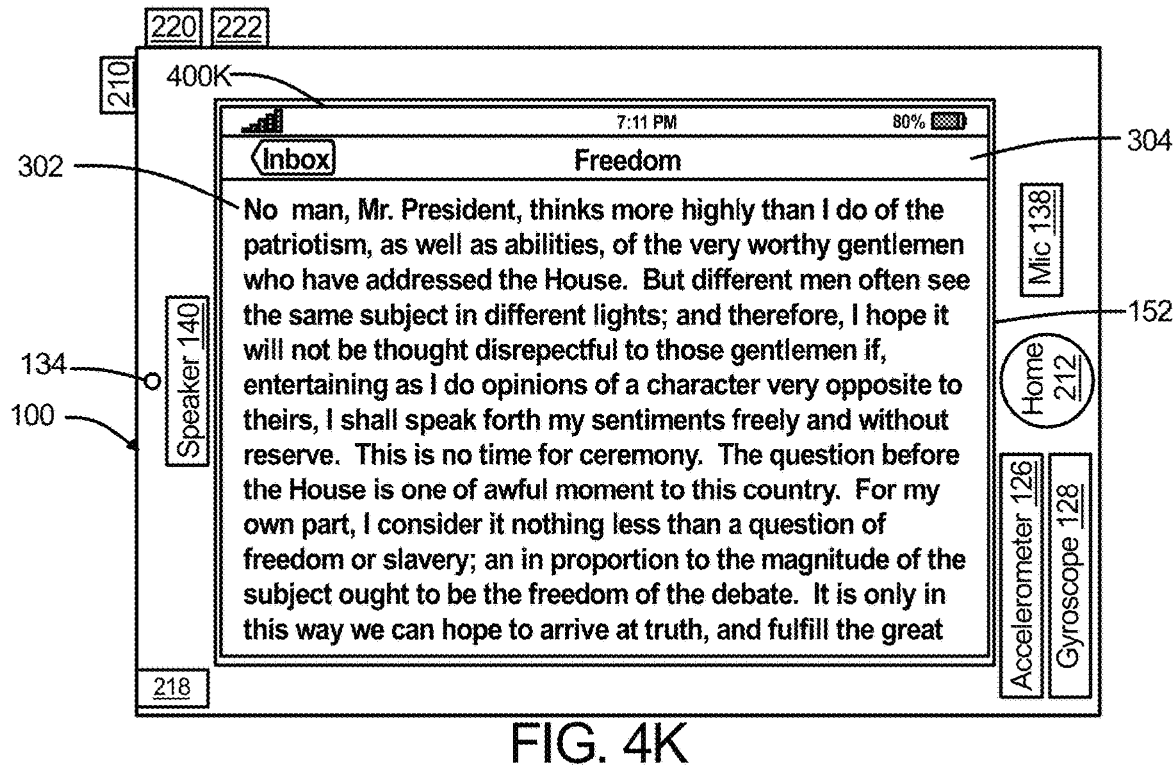

A user can perform two-finger vertical scroll gesture 420 on touchpad 156 as illustrated in FIG. 4H. In response to detecting scroll gesture 420, the device scrolls up the content as illustrated in FIG. 4I. A user can cancel selection 418 within read-only text content 302 with a tap or click finger gesture 422 at any position on touchpad 156 as illustrated in FIG. 4J. In response, the device displays UI 400K (FIG. 4K) with selection 418 no longer displayed.

Figure 4L:
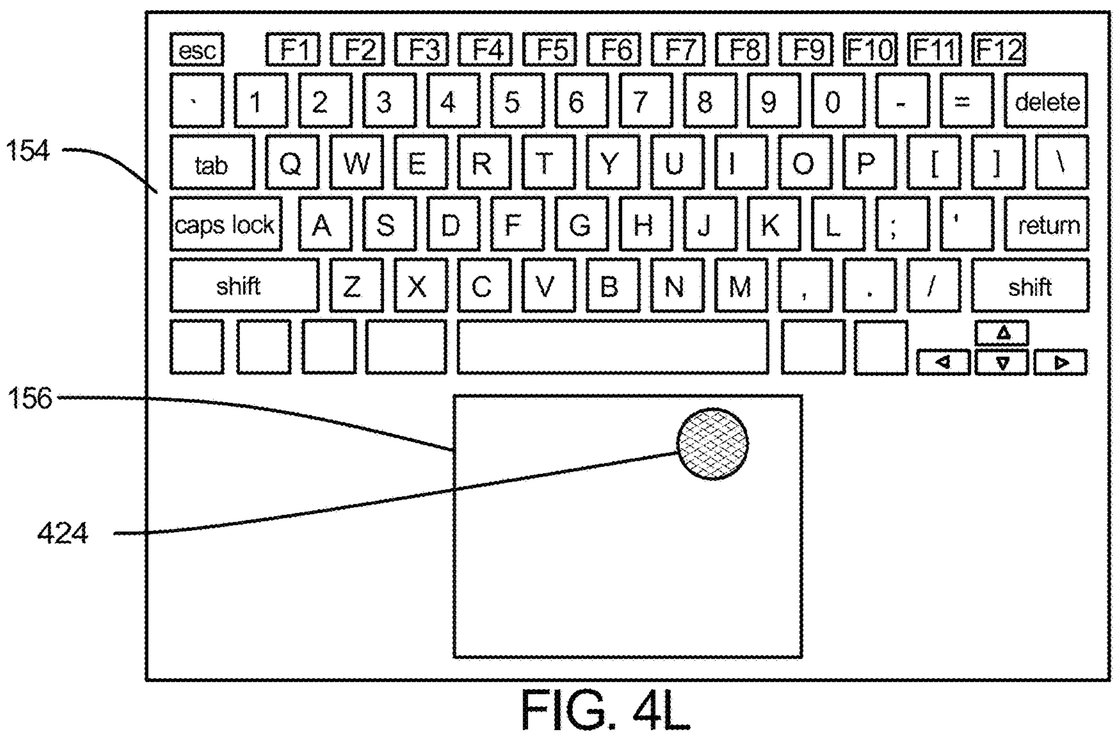
Figure 4M:
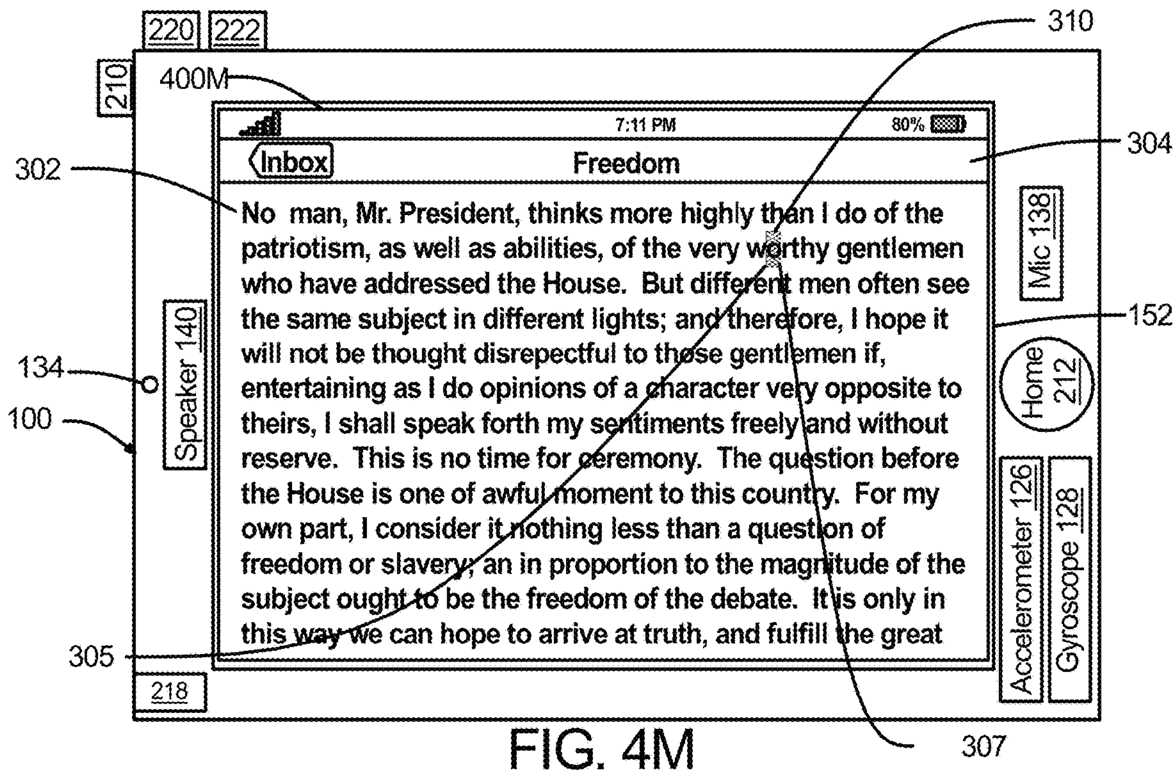
Figure 4N:
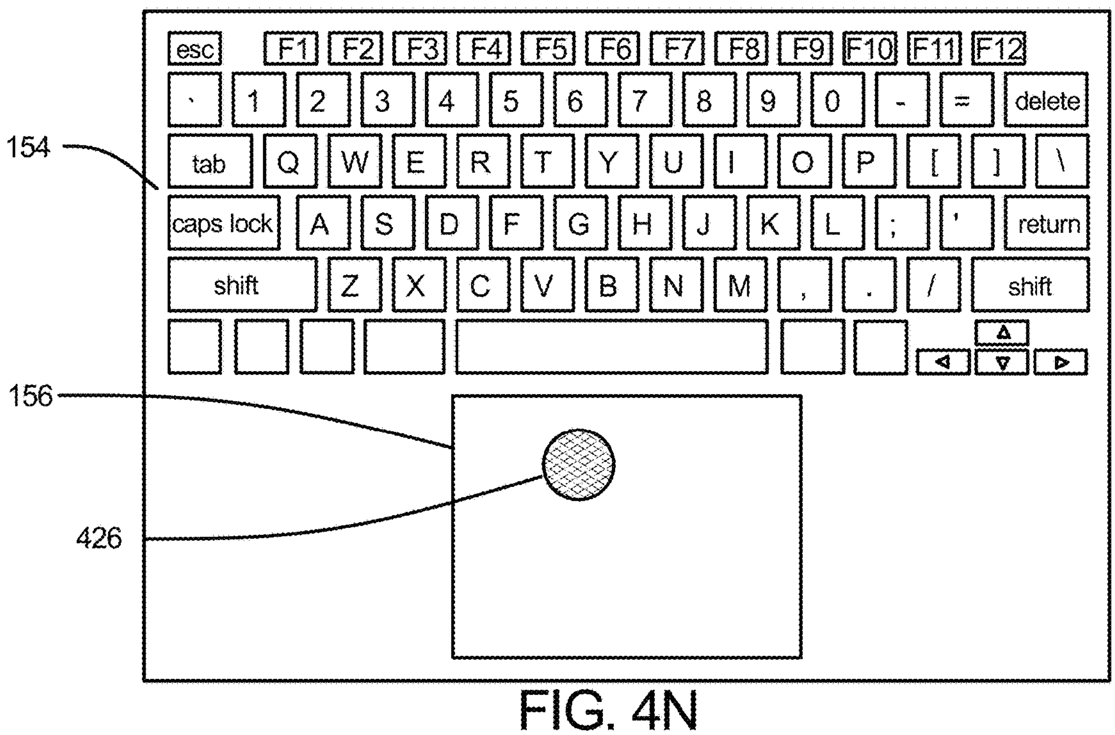
Figure 4O:
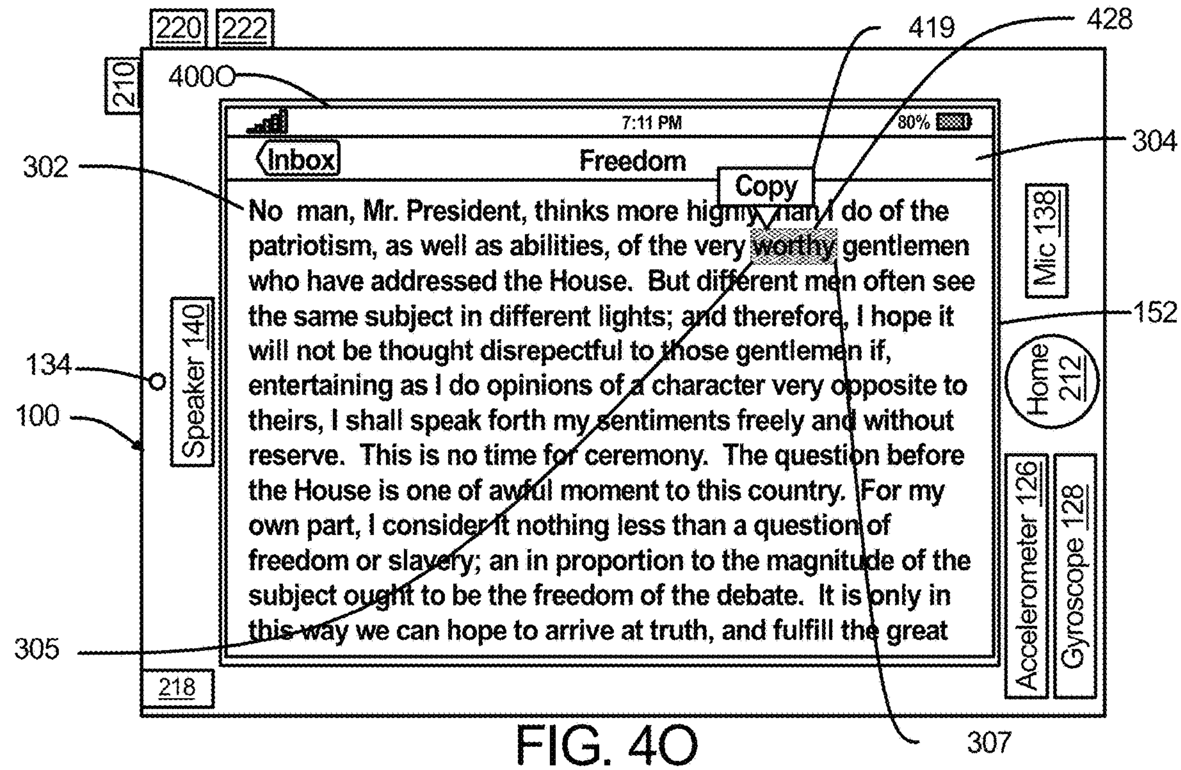

A user can perform a finger gesture 424 (a long-press or long-click finger gesture for example) on touchpad 156 (FIG. 4L). In response to detecting the finger gesture on touchpad 156, the device displays unit-length selection 310 at a first selection position in UI 400M (FIG. 4M). A user can perform double-tap or double-click finger gesture 426 anywhere on touchpad 156. In response to detecting the double-tap or double-click finger gesture on touchpad 156, the device selects the word at the position of unit length selection 310 as illustrated in (FIG. 4O). The device can also display menu 419 for the selection 428.

4.2 Using gestures on touchpad and keyboard: FIGS. 4P-4U illustrate an exemplary user interface and method for displaying and moving a selection of length equal to one character and selecting text within read-only content with drag-lock off, on a computing device with a touch-sensitive display, using gestures on a touchpad and keyboard.

Figure 4P:
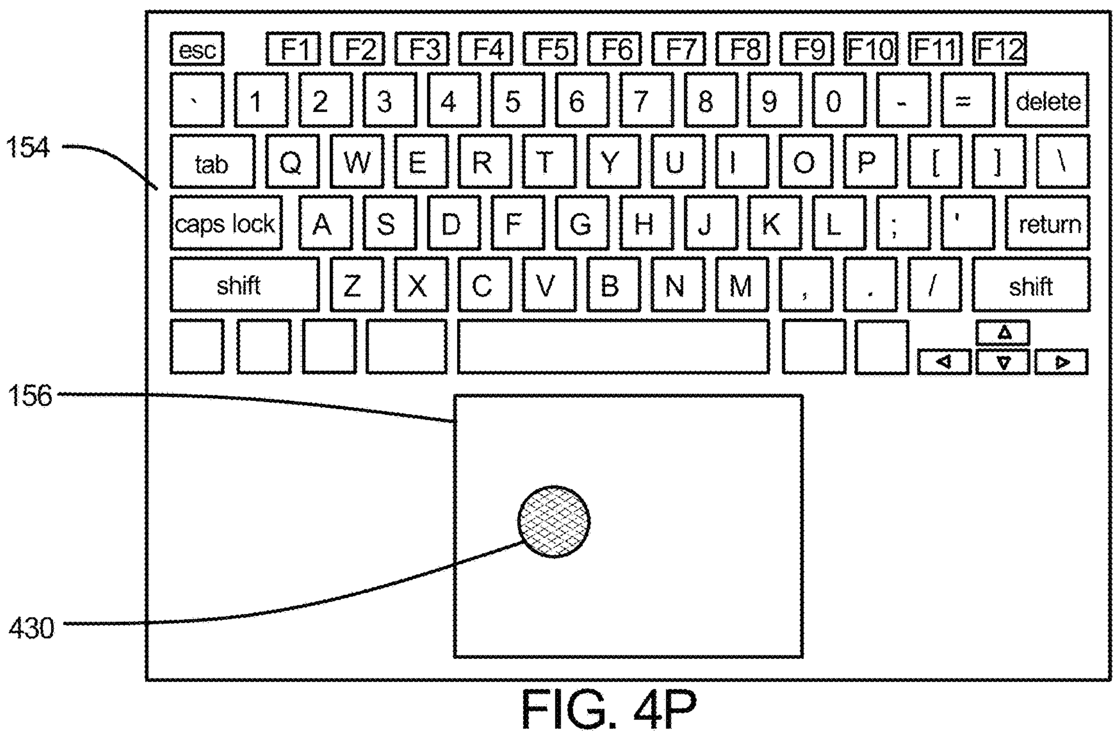
Figure 4Q:
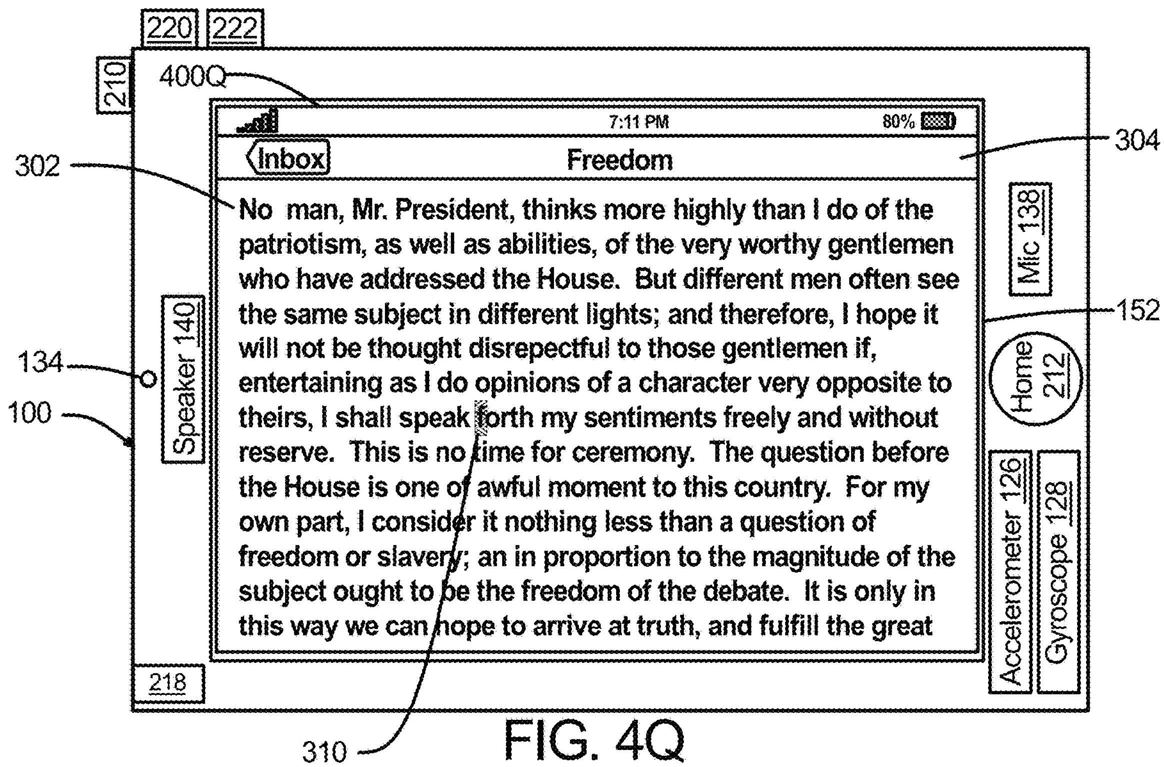
Figure 4R:
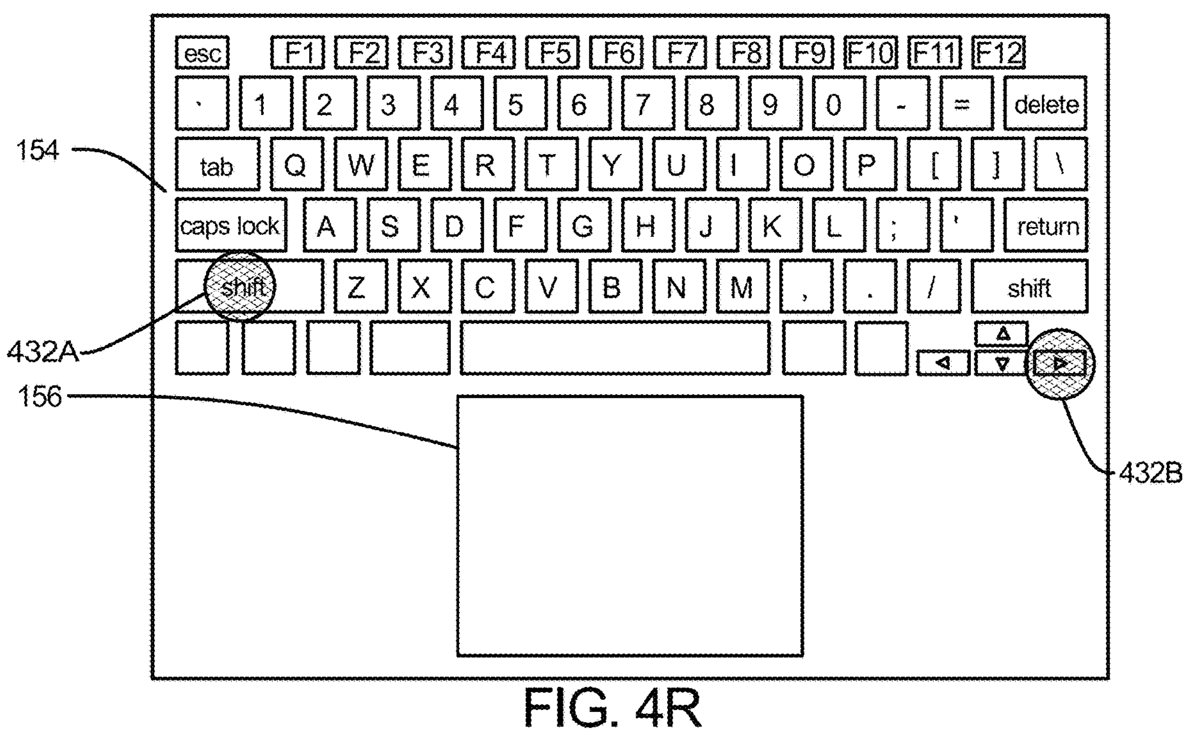
Figure 4S:
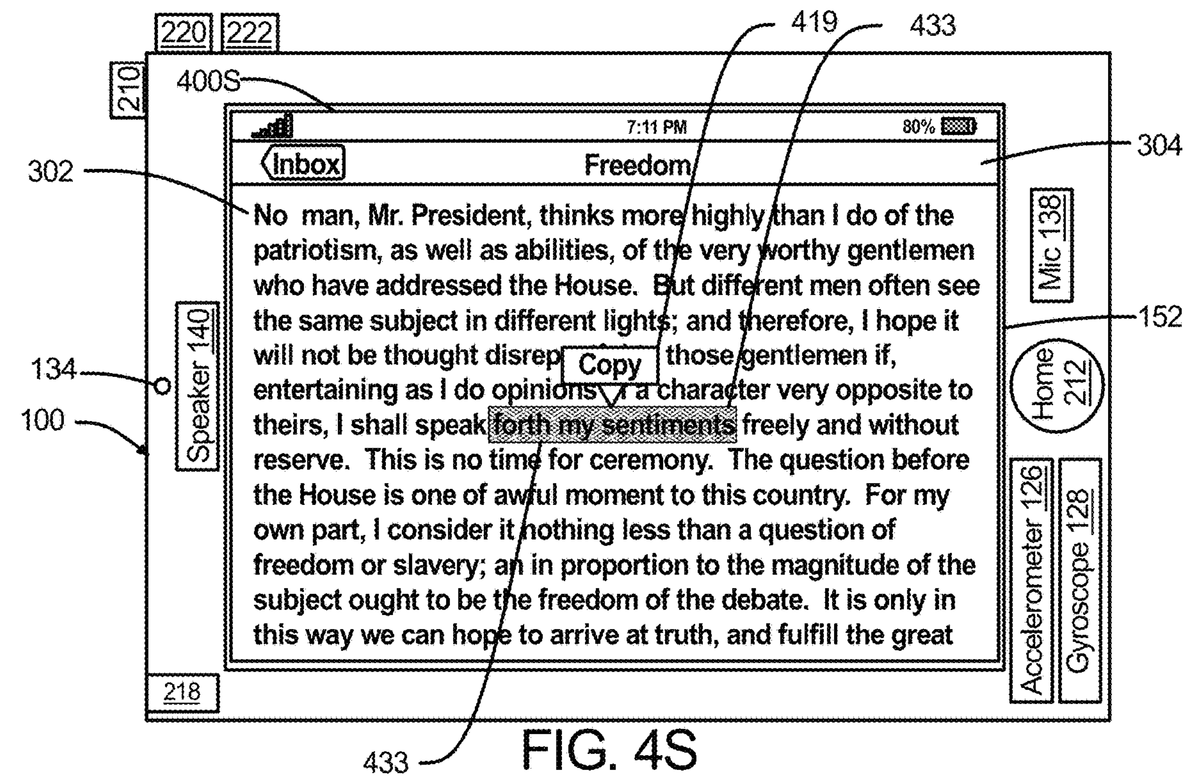
Figure 4T:
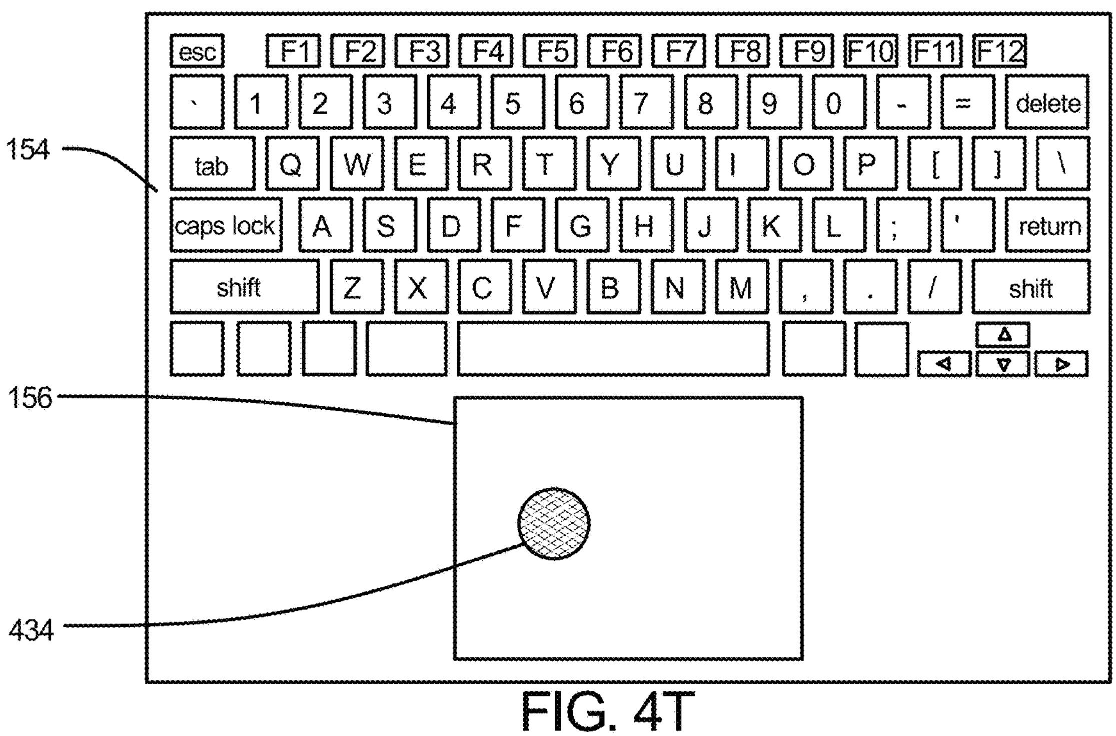
Figure 4U:
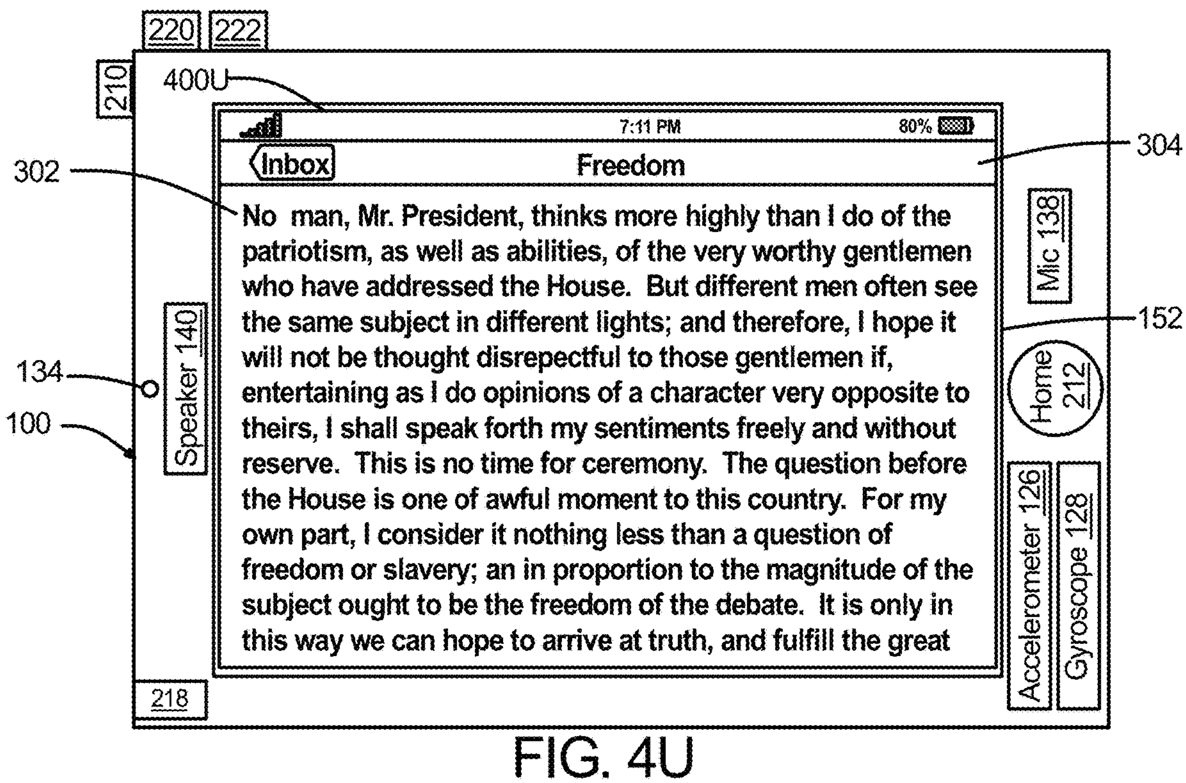

A user can perform a finger gesture 430 (a long-press or long-click finger gesture for example) on touchpad 156 as illustrated in FIG. 4P. In response to detecting finger gesture 430 on touchpad 156, the device displays unit-length selection 310 at a first selection position as illustrated in UI 400Q (FIG. 4Q). A user can perform a hold gesture 432A on the shift key and then perform multiple tap gestures 432B on the right-arrow key on keyboard 154. In response to detecting the shift and multiple taps on the right arrow-key, the device selects a portion of the read-only text a shown in UI 400S (FIG. 4S). Again, the device can also display menu 419 for the selection 433. A user can cancel selection 433 within read-only text content 302 with tap or click finger gesture 434 at any position on touchpad 156 as illustrated in FIG. 4T. In response, the device displays UI 400U (FIG. 4U) with selection 310 no longer displayed.

5.0 Positioning a unit-length selection and selecting text within read-only content w/ drag-lock ON:

This is first described for the case of using gestures on a touchpad. This is then described for the case of using gestures on a touchpad and keyboard.

5.1 Using gestures on touchpad: FIGS. 5A-5I illustrate an exemplary user interface and method for displaying and moving a selection of length equal to one character and selecting text within read-only content with drag-lock on, on a computing device with a touch-sensitive display, using gestures on a touchpad.

Figure 5A:
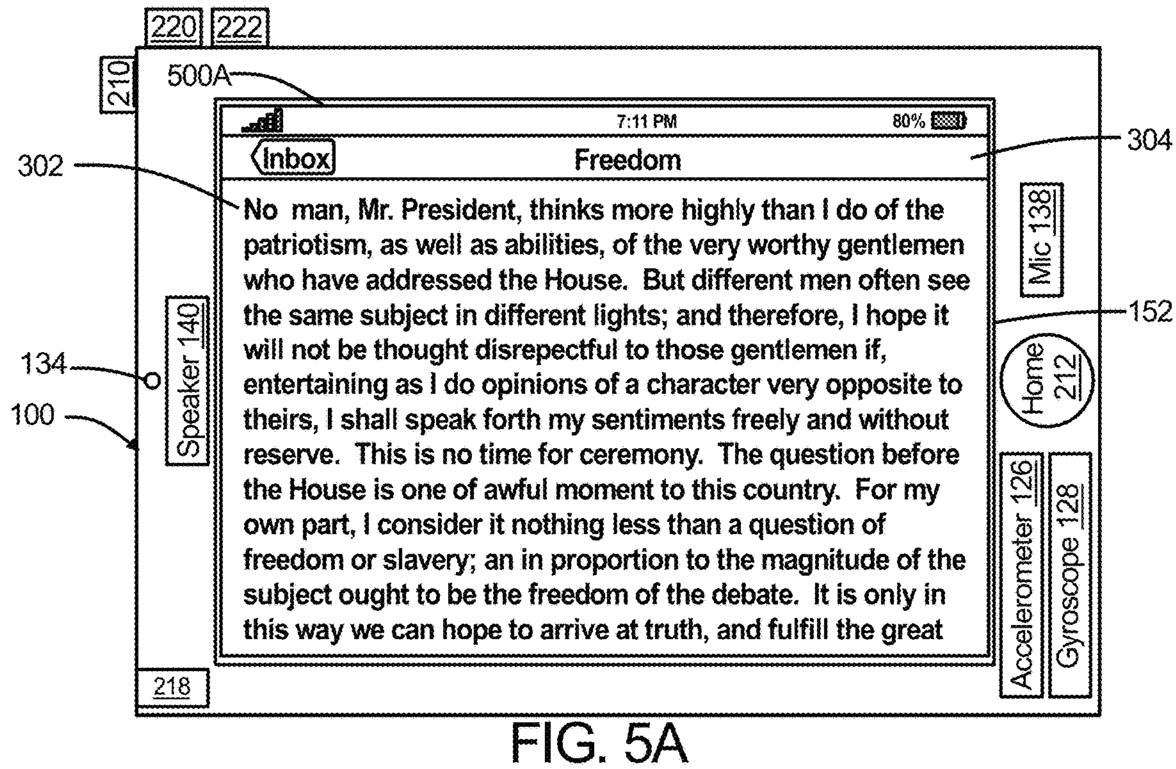
FIGS. 5A-5I illustrate an exemplary user interface and method for displaying and moving a selection of length equal to one character and selecting text within read-only content with drag-lock on, on a mobile computing device with a display, using gestures on a touchpad in accordance with some embodiments.
Figure 5B:
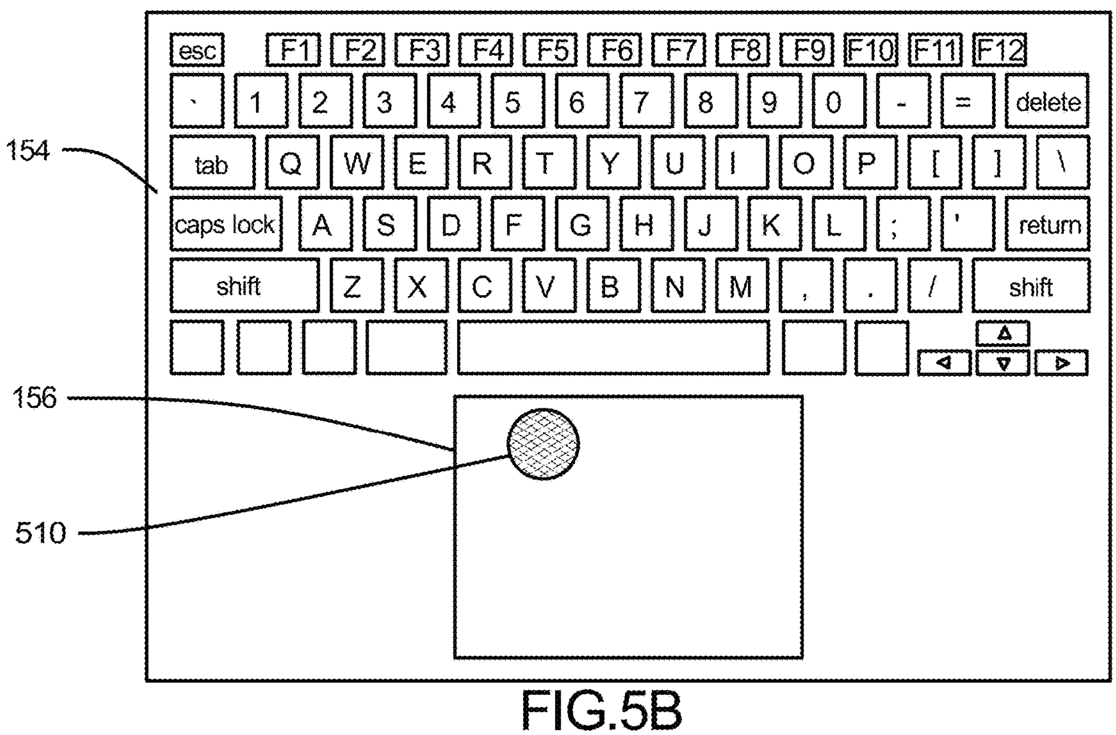
Figure 5C:
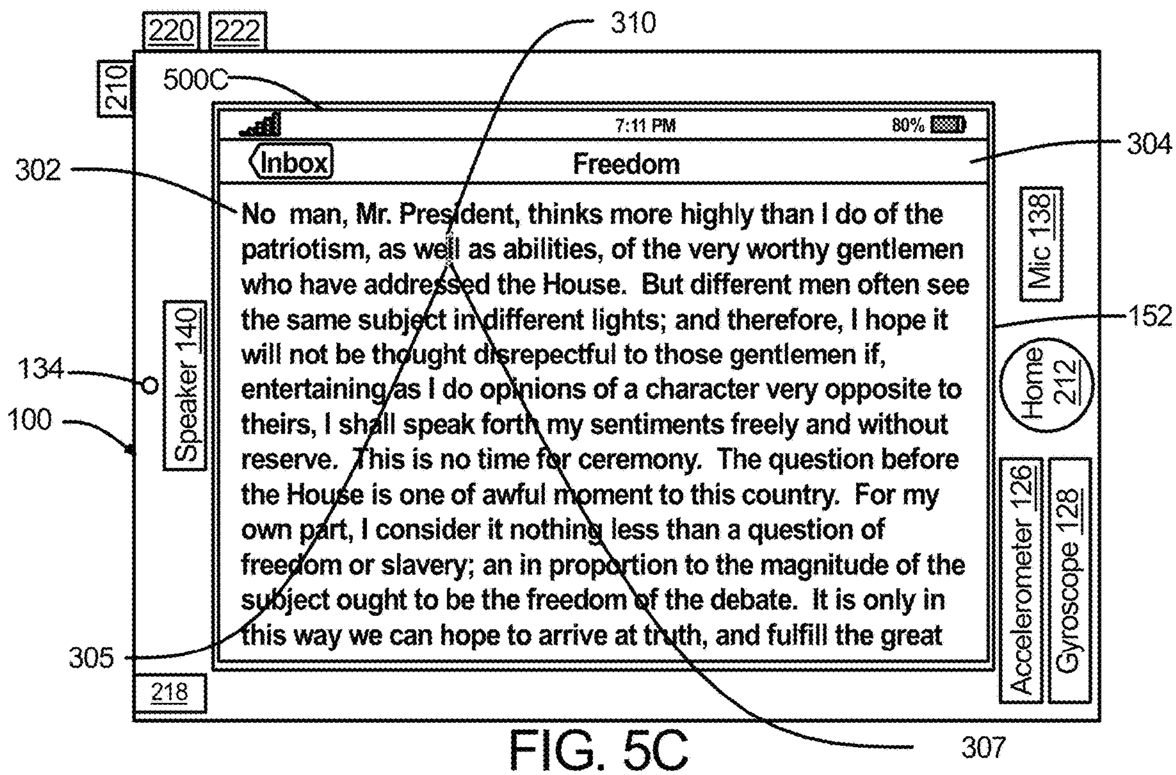

The device can display read-only text content 302 as shown in UI 500A (FIG. 5A). The device can also display application navigation bar 304. A user can perform a finger gesture 510 (a long-press or long-click finger gesture for example) on touchpad 156 as illustrated in FIG. 5B. In response to detecting the finger gesture on touchpad 156, the device displays unit-length selection 310 at a first selection position as illustrated in UI 500C (FIG. 5C). (If no read-only content is present at or near that position on the display, then the device does not display selection 310.) The selection has a selection start point 305 and a selection end point 307. In one exemplary embodiment, the first selection position is at approximately the same relative position on the display as the long-press or long-click gesture on the touchpad as illustrated in FIGS. 5B-5C.

Figure 5D:
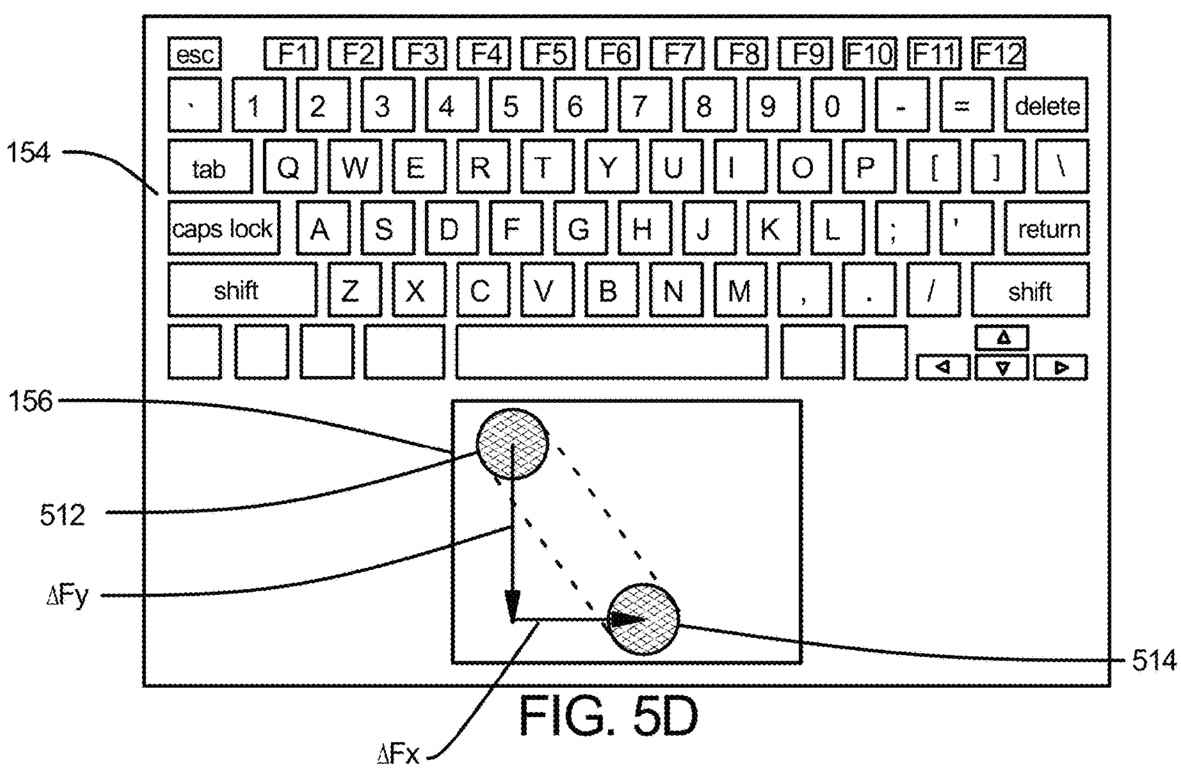
Figure 5E:
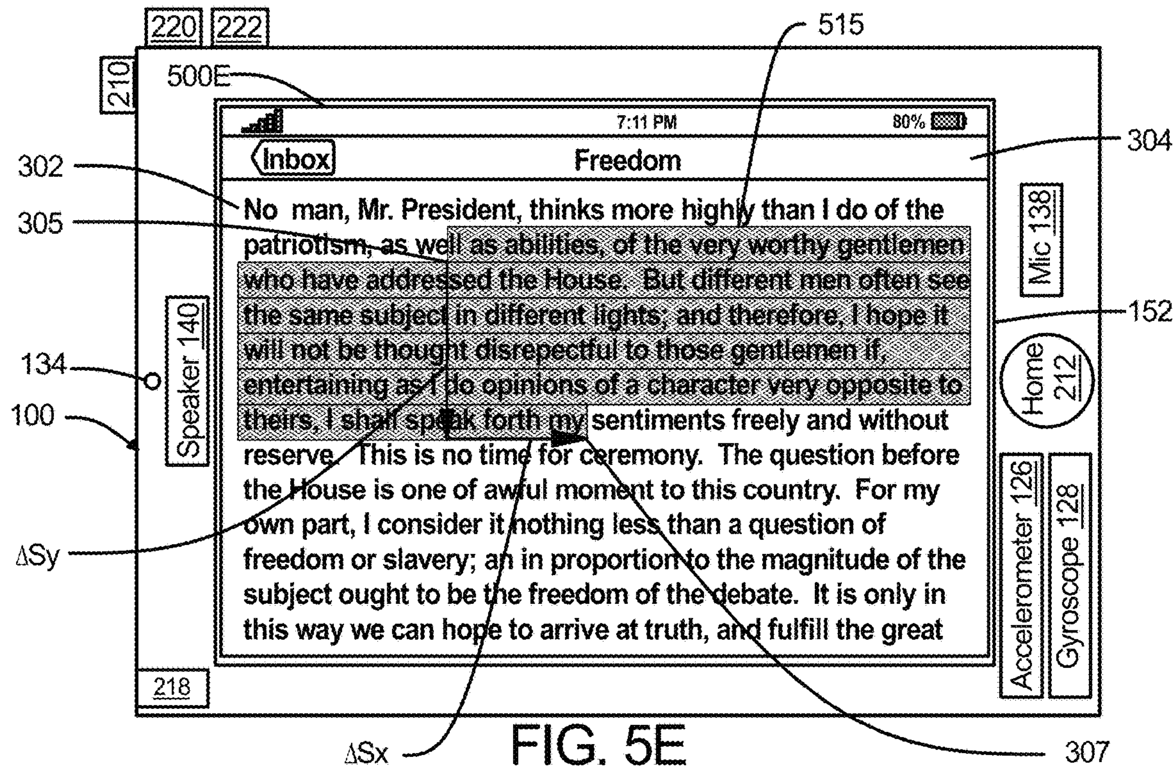

With unit-length selection 310 at a first position, a user can perform a diagonal tap-and-slide or click-and-slide finger gesture 512 to 514 beginning anywhere on touchpad 156. In response to detecting a tap and change in the horizontal position (ΔFx) and change in the vertical position (ΔFy) of an uninterrupted finger contact on the Touchpad 156, the device changes the position of selection end point 307 on the display from a first position to a second position. In this exemplary embodiment ΔSx is approximately proportional to ΔFx and ΔSy is approximately proportional to ΔFy as illustrated in FIGS. 5D-5E. The device displays UI 500E (FIG. 5E) with selection end point 307 at a second position. In this example, Kx~1 and Ky~1.

Figure 5F:
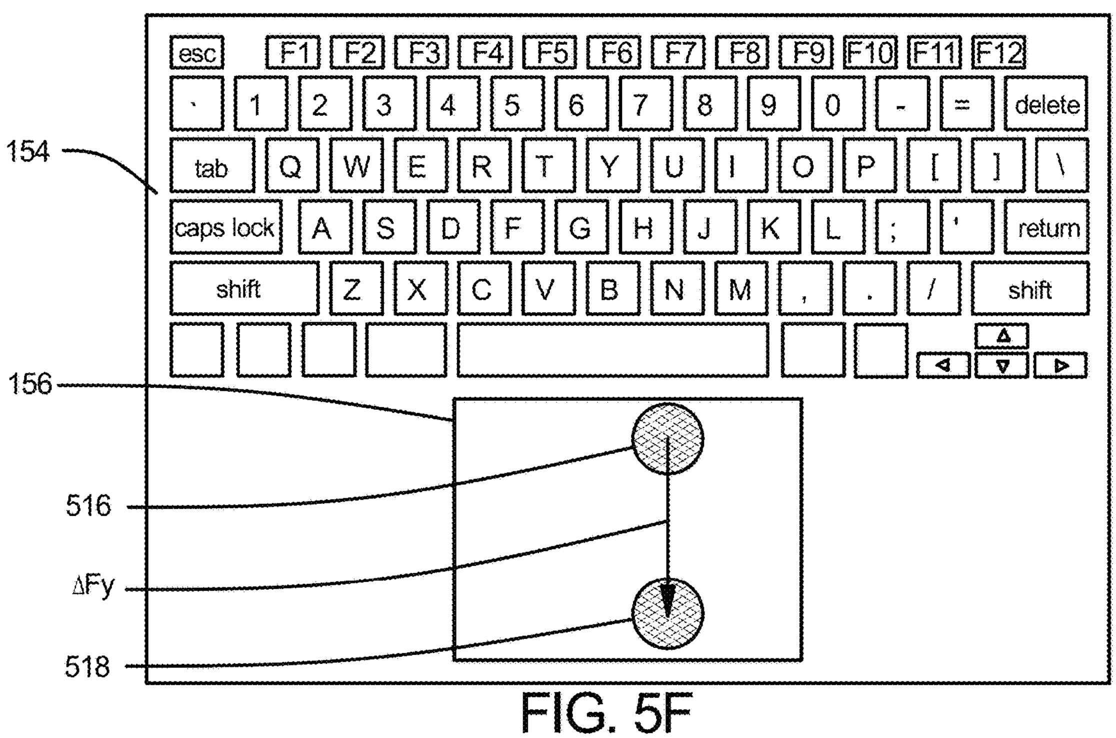
Figure 5G:
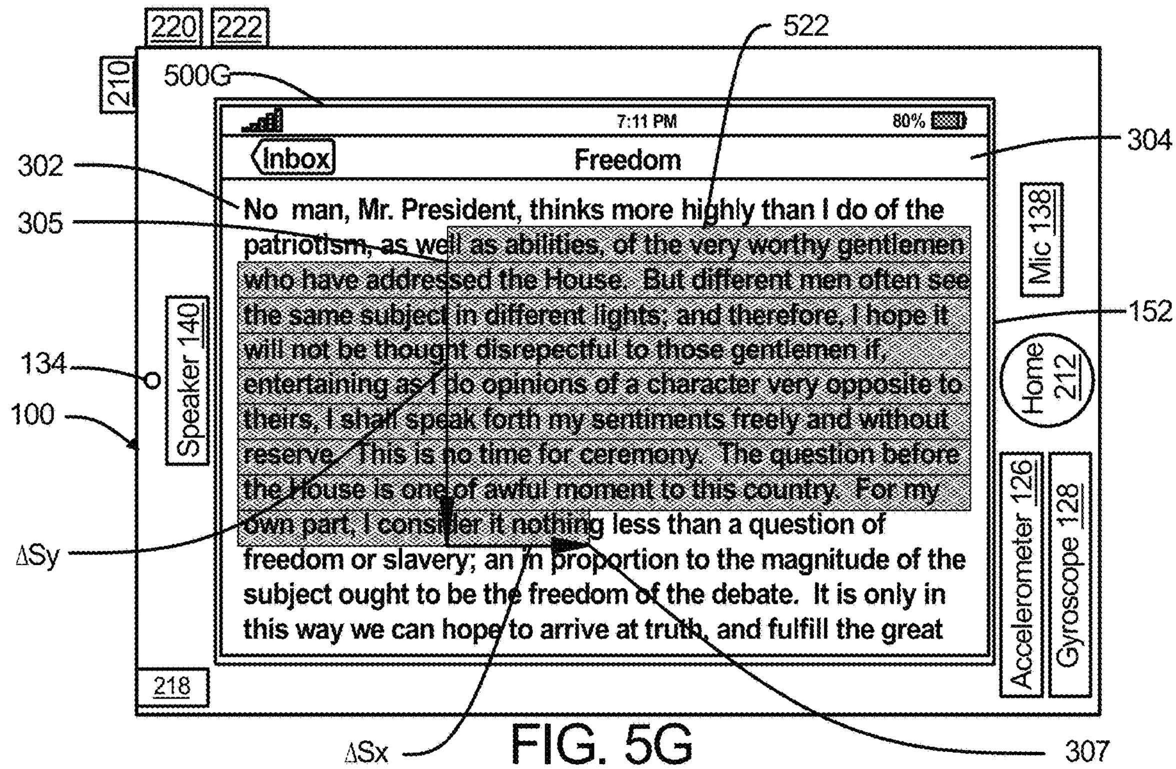
Figure 5H:
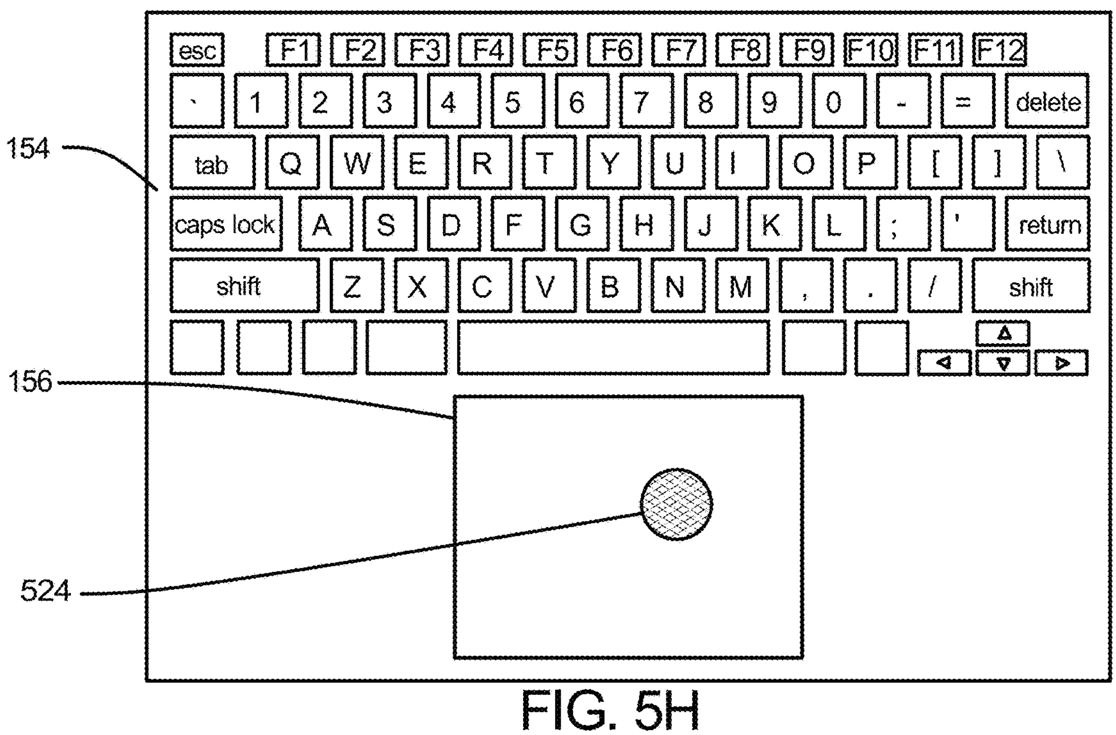
Figure 5I:
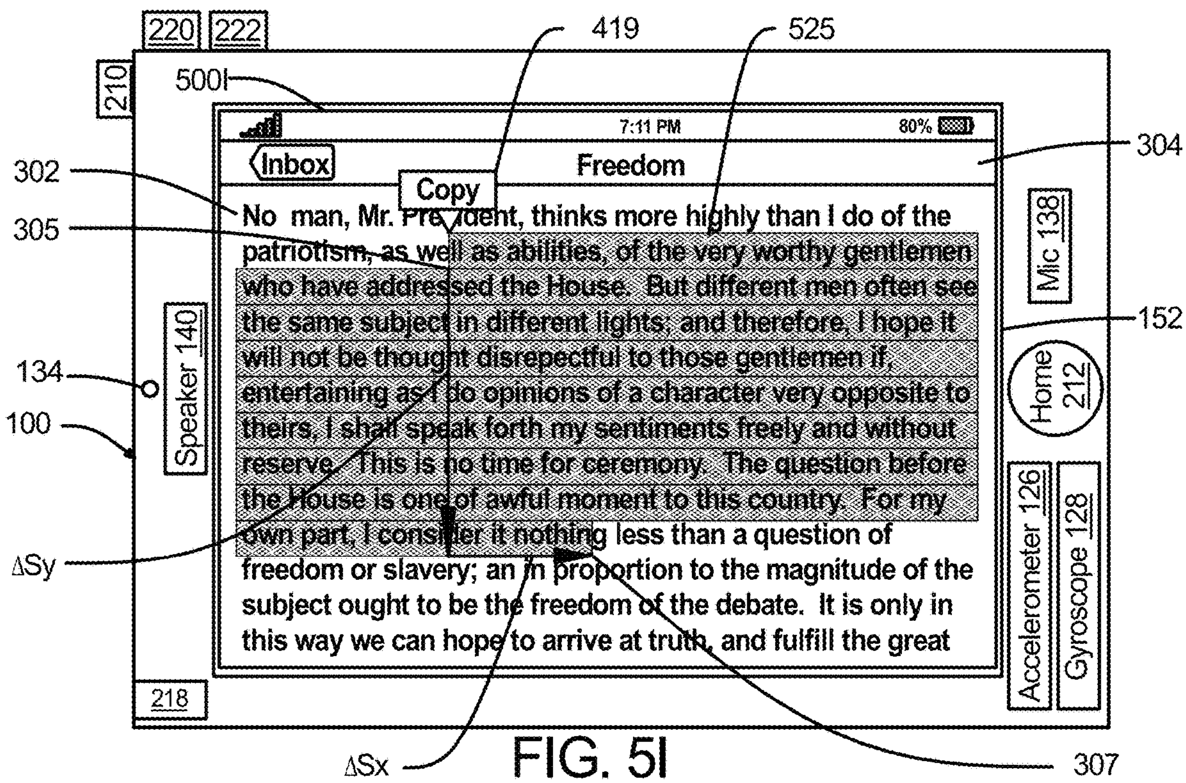

With drag lock ON, the extent of selection 515 illustrated in UI 500E (FIG. 5E) is not yet finalized. The user can change the selection extent with one or more additional slide gestures beginning anywhere on touchpad 156. For example, a user can perform a vertical slide gesture 516 to 518 as illustrated in FIG. 5F to modify the extent of selection 515. In response to detecting ΔFy (a change in the vertical position) of uninterrupted finger contact on touchpad 156, the device modifies the extent to selection 522 as illustrated in UI 500G (FIG. 5G). The user can continue change the extent of the selection with additional slide gestures beginning anywhere on touchpad 156. Once satisfied with the selection extent, the user can finalize the selection with tap gesture 524 anywhere on touchpad 156 as illustrated in FIG. 5H. In response to detecting the finger tap finalizing the selection extent, the device displays UI 5001 (FIG. 5I) with final selection extent 525.

The device can also display menu 419 for the selection 525. Menu 419 displays available actions with respect to the selection. A user can tap on-screen on a menu item to perform an action with respect to the selection. Alternatively, a user can enter a keyboard shortcut to perform an action with respect to the selected read-only text.

5.2 Using gestures on touchpad and keyboard: A user can perform a finger gesture (a long-press or long-click finger gesture for example) on touchpad 156 to display unit-length selection 310 and perform finger gestures on keyboard 154 to move unit-length selection 310 and select text in a manner similar to that described in reference to FIGS. 3X-3Y and FIGS. 4R-4S above.

6.0 Positioning a zero-length selection and selecting text within editable content w/drag-lock OFF: This is first described for the case of using gestures on a touchpad. This is then described for the case of using gestures on a touchpad and keyboard.

Figure 6A:
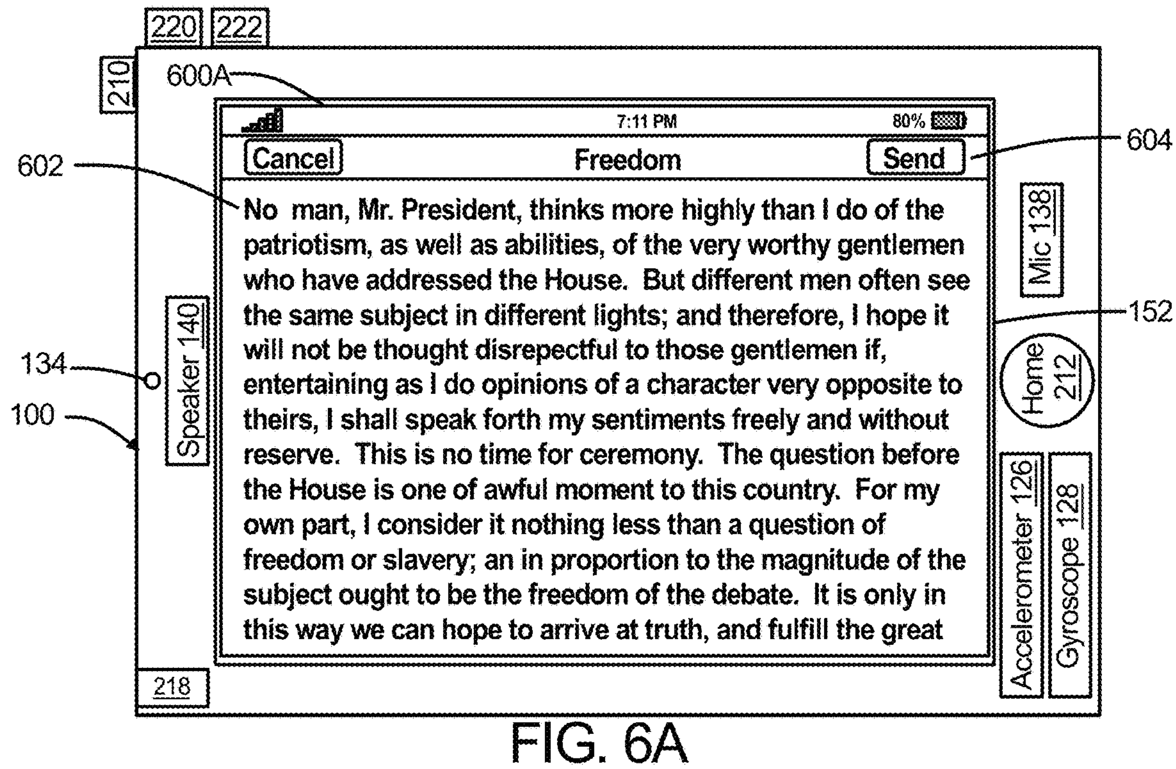
FIGS. 6A-6O illustrate an exemplary user interface and method for displaying and moving a selection of length equal to zero and selecting text within editable content with drag-lock off, on a mobile computing device with a display, using gestures on a touchpad in accordance with some embodiments.

6.1 Using gestures on touchpad: FIGS. 6A-6P illustrate an exemplary user interface and method for displaying and moving a selection of length equal to zero and selecting text within editable content with drag-lock off, on a computing device with a touch-sensitive display, using gestures on a touchpad.

Figure 6B:
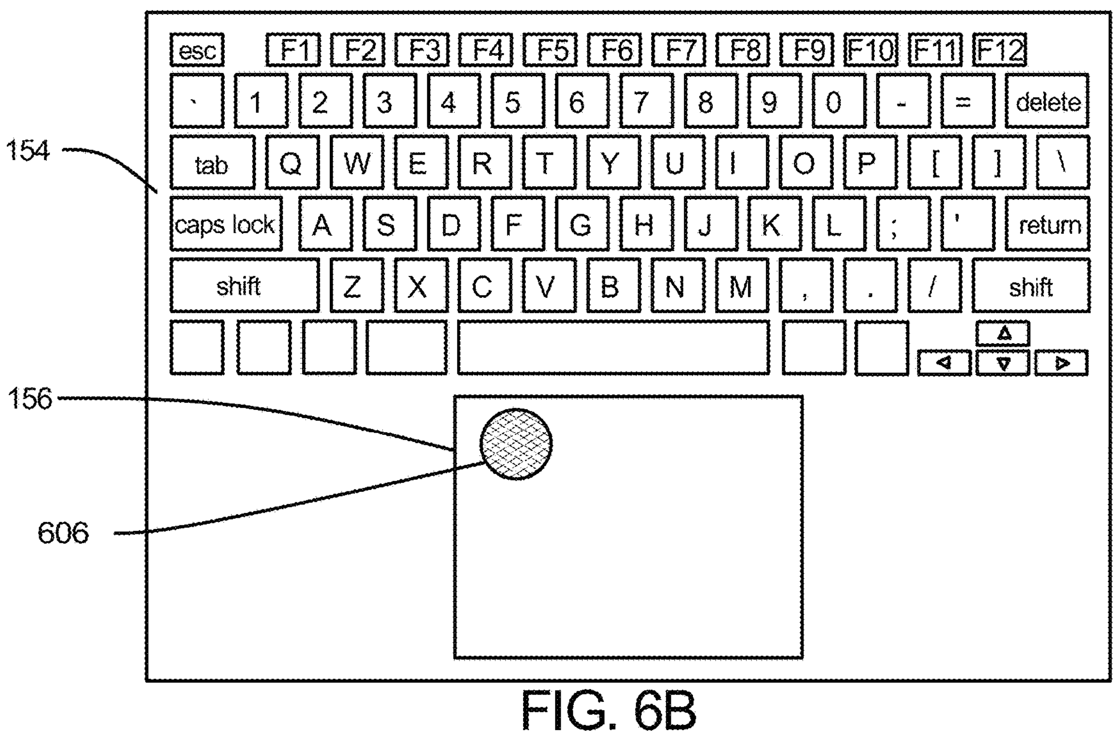
Figure 6C:
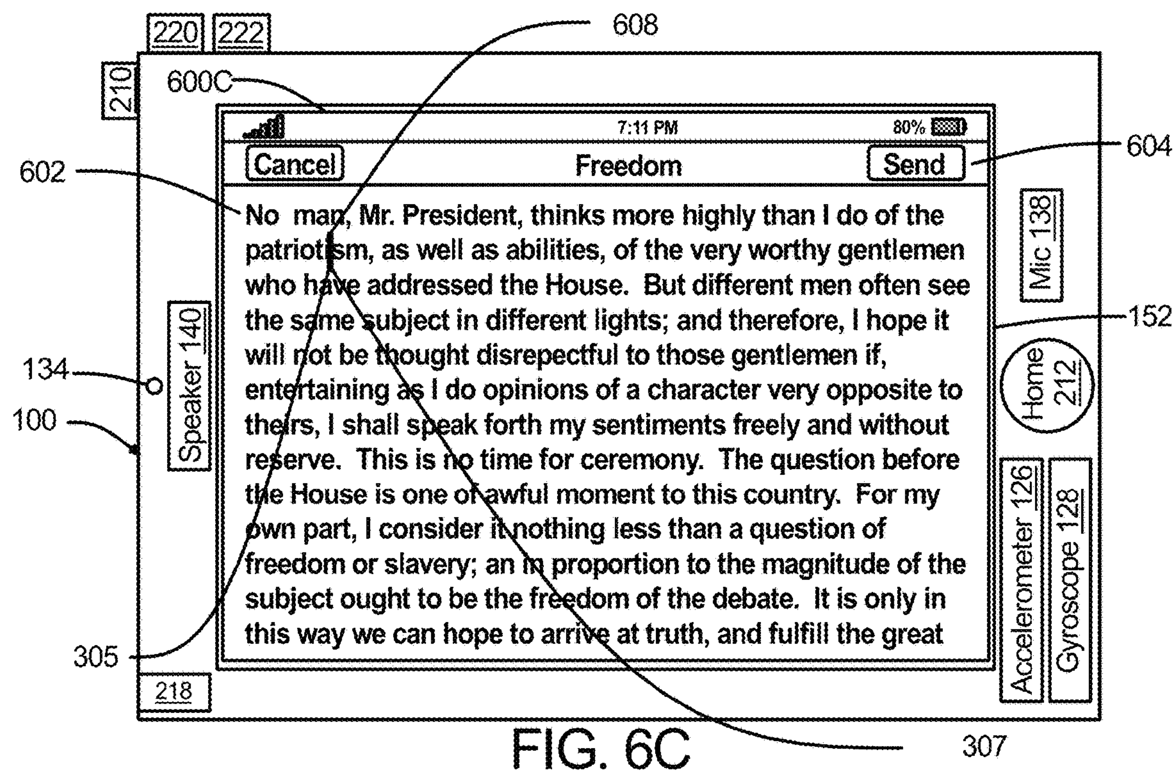

The device can display editable text content 602 in UI 600A (FIG. 6A). The device can also display application navigation bar 604. A user can perform a finger gesture 606 (a tap or click or long-press or long-click finger gesture for example) on touchpad 156 as illustrated in FIG. 6B. In response to detecting the finger gesture 606 on touchpad 156, the device displays zero-length selection 608 at a first selection position as illustrated in UI 6000 (FIG. 6C). The selection 608 has a selection start point 305 and a selection end point 307. In the case of zero-length selection 608, selection start point 305 and selection end point 307 are coincident. In one exemplary embodiment, the first selection position is at approximately the same relative position on the display as the tap or click or long-press or long-click gesture on the touchpad as illustrated in FIGS. 6B-6C. In other exemplary embodiments, the first selection position is before the first character, or after the last character, in editable text content 602. In this disclosure we will often refer to "selection 608 of length equal to zero" simply as "zero-length selection 608" or "selection 608".

Figure 6D:
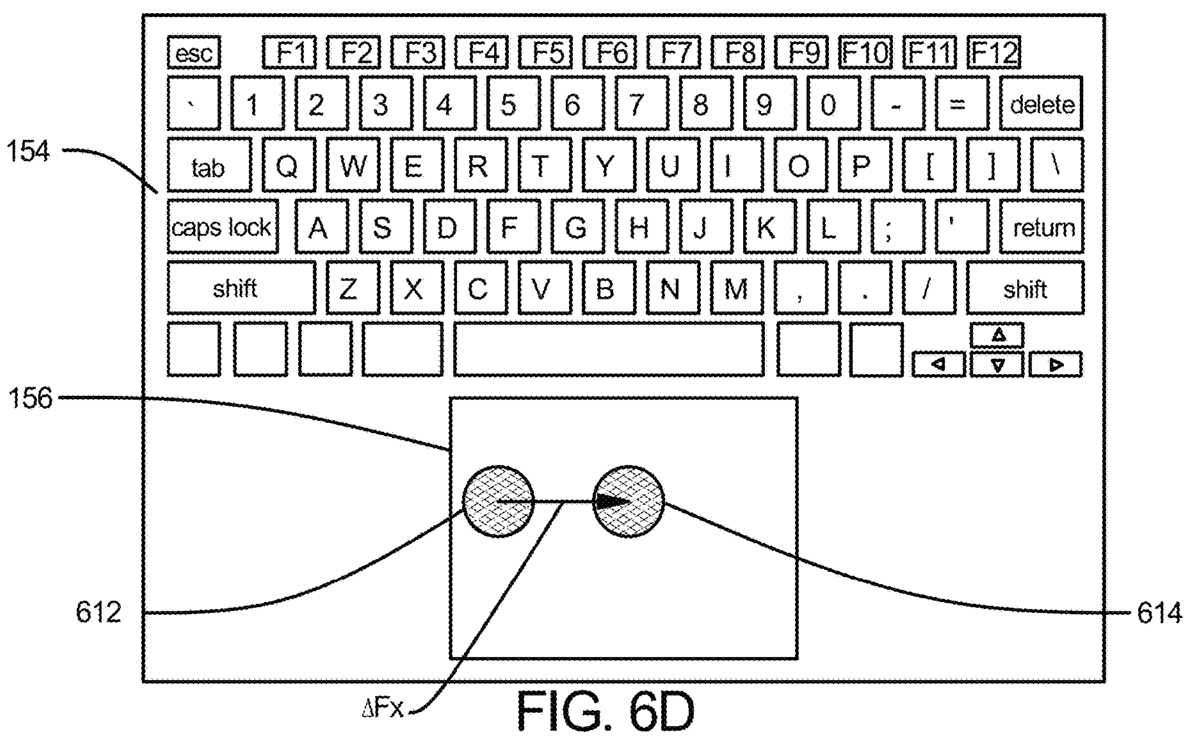
Figure 6E:
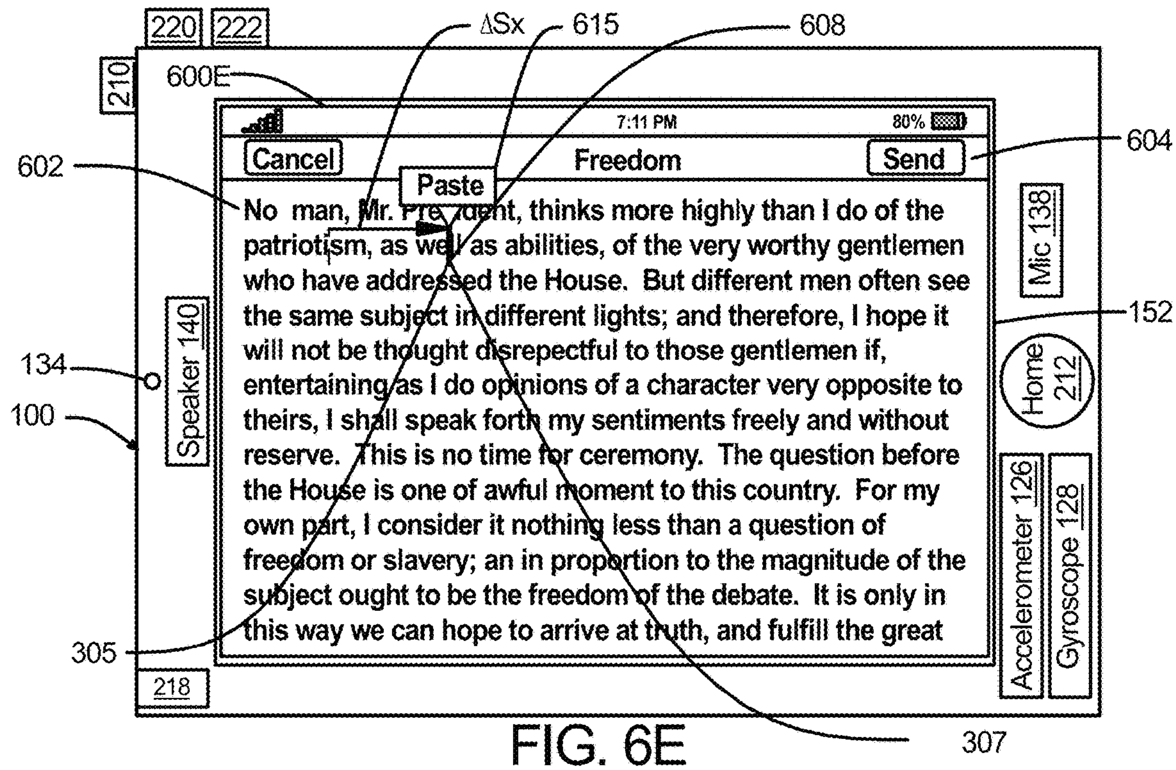

A user can perform a slide finger gesture 612 to 614 beginning anywhere on touchpad 156 as illustrated in FIG. 6D. In response to detecting ΔFx (a change in the horizontal position of an uninterrupted finger contact), the device changes the horizontal position of zero-length selection 608 on the display from the first selection position to a second selection position as illustrated in UI 600E (FIG. 6E). In this exemplary embodiment ΔSx (the change in the horizontal position of selection 608) is approximately proportional to ΔFx as illustrated in FIGS. 6D-6E.

The device can also display menu 615 for zero-length selection 608. Menu 615 displays available actions with respect to the selection. In the case of editable text, paste can be an action as illustrated in FIG. 6E. A user can tap on-screen on a menu item to perform an action with respect to the selection. Alternatively, a user can enter a keyboard shortcut to perform an action with respect to the selection.

Figure 6F:
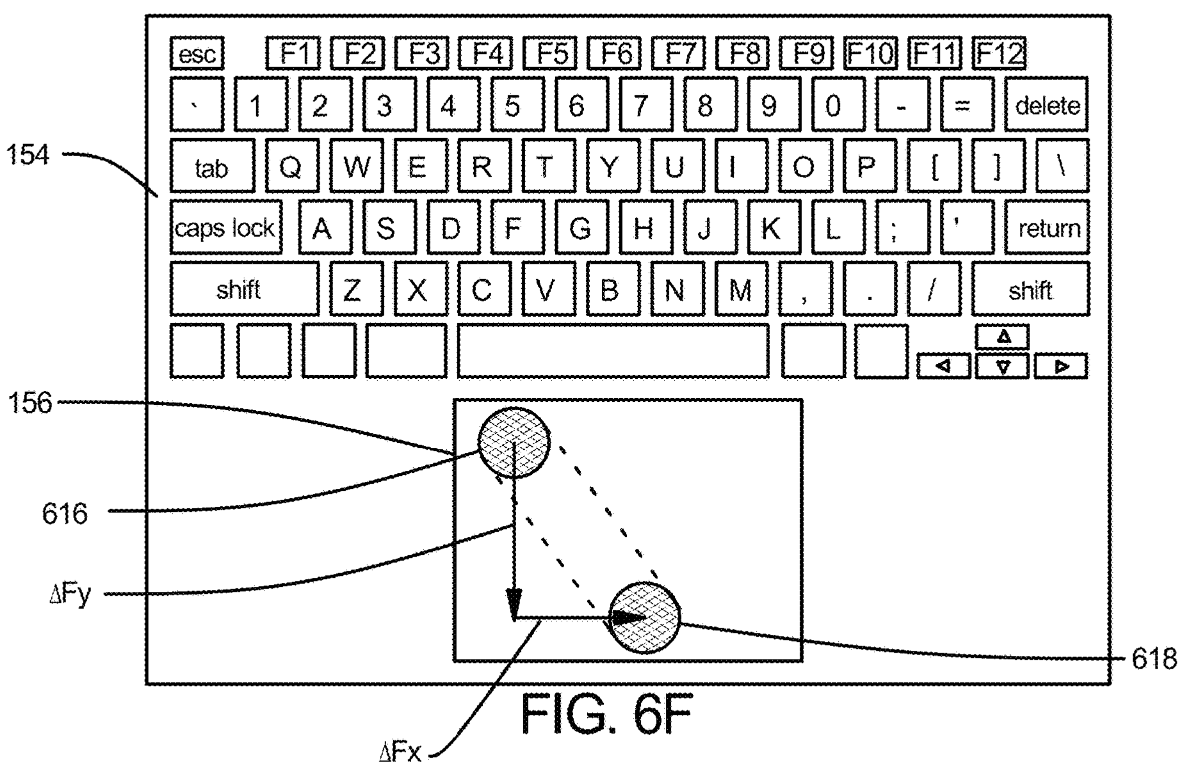
Figure 6G:
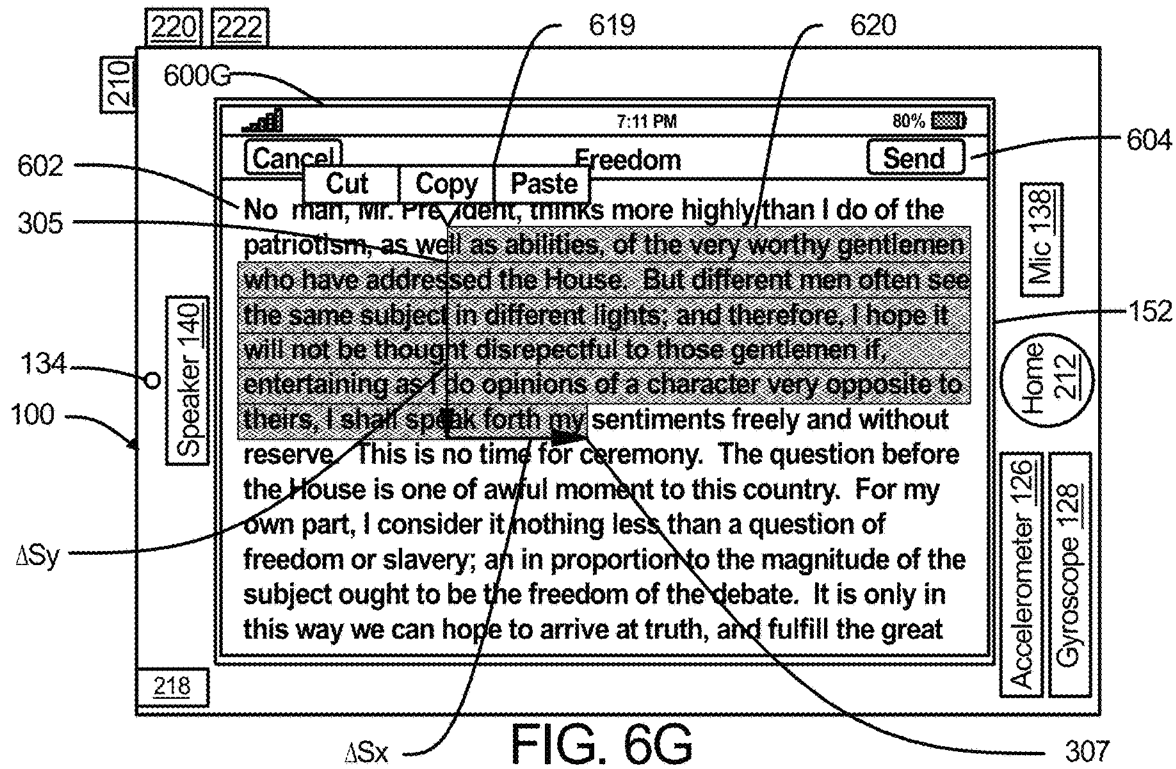
Figure 6H:
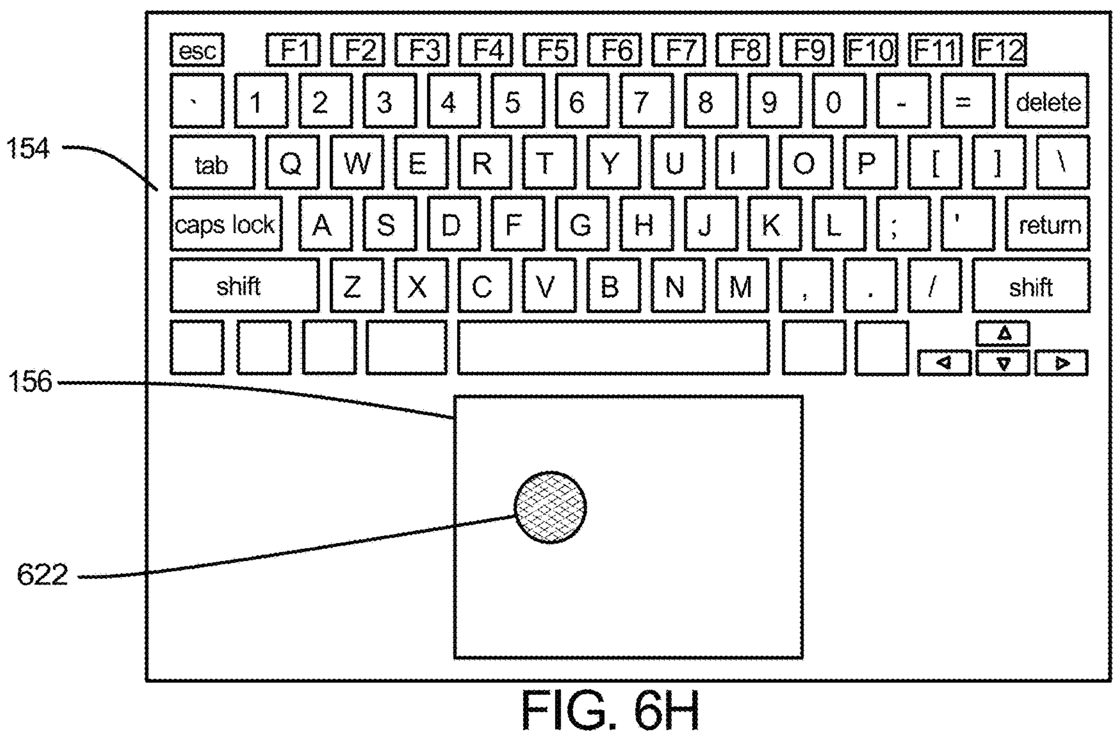

With zero-length selection 608 at a first position, a user can perform a diagonal tap-and-slide or click-and-slide finger gesture 616 to 618 beginning anywhere on touchpad 156. In response to detecting a tap and change in the horizontal position (ΔFy) and change in the vertical position (ΔFy) of an uninterrupted finger contact on the touchpad 156 as illustrated in FIG. 6F, the device changes the position of selection end point 307 on the display from a first position to a second position as illustrated in FIG. 6G. In this exemplary embodiment ΔSx is approximately proportional to ΔFx and ΔSy is approximately proportional to ΔFy as illustrated in FIGS. 6F-6G. The device displays UI 600G (FIG. 6G) with selection end point 307 at a second position. In this example, Kx~1 and Ky~1.

The device can also display menu 619 for selection 620. Menu 619 displays available actions with respect to the selection. In the case of selected editable text, cut, copy, or paste can be an action as illustrated in FIG. 6G. A user can tap on-screen on a menu item to perform an action with respect to the selection. Alternatively, a user can enter a keyboard shortcut to perform an action with respect to the selection.

Figure 6I:
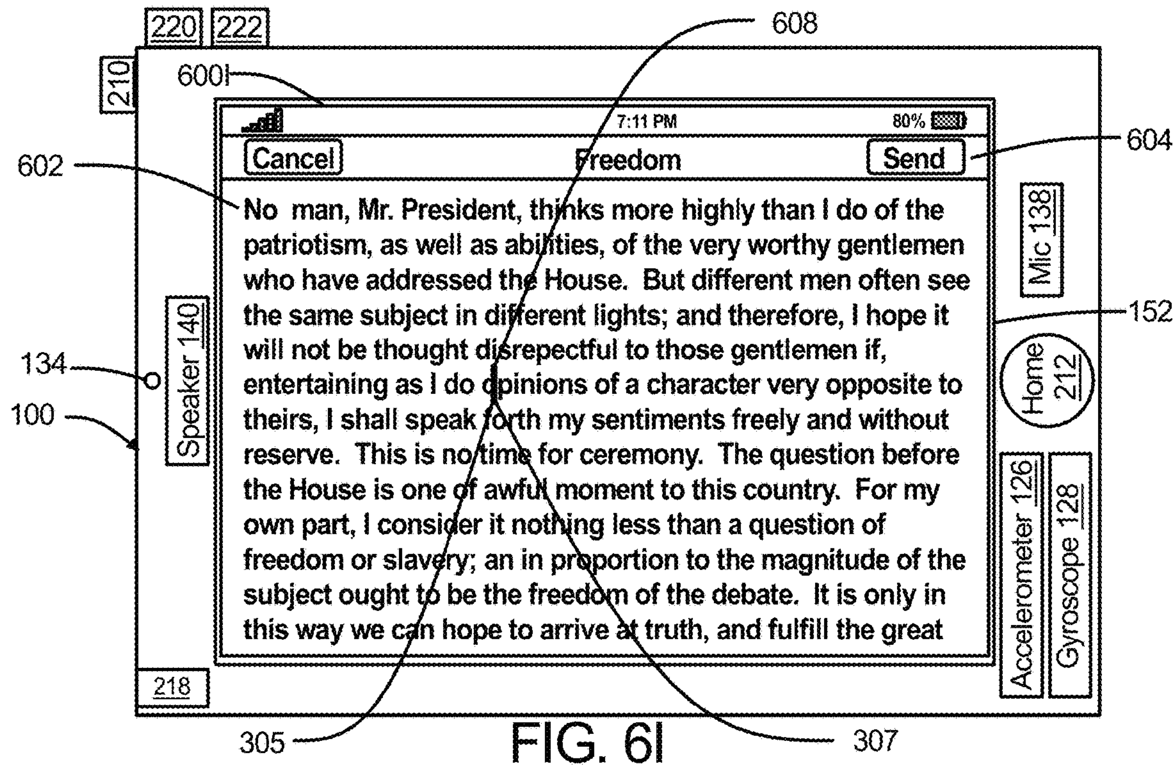

A user can perform tap or click finger gesture 622 anywhere on touchpad 156. In response, the device displays UI 6001 (FIG. 6I) with the selection 620 no longer displayed, and with zero-length selection 608 displayed at approximately the same relative position on the display as the tap gesture on the touchpad as illustrated in FIG. 6I.

Figure 6J:
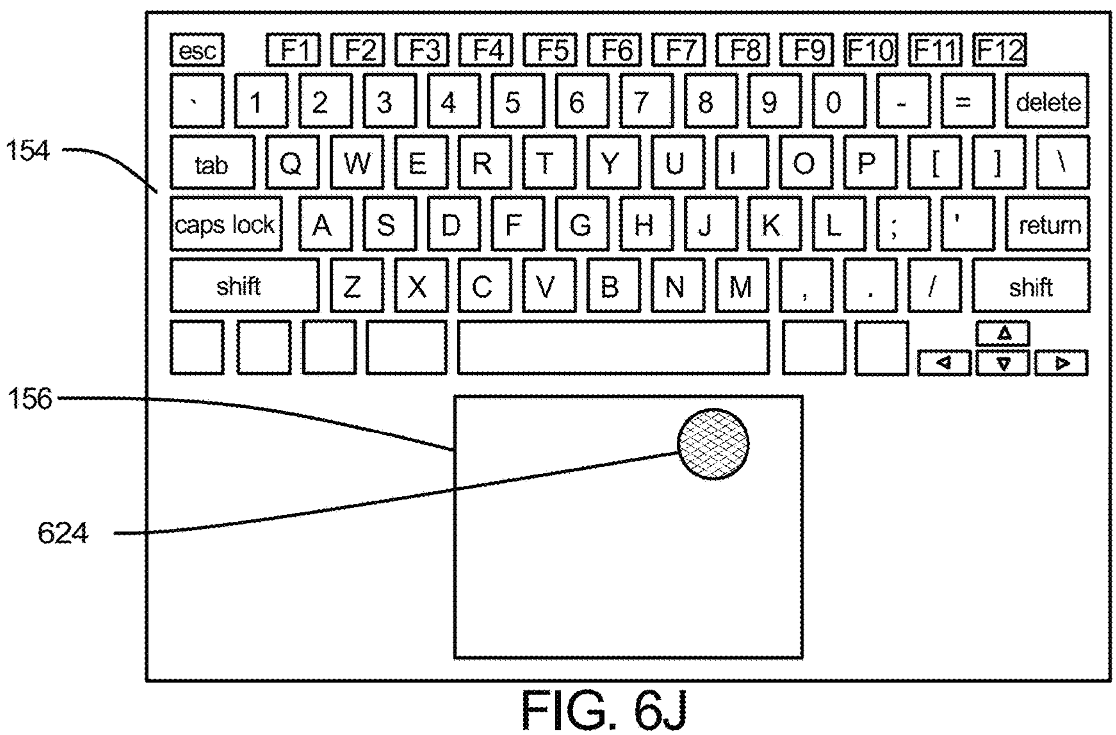
Figure 6K:
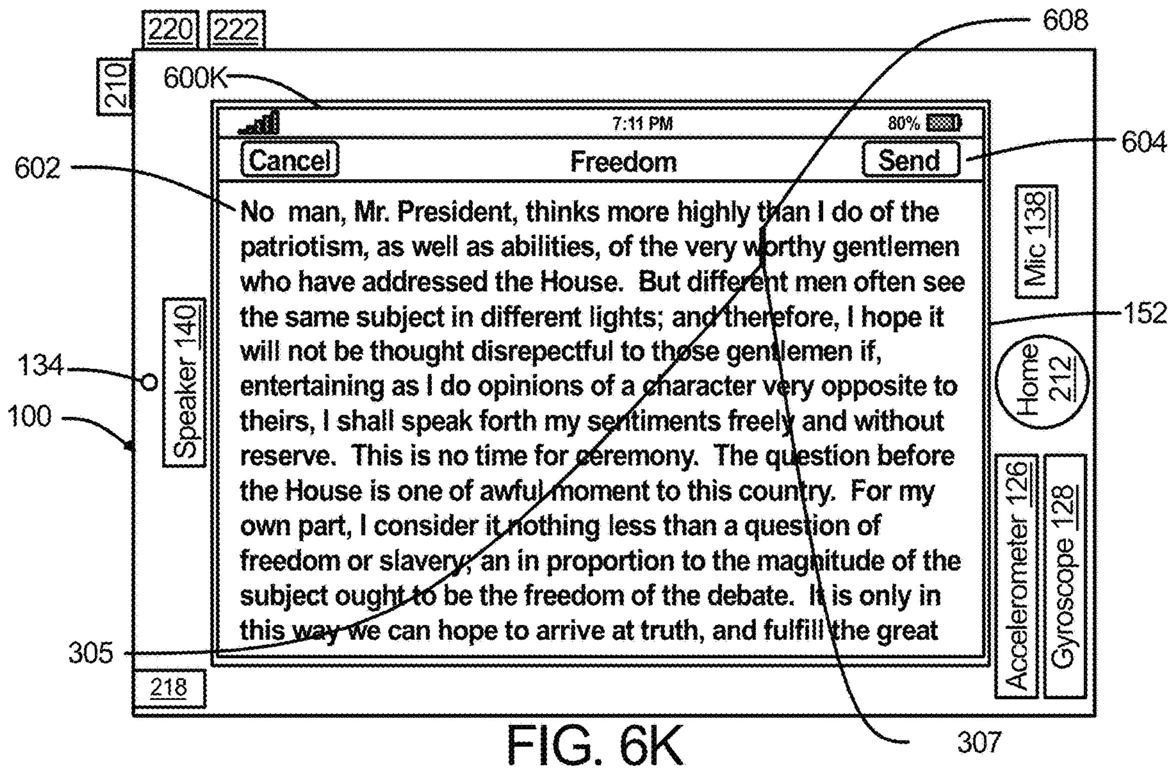
Figure 6L:
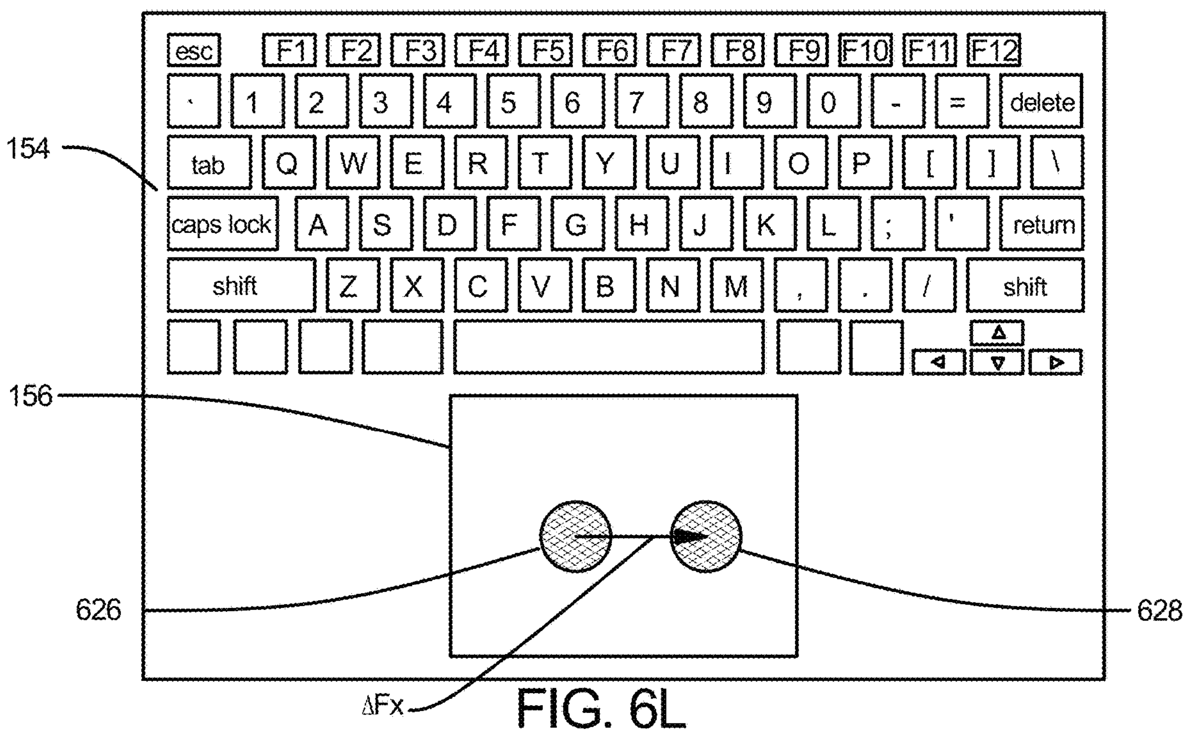

A user can perform a finger gesture 624 (a tap or click or long-press or long-click finger gesture for example) on touchpad 156 as illustrated in FIG. 6J. In response to detecting the finger gesture 624 on touchpad 156, the device displays zero-length selection 608. In some embodiments zero-length selection 608 is displayed at approximately the same relative position on the display as gesture 624 on the touchpad as illustrated in UI 600K (FIG. 6K).

A user can perform slide finger gesture 626 to 628 beginning anywhere on touchpad 156 as illustrated in FIG.

Figure 6M:
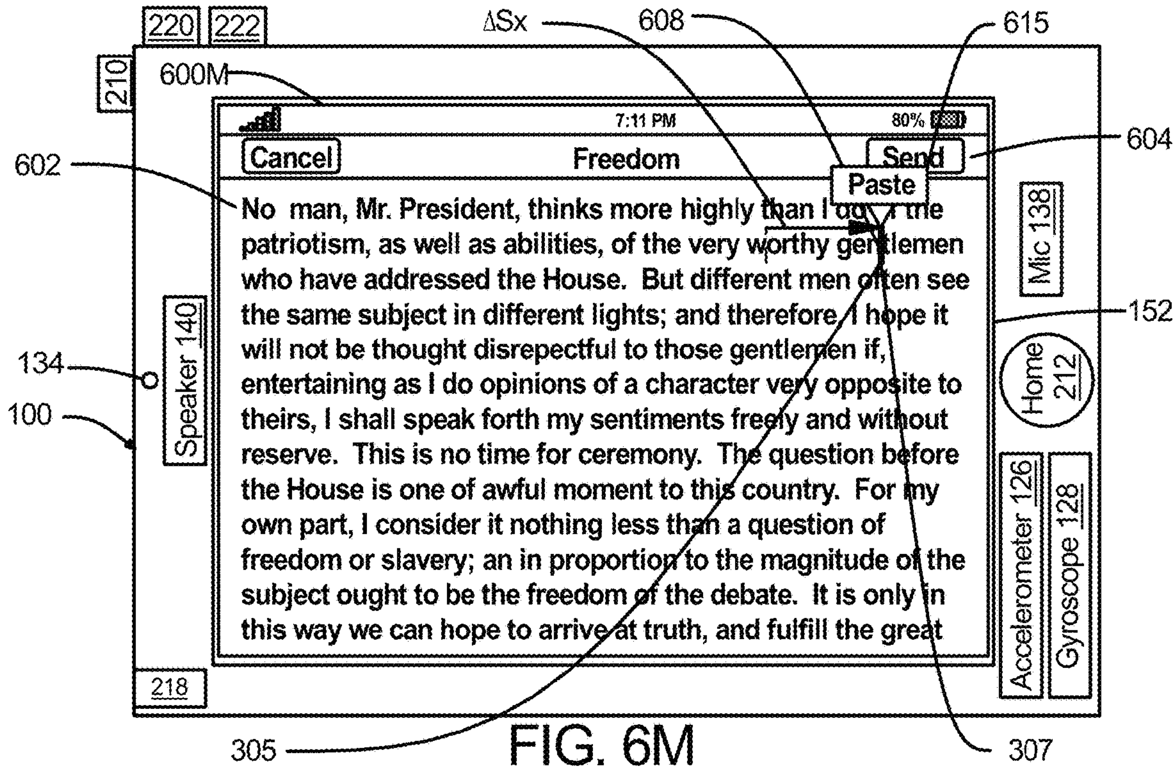
Figure 6N:
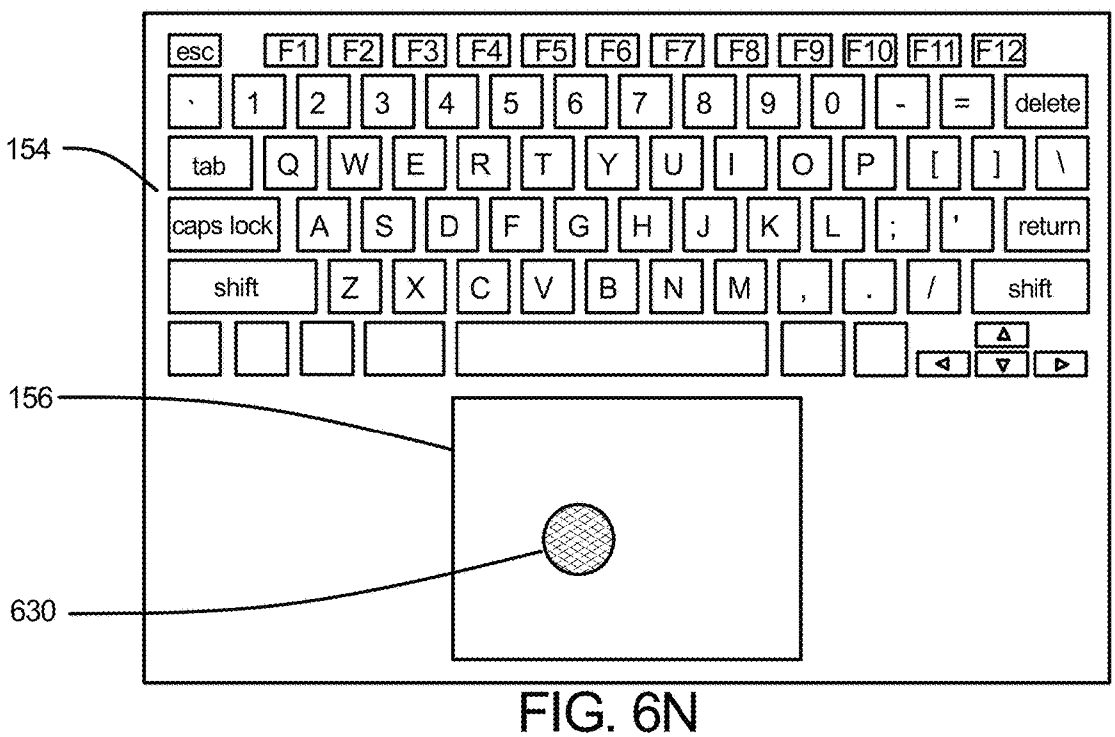

6L. In response to detecting ΔFx (a change in the horizontal position of an uninterrupted finger contact), the device changes the horizontal position of zero-length selection 608 on the display from the first selection position to a second selection position as illustrated in UI 600M (FIG. 6M). In this example, Kx~1. The device can also display menu 615 for zero-length selection 608. Menu 615 displays available actions with respect to the selection. In the case of editable text, paste can be an action as illustrated in FIG. 6M. A user can tap on-screen on a menu item to perform an action with respect to the selection. Alternatively, a user can enter a keyboard shortcut to perform an action with respect to the selection.

Figure 6O:
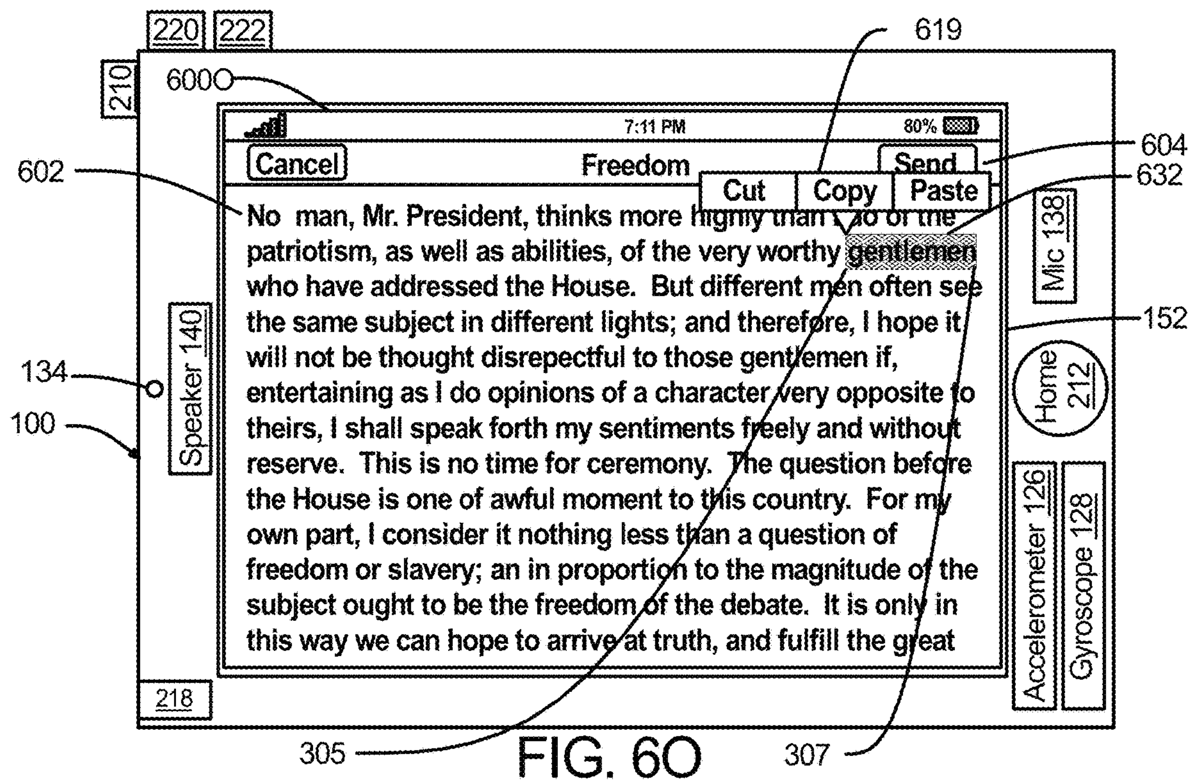

A user can perform a finger gesture (double-tap or double-click finger gesture for example) 630 on touchpad 156. In response to detecting finger gesture 630 on touchpad 156, the device selects the word at the position of zero-length selection 608 as illustrated in UI 600O (FIG. 6O). The device can also display menu 619 for the selection 632. The menu displays available actions with respect to the selection. Again, in the case of selected editable text, cut, copy, or paste can be an action as illustrated in FIG. 6O. A user can tap on-screen on a menu item to perform an action with respect to the selection. Alternatively, a user can enter a keyboard shortcut to perform an action with respect to the selection.

6.2 Using gestures on touchpad and keyboard: A user can perform a finger gesture (a tap or click or long-press or long-click finger gesture for example) on touchpad 156 to display zero-length selection 608 and perform finger gestures on keyboard 154 to move zero-length selection 608 and select text in a manner similar to that described in reference to FIGS. 3V-3X and FIGS. 4P-4U above for unit-length selection 310.

7.0 Positioning a zero-length selection and selecting text within single-line of editable content w/ drag-lock OFF: This is first described for the case of using gestures on a touchpad. This is then described for the case of using gestures on a touchpad and keyboard.

7.1 Using gestures on touchpad: FIGS. 7A-7I illustrate an exemplary user interface and method for displaying and moving a selection of length equal to zero and selecting text within a single line of editable content with drag-lock off, on a computing device with a touch-sensitive display, using gestures on a touchpad.

Figure 7A:
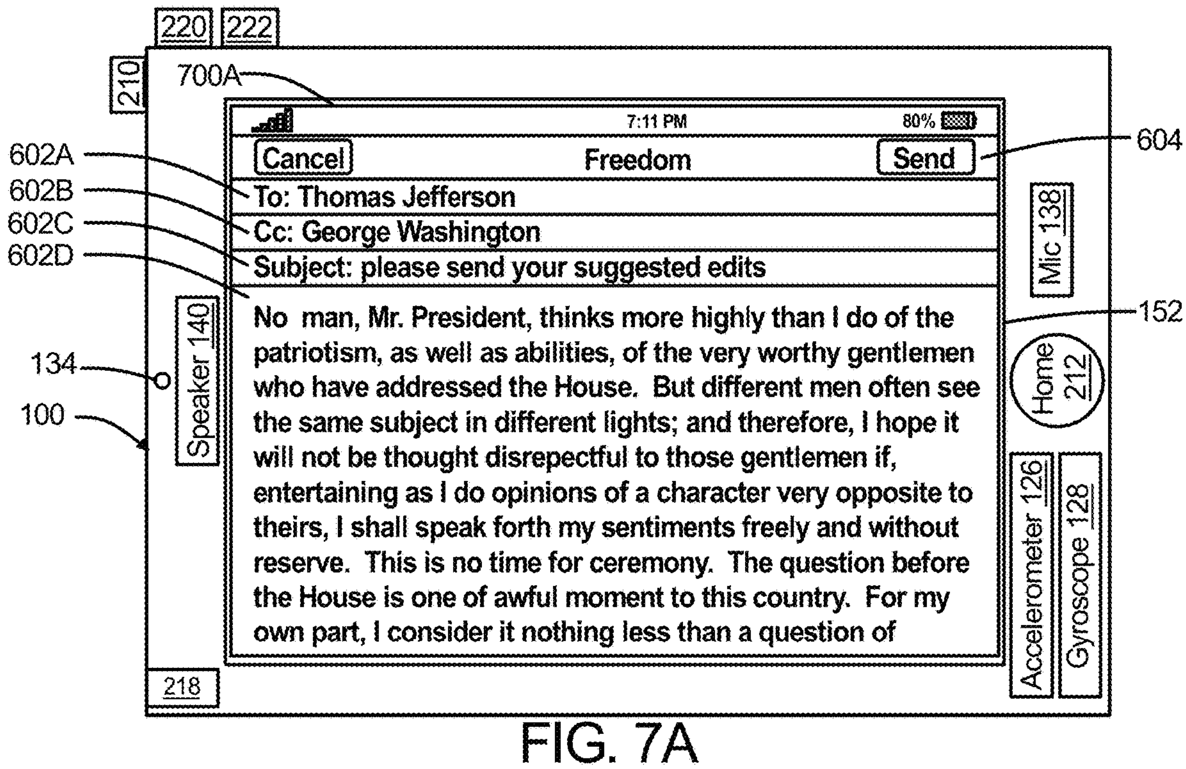
FIGS. 7A-7I illustrate an exemplary user interface and method for displaying and moving a selection of length equal to zero and selecting text within a single line of editable content with drag-lock off, on a mobile computing device with a display, using gestures on a touchpad in accordance with some embodiments.
Figure 7B:
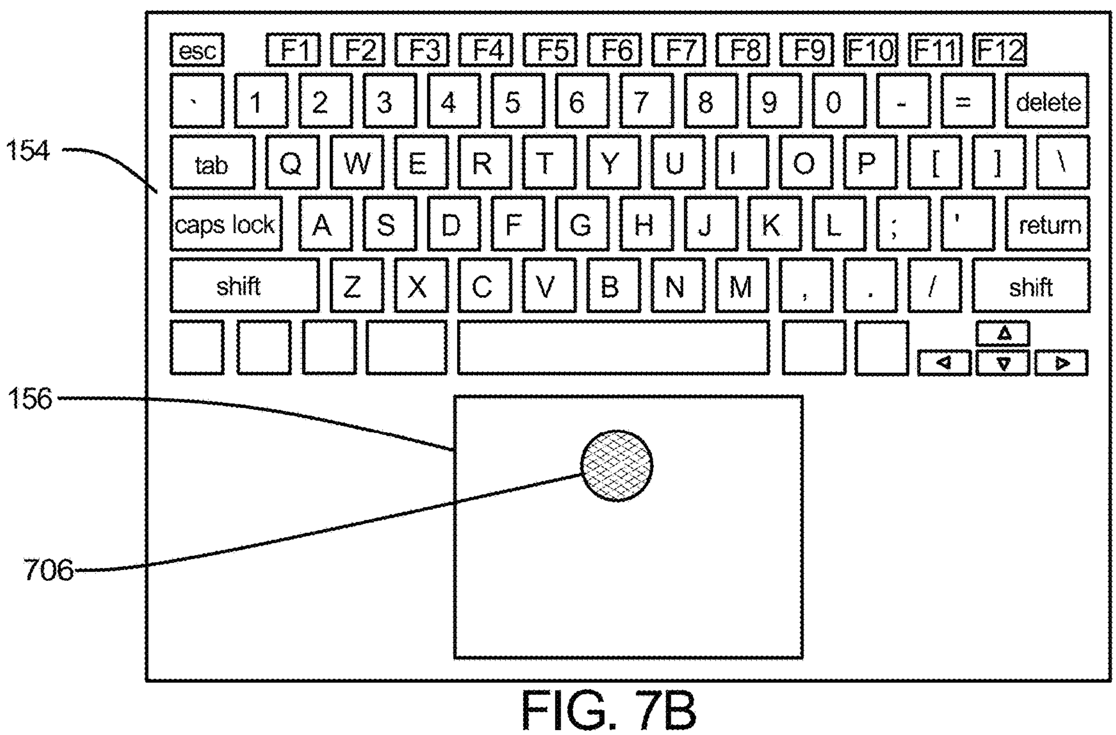
Figure 7C:
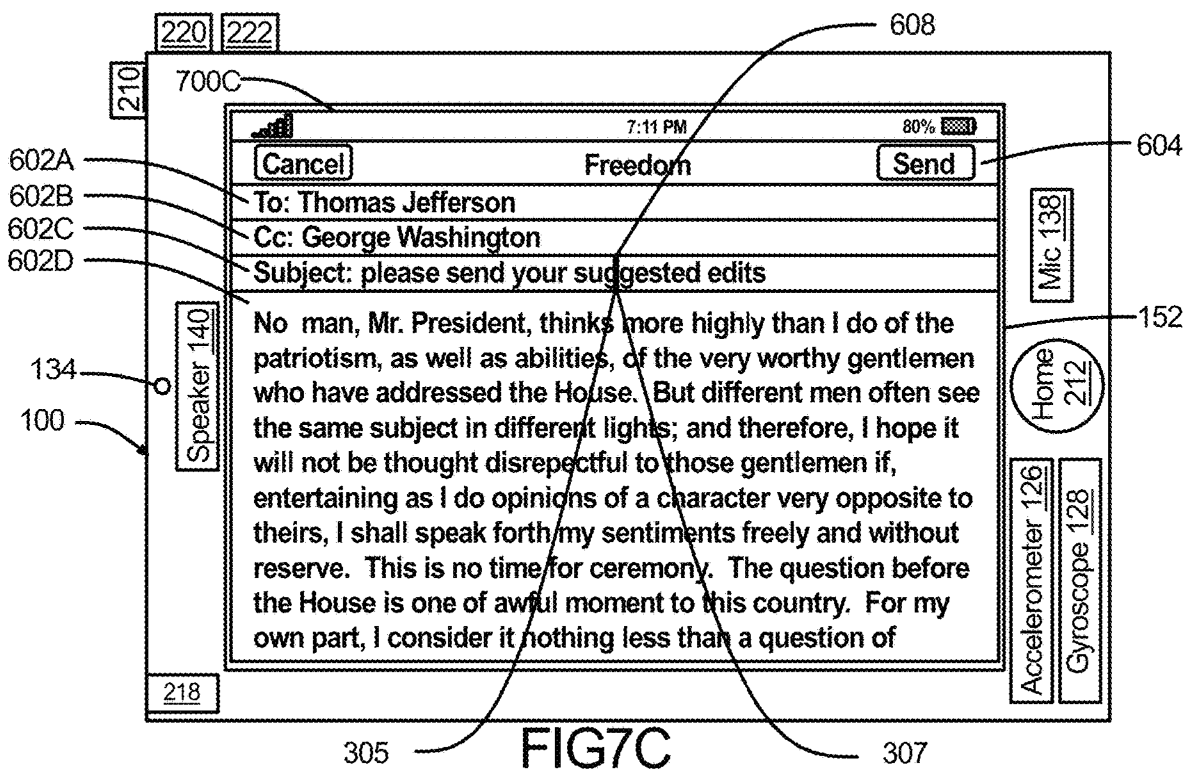
Figure 7D:
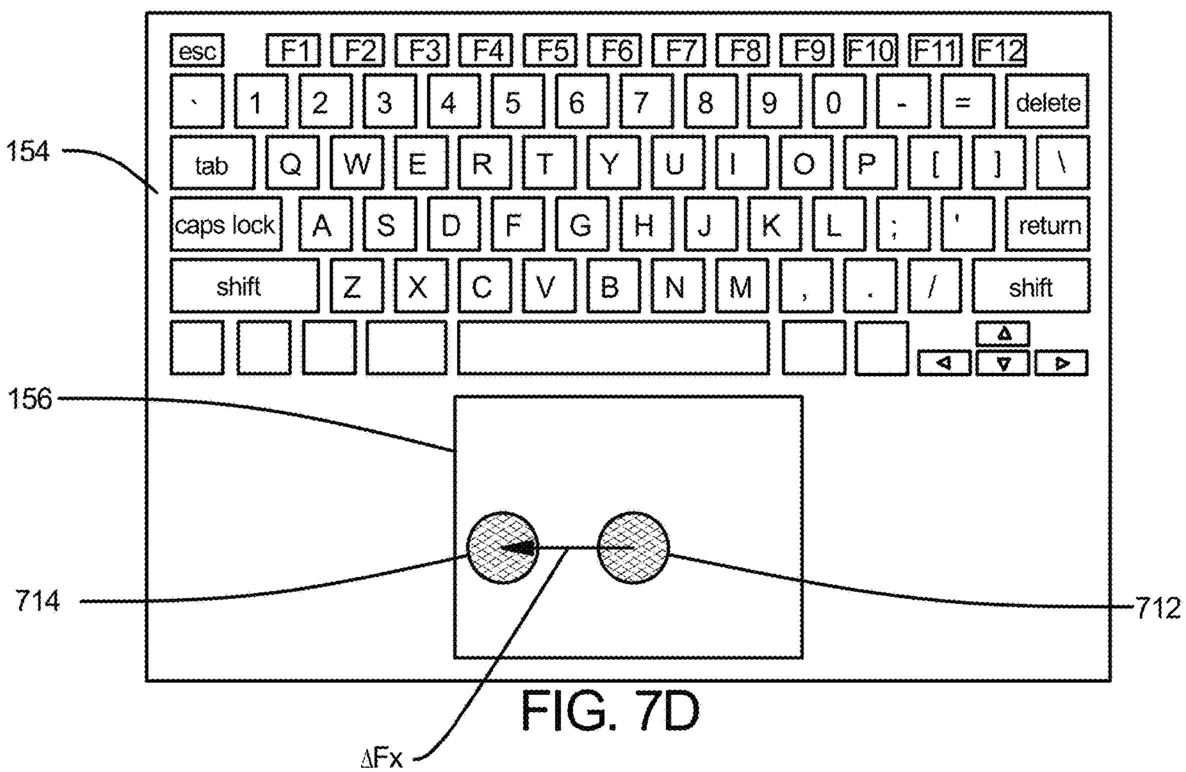
Figure 7E:
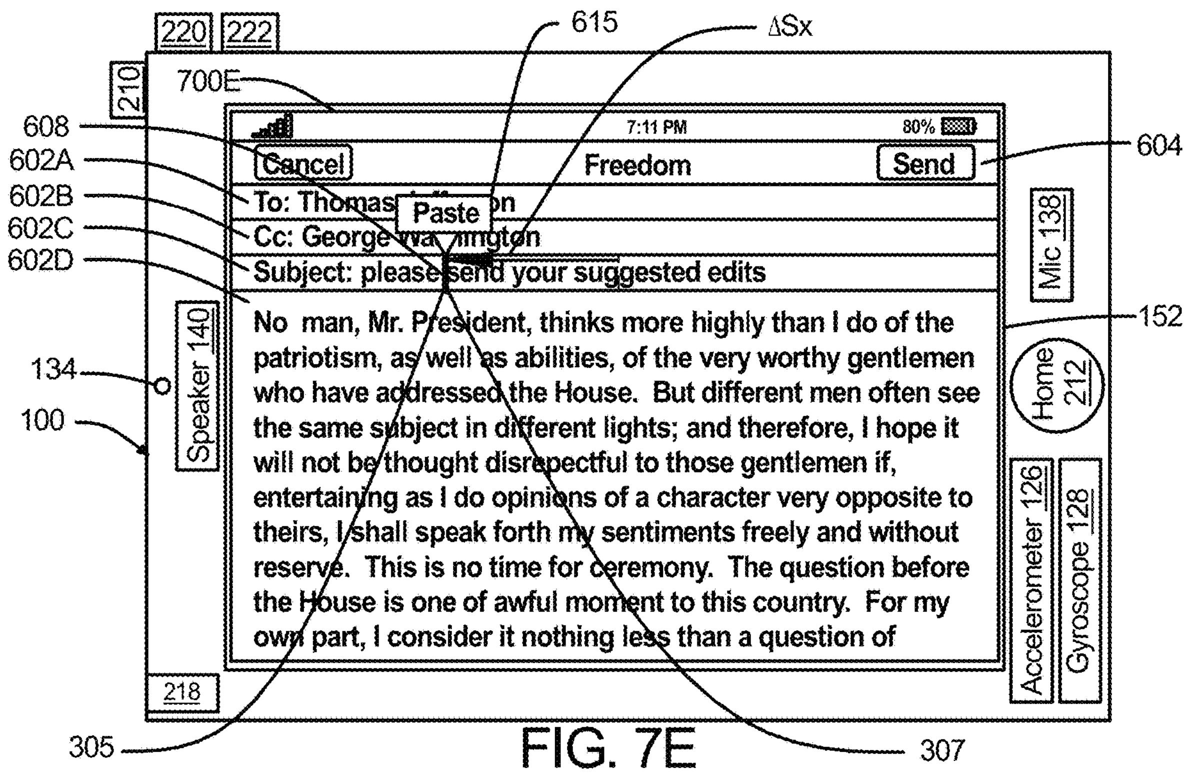

The device can display editable content 602 in individual content areas as illustrated in UI 700A (FIG. 7A). The device can also display application navigation bar 604. A user can perform a finger gesture 706 (a tap or click or long-press or long-click finger gesture for example) on touchpad 156 as illustrated in FIG. 7B. In response to detecting the finger gesture on touchpad 156, the device displays zero-length selection 608 at a first selection position within a single line of editable text content 602C as illustrated in UI 700C (FIG. 7C). Unit-length selection 310 has selection start point 305 and selection end point 307. In one exemplary embodiment, the first selection position is at approximately the same relative position on the display as the tap or click or long-press or long-click gesture on the touchpad as illustrated in FIGS. 7B-7C. In other exemplary embodiments, the first selection position is before the first character or after the last character in editable text content 602. A user can perform a slide finger gesture 712 to 714 beginning anywhere on touchpad 156 as illustrated in FIG. 7D. In response to detecting ΔFx (a change in the horizontal position of an uninterrupted finger contact), the device changes the horizontal position of zero-length selection 608 on the display from the first selection position to a second selection position as illustrated in UI 700E (FIG. 7E). The device can also display menu 615 for zero-length selection 608. Menu 615 displays available actions with respect to zero-length selection 608. In the case of editable text, paste can be an action as illustrated in FIG. 7E. A user can tap on-screen on a menu item to perform an action with respect to the selection. Alternatively, a user can enter a keyboard shortcut to perform an action with respect to the selection.

Figure 7F:
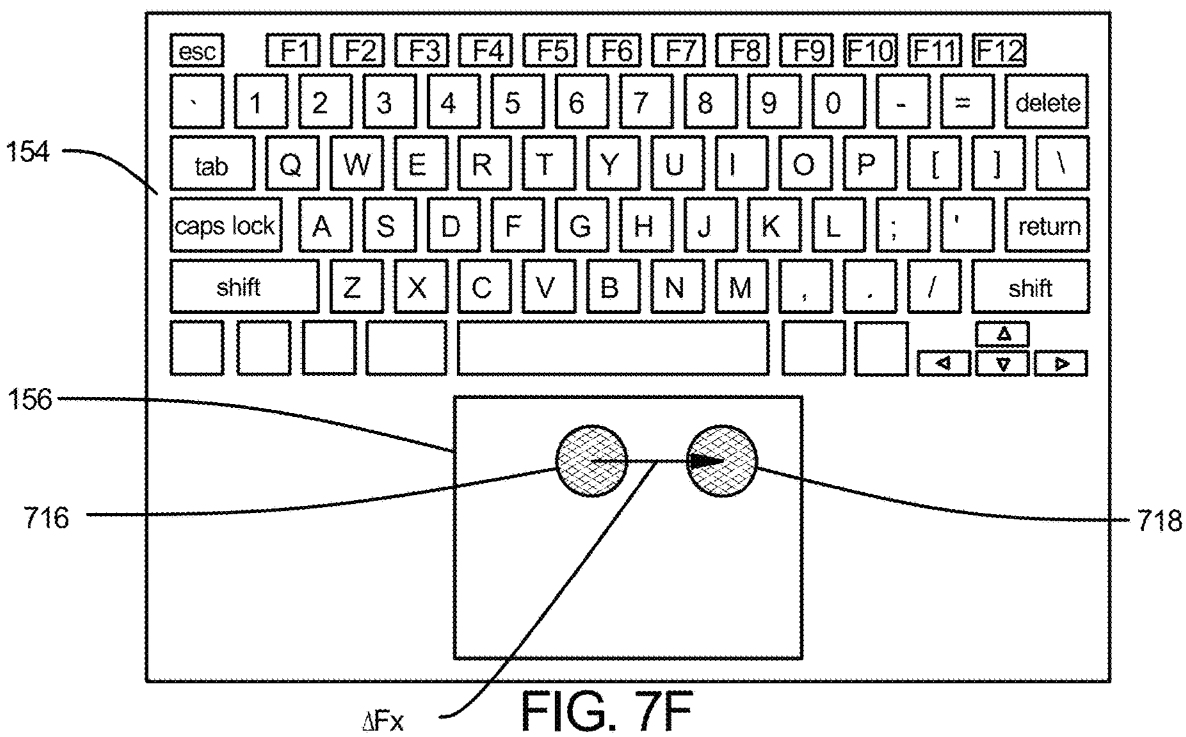
Figure 7G:
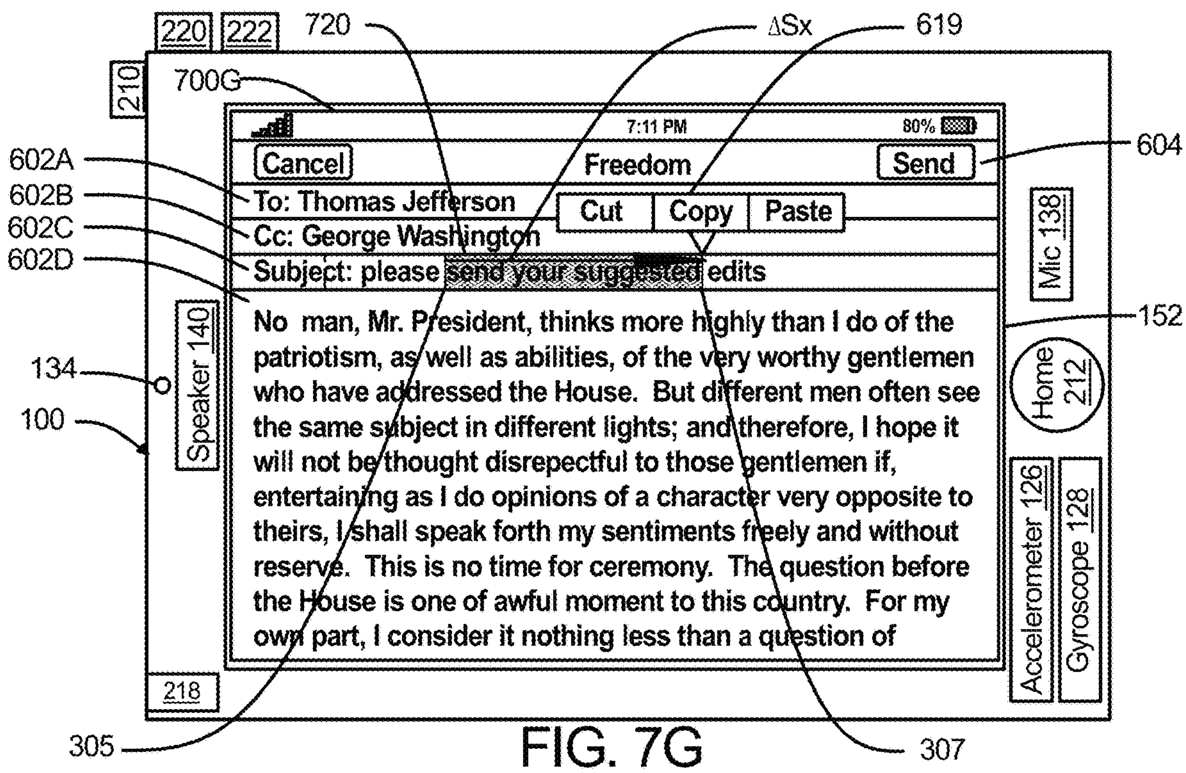

A user can perform a slide finger gesture 716 to 718 beginning anywhere on touchpad 156 as illustrated in FIG. 7F. In response to detecting ΔFx (a change in the horizontal position of an uninterrupted finger contact), the device changes the horizontal position of zero-length selection 608 on the display from the first selection position to a second selection position as illustrated in UI 700GE (FIG. 7G). In this exemplary embodiment ΔSx (the change in the horizontal position of zero-length selection 608) is approximately proportional to ΔFx as illustrated in FIGS. 7F-7G. In this example, Kx>1.

The device can also display menu 619 for the selection 720. The menu displays available actions with respect to the selection. In the case of selected editable text, cut, copy, or paste can be an action as illustrated in FIG. 7G. A user can tap on-screen on a menu item to perform an action with respect to the selection. Alternatively, a user can enter a keyboard shortcut to perform an action with respect to the selection.

Figure 7H:
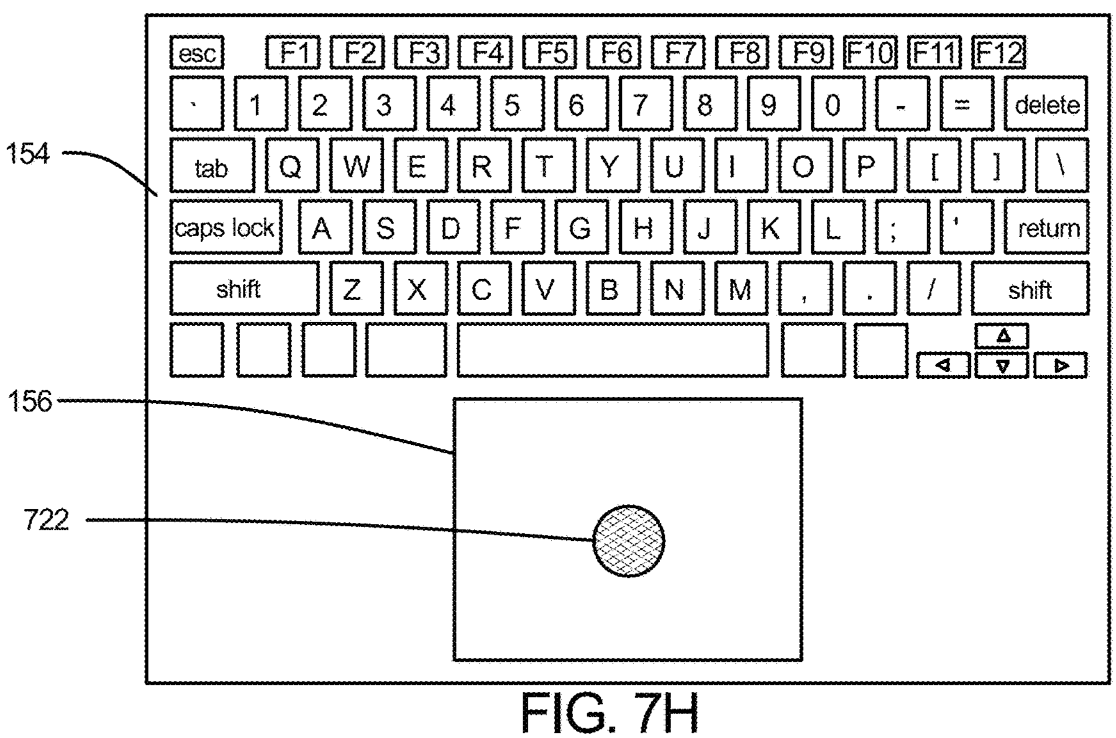
Figure 7I:
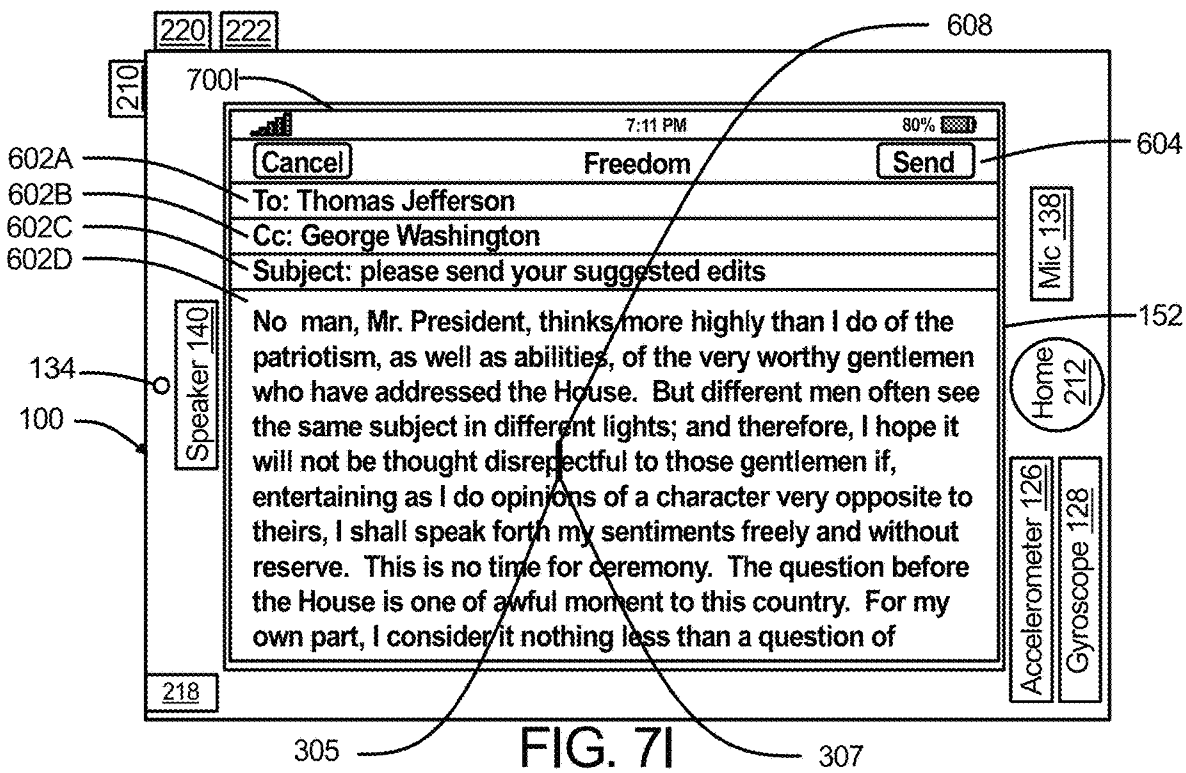

A user can perform finger gesture 722 (a tap or click or long-press or long-click finger gesture for example) on touchpad 156 as illustrated in FIG. 7H. In response to detecting finger gesture 722 on touchpad 156, the device displays zero-length selection 608 at a first selection position within editable text content 602D as illustrated in UI 700I (FIG. 7I). In one exemplary embodiment, the first selection position is at approximately the same relative position on the display as the tap or click or long-press or long-click gesture on the touchpad as illustrated in FIGS. 7H-7I.

7.2 Using gestures on touchpad and keyboard: A user can perform a finger gesture (a tap or click or long-press or long-click finger gesture for example) on touchpad 156 to display zero-length selection 608 and perform finger gestures on keyboard 154 to move zero-length selection 608 and select text in a manner similar to that described in reference to FIGS. 3W-3X and FIGS. 4R-4S above for unit-length selection 310.

8.0 Positioning a zero-length selection within an editable text content area: This is first described for the case of using gestures on a touchpad. This is then described for the case of using gestures on a touchpad and keyboard.

Figure 8A:
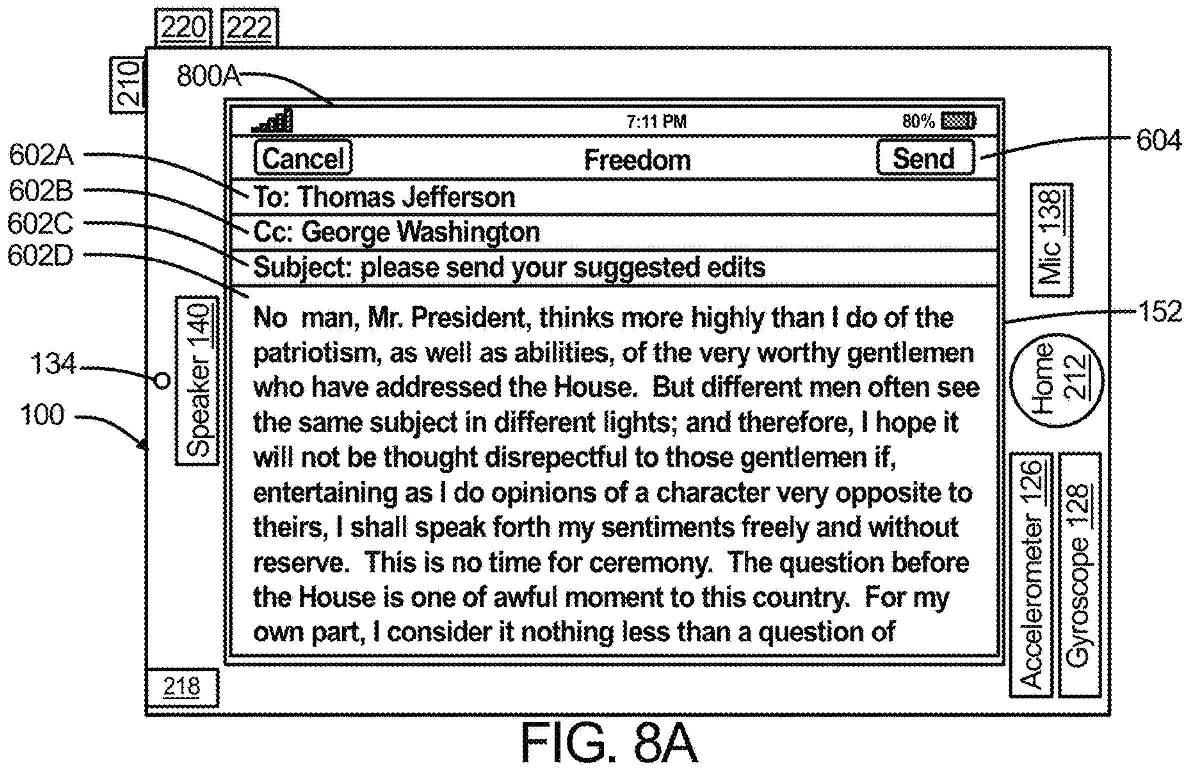
FIGS. 8A-8E illustrate an exemplary user interface and method for displaying a selection of length equal to zero within editable content entry areas, on a mobile computing device with a display, using gestures on a touchpad in accordance with some embodiments.
Figure 8B:
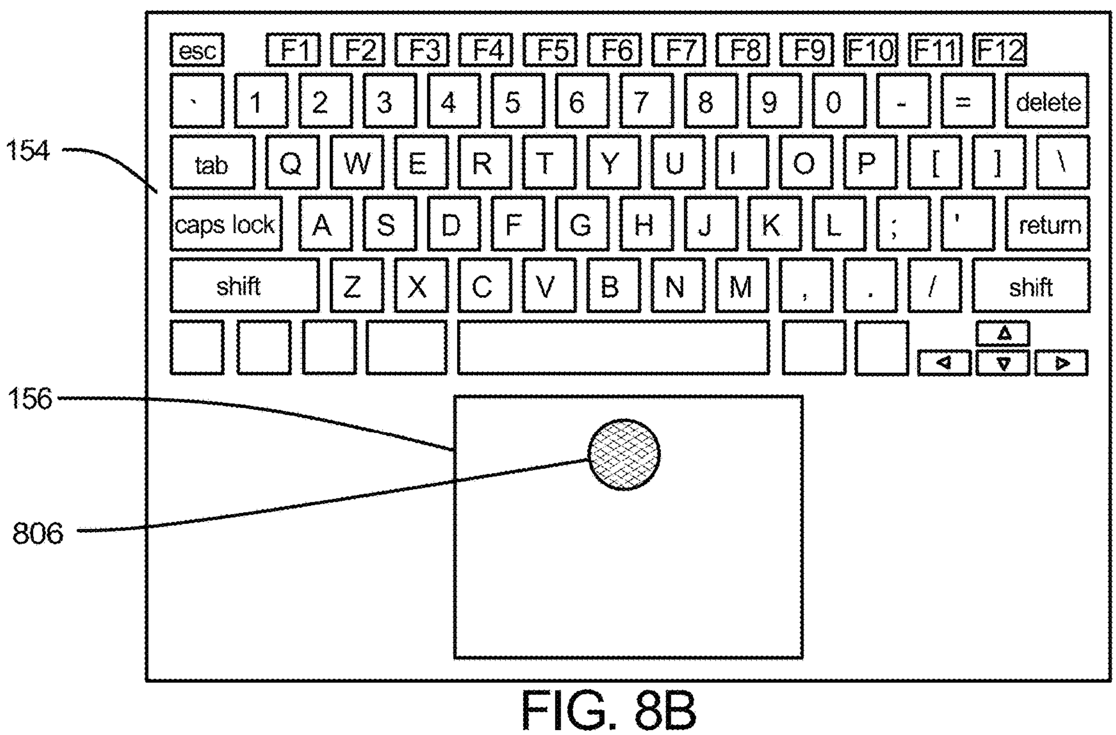
Figure 8C:
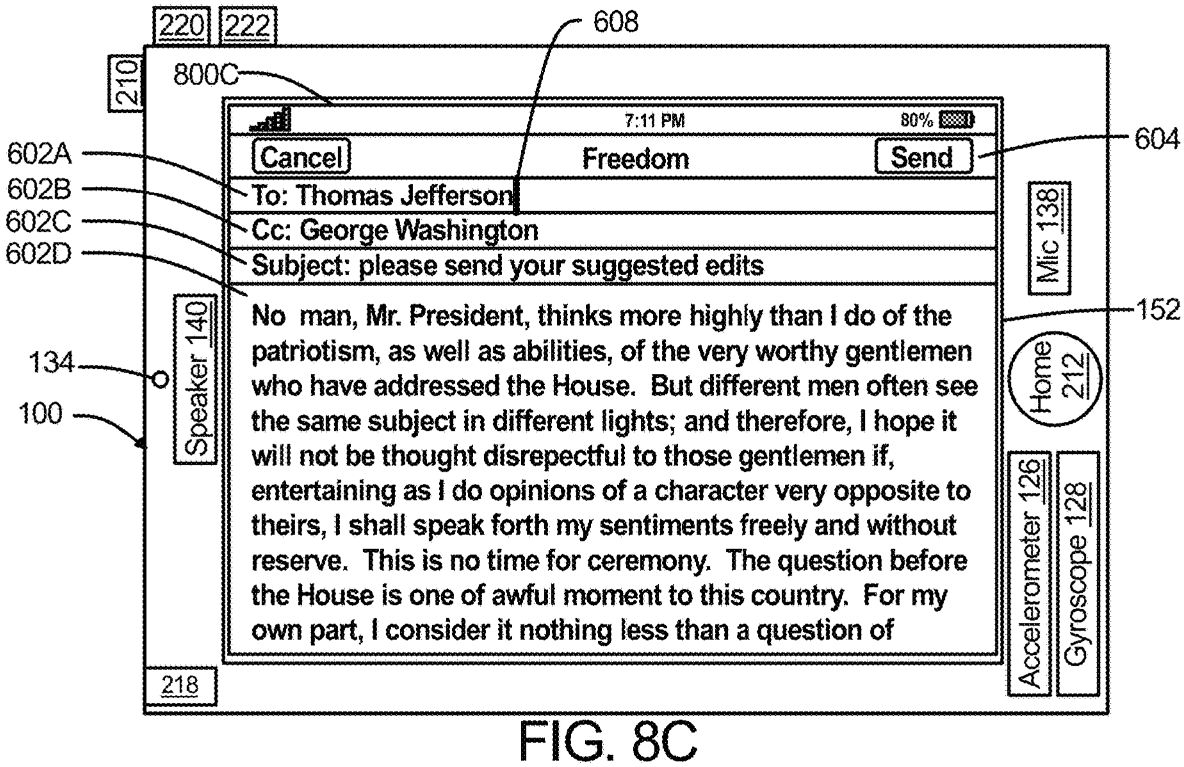
Figure 8D:
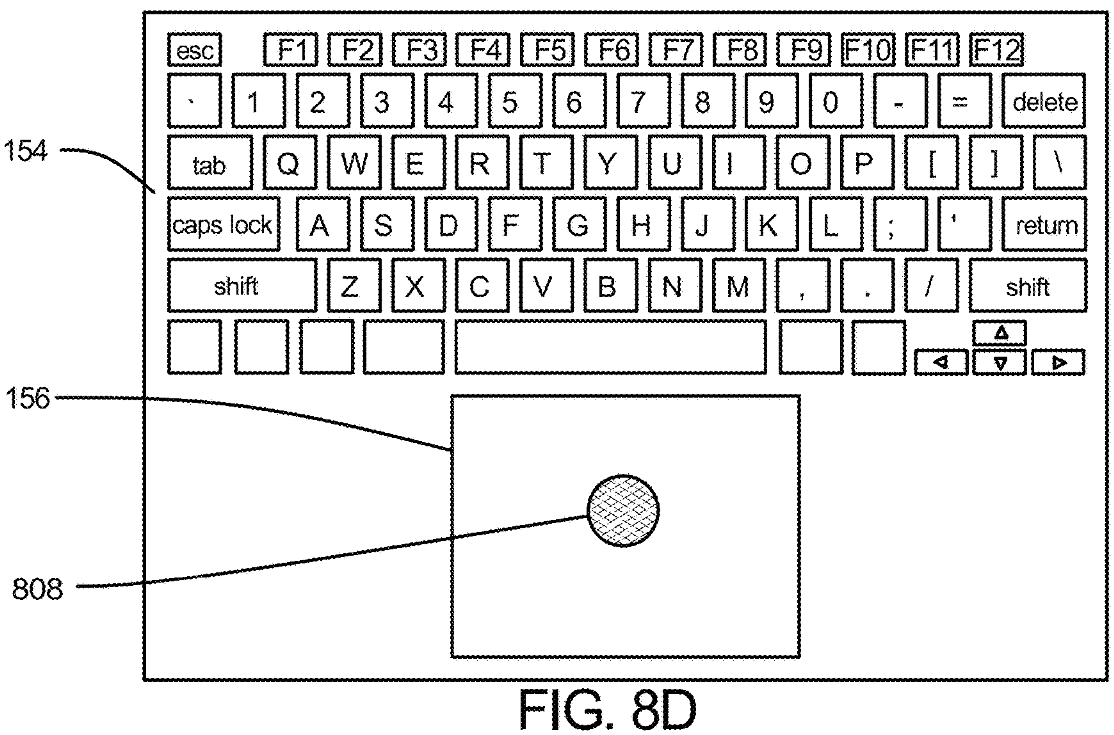
Figure 8E:
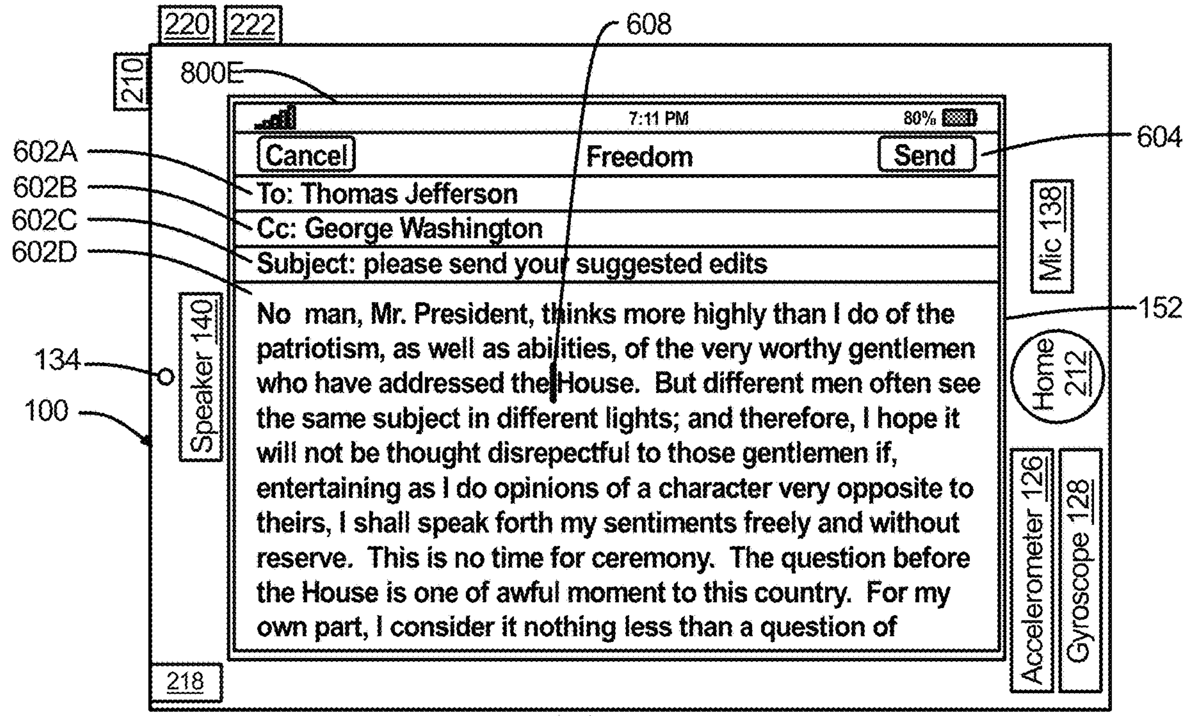

8.1 Using gestures on touchpad: FIGS. 8A-8E illustrate an exemplary user interface and method for displaying a selection of length equal to zero within any editable content entry area, on a computing device with a touch-sensitive display, using gestures on a touchpad. The device can display editable text content 602 in UI 800A (FIG. 8A). The device can also display application navigation bar 604. A user can perform finger gesture 806 (a tap or click or long-press or long-click finger gesture for example) on touchpad 156 as illustrated in FIG. 8B. In response to detecting finger gesture 806 on touchpad 156, the device displays zero-length selection 608 at a first selection position within editable text content 602A as illustrated in UI 800C (FIG. 6C). In one exemplary embodiment, the first selection position is at approximately the same relative position on the display as the tap or click or long-press or long-click gesture on the touchpad as illustrated in FIGS. 8B-8C. A user can perform a finger gesture 808 (a tap or click or long-press or long-click finger gesture for example) on touchpad 156 as illustrated in FIG. 8D. In response to detecting the finger gesture 808 on touchpad 156, the device displays zero-length selection 608 at a first selection position within editable text content 602D as illustrated in UI 800E (FIG. 8E). In one exemplary embodiment, the first selection position is at approximately the same relative position on the display as the tap or click or long-press or long-click gesture on the touchpad as illustrated in FIGS. 8D-8E.

Figure 8F:
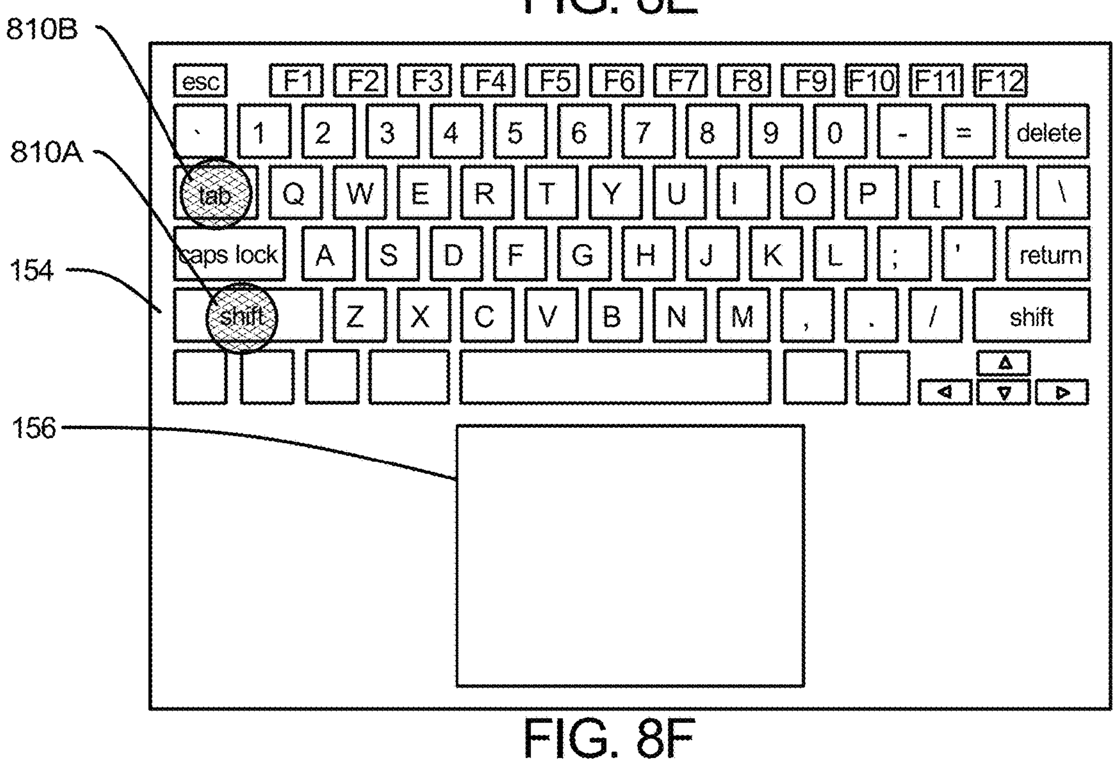
FIGS. 8F-8I illustrate an exemplary user interface and method for moving a selection of length equal to zero between editable content entry areas, on a mobile computing device with a display, using gestures on a keyboard in accordance with some embodiments.
Figure 8G:
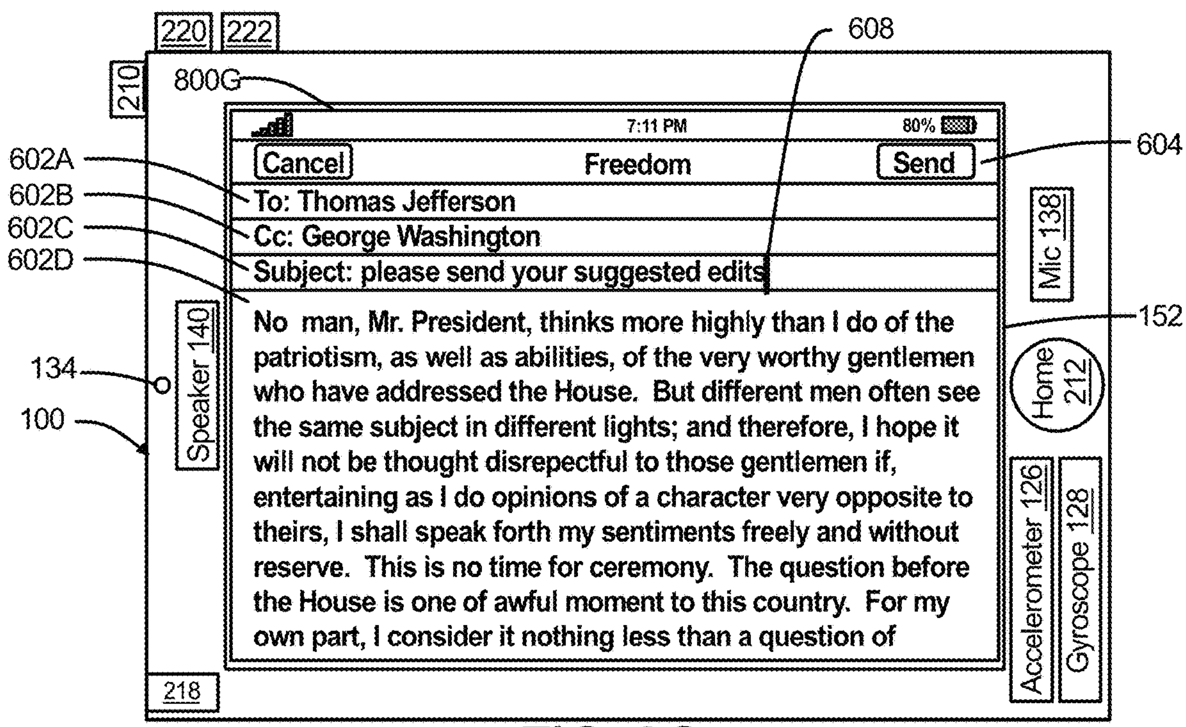

8.2 Using gestures on touchpad and keyboard: FIGS. 8F-8I illustrate an exemplary user interface and method for moving a selection of length equal to zero between editable content entry areas, on a computing device with a touch-sensitive display, using gestures on a touchpad and keyboard. With selection 608 at a first position as illustrated in FIG. 8E, a user can hold 810A shift key and tap 810B the tab key on Keyboard 154 as illustrated in FIG. 8F. In response, the device can move selection 608 from editable text content area 602D to prior editable text content area 602C as illustrated In FIG. 8G.

Figure 8H:
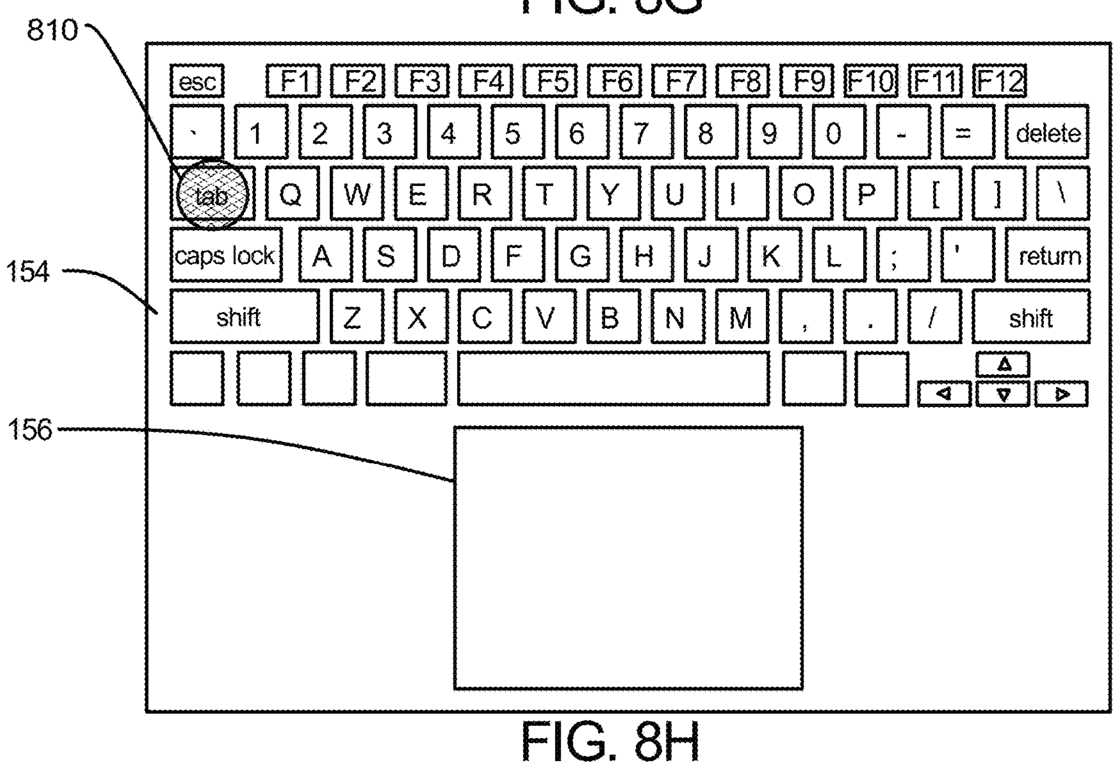
Figure 8I:
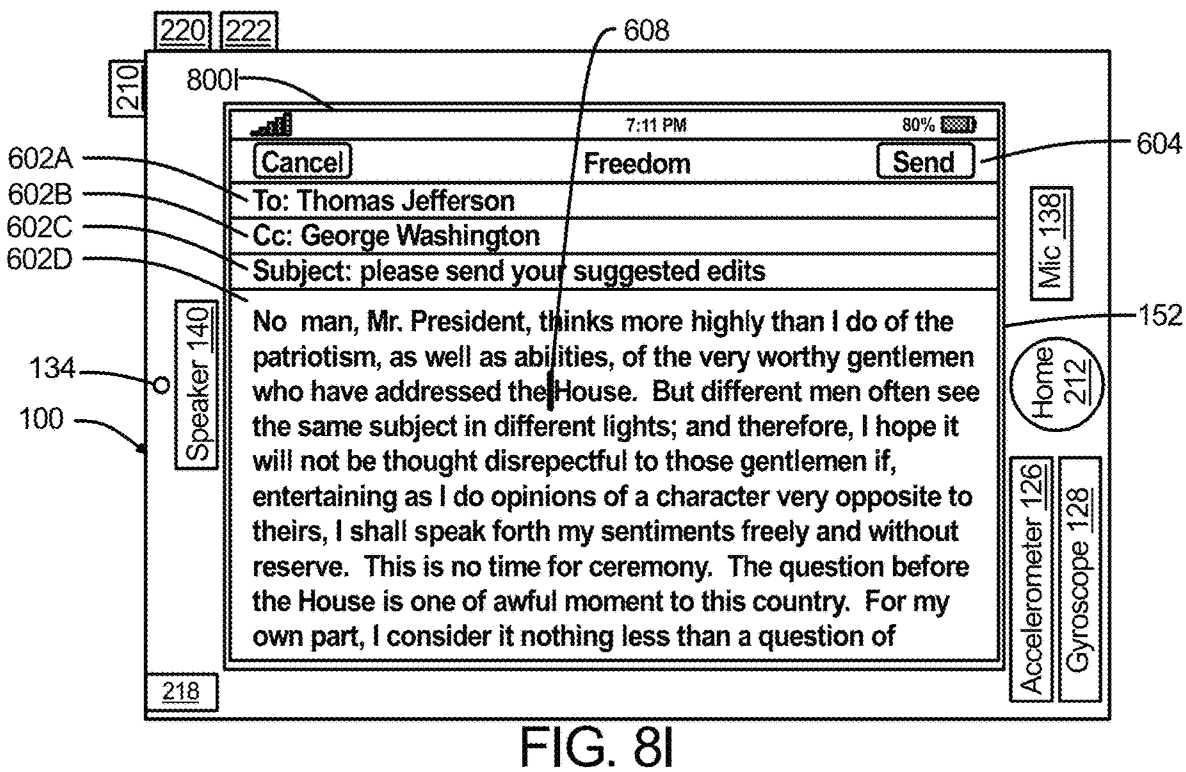

With selection 608 at a first position in editable text content entry area 602C as illustrated in FIG. 8G, a user can tap 810 the tab key on Keyboard 154 as illustrated in FIG. 8H. In response the device can move selection 608 from editable text content area 602C to it prior position in text content area 602D as illustrated In FIG. 8I.

Figure 9A:
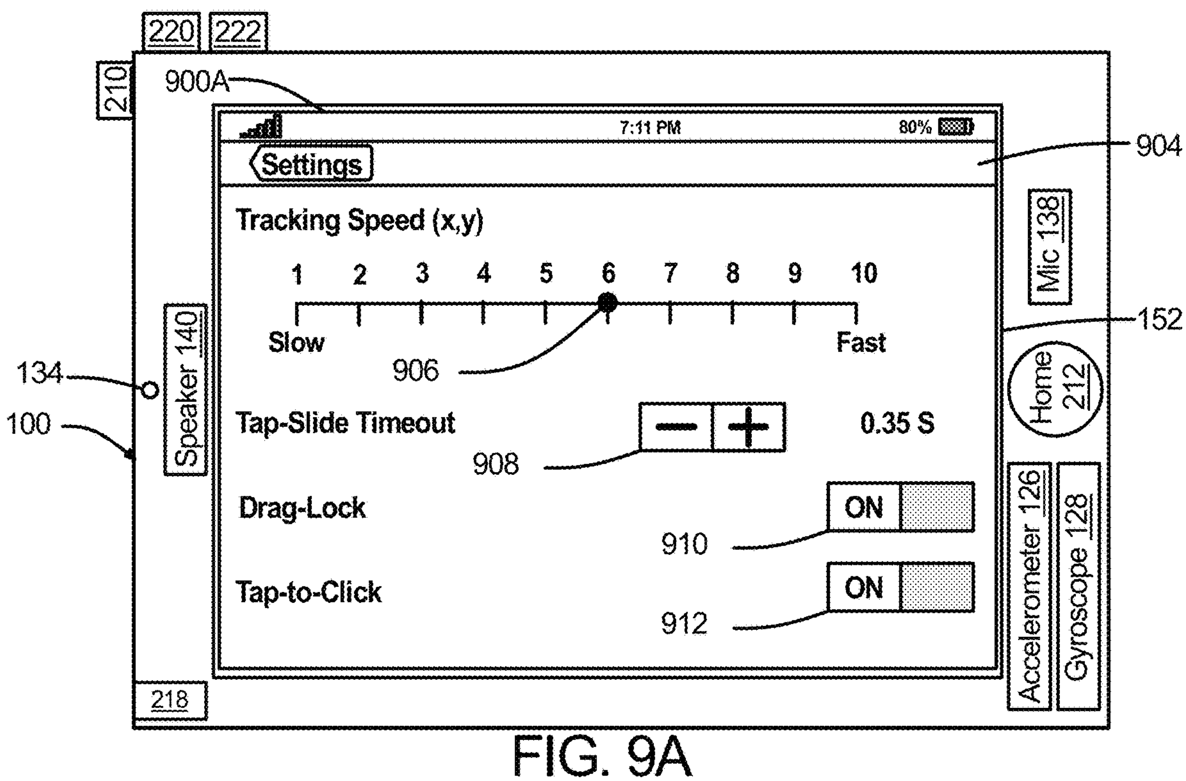
FIG. 9A illustrates an exemplary user interface for user selectable settings for gestures on a touchpad in accordance with some embodiments.
Figure 9B:
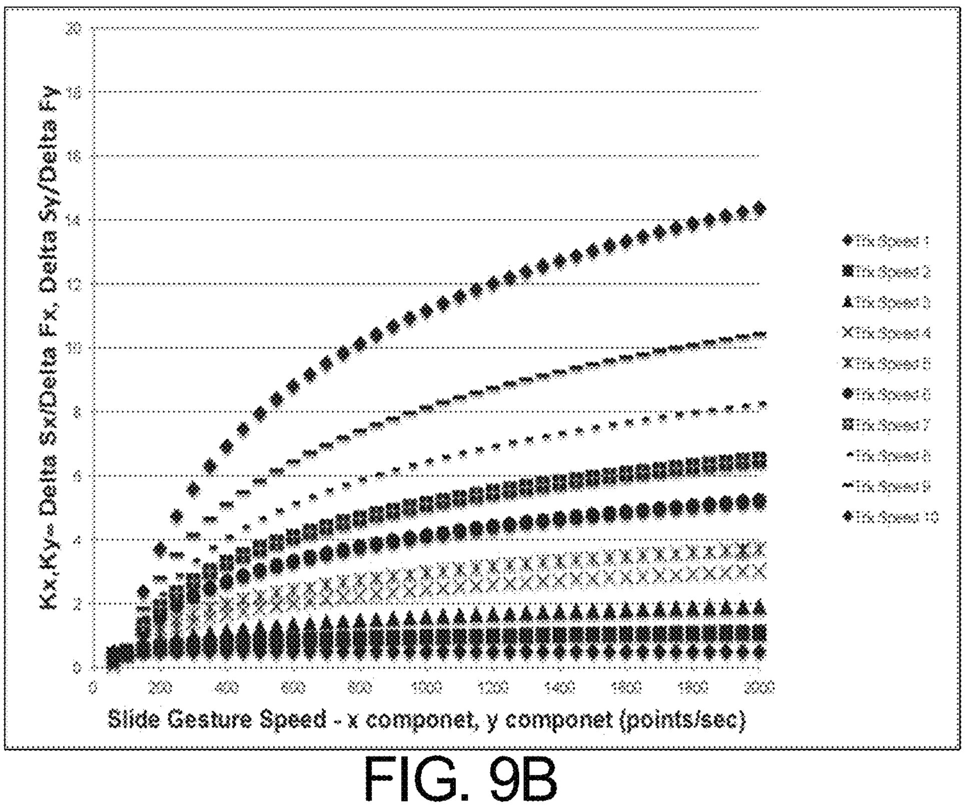
FIG. 9B illustrates an exemplary functional dependence of Kx and Ky on the x-component and y-component of the slide gesture speed, for gestures on a touchpad, for a "tracking speed" setting ranging from of 1 to 10.

9.0 User selectable settings: FIG. 9A illustrates an exemplary user interface for user selectable settings for gestures on touchpad 156. A user can select a settings icon. In response, the device can display UI 900A (FIG. 9A). A user can perform a slide finger gesture on tracking speed slider control 906 to set the tracking speed to a particular number as illustrated in FIG. 9A. The tracking speed can be set to any number from #1 to #10. In this example, the tracking speed has been set to #6. The tracking speed setting determines the functional dependence of Kx and Ky on the x-component and y-component of the slide gesture speed on touchpad 156, where the change in position of the selection in the x-direction is approximately proportional to the change in position of the finger in the x-direction ($\Delta Sx=Kx\Delta Fx$), and where the change in position of the selection in the y-direction is approximately proportional to the change in position of the finger in the y-direction ($\Delta Sy=Ky\Delta Fy$) as discussed in reference to FIGS. 3A-3U, FIGS. 4A-4O, FIGS. 5A-5I, FIGS. 6A-6O, and FIGS. 7A-7I. In response, the device uses the functional dependence of Kx and Ky for that particular tracking speed setting number. An example functional dependence Kx and Ky for 10 different tracking speed settings is illustrated in FIG. 9B. In the example shown, with a tracking speed setting of #6, the value of Kx and Ky can range from about 0.3 to about 5 depending upon the x-component and y-component of the slide gesture speed at any position along the slide gesture path. Accordingly, the user can roughly position the selection start point with $Kx>1$ and $Ky>1$ with a high speed slide gesture on touchpad 156; the user can then precisely position the selection start point with $Kx<1$ and $Ky<1$ with a low speed slide gesture on touchpad 156.

A user can set the tap-slide timeout, for a tap-and-slide gesture, with stepper control 908 to a value between 0.2 seconds to 0.5 seconds. In the example shown the timeout is set to 0.35 seconds.

A user can set drag-lock OFF or ON with drag-lock switch 910. Text selection with drag-lock set OFF is described in reference to FIGS. 4A-4O, FIGS. 6A-6O, and FIGS. 7A-7I. Text selection with drag-lock set ON, is described in reference to FIGS. 5A-5I for read-only text. Text selection with drag-lock set ON, for editable text is similar to that described for read-only text. A user can set tap-to-click ON, with tap-to-click switch 912, for a tap on touchpad 156. With tap to click set ON, a tap gesture on touchpad 156 can be treated the same as a click gesture on touchpad 156. This gesture behavior can be readily discoverable by new users if it is similar to behavior in a pointer-based operating systems.

The system can define the meaning of additional gestures on touchpad 156. These can include: a) a two-finger tap or two-finger click gesture for example to perform a secondary-click, b) a two-finger slide gesture for example to scroll or pan displayed content, and c) a double-tap or double-click gesture, for example, to select a word at the position unit-length selection 310 or zero-length selection 608 as described in reference to FIGS. 4M-4O and FIGS. 6M-6O. The system can also define the meaning of other gestures on touchpad 156, including, but not limited to, a three finger tap or click, a pinch gesture or reverse pinch gesture, a left-slide or right-slide gesture with two-fingers or three-fingers, a up-slide or down-gesture with three fingers. These additional gestures on a touchpad can be defined to be similar to the way those gestures are currently defined in a pointer-based operating system to make those gestures readily discoverable by new users.

Figure 10A:
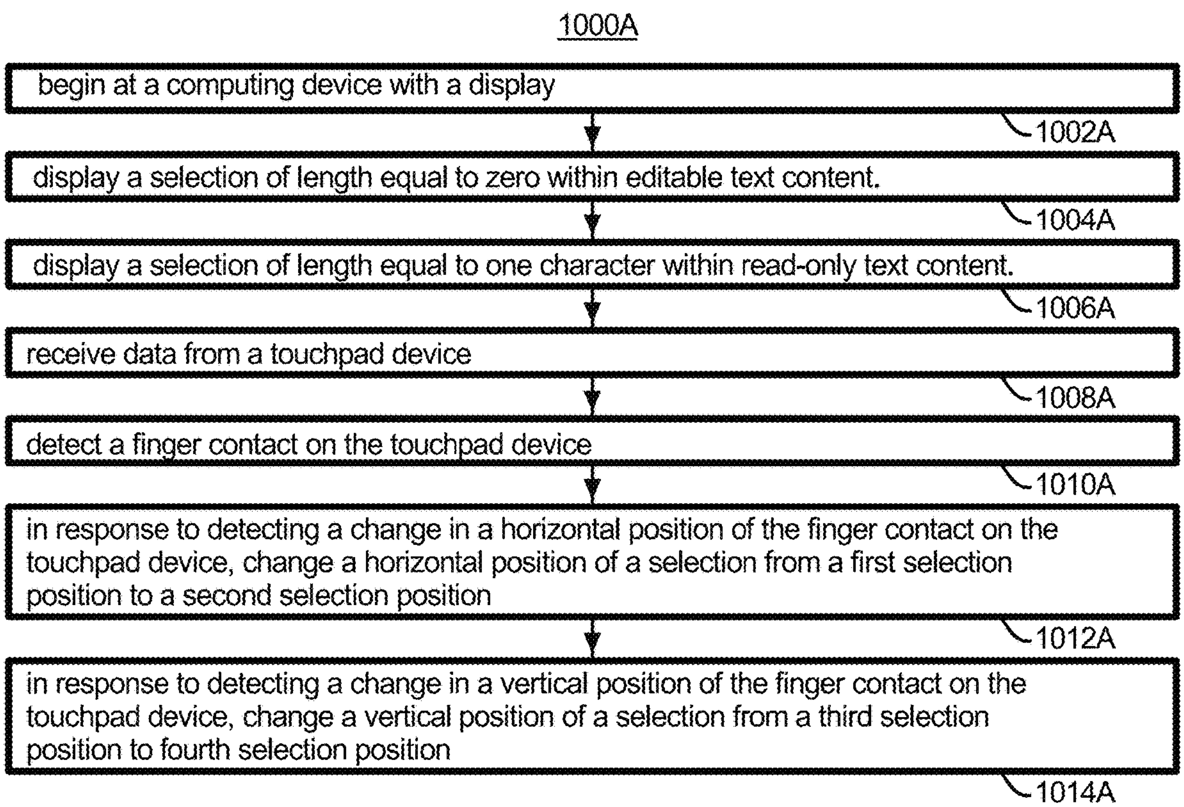
FIG. 10A is a flow diagram illustrating a method for positioning a selection within content on a computing device with a display using gestures on a touchpad in accordance with some embodiments.
Figure 10B:
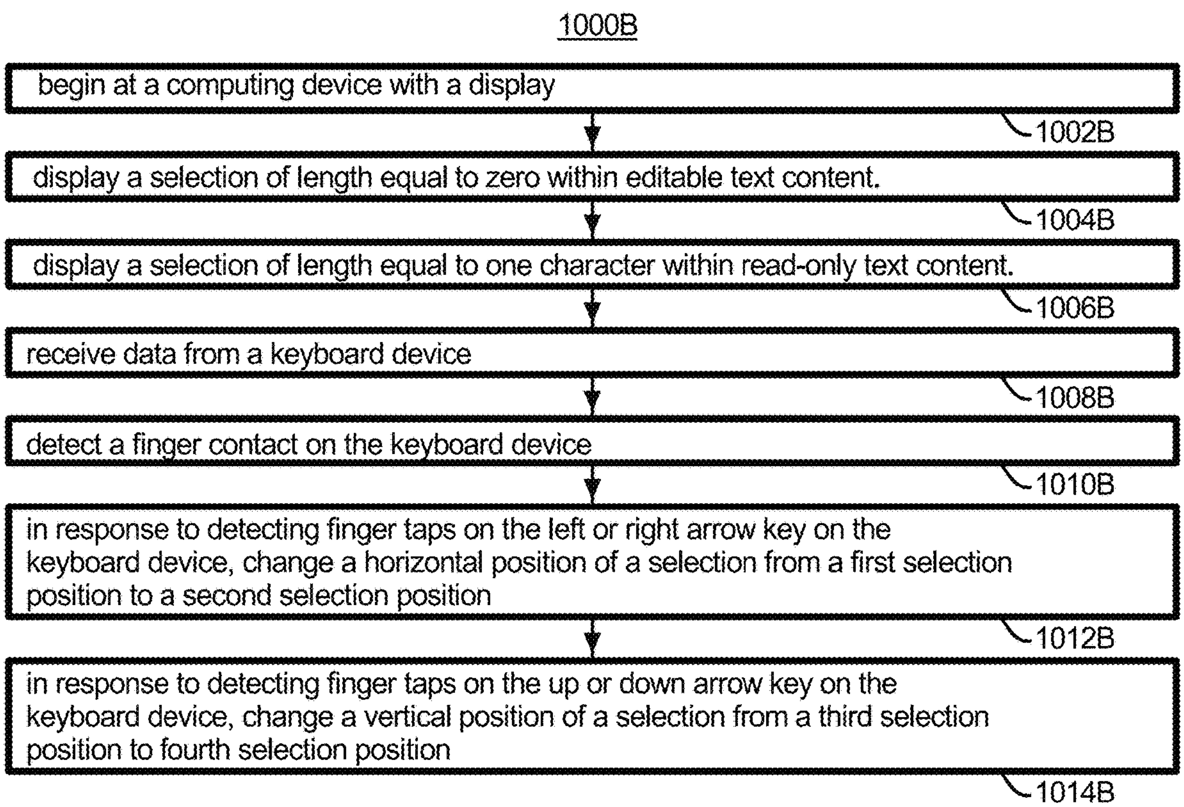
FIG. 10B is a flow diagram illustrating a method for positioning a selection within content on a computing device with a display using gestures on a keyboard in accordance with some embodiments.
Figure 10C:
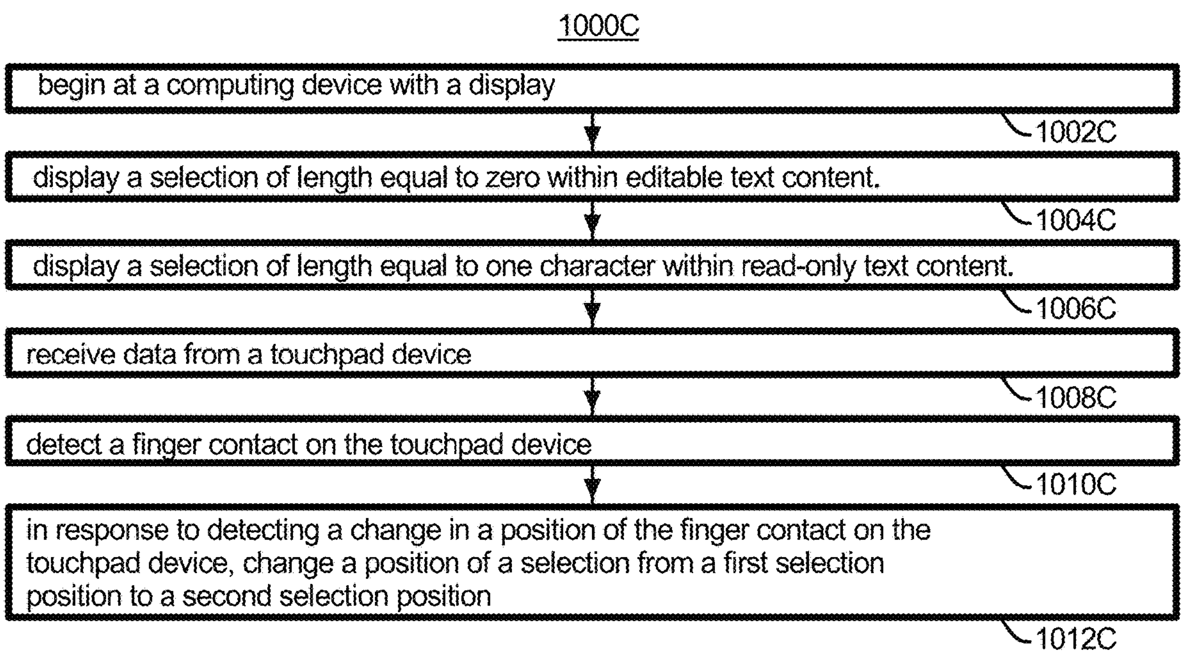
FIG. 10C is a flow diagram illustrating a method for positioning a selection within content on a computing device with a display using gestures on a touchpad in accordance with some embodiments.

10.1 Methods for positioning a selection within content using gestures on a touchpad: FIG. 10A and FIG. 10C are flow diagrams illustrating methods for positioning a selection, within content on a computing device with a display using gestures on a touchpad in accordance with some embodiments. FIGS. 3A-3U, FIGS. 4A-4O, FIGS. 5A-5I, FIGS. 6A-6O, FIGS. 7A-7I, and FIGS. 8A-8E, illustrate exemplary user interfaces for use in implementing the methods presented in the flow diagrams shown in FIG. 10A and FIG. 10C.

10.2 Methods for positioning a selection within content using gestures on a keyboard: FIG. 10B is a flow diagram illustrating a method for positioning a selection, within content on a computing device with a display using gestures on a keyboard in accordance with some embodiments. FIGS. 3V-3Z, FIGS. 4P-4U, and FIGS. 8F-8I, illustrate exemplary user interfaces for use in implementing the methods presented in the flow diagrams shown in FIG. 10B.

Figure 11A:
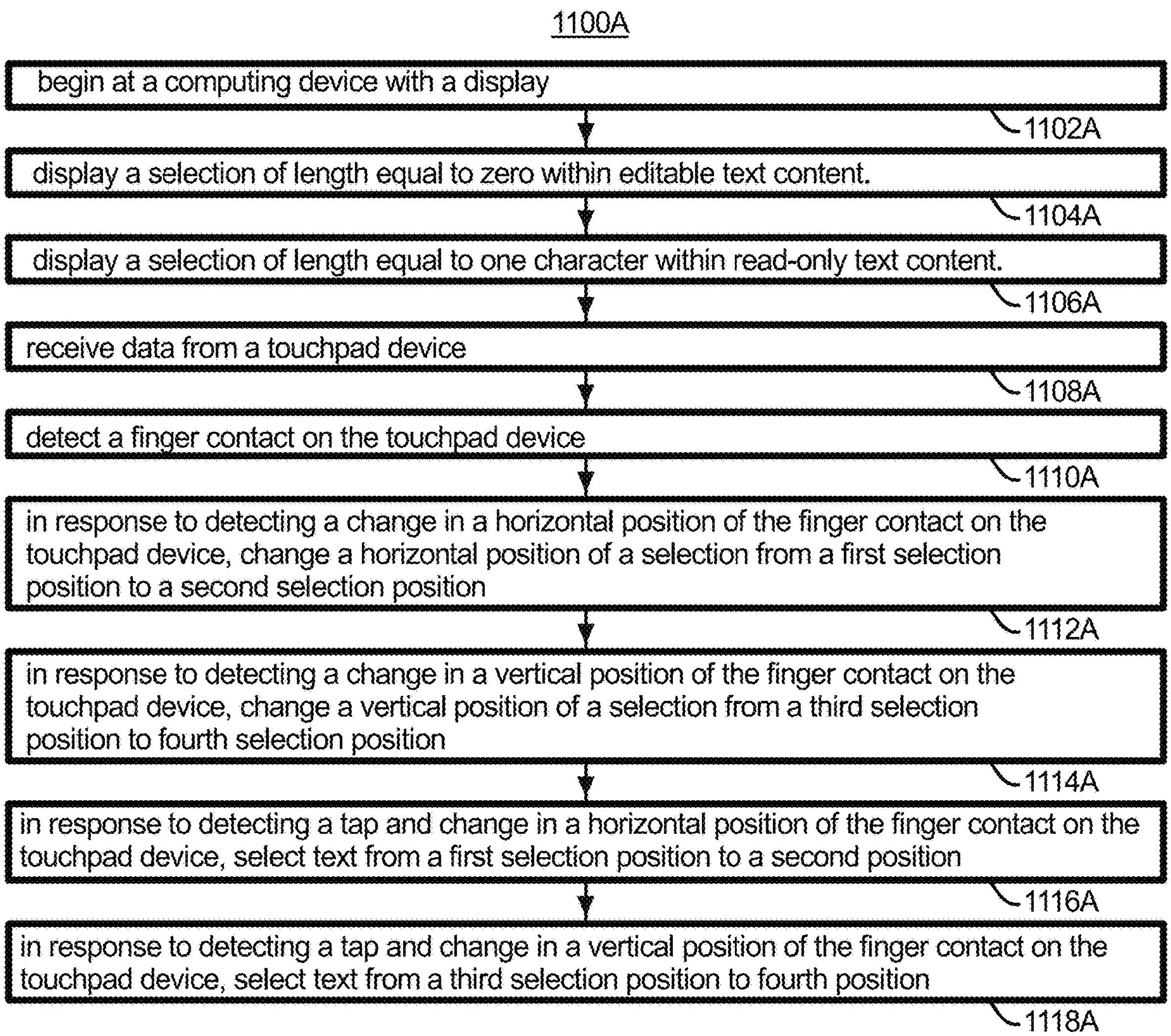
FIG. 11A is a flow diagram illustrating a method for positioning a selection and selecting text within content on a computing device with a display using gestures on a touchpad in accordance with some embodiments.
Figure 11B:
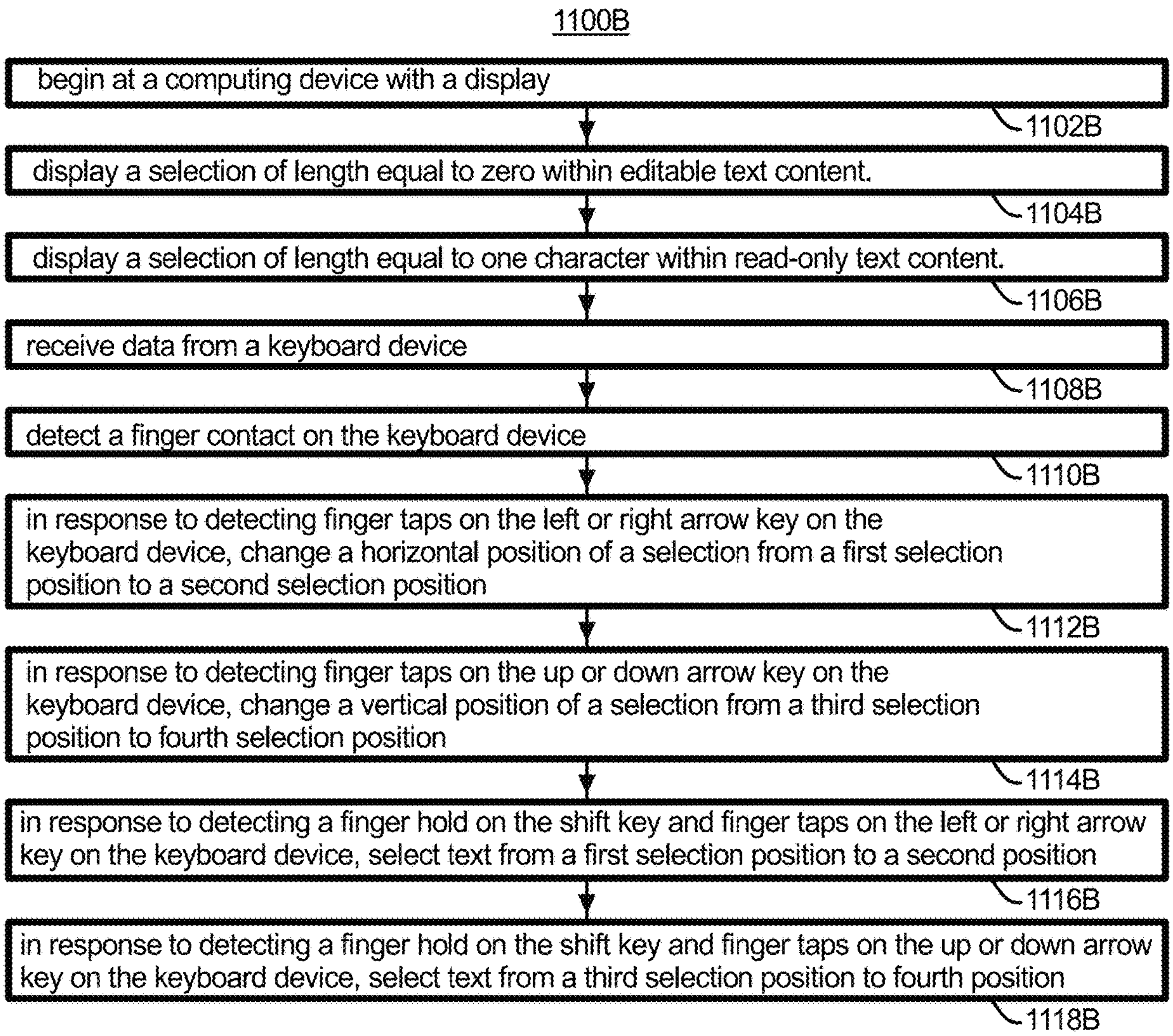
FIG. 11B is a flow diagram illustrating a method for positioning a selection and selecting text within content on a computing device with a display using gestures on a keyboard in accordance with some embodiments.
Figure 11C:
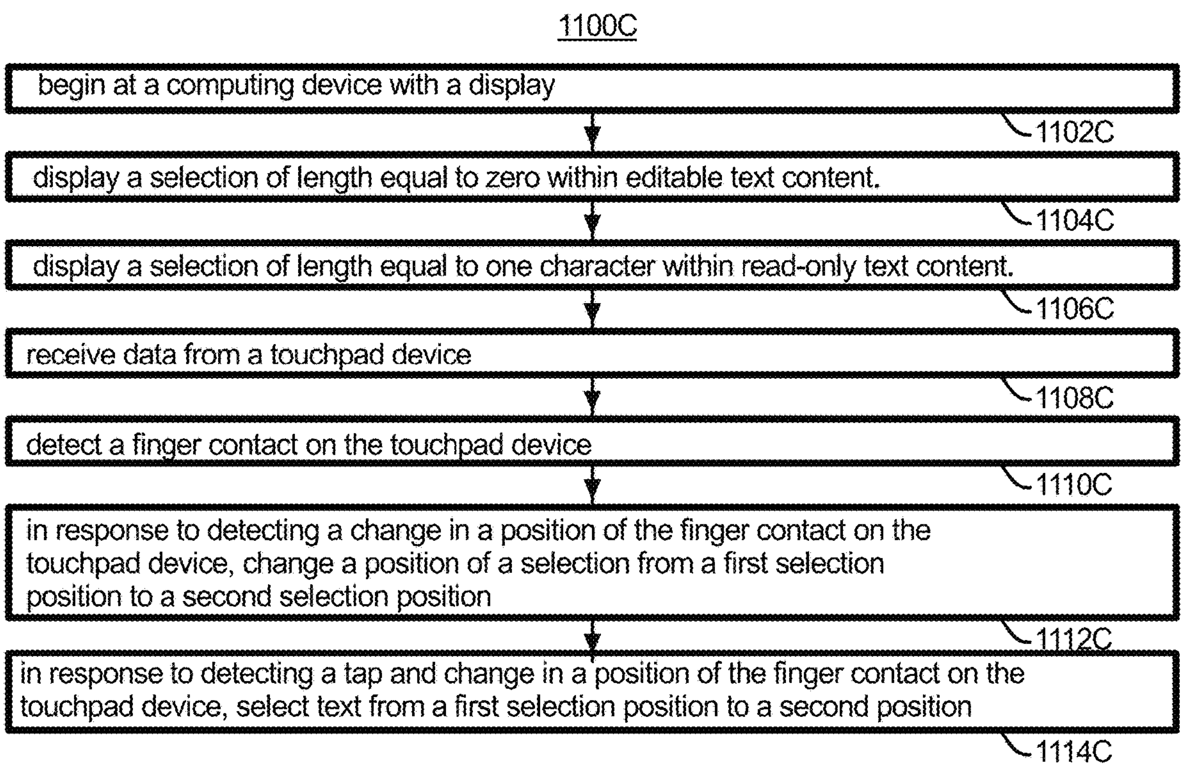
FIG. 11C is a flow diagram illustrating a method for positioning a selection and selecting text within content on a computing device with a display using gestures on a touchpad in accordance with some embodiments.

11.1 Methods for positioning a selection and selecting text within content using gestures on a touchpad: FIG. 11A and FIG. 11C are flow diagrams illustrating methods for positioning a selection and selecting text within content on a device with a display using gestures on a touchpad in accordance with some embodiments. FIGS. 4A-4O, FIGS. 5A-5I, FIGS. 6A-6O, and FIGS. 7A-7I, illustrate exemplary user interfaces for use in implementing the methods presented in the flow diagrams shown in FIG. 11A and FIG. 11C.

11.2 Methods for positioning a selection and selecting text within content using gestures on a keyboard: FIG. 11B is a flow diagram illustrating a method for positioning a selection and selecting text within content on a device with a display using gestures on a keyboard in accordance with some embodiments. FIGS. 4P-4U illustrate exemplary user interfaces for use in implementing the methods presented in the flow diagrams shown in FIG. 11B.

Figure 12A:
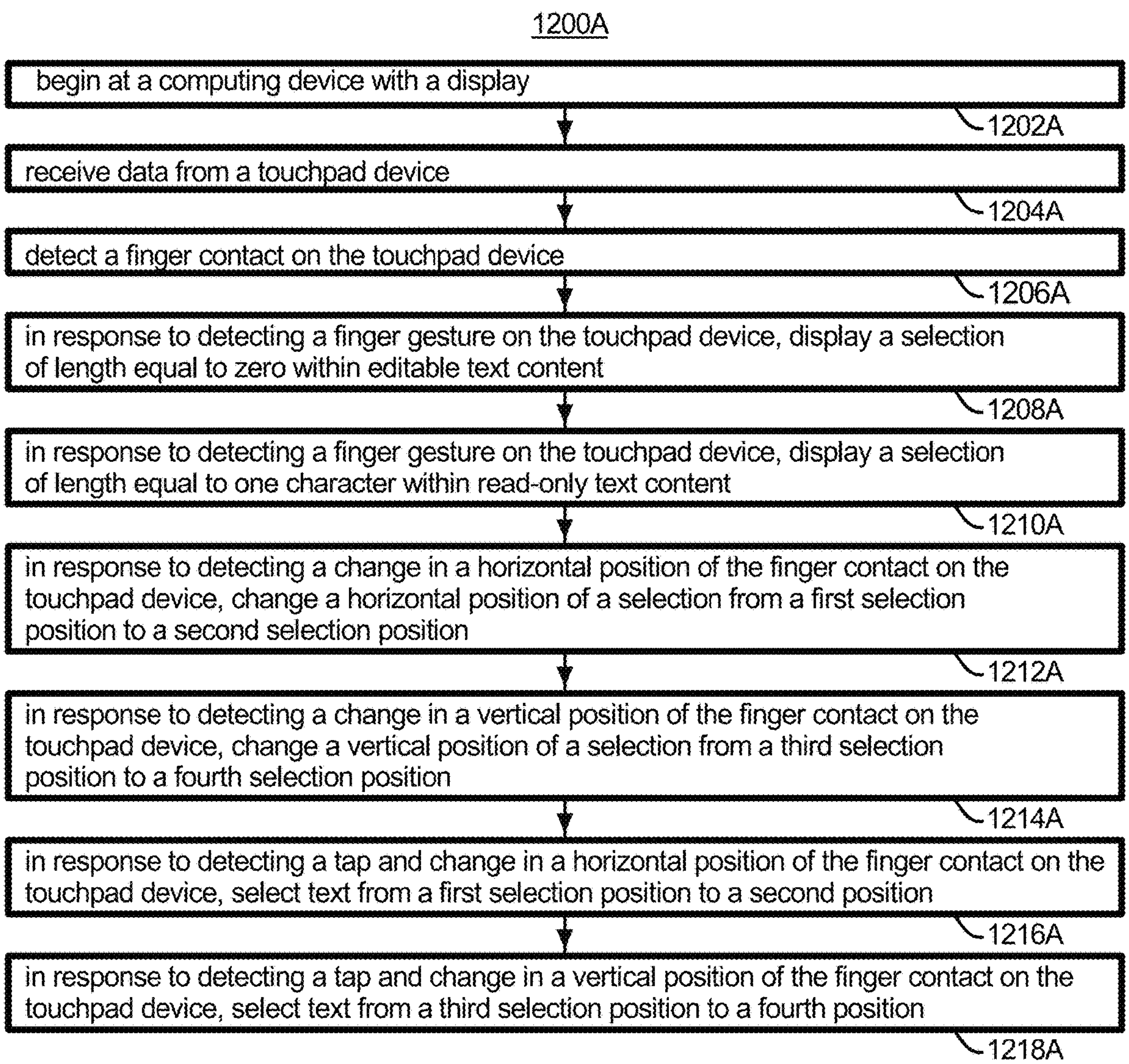
FIG. 12A is a flow diagram illustrating a method for displaying a selection, positioning the selection, and selecting text within content on a computing device with a display using gestures on a touchpad in accordance with some embodiments.
Figure 12B:
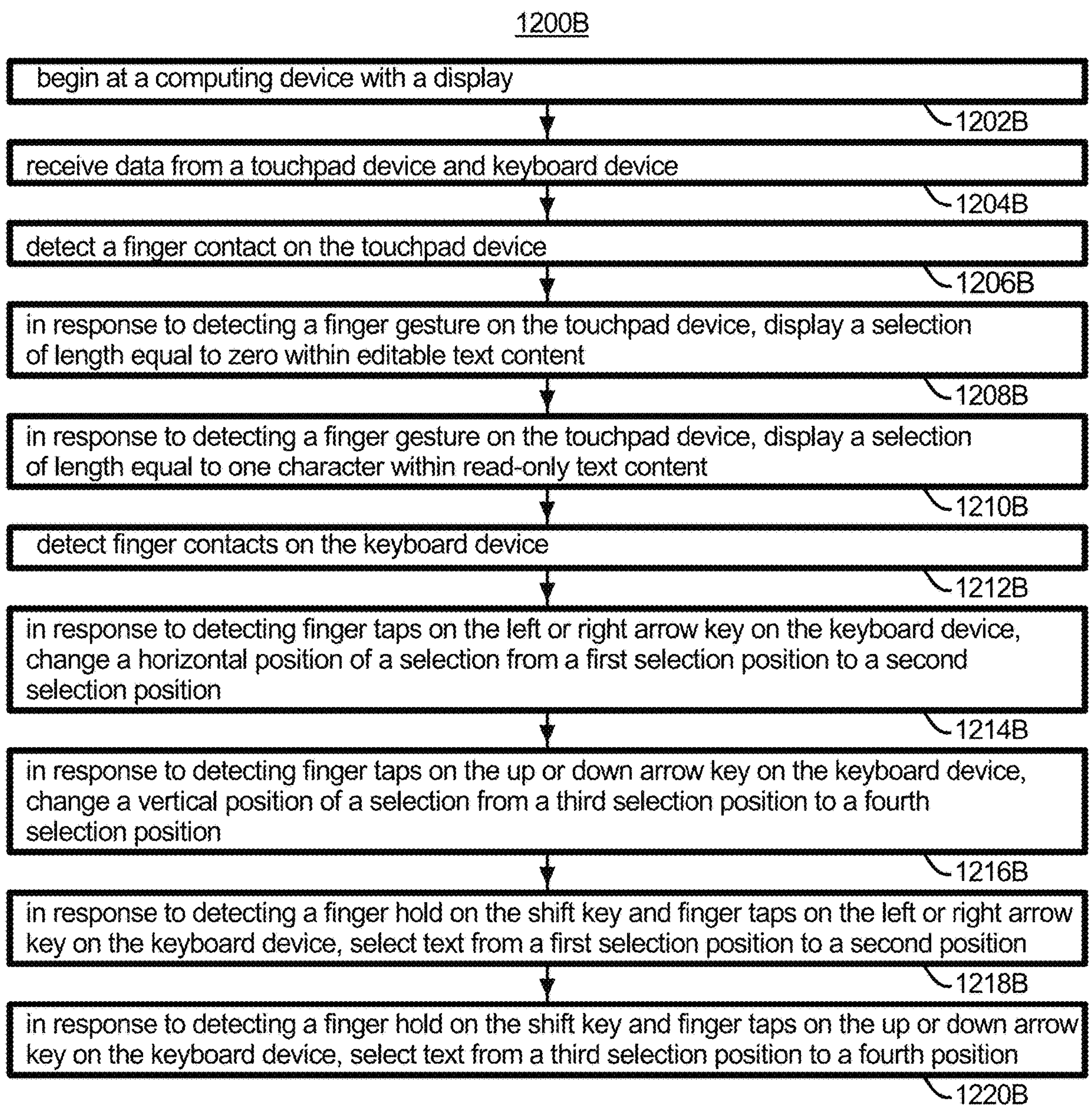
FIG. 12B is a flow diagram illustrating a method for displaying a selection, positioning the selection, and selecting text within content on a computing device with a display using gestures on a touchpad and keyboard in accordance with some embodiments.
Figure 12C:
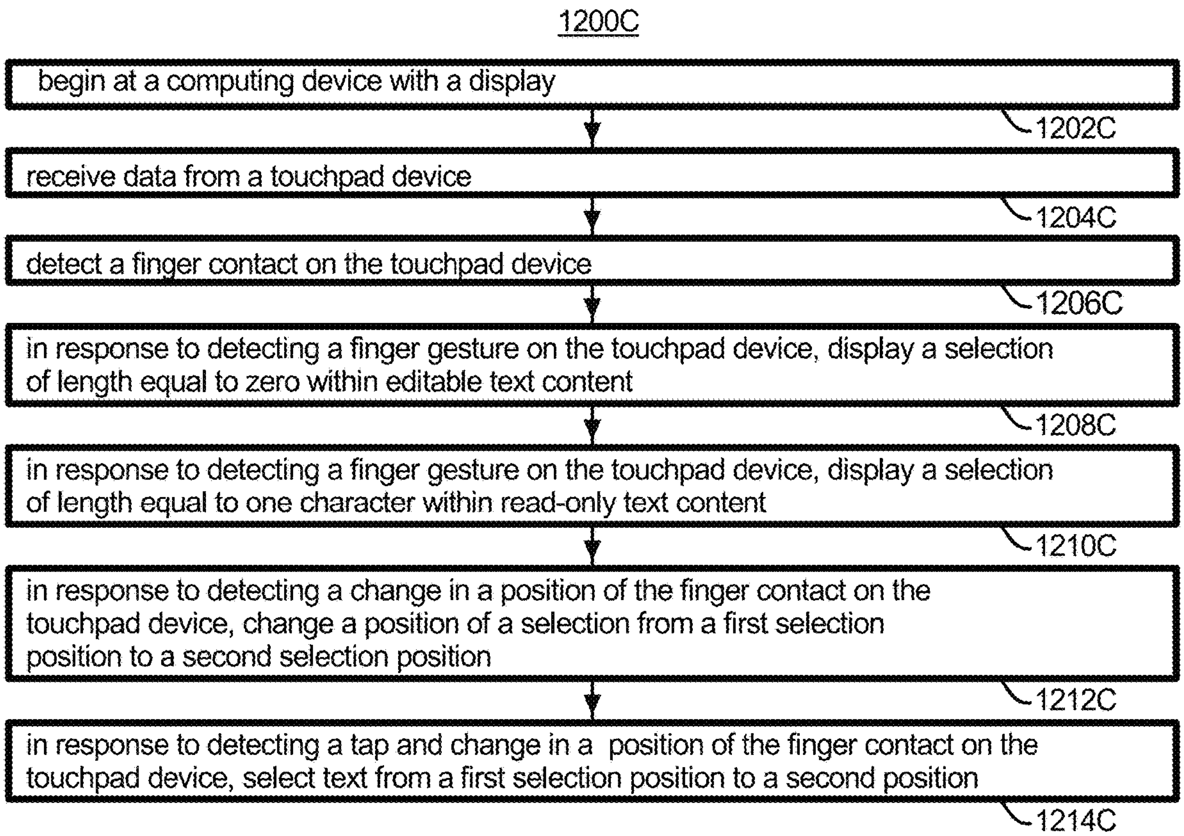
FIG. 12C is a flow diagram illustrating a method for displaying a selection, positioning the selection, and selecting text within content on a computing device with a display using gestures on a touchpad in accordance with some embodiments.

12.1 Methods for displaying a selection, positioning a selection, and selecting text within content using gestures on a touchpad: FIG. 12A and FIG. 12C are flow diagrams illustrating methods for displaying a selection, positioning the selection, and selecting text within content on a computing device with a display using gestures on a touchpad in accordance with some embodiments. FIGS. 4A-4O, FIGS. 5A-5I, FIGS. 6A-6O, and FIGS. 7A-7I, illustrate exemplary user interfaces for use in implementing the methods presented in the flow diagrams shown in FIG. 12A and FIG. 12C.

12.2 Methods for displaying a selection, positioning a selection, and selecting text within content using gestures on a touchpad and keyboard: FIG. 12B is a flow diagram illustrating a method for displaying a selection, positioning the selection, and selecting text within content on a computing device with a display using gestures on a touchpad and keyboard in accordance with some embodiments. FIGS. 4P-4U illustrate exemplary user interfaces for use in implementing the methods presented in the flow diagrams shown in FIG. 12B.

13.0 Performing secondary-click action with respect to a selection: A keyboard shortcut entered into a keyboard is one method for performing an action with respect to a selection as discussed above in reference to FIGS. 4A-4O, FIGS. 4P-4U, FIGS. 5A-5I, FIGS. 6A-6O, and FIGS. 7A-7I. For example: 1) Command C to copy the selection to the clipboard, 2) Command X to cut the selection to the clipboard, and 3) Command V to paste the content of the clipboard to the replace the selection. (In Windows OS these shortcuts are typically implemented with the control key in lieu of the command key.) In the case of a pointer-based operating system, a secondary-click gesture on a touchpad or mouse is a method for performing an action with respect to an item at the position of the pointer. In a pointer-based operating system this item at the position of the pointer can be anything on the display including, but not limited to, an image, a video, a menu item, an icon, editable text, or read-only text. In the case of a touch-based operating system, applicant describes below the use of a secondary-click gesture to perform a secondary-click (sometimes called a right-click) action with respect to the following: a) text at the position of unit-length selection 310 within read-only text, b) text at the position of zero-length selection 608 within editable text, and c) selected text within read-only text or editable text. Performing a secondary-click action with respect to a selection offers the user a powerful new way of working with text on a computing device running applications under a touch-based operating system. This is first described below for the case of using gestures on a touchpad and keyboard. This is then described below for the case of using gestures on a touchpad.

Figure 13A:
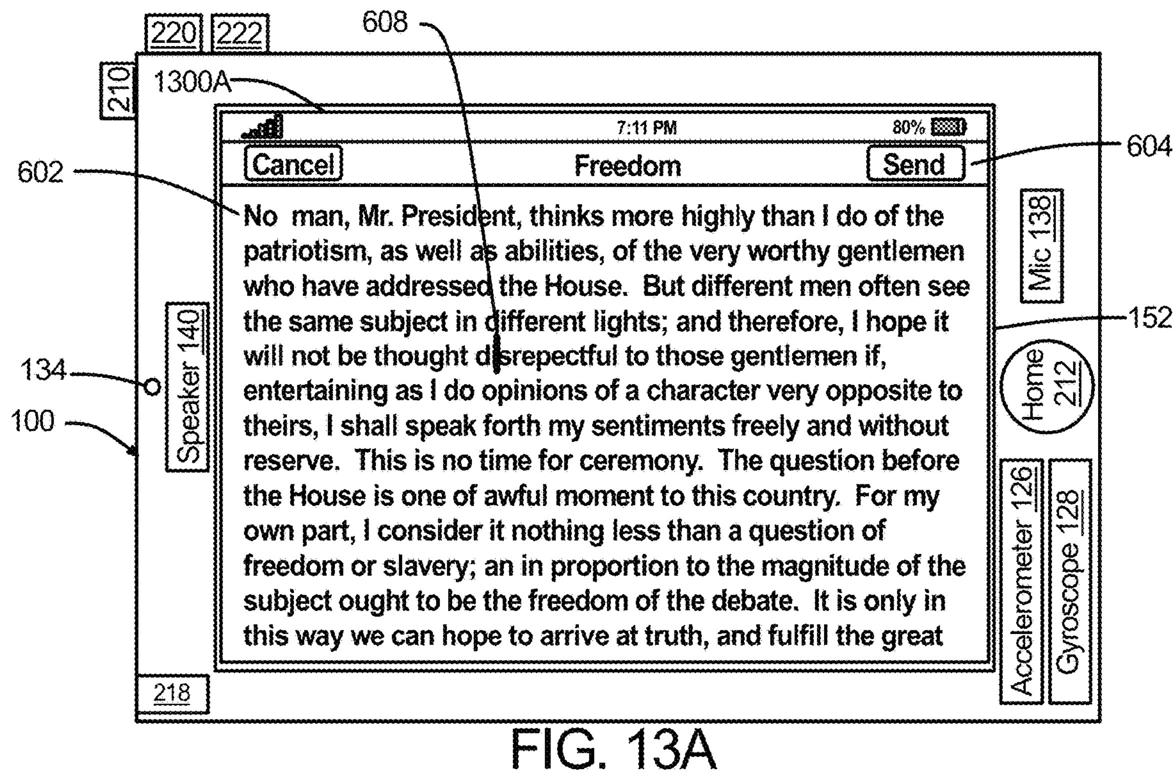
FIGS. 13A-13K illustrate an exemplary user interface and method for performing a secondary-click action with respect to a selection within editable content, on a computing device with a display, using gestures on a touchpad and keyboard in accordance with some embodiments.
Figure 13B:
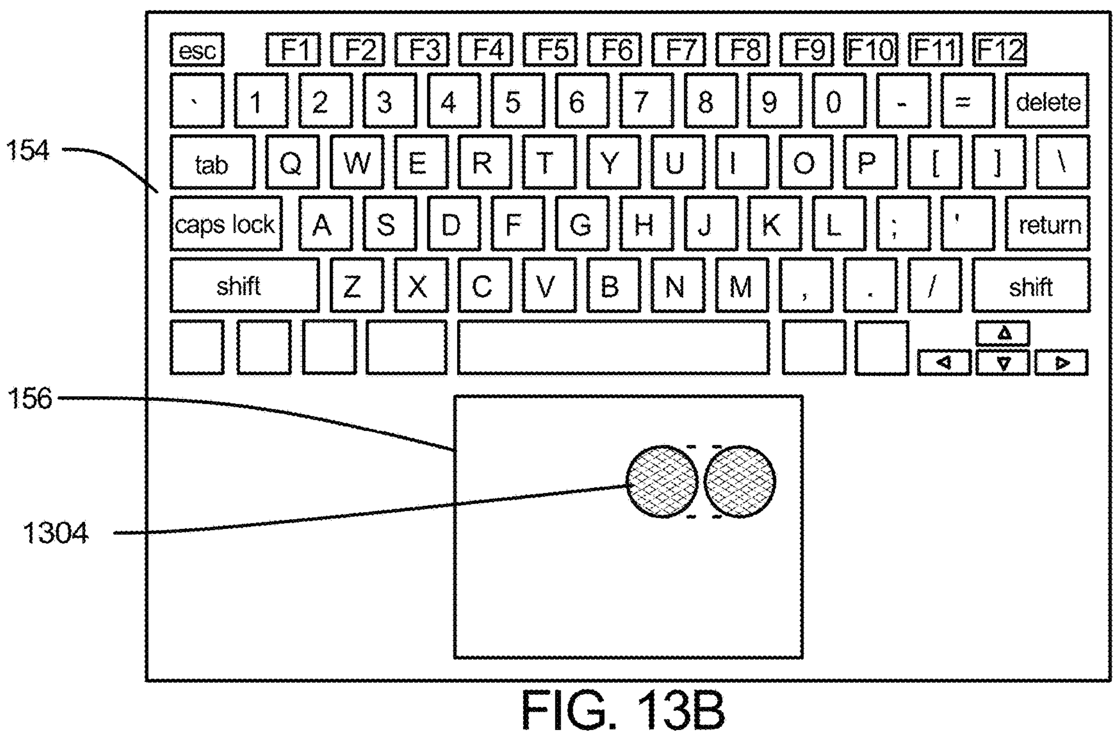
Figure 13C:
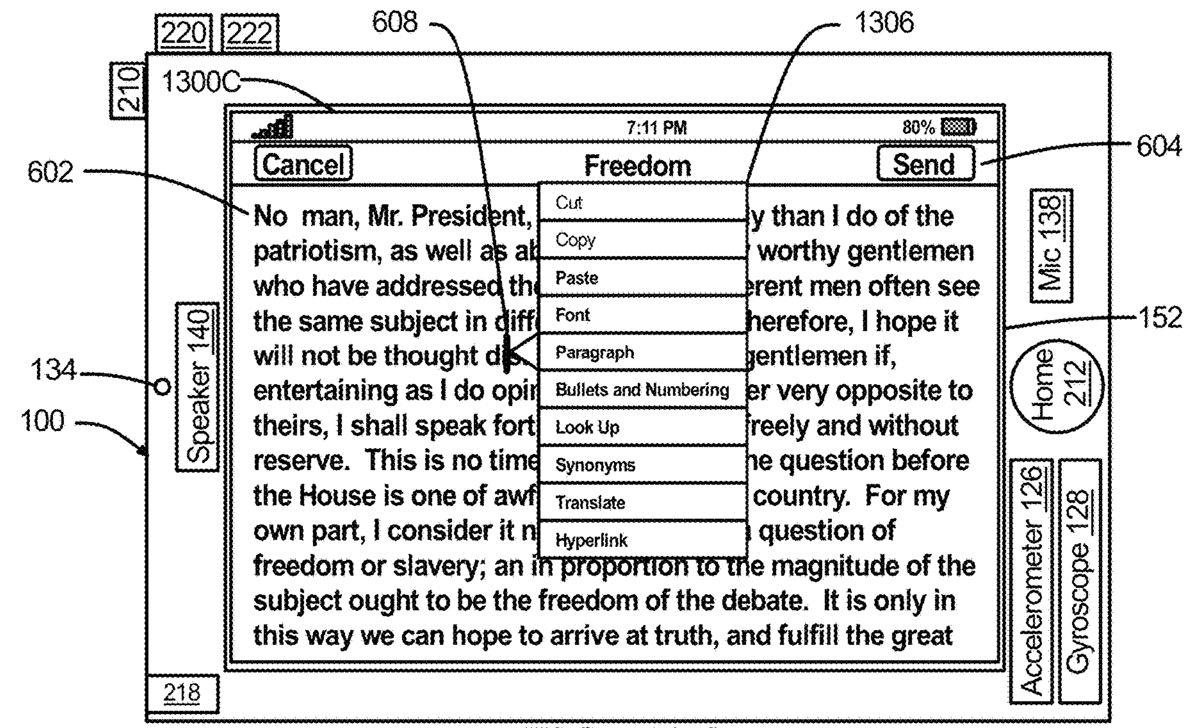

13.1 Using gestures on touchpad and keyboard: FIGS. 13A-13K illustrate an exemplary user interface and method for performing a secondary-click action with respect to a selection within editable content, on a computing device with a touch-sensitive display in accordance with some embodiments using gestures on a touchpad and a keyboard. The device can display editable text content 602 in UI 1300A (FIG. 13A) and zero-length selection 608 at a position within the editable content. A user can perform a secondary-click gesture 1304 (a two-finger tap or two-finger click gesture for example) on touchpad 156 as illustrated in FIG. 13B. In response to detecting finger gesture 1304 on touchpad 156, the device displays secondary-click menu 1306 adjacent to zero-length selection 608 as illustrated in UI 1300C (FIG. 13C).

Cancel action: A user can perform a tap 1307 on the "esc" key on keyboard 154. In response to detecting finger tap 1307 on "esc" key on keyboard 154, the device cancels the display of the menu and redisplays UI 1300A (FIG. 13A).

Secondary-click menu 1306 displays a list of actions that can be performed with respect to zero-length selection 608. In the example shown with a selection of zero-length, the cut and copy actions are not available and therefore shown in different font style in a manner similar to the display of a secondary-click menu in a pointer-based operating system.

Figure 13D:
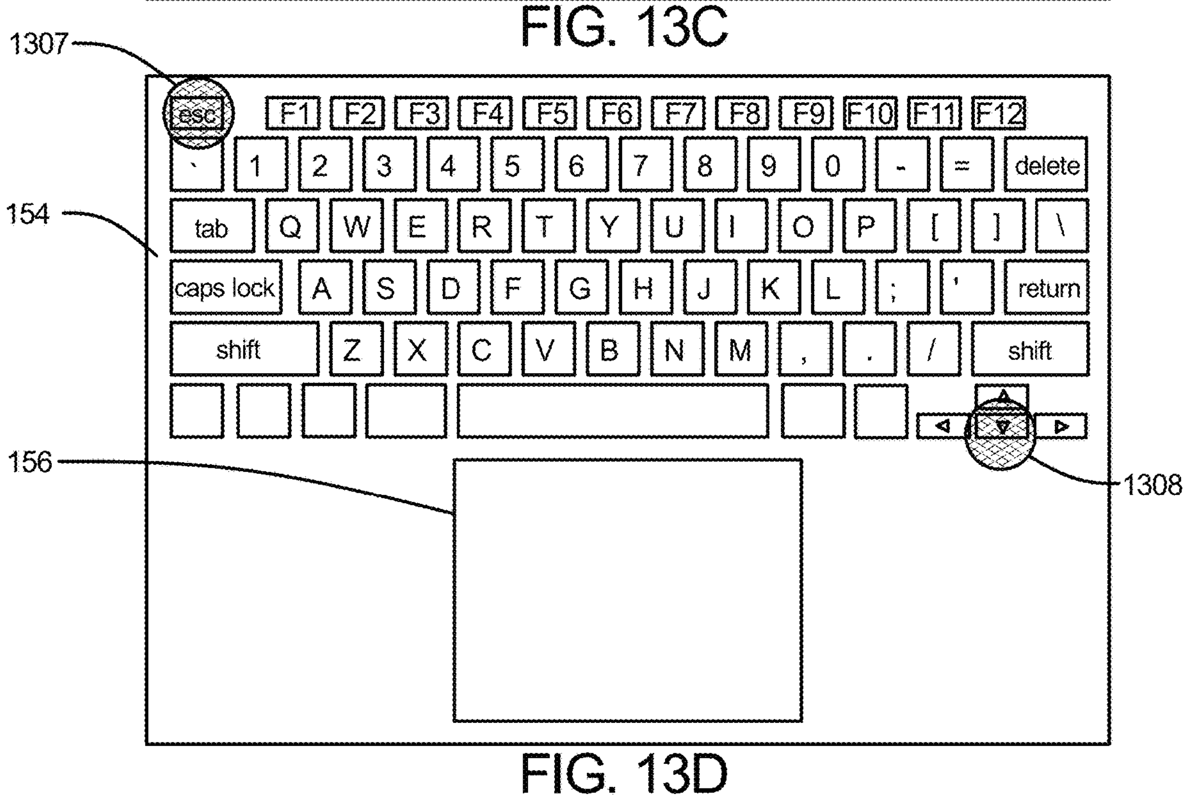
Figure 13E:
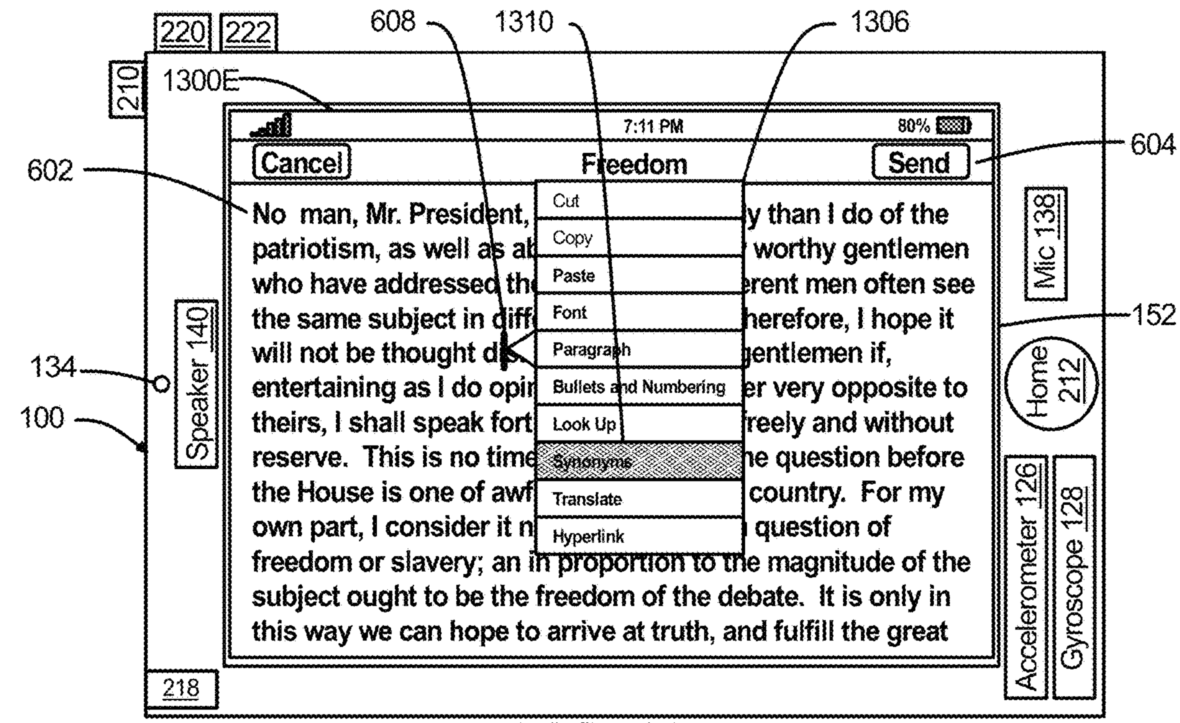

1) A user can perform tap gestures 1308 on the down arrow key on keyboard 154 as illustrated in FIG. 13D. In response to detecting the first finger tap, the device positions menu-item selection 1310 at the first (topmost) item on secondary-click menu 1306 (not shown). In response to detecting seven additional finger taps, the device moves menu-item selection 1310 down the list until "Synonyms" is selected on secondary-click menu 1306 as illustrated in UI 1300E (FIG. 13E.)

Cancel action: A user can perform a tap 1307 on the "esc" key on keyboard 154. In response to detecting finger tap 1307 on "esc" key on keyboard 154, the device cancels the display of the menu and redisplays UI 1300A (FIG. 13A).

Figure 13F:
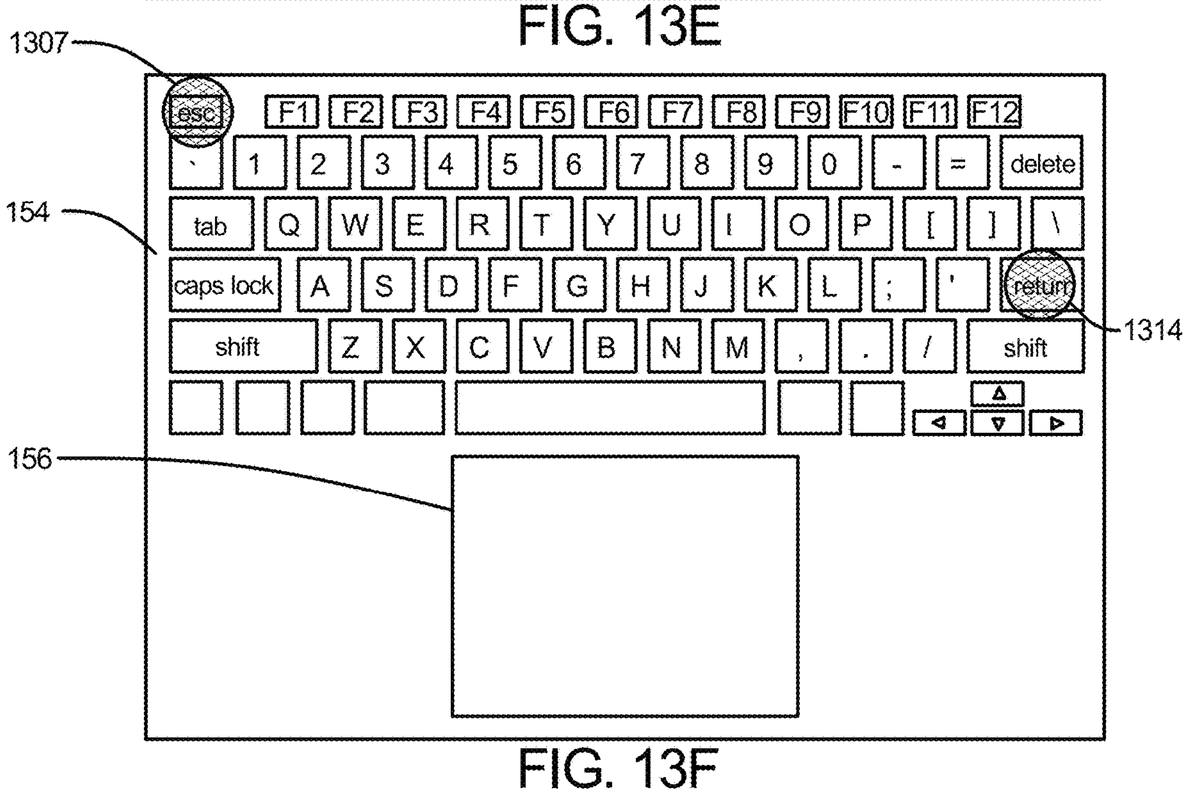
Figure 13G:
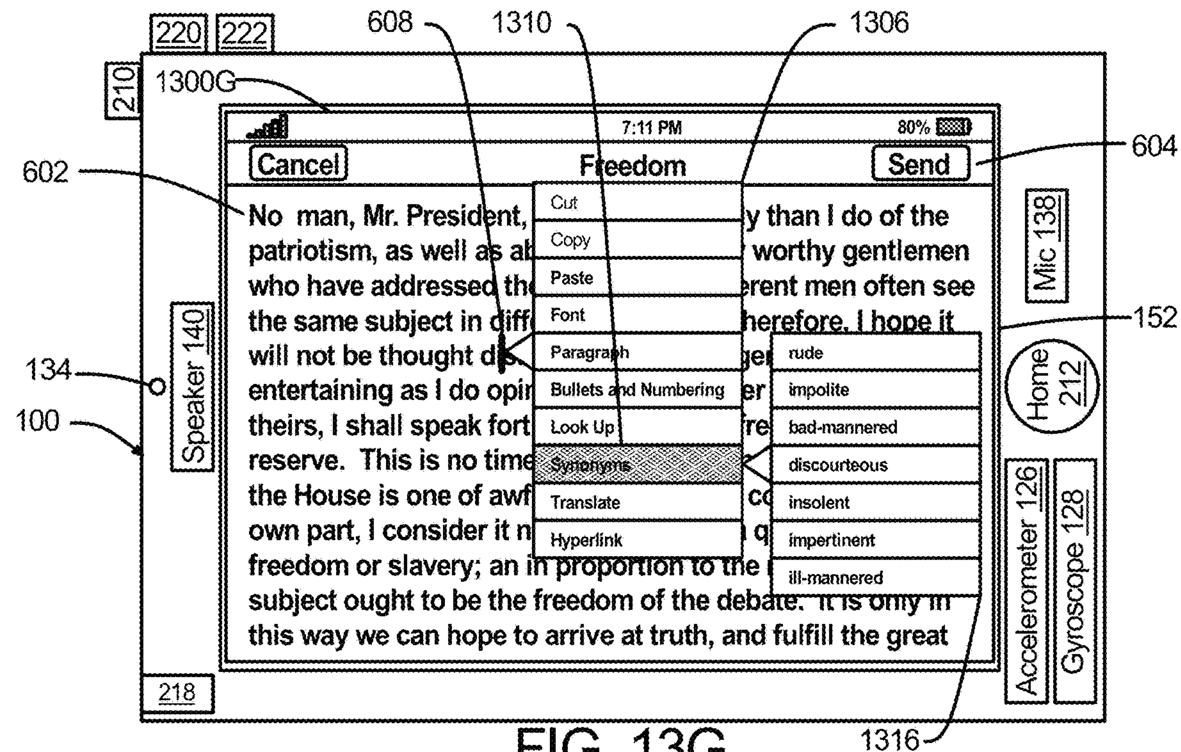

2) A user can perform tap gesture 1314 on the "return" key on keyboard 154 as illustrated in FIG. 13F. In response, the device displays sub-menu 1316 showing a list of synonyms as illustrated in UI 1300G (FIG. 13G). The list of synonyms is for the word at the position of zero-length selection 610 when the secondary-click gesture was performed. In this example, the word is "disrespectful."

Figure 13H:
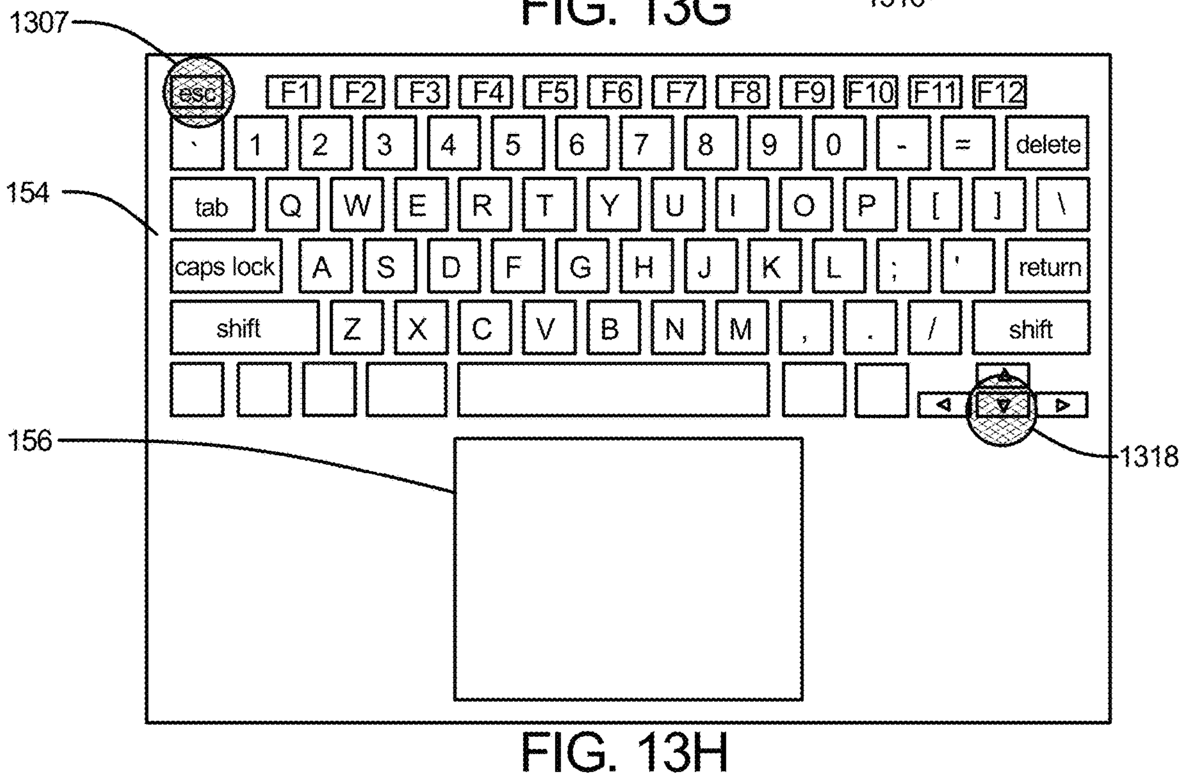
Figure 13I:
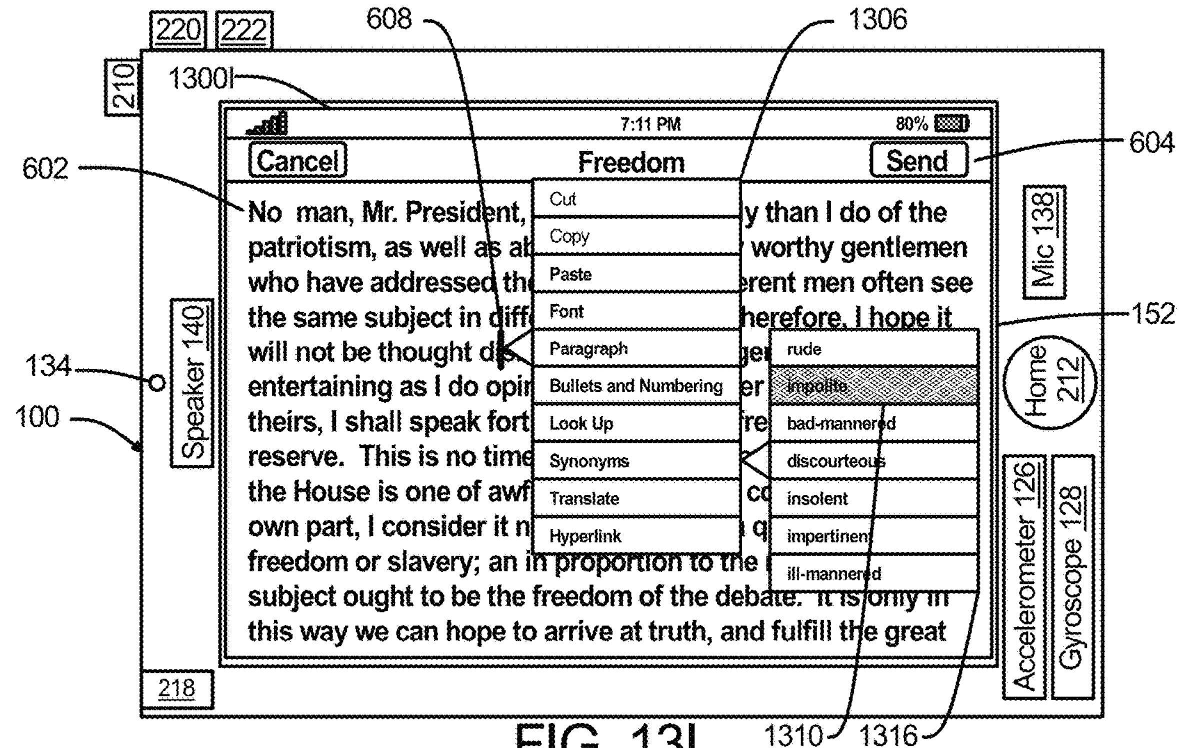

3) A user can perform tap gestures 1318 on the down arrow key on keyboard 154 as illustrated in FIG. 13H. In response to detecting the first finger tap, the device positions menu-item selection 1310 at the first (topmost) item on sub-menu 1316 (not shown). In response to detecting one additional finger tap, he device moves menu-item selection 1310 down the list until second item "impolite" is selected on sub-menu 1316 as illustrated in UI 13001 (FIG. 13I.)

Cancel action: A user can perform a tap 1307 on the "esc" key on keyboard 154. In response to detecting finger tap 1307 on "esc" key on keyboard 154, the device cancels the display of the menu and redisplays UI 1300A (FIG. 13A).

Figure 13J:
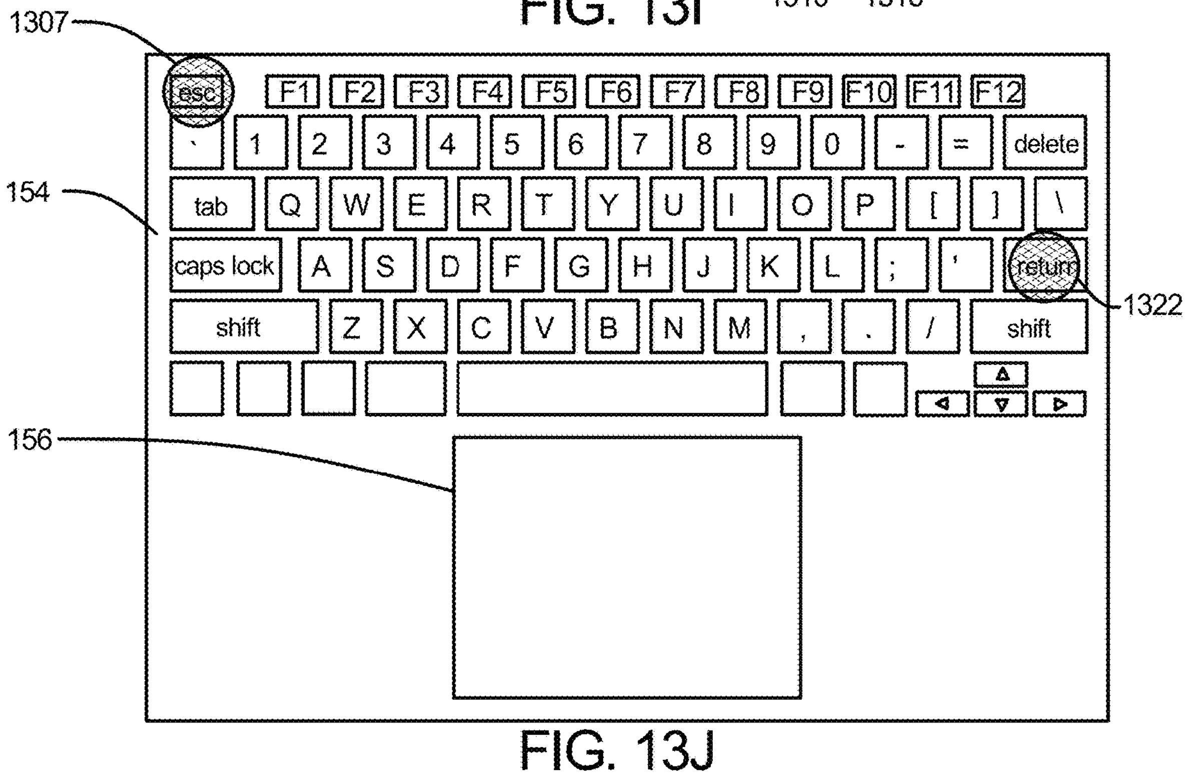
Figure 13K:
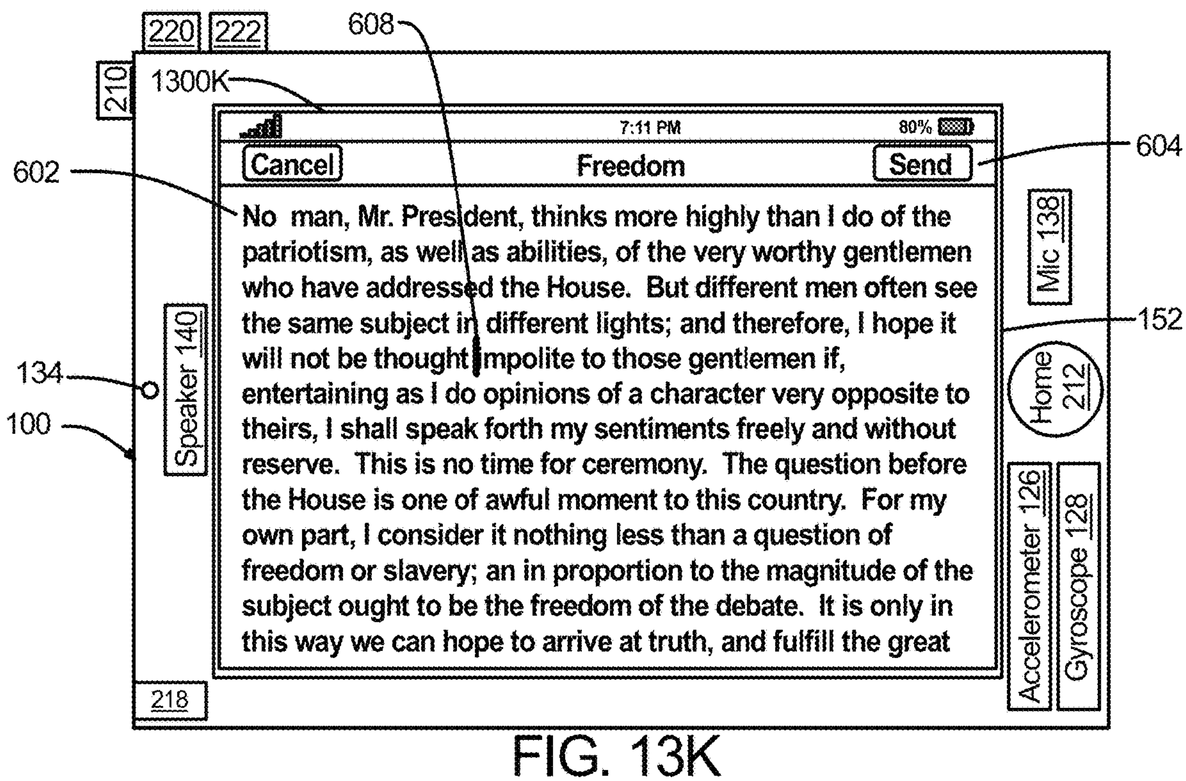

4) A user can perform tap gesture 1322 on the "return" key on keyboard 154 as illustrated in FIG. 13J. In response, the device replaces the word "disrespectful" with the synonym "impolite" as illustrated in FIG. 13K.

In this example, we have described a method for performing a secondary-click action with respect to zero-length selection 608 within editable text. The same method can be used to perform a secondary-click action with respect to unit-length selection 310 within read-only text. The same method can be used to perform a secondary-click action with respect to an extended selection of two or more characters, either within editable text, or within read-only text. In any case, the secondary-click menu can display those available actions that are applicable to the particular selection.

Auto-Scroll of menu: In some instances, secondary-click menu 1306 can have a vertical extent that exceeds the display vertical extent (not shown). When a user moves menu-item selection 1310 to a position near the last (first) displayed item in secondary-click menu 1306, the device can automatically scroll secondary-click menu 1306 up (down). The device can continue to scroll secondary-click menu 1306 up (down), either until the user moves selection 1310 up (down) from the last (first) displayed menu item, or until the secondary-click menu has scrolled to last (first) menu item. In some instances, sub-menu 1316 can have a vertical extent that exceeds the display vertical extent (not shown). When a user moves menu-item selection 1310 to a position near the last (first) displayed item in sub-menu 1316, the device can automatically scroll sub-menu 1316 up (down). The device can continue to scroll sub-menu 1316 up (down), either until the user moves selection 1310 up (down)

from the last (first) displayed menu item, or until the sub-menu has scrolled to last (first) menu item.

13.2 Using gestures on touchpad: FIGS. 13L-13V illustrate an exemplary user interface and method for performing a secondary-click action with respect to a selection within editable content, on a computing device with a touch-sensitive display in accordance with some embodiments using gestures on a touchpad.

Figure 13L:
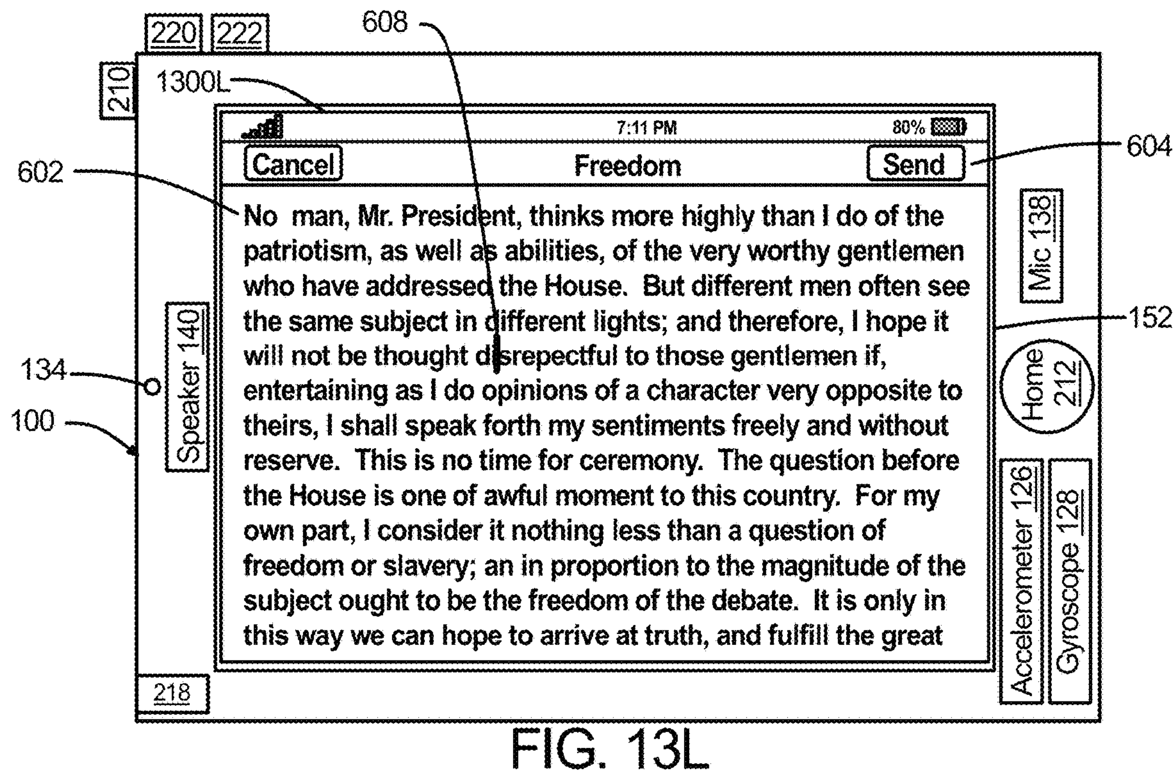
FIGS. 13L-13V illustrate an exemplary user interface and method for performing a secondary-click action with respect to a selection within editable content, on a computing device with a display, using gestures on a touchpad and keyboard in accordance with some embodiments.
Figure 13M:
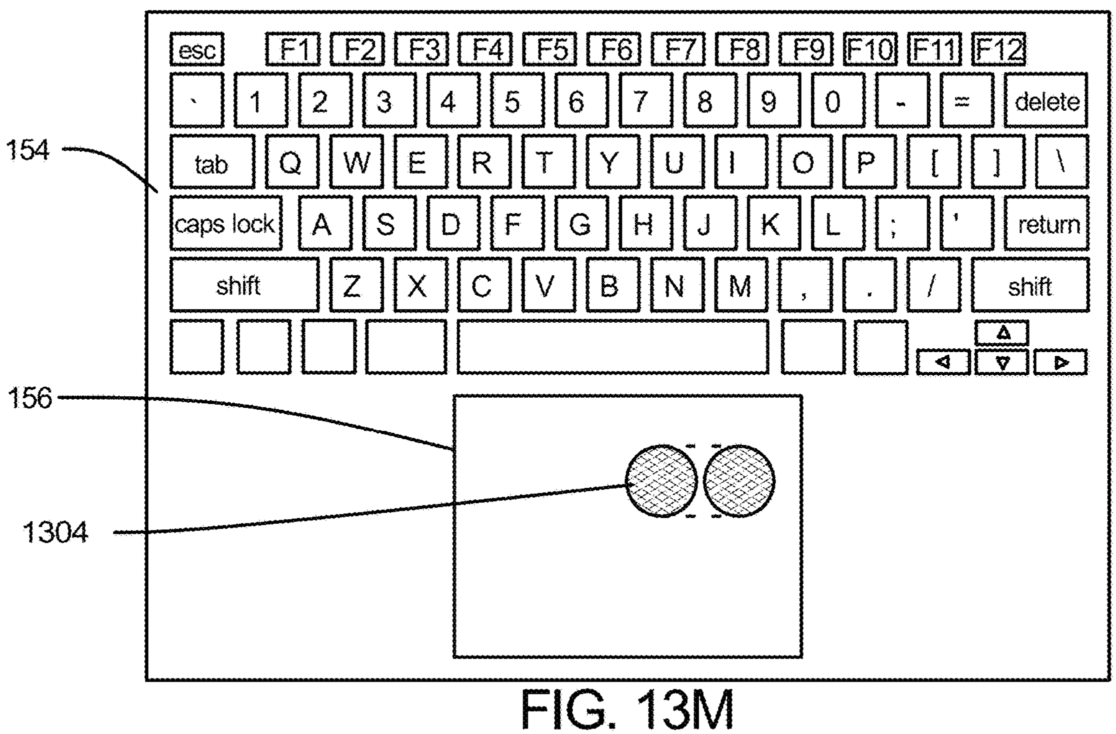
Figure 13N:
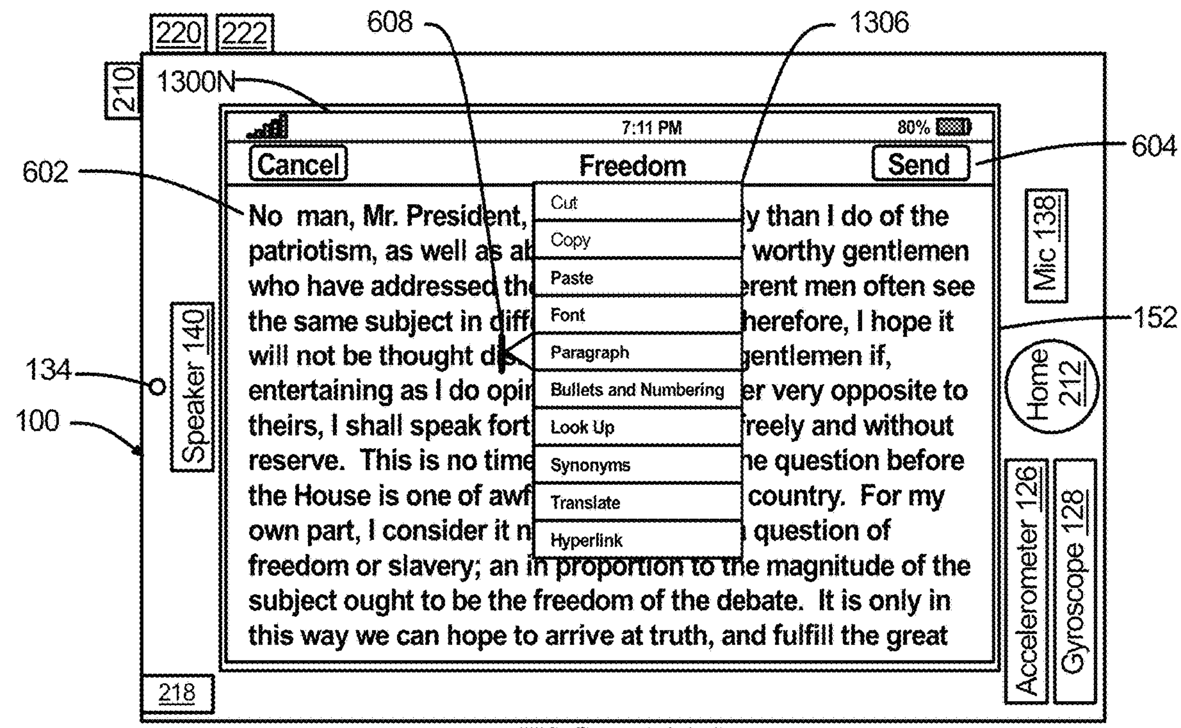
Figure 13O:
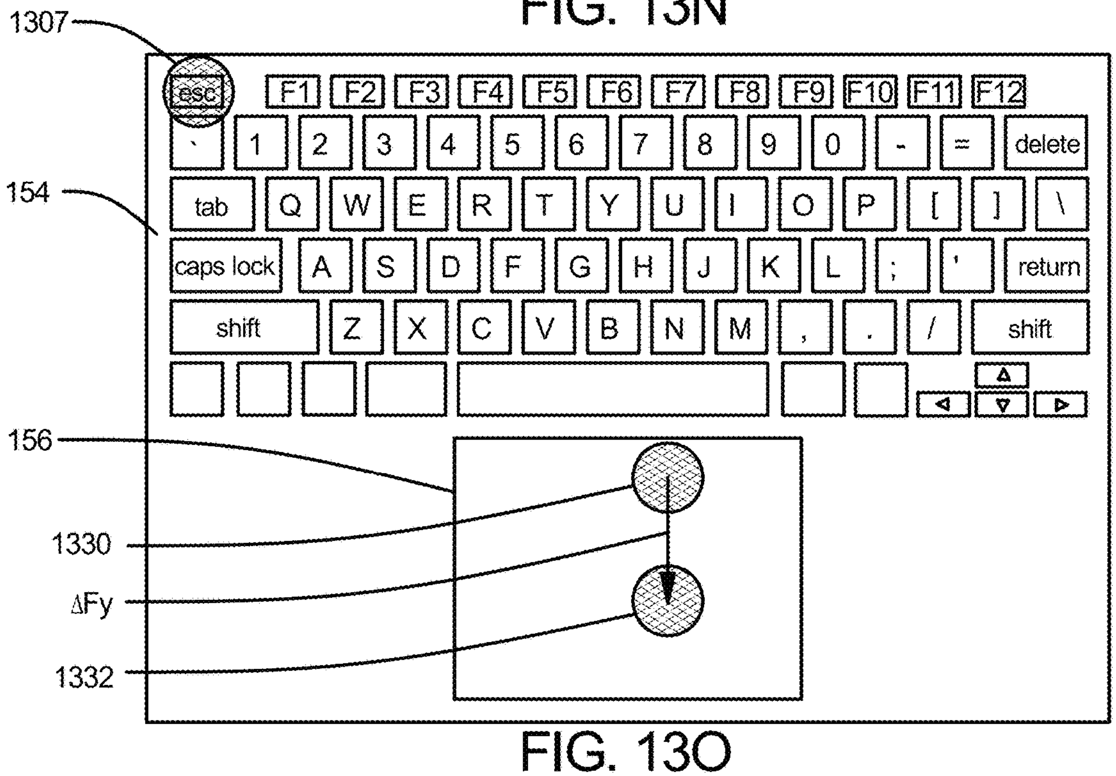

For example, the device can display editable text content 602 as illustrated in UI 1300L (FIG. 13L) and zero-length selection 608 at a position within editable content 608. A user can perform secondary-click gesture 1304 (a two-finger tap or two-finger click gesture for example) on touchpad 156 as illustrated in FIG. 13M. In response to detecting secondary-click gesture 1304 on touchpad 156, the device displays secondary-click menu 1306 adjacent to zero-length selection 608 as illustrated in UI 1300N (FIG. 13N).

Cancel action: A user can perform a tap 1307 on the "esc" key on keyboard 154. In response to detecting finger tap 1307 on "esc" key on keyboard 154, the device cancels the display of the menu and redisplays UI 1300L (FIG. 13L).

Secondary-click menu 1306 displays a list of actions that can be performed with respect to zero-length selection 608 as previously described. In the example shown with a selection of zero-length, the cut and copy actions are not available—and are shown in different font style. (A similar approach can be used to perform an action with respect to an extended selection within editable text content.)

Figure 13P:
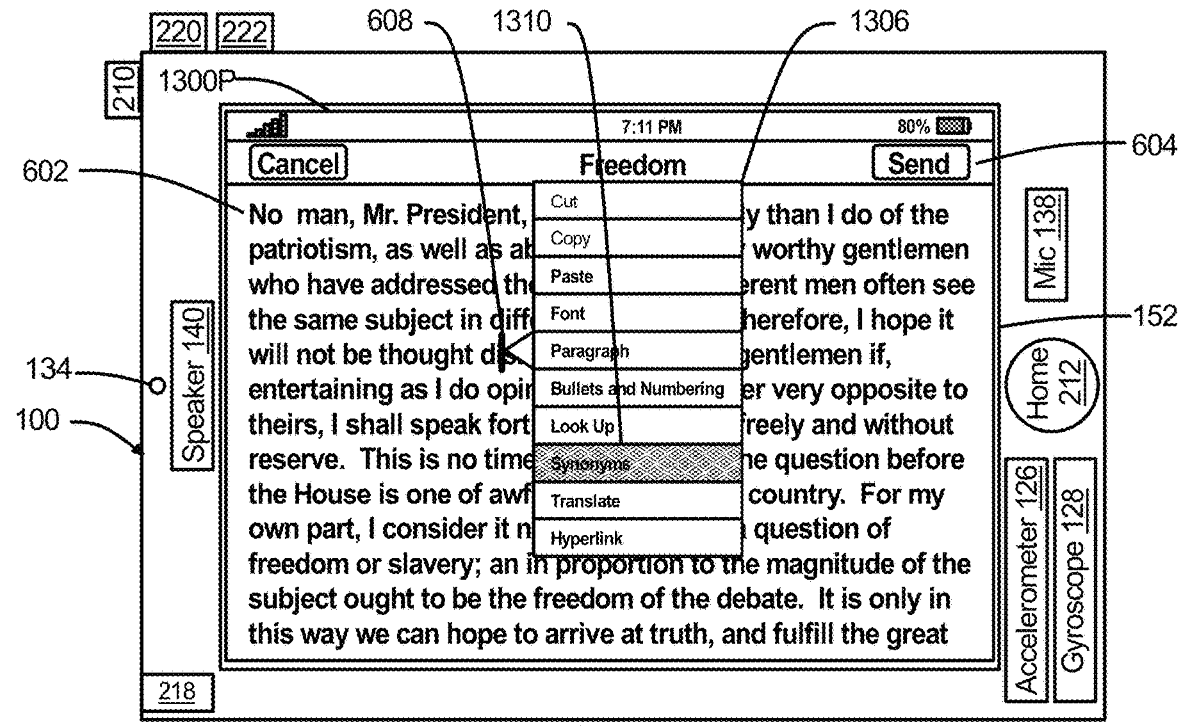

1) A user can perform a vertical slide finger gesture 1330 to 1332 in a downward direction beginning anywhere on touchpad 156. In response to detecting an initial ΔFy (a change in the vertical position of an uninterrupted finger contact), the device displays menu-item selection 1310 at the first (topmost) item in the secondary-click menu (not shown). In response to detecting ΔFy (a change in the vertical position of an uninterrupted finger contact), the device changes the position of menu-item selection 1310 on secondary-click menu 1306. In this exemplary embodiment ΔSy (the change in the vertical position of menu-item selection 1310) is approximately proportional to ΔFy as illustrated in FIGS. 130-13P. This can be written as ΔSy=KyΔFy where Ky is a proportionality constant for the y-component of the finger motion. ΔSy is not exactly proportional to ΔFy because the selection moves in discrete steps corresponding the vertical distance between items in the menu. The value of Ky can be less than one, equal to one, or greater than one. In some embodiments, Ky can be a function of the y-component of the slide gesture speed.

In the example shown the user has performed a slide gesture in the downward direction, until the device changes the vertical position of menu-item selection 1310 to the item "Synonyms" on secondary-click menu 1306 as illustrated in UI 1300P (FIG. 13P).

Cancel action: A user can perform a tap 1307 on the "esc" key on keyboard 154. In response to detecting finger tap 1307 on "esc" key on keyboard 154, the device cancels the display of the menu and redisplays UI 1300L (FIG. 13L).

Figure 13Q:
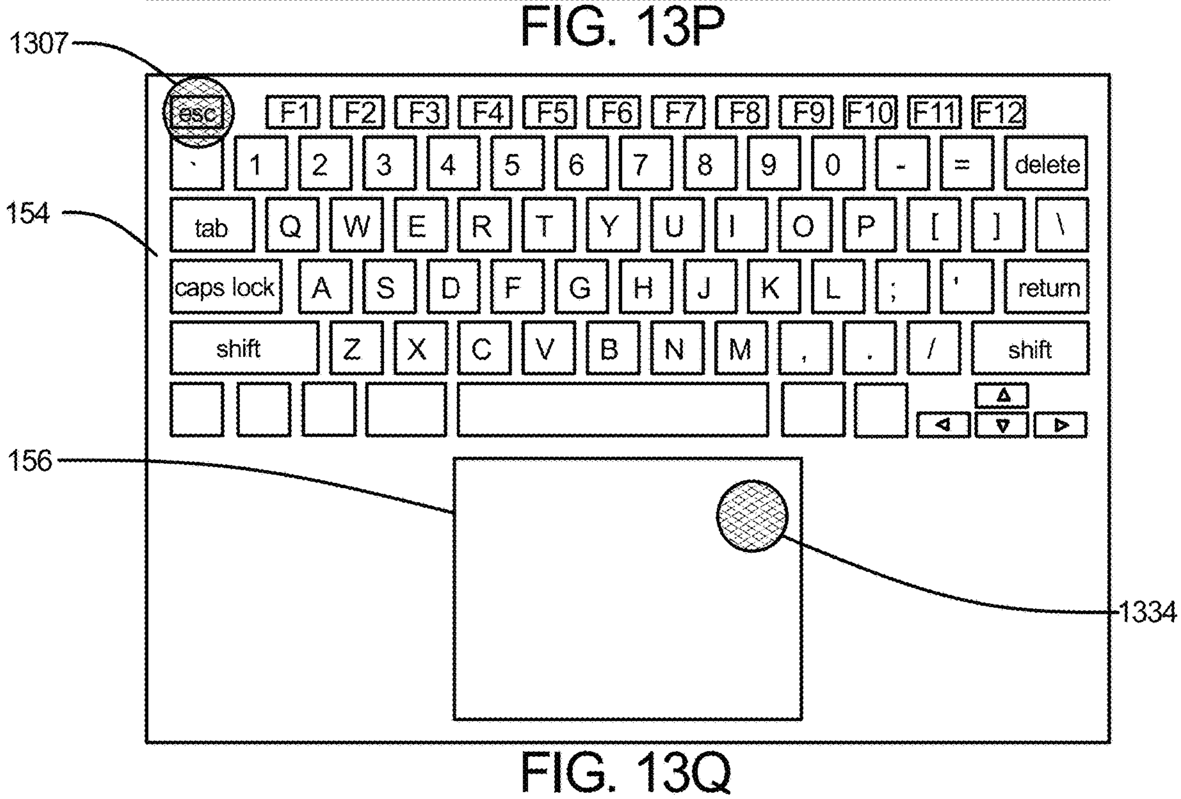
Figure 13R:
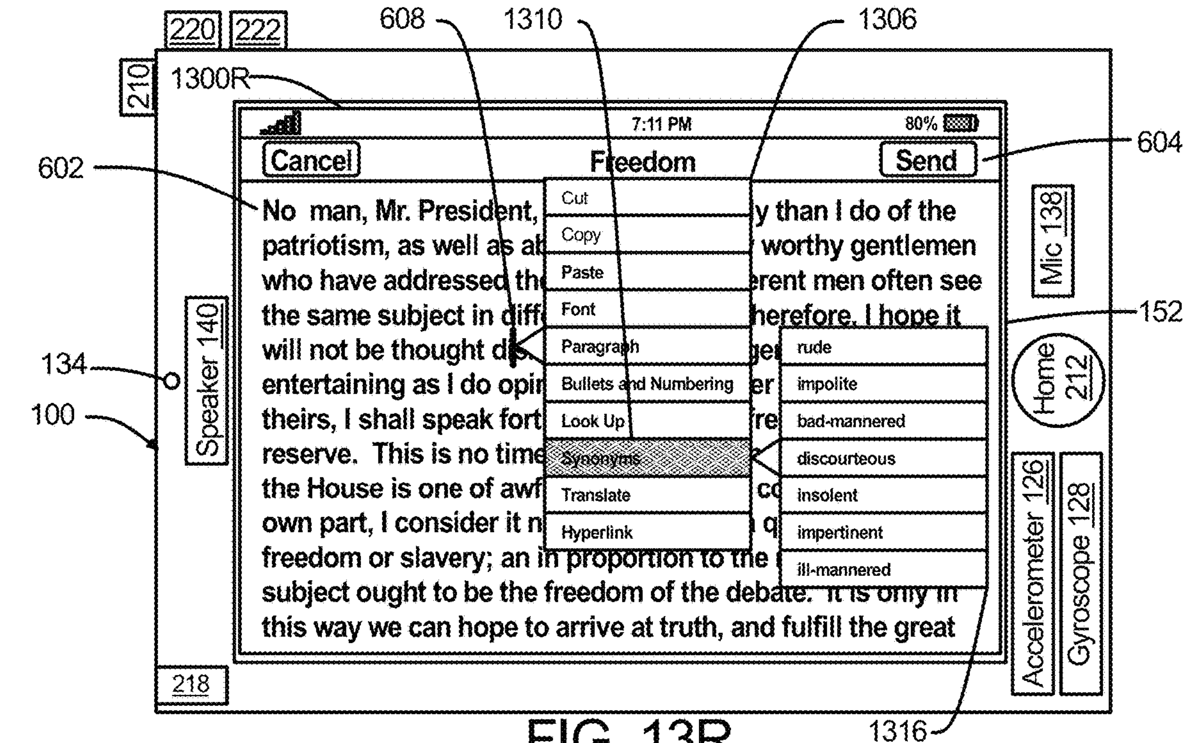

2) A user can perform tap gesture 1334 on touchpad 156 as illustrated in FIG. 13Q. In response, the device selects the item synonyms in menu 1306 and displays sub-menu 1316 showing a list of synonyms as illustrated in UI 1300R (FIG. 13R). The list of synonyms is for the word at the position of zero-length selection 610 when the secondary-click gesture was performed as in the prior example. In this example, the word is "disrespectful."

3) A user can perform a vertical slide finger gesture 1336 to 1338 in a downward direction beginning anywhere on touchpad 156. In response to detecting an initial ΔFy (a change in the vertical position of an uninterrupted finger contact), the device displays menu-item selection 1310 at the first (topmost) item in the sub-menu (not shown). In response to detecting ΔFy (a change in the vertical position of an uninterrupted finger contact), the device changes the position of menu-item selection 1310 on sub-menu 1316. In the example shown the user has performed a slide gesture in the downward direction, until the device changes the vertical position of menu-item selection 1310 to the item "impolite" on sub-menu 1316 as illustrated in UI 1300T (FIG. 13T). (A user can perform a tap 1307 on the "esc" key on keyboard 154. In response to detecting finger tap 1307 on "esc" key on keyboard 154, the device cancels the display of the menu and redisplays UI 1300L (FIG. 13L)). Similarly, in response to detecting an initial vertical slide gesture in an upward direction, the device can display menu-item selection 1310 initially at the last (bottommost) item in a menu.

Figure 13S:
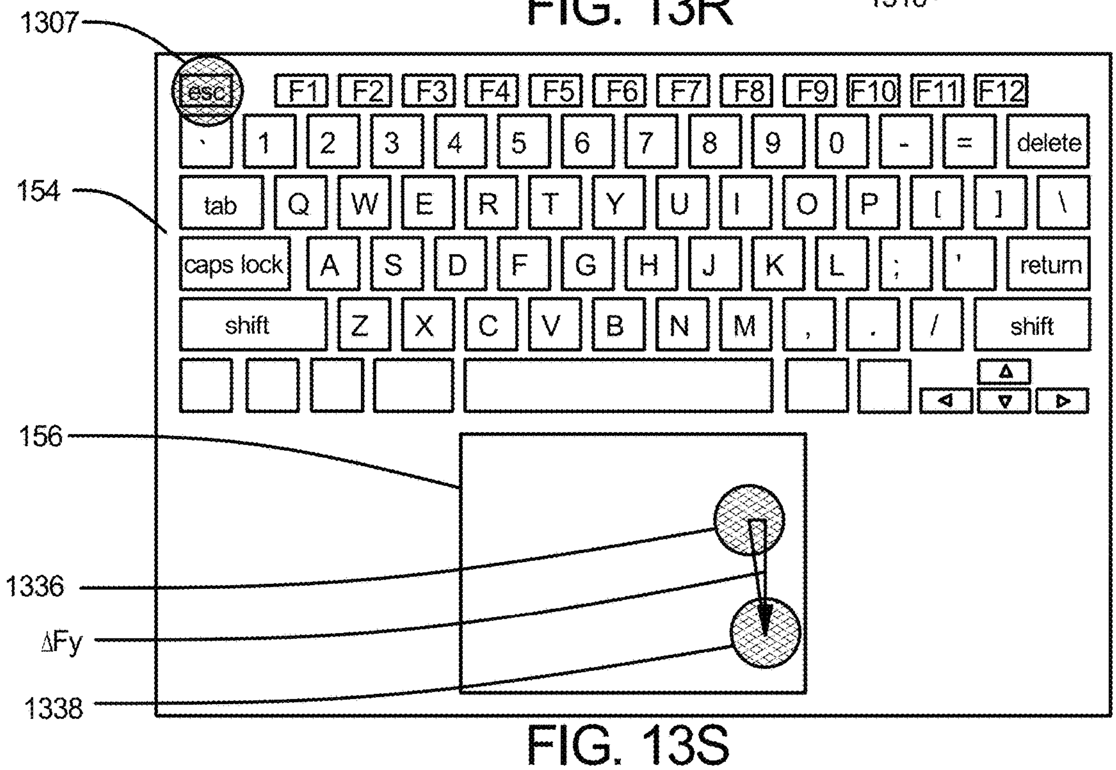
Figure 13T:
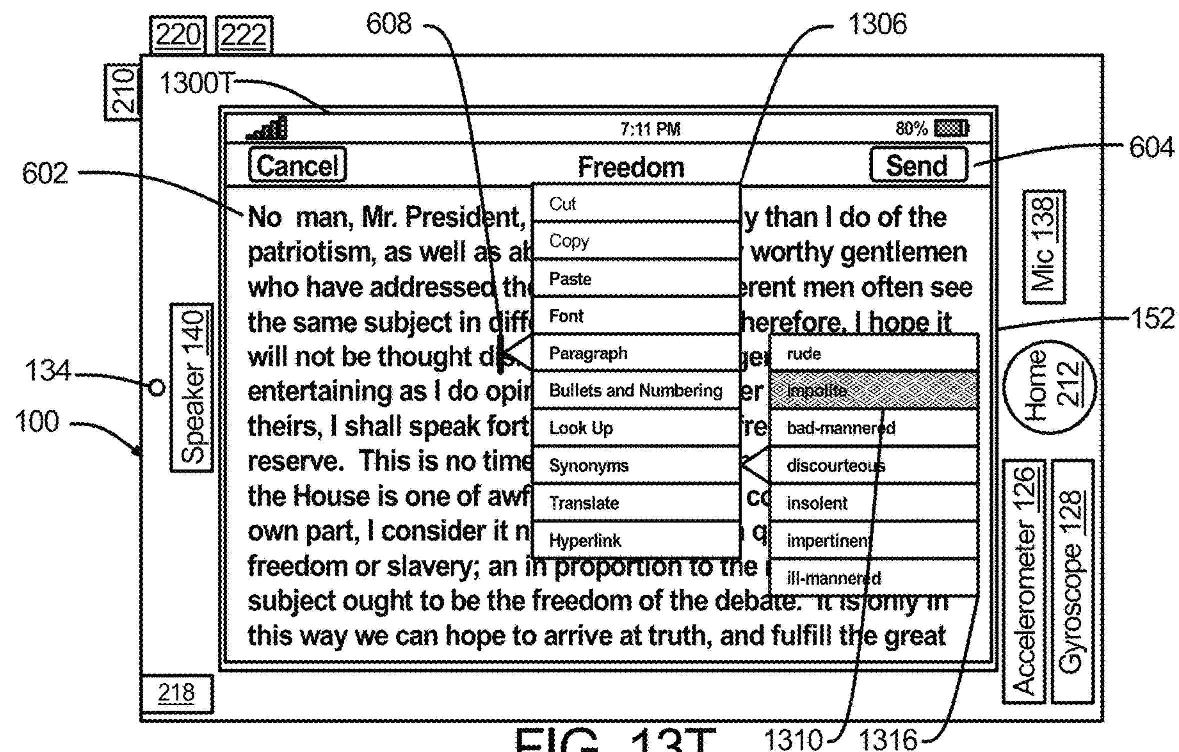
Figure 13U:
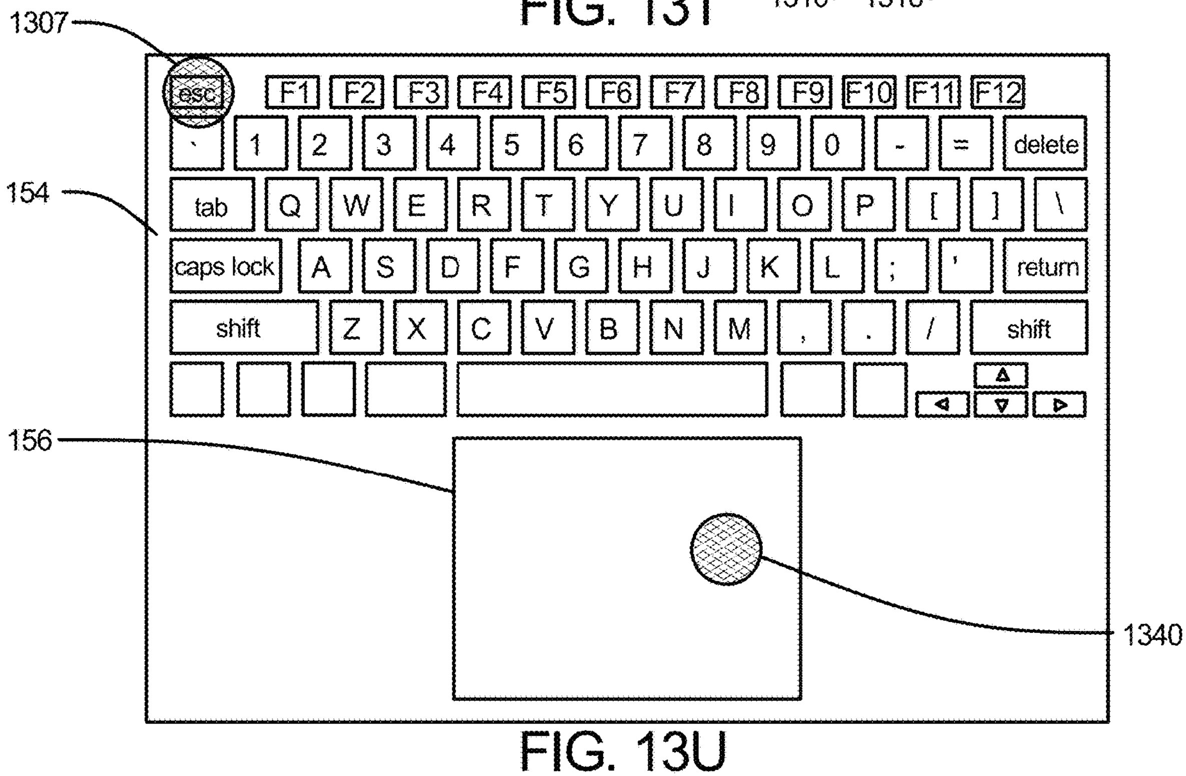
Figure 13V:
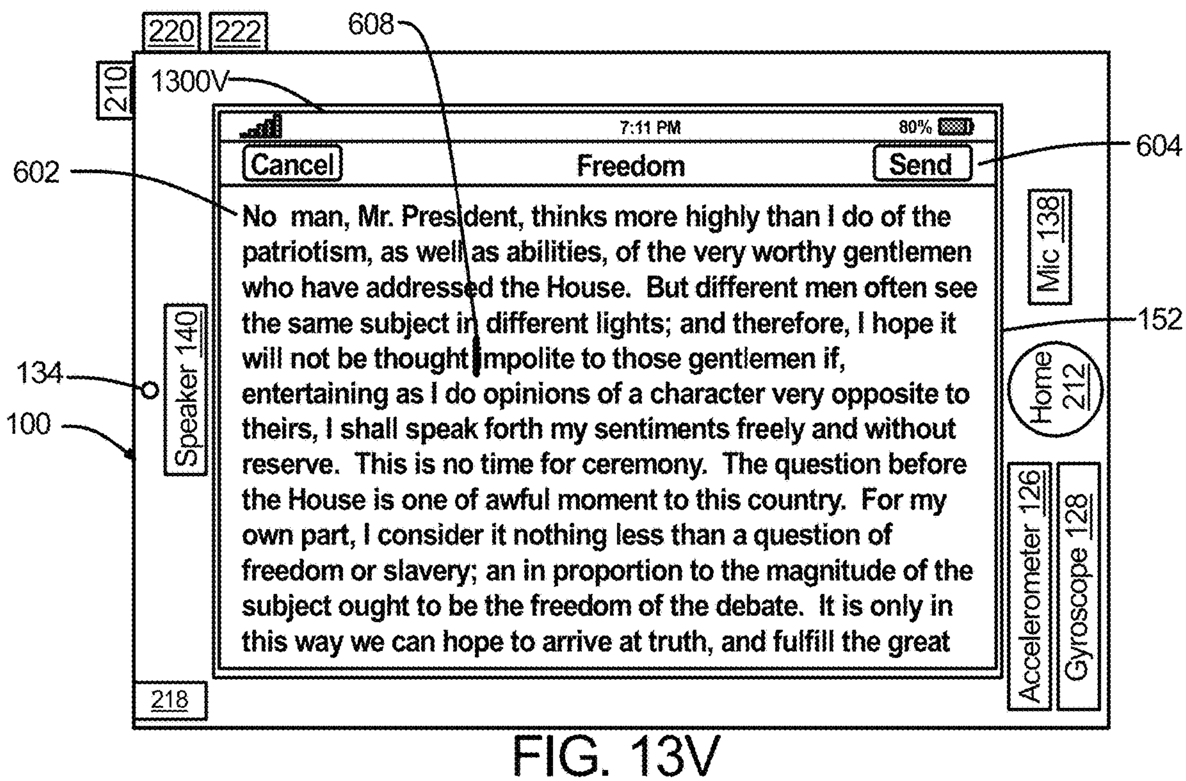

4) A user can perform tap gesture 1340 on touchpad 156 as illustrated in FIG. 13U. In response, the device replaces the word "disrespectful" with the synonym "impolite". Alternatively, the user can perform a tap gesture on the return key on keyboard 154 to replace the word "disrespectful" with the synonym "impolite".

The slide gesture need not be perfectly vertical as illustrated in FIG. 13S. In the example shown, the slide gesture has a y-component and an x-component. In that case, ΔSy (the change in the vertical position of menu-item selection 1310) is approximately proportional to ΔFy as illustrated in FIGS. 13S-13T. Ky is the proportionality constant for motion in the y-direction. ΔSy is not exactly proportional to ΔFy because the selection moves in discrete steps corresponding the vertical distance between items in the menu where the menu in this example is a single column. An analogous approach could be used for displaying and changing the position of a menu-item selection within a menu consisting of a single row. In the case of a menu consisting of a single row, response to detecting an initial vertical slide gesture in an rightward (leftward) direction, the device can display menu-item selection 1310 initially at the leftmost (rightmost) item in a menu consisting of a single row. Finally, an analogous approach could be used for displaying and changing the position of a menu-item selection within a 2-D menu consisting of a two or more rows and columns.

In this example, we have described a method for performing a secondary-click action with respect to zero-length selection 608 within editable text. The same method can be used to perform a secondary-click action with respect to unit-length selection 310 within read-only text. The same method can be used to perform a secondary-click action with respect to an extended selection of two or more characters, either within editable text, or within read-only text. In any case, the secondary-click menu can display those available actions that are applicable to the particular selection.

Auto-Scroll of menu: In some instances, secondary-click menu 1306 can have a vertical extent that exceeds the display vertical extent (not shown). When a user moves menu-item selection 1310 to a position near the last (first) displayed item in secondary-click menu 1306, the device can automatically scroll secondary-click menu 1306 up (down). The device can continue to scroll secondary-click menu 1306 up (down), either until the user moves selection 1310 up (down) from the last (first) displayed menu item, or until the secondary-click menu has scrolled to last (first) menu item. In some instances, sub-menu 1316 can have a vertical extent that exceeds the display vertical extent (not shown). When a user moves menu-item selection 1310 to a position near the last (first) displayed item in sub-menu 1316, the device can automatically scroll sub-menu 1316 up (down). The device can continue to scroll sub-menu 1316 up (down), either until the user moves selection 1310 up (down) from the last (first) displayed menu item, or until the sub-menu has scrolled to last (first) menu item. The device can auto-scroll menus consisting of a row in a manner analogous to that described above for auto-scrolling menus consisting of a column.

Figure 14A:
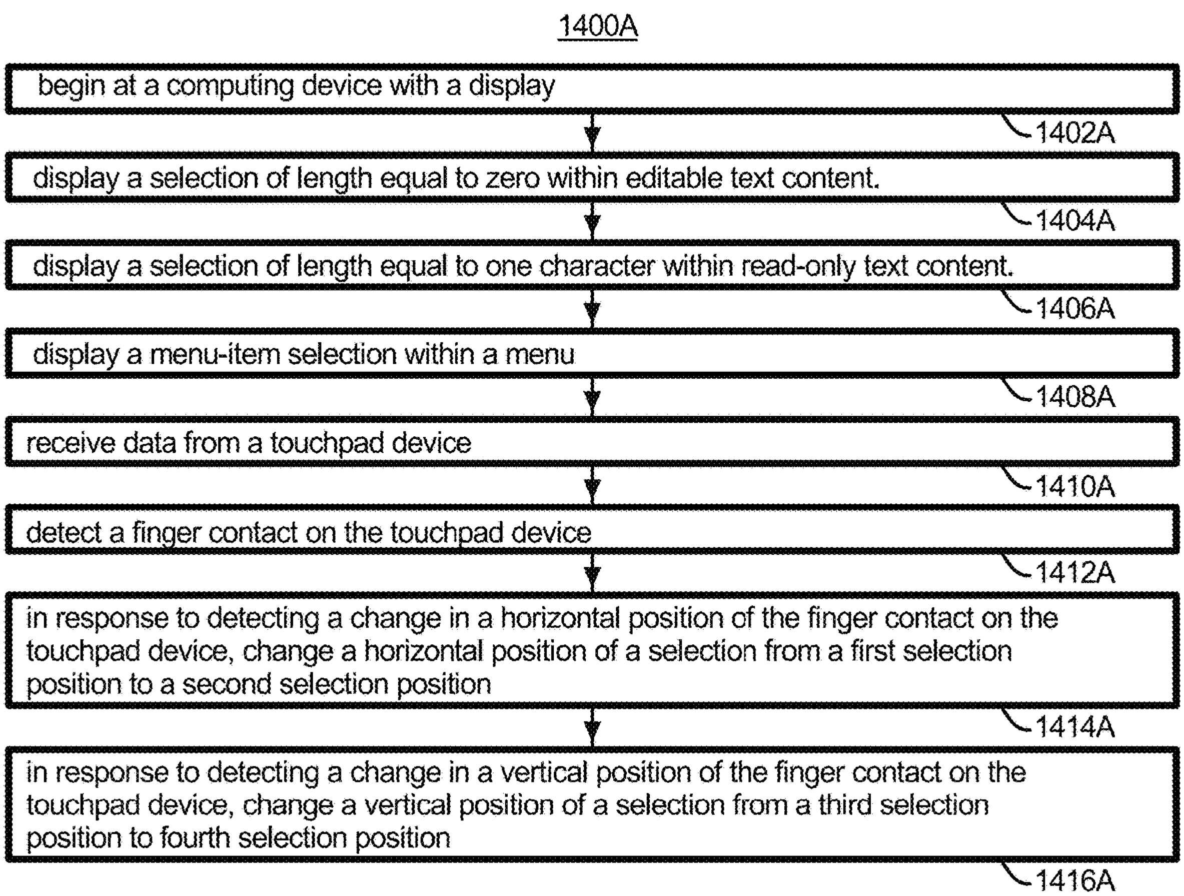
FIG. 14A is a flow diagram illustrating a method for positioning a menu-item selection within a menu (within a secondary-click menu for example) on a computing device with a display using gestures on a touchpad in accordance with some embodiments.
Figure 14B:
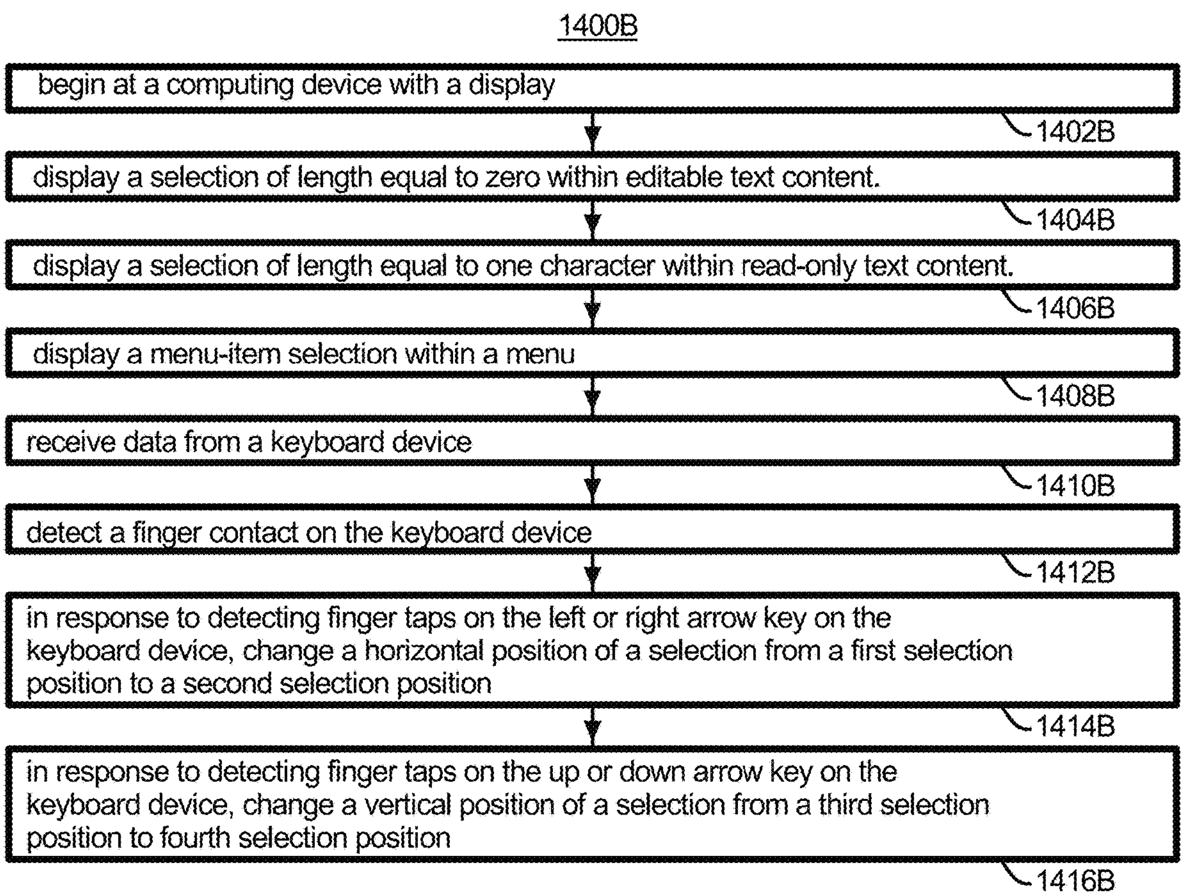
FIG. 14B is a flow diagram illustrating a method for positioning a menu-item selection within a menu (within a secondary-click menu for example) on a computing device with a display using gestures on a touchpad and keyboard in accordance with some embodiments.
Figure 14C:
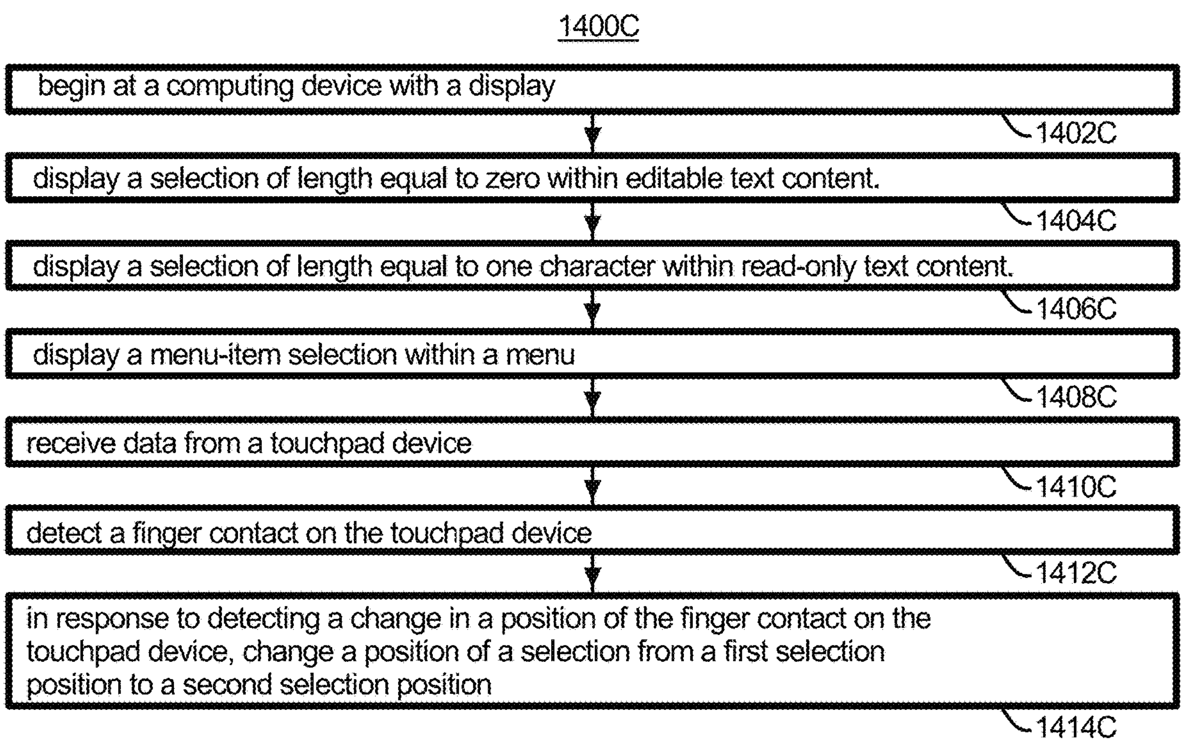
FIG. 14C is a flow diagram illustrating a method for positioning a menu-item selection within a menu (within a secondary-click menu for example) on a computing device with a display using gestures on a touchpad in accordance with some embodiments.

14.1 Methods for positioning a menu-item selection within a menu using gestures on a touchpad: FIG. 14A and FIG. 14C are flow diagrams illustrating methods for positioning a menu-item selection, within a menu on a computing device with a display using gestures on a touchpad in accordance with some embodiments. FIGS. 13L-13V, illustrate exemplary user interfaces for use in implementing the methods presented in the flow diagrams shown in FIGS. 14A and 14C.

14.2 Methods for positioning a menu-item selection within a menu using gestures on a touchpad and keyboard: FIG. 14B is a flow diagram illustrating a method for positioning a menu-item selection, within a menu on a computing device with a display using gestures on a touchpad and keyboard in accordance with some embodiments. FIGS. 13A-13K, illustrate exemplary user interfaces for use in implementing the methods presented in the flow diagrams shown in FIG. 14B.

15.0 Editing text-object content (a spreadsheet) using gestures on a touchpad: First, positioning a text-object selection (a cell selection in a spreadsheet) is described. Next, displaying a zero-length selection within a text-object (within a spreadsheet cell), and positioning the zero length selection within the spreadsheet cell content to edit the cell content, is described. Finally, performing a secondary-click gesture to display a secondary-click menu, selecting an item in a secondary-click menu to perform an action with respect to one or more selected cells, is described.

15.1 Positioning a text-object selection within text-object content (a spreadsheet) using gestures on a touchpad: FIGS. 15A-15I illustrate an exemplary user interface and method for displaying a text-object selection within text-object content (a spreadsheet), and moving a text-object selection within text-object content (a spreadsheet), on a mobile computing device with a display, using gestures on a touchpad in accordance with some embodiments.

FIGS. 15A-15E illustrate an example of displaying text-object selection 1510 within editable text-object content 1502 and changing the horizontal position of text-object selection 1510 with gestures on touchpad 156. FIGS. 15F-15G illustrate an example of changing the vertical position of text-object selection 1510 with gestures on touchpad 156. FIGS. 15H-15I, illustrate an example of changing both the horizontal and vertical position of text-object selection 1510 with a diagonal slide finger gesture on touchpad 156. In this disclosure we will often refer to "editable text-object selection 1510" simply as "selection 1510".

Figure 15A:
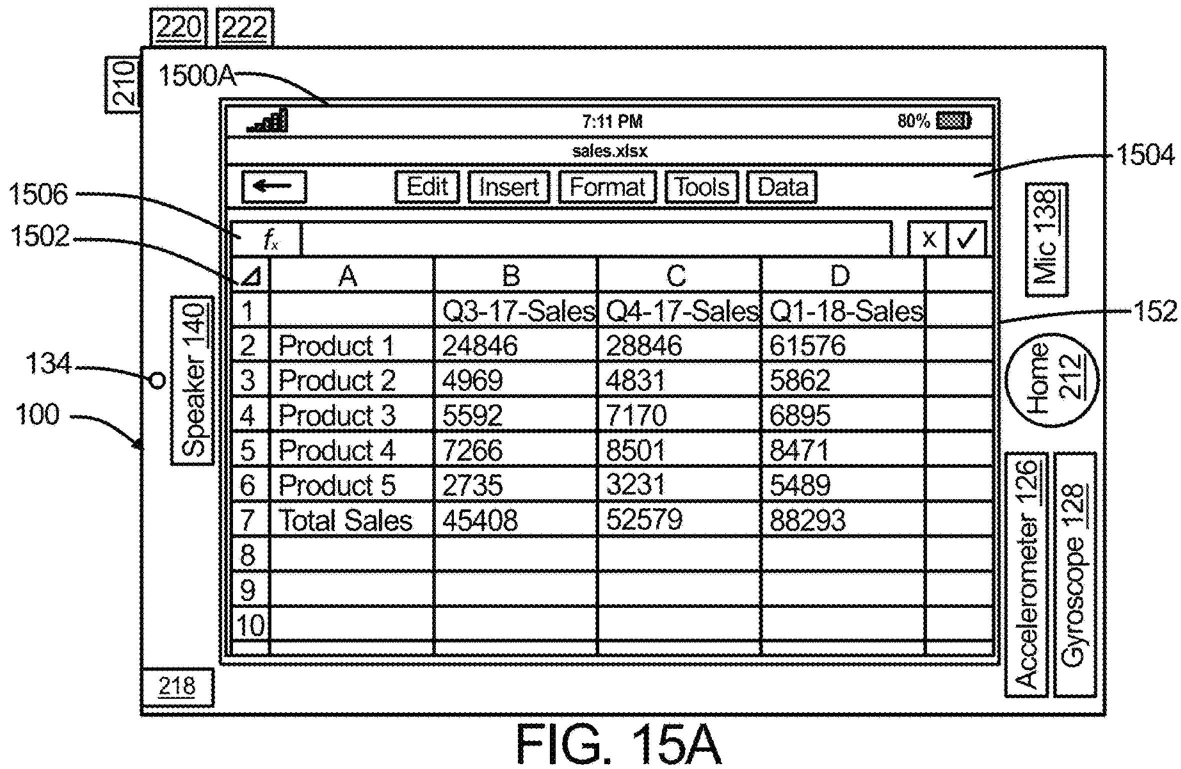
FIGS. 15A-15I—illustrate an exemplary user interface and method for displaying a text-object selection within text-object content (a spreadsheet), and moving a text-object selection within text-object content (a spreadsheet), on a mobile computing device with a display, using gestures on a touchpad in accordance with some embodiments.
Figure 15B:
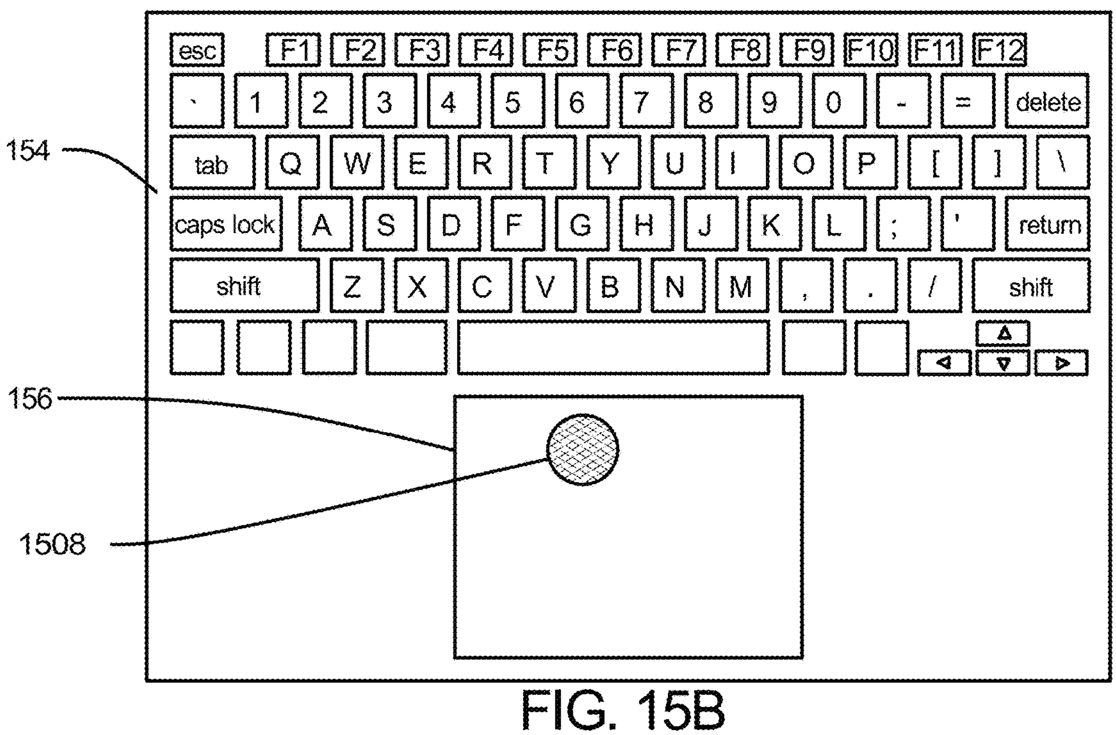
Figure 15C:
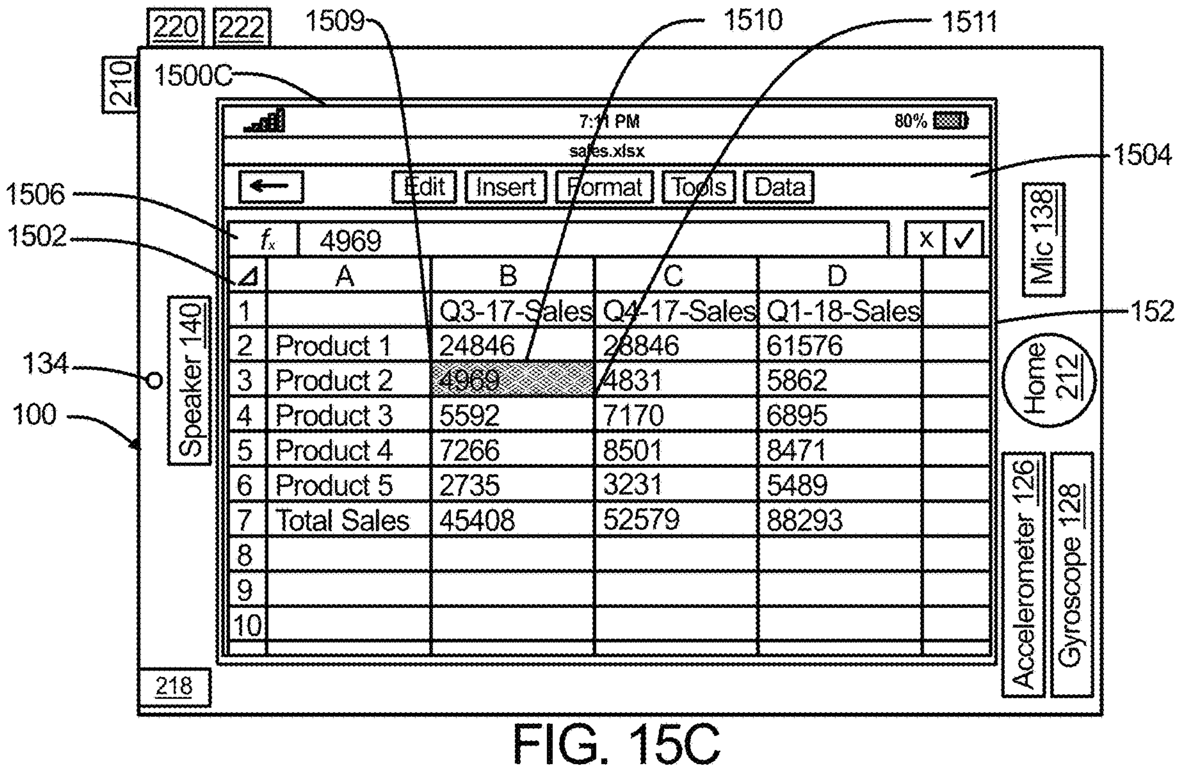

The device can display editable text-object content 1502 as illustrated in FIG. 15A. The device can also display application navigation bar 1504. A user can perform a finger gesture 1506 (a tap or click or long-press or long-click finger gesture for example) on touchpad 156 as illustrated in FIG. 15B. In response to detecting finger gesture 1506 on touchpad 156, the device displays text-object selection 1510 at a first selection position as illustrated in FIG. 15C. The text-object selection has a start point 1509 and end point 1511. (If no editable text-object content is present at or near the same relative position on the display, then the device does not display selection 1510.)

In one exemplary embodiment, the first selection position is at approximately the same relative position on the display as finger gesture 1508 on touchpad 156 as illustrated in FIGS. 15B-15C. In another exemplary embodiment, the first selection position is at the first text-object in editable text-object content 1502.

Figure 15D:
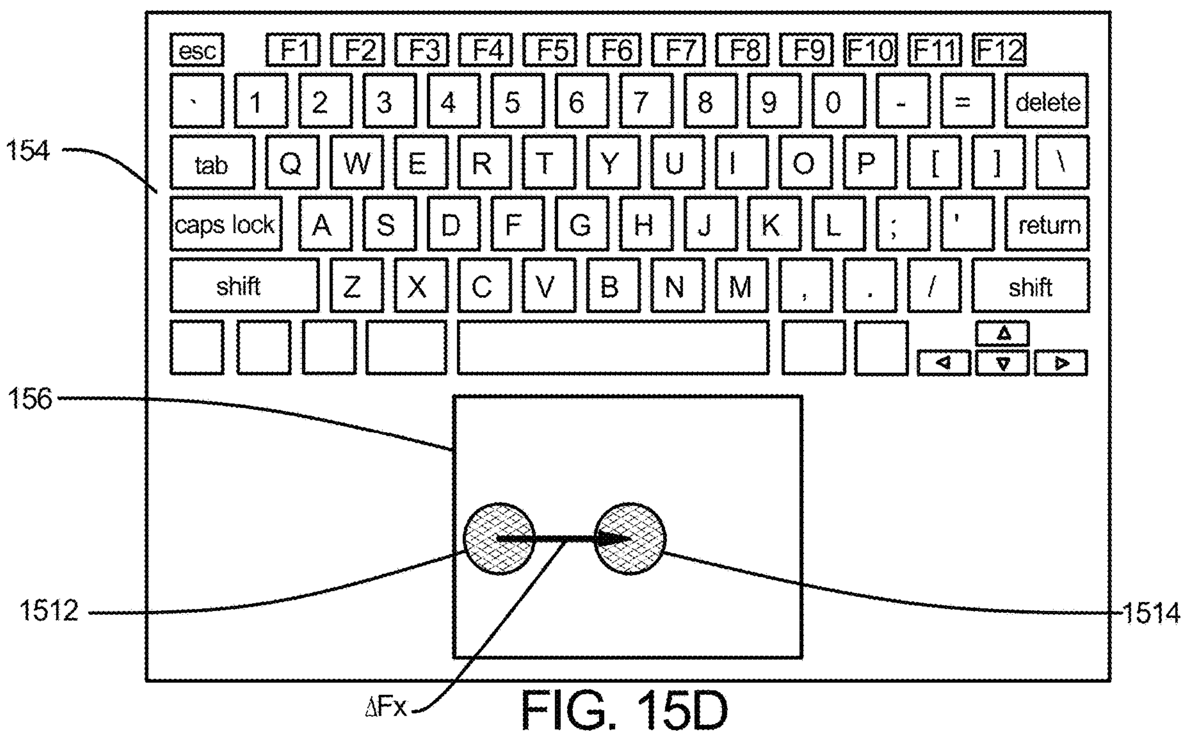
Figure 15E:
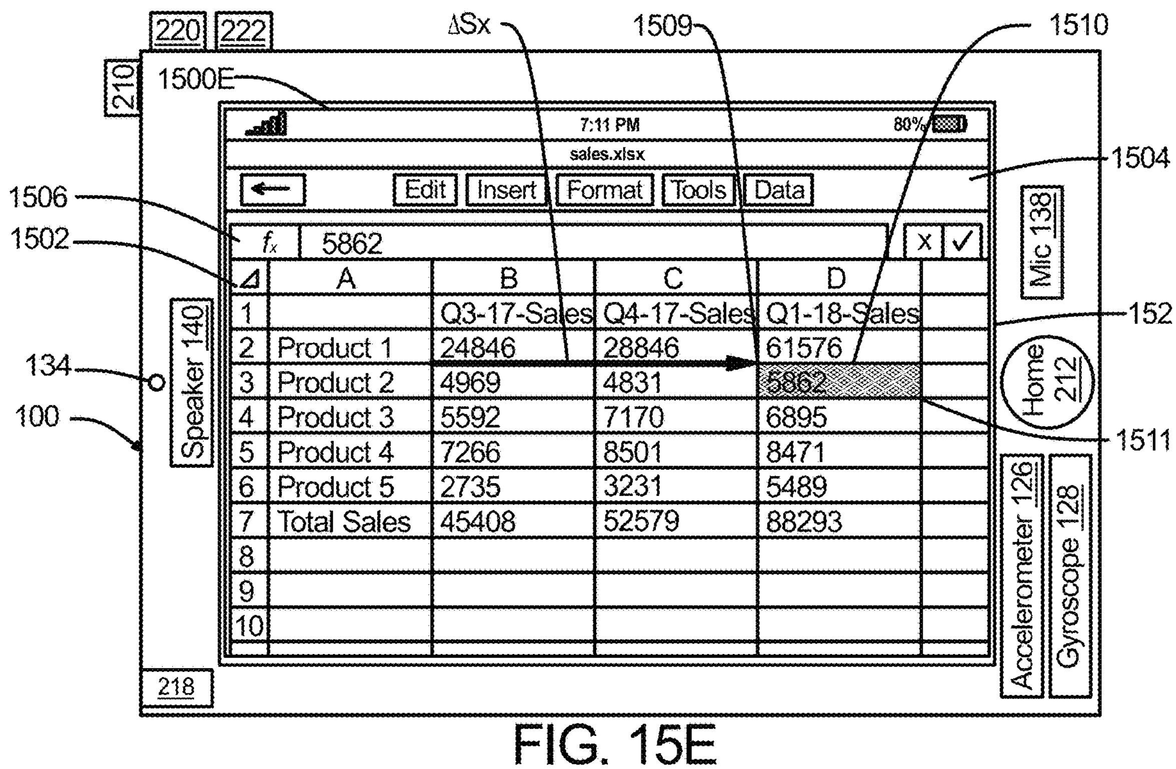
Figure 15F:
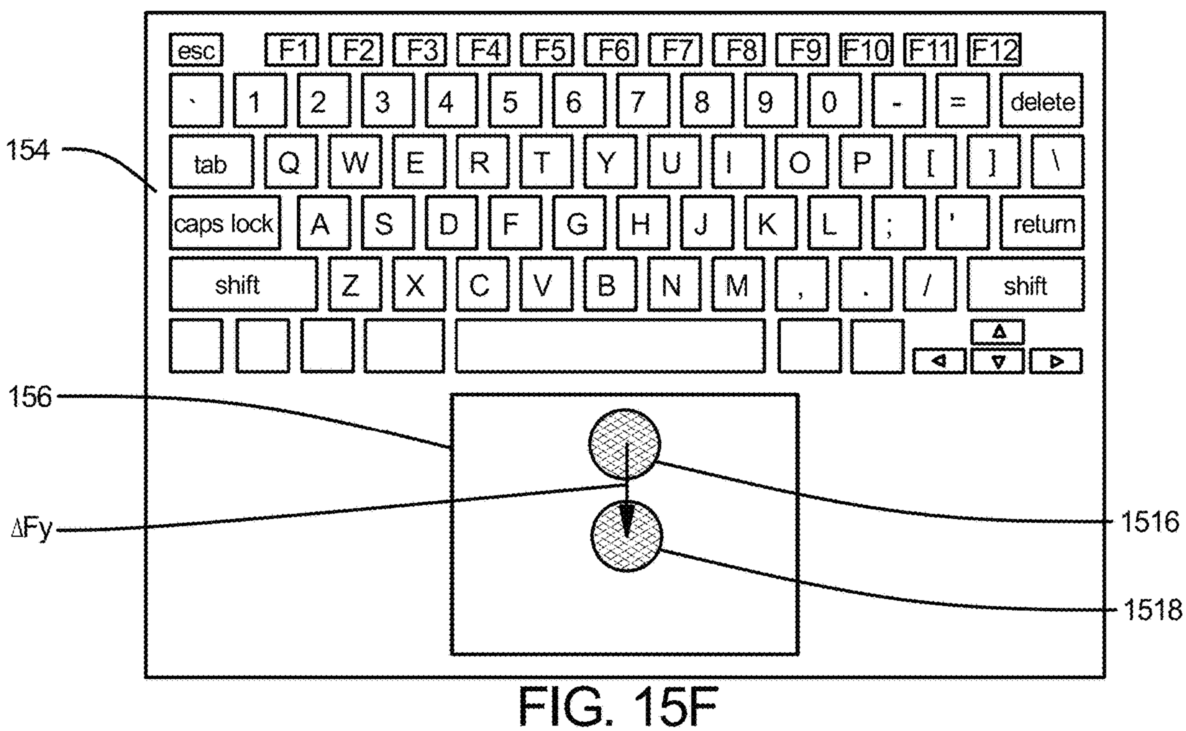
Figure 15G:
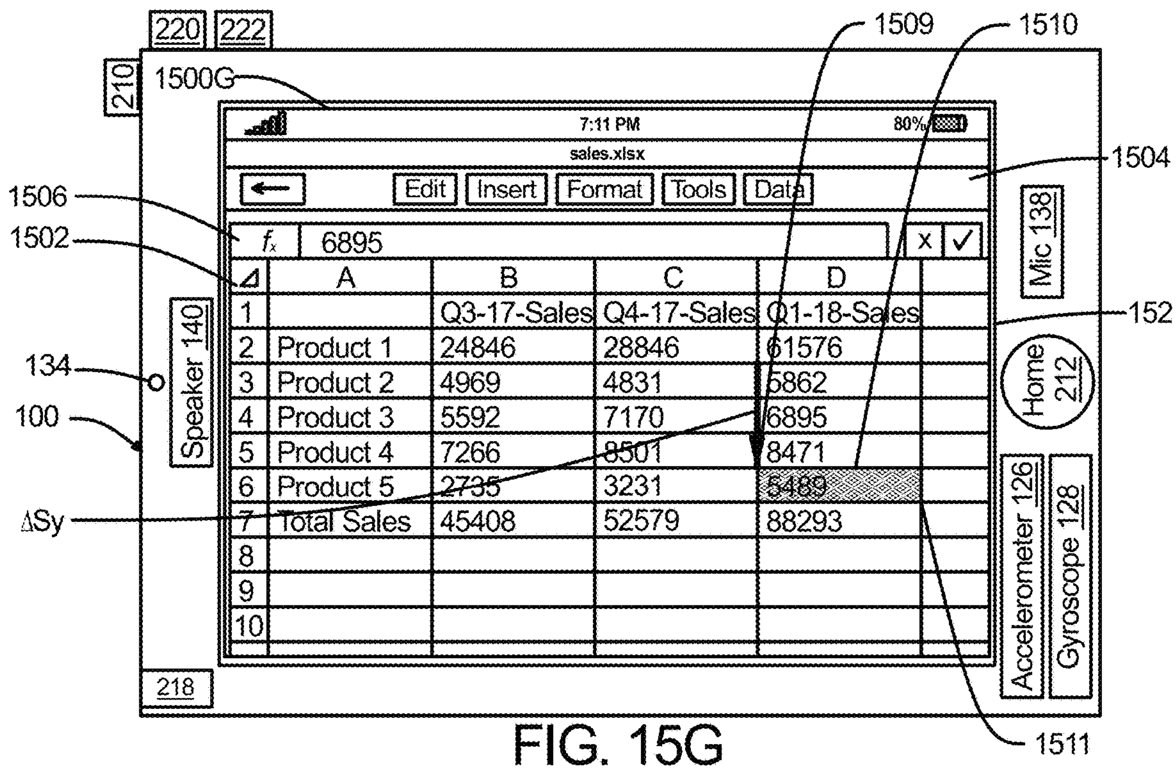
Figure 15H:
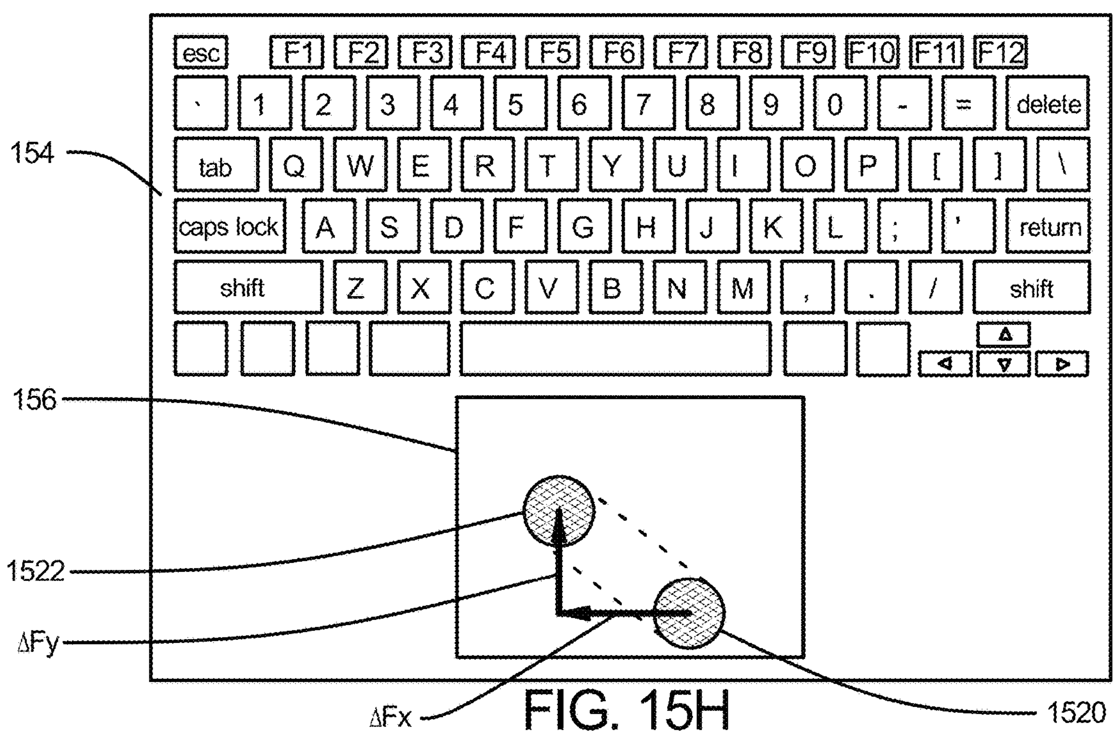
Figure 15I:
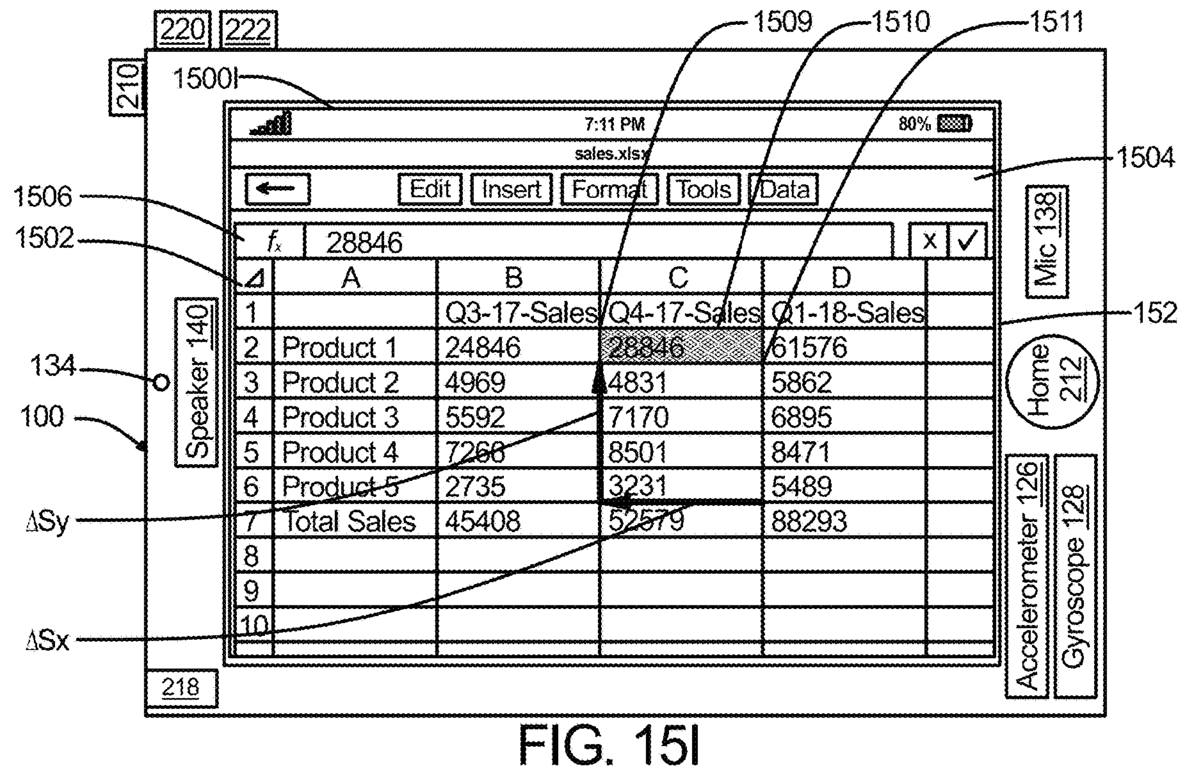

A user can perform a horizontal slide finger gesture 1512 to 1514 on touchpad 156 as illustrated in FIG. 15D. In response to detecting $\Delta Fx$ (a change in the horizontal position of an uninterrupted finger contact), the device changes the horizontal position of text-object selection 1510 on the display from the first selection position to a second selection position as illustrated in FIGS. 15C-15E. In one exemplary embodiment $\Delta Sx$ (the change in the horizontal position of selection 1510) is approximately proportional to $\Delta Fx$ as illustrated in FIGS. 15D-15E. This can be written as $\Delta Sx = Kx \Delta Fx$ where Kx is a proportionality constant for the x-component of the finger motion. $\Delta Sx$ is not exactly proportional to $\Delta Fx$ because the selection moves in discrete steps corresponding to the horizontal distance between text-objects. The value of Kx can be less than one, equal to one, or greater than one. In some embodiments, Kx can be a function of the x-component of the slide gesture speed. In this example, $Kx>1$.

With text-object selection 1510 at a first position, a user can perform a vertical slide finger gesture 1516 to 1518 beginning anywhere on touchpad 156. In response to detecting $\Delta Fy$ (a change in the vertical position of an uninterrupted finger contact), the device changes the vertical position of selection 1510 as illustrated in FIGS. 15E-15G. In one exemplary embodiment $\Delta Sy$ (the change in the vertical position of text-object selection 1510) is approximately proportional to $\Delta Fy$ as illustrated in FIGS. 15F-15G. This can be written as $\Delta Sy = Ky \Delta Fy$ where Ky is a proportionality constant for the y-component of the finger motion. $\Delta Sy$ is not exactly proportional to $\Delta Fy$ because the selection moves in discrete steps corresponding to the vertical distance between text-objects (spreadsheet cells in this example). The value of Ky can be less than one, equal to one, or greater than one. In some embodiments, Ky can be a function of the y-component of the slide gesture speed. In this example, $Ky \sim 1$. The device displays user interface (UI) 1500G (FIG. 15G) with text-object selection 1510 at a new position.

A user can change both the horizontal and vertical position of text-object selection 1510 with a single diagonal-slide finger gesture as illustrated in FIGS. 15H-15I. With selection 1510 at a first position, a user can perform a diagonal-slide finger gesture 1520 to 1522 beginning anywhere on touchpad 156. In response to detecting $\Delta Fx$ (a change in the horizontal position) and $\Delta Fy$ (a change in the vertical position) of an uninterrupted finger contact on touchpad 156, the device changes the position of text-object selection 1510 on the display from a first position to a second position. In this exemplary embodiment $\Delta Sx$ is approximately proportional to $\Delta Fx$ and $\Delta Sy$ is approximately proportional to $\Delta Fy$ as illustrated in FIGS. 15H-15I. The device displays UI 1500I (FIG. 15I) with selection 1510 at a second position. In this example, $Kx \sim 1$ and $Ky \sim 1$ In some embodiments where, Kx, the proportionality constant for the x-component of the finger motion, is a function of the time rate of change of finger position in the x-direction (the x-component of the slide gesture speed), and Ky, the proportionality constant for the y-component of the finger motion, is made a function of the time rate of change of finger position in the y-direction (the y-component of the slide gesture speed). This approach enables a user to quickly and accurately move text-object selection 1510 within editable text-object content. A user can quickly move text-object selection 1510 with a high-speed slide gesture where Kx>1 and Ky>1 and accurately move text-object selection 1510 to its final position with a low-speed slide gesture where Kx<1 and Ky<1.

Methods for moving a text-object selection with editable text-object content have been described. Similar methods can be used for moving a text-object selection within read-only text-object content.

Figure 15J:
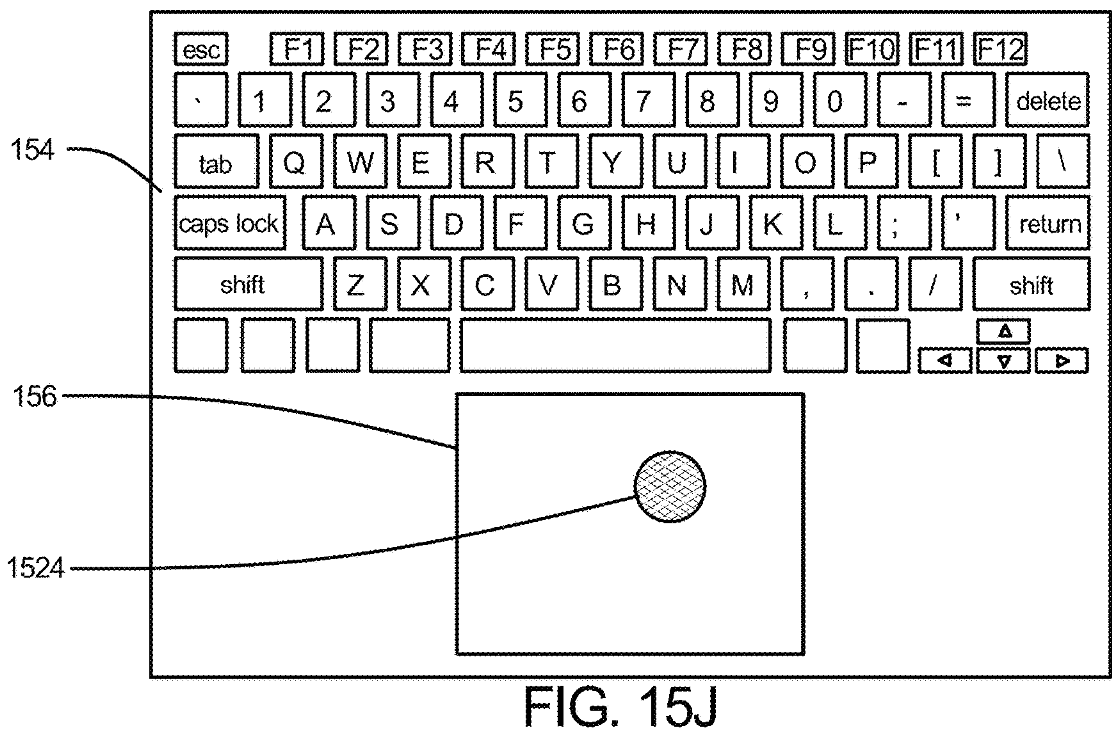
FIGS. 15J-15W—illustrate an exemplary user interface and method for displaying a text-object selection within text-object content (a spreadsheet), displaying a zero-length selection within an editable text-object (a spreadsheet cell), and moving the zero-length selection within the editable text-object (a spreadsheet cell), on a mobile computing device with a display, using gestures on a touchpad in accordance with some embodiments.
Figure 15K:
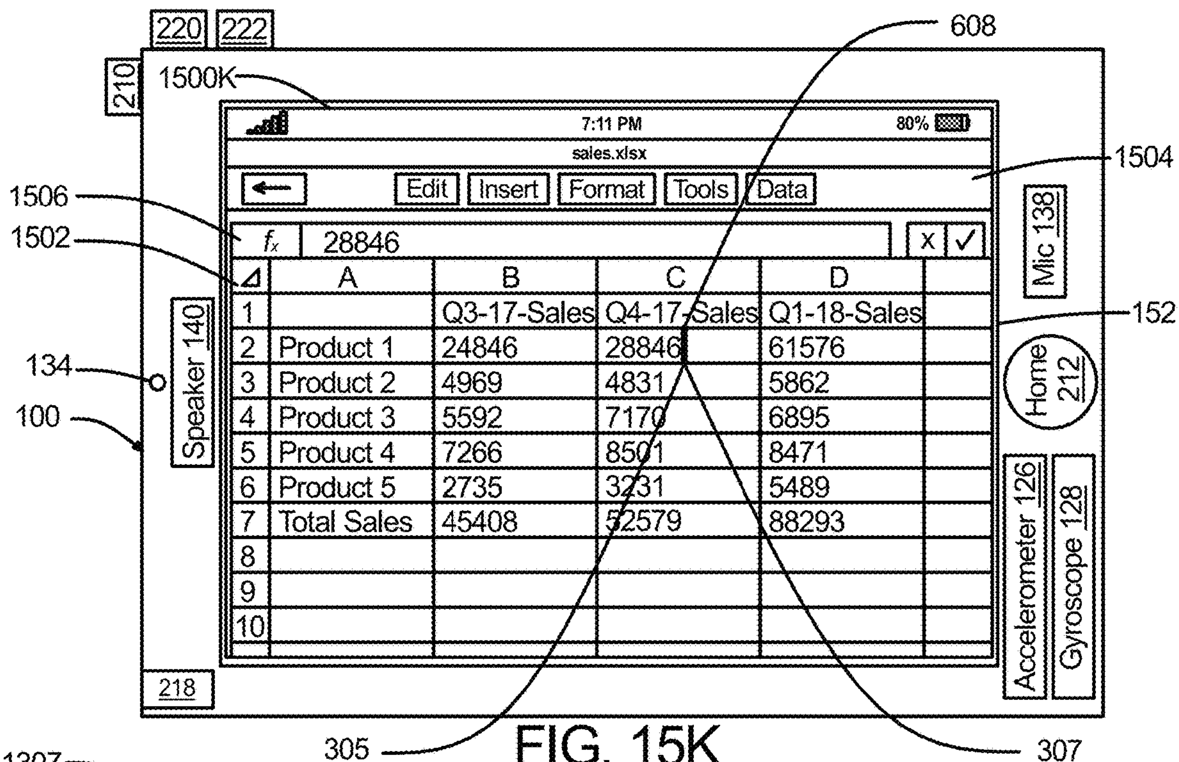
FIGS. 15X-15QQ—illustrate an exemplary user interface and method for performing a secondary-click action with respect to selected text-objects (spreadsheet cells) within editable text-object content (a spreadsheet), on a mobile computing device with a display, using gestures on a touchpad in accordance with some embodiments.

15.2 Displaying and positioning a zero-length selection within an editable text-object (a spreadsheet cell) using gestures on a touchpad: FIGS. 15J-15W—illustrate an exemplary user interface and method for displaying a text-object selection 1510 within editable text-object content (a spreadsheet), displaying zero-length selection 608 within an editable text-object (a spreadsheet cell), and moving the zero-length selection 608 within the editable text-object, on a mobile computing device with a display, using gestures on a touchpad in accordance with some embodiments.

The device can display text-object selection 1510 within editable text-object content 1502 as illustrated in UI 1500I (FIG. 15I). The device can also display application navigation bar 1504. A user can perform a finger gesture 1524 (a double-tap or double-click gesture for example) on touchpad 156 as illustrated in FIG. 15J. In response to detecting the finger gesture 1504 on touchpad 156, the device displays zero-length selection 608 at a first selection position within the selected text-object as illustrated in UI 1500K (FIG. 15K). Selection 608 has a selection start point 305 and a selection end point 307. In the case of zero-length selection 608, selection start point 305 and selection end point 307 are coincident. In one exemplary embodiment, the first selection position is after the last character within the text object as illustrated in UI 1500K (FIG. 15K). In this disclosure we will often refer to "selection 608 of length equal to zero" simply as "zero-length selection 608" or "selection 608".

Figure 15L:
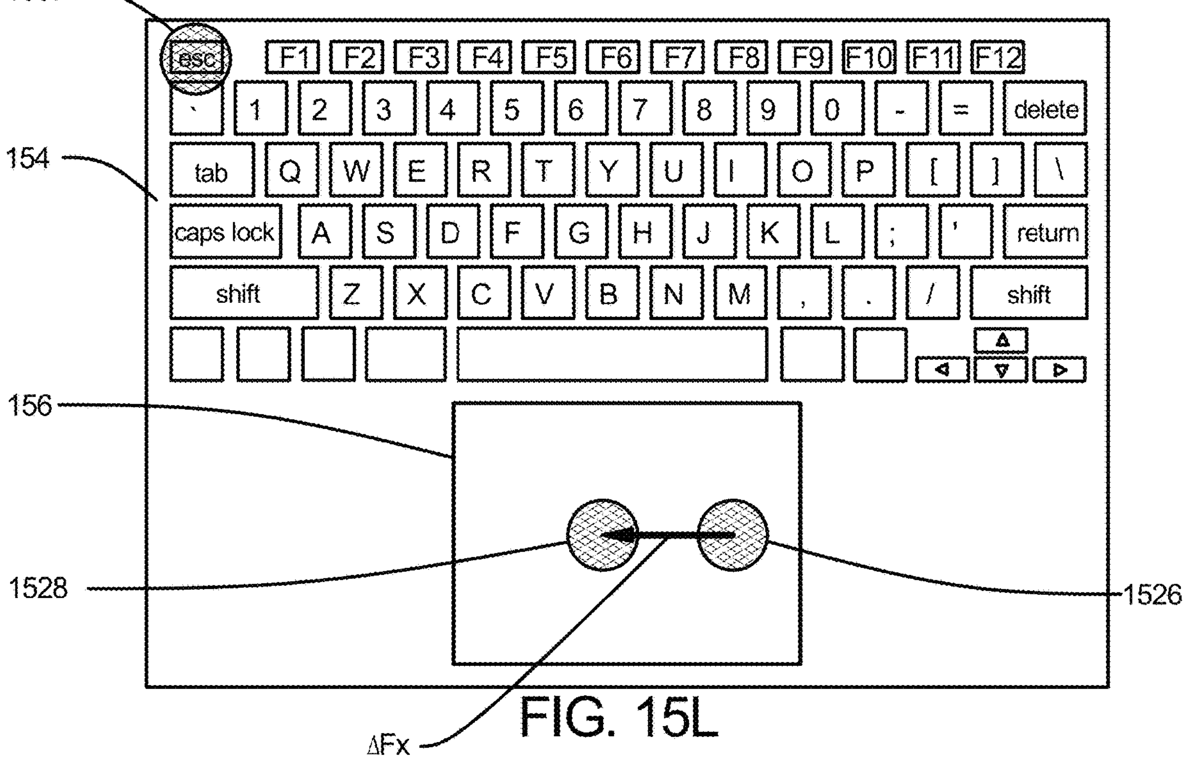
Figure 15M:
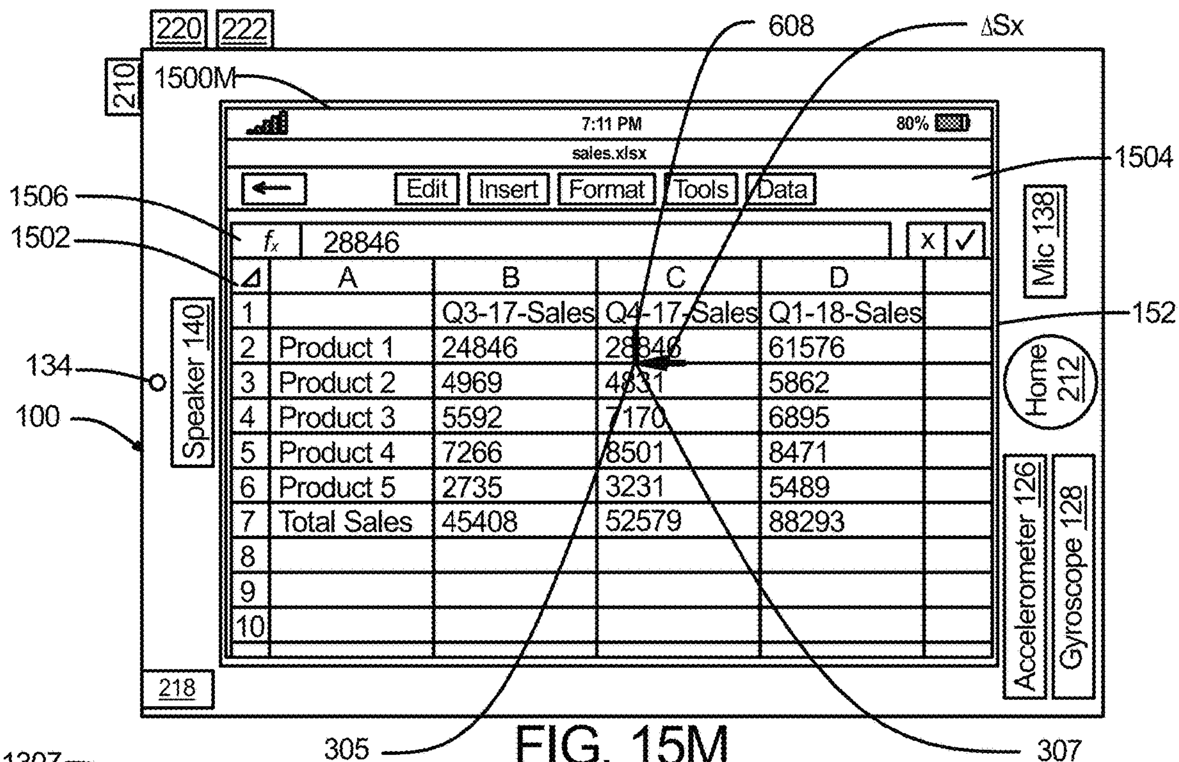

A user can perform a slide finger gesture 1526 to 1528 beginning anywhere on touchpad 156 as illustrated in FIG. 15L. In response to detecting ΔFx (a change in the horizontal position of an uninterrupted finger contact), the device changes the horizontal position of zero-length selection 608 on the display from the first selection position to a second selection position as illustrated in FIGS. 15K-15M). In this exemplary embodiment ΔSx (the change in the horizontal position of selection 608) is approximately proportional to ΔFx as illustrated in FIGS. 15L-15M.

Figure 15N:
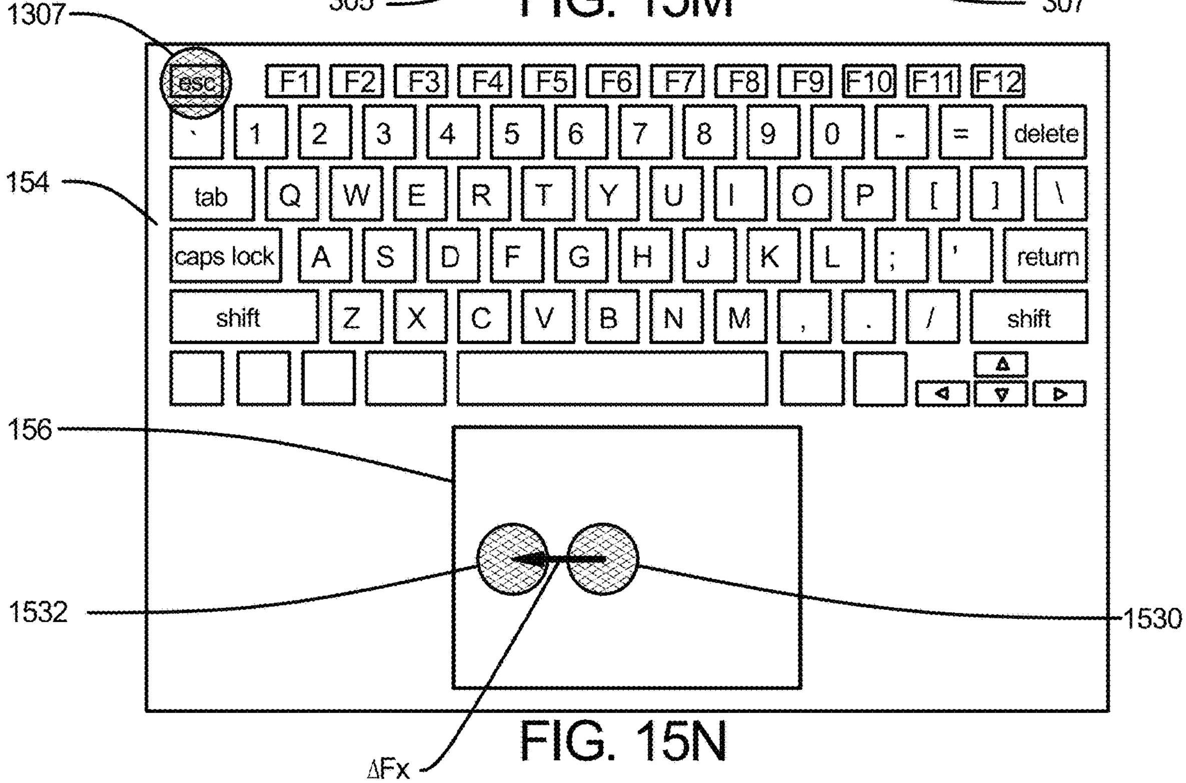
Figure 15O:
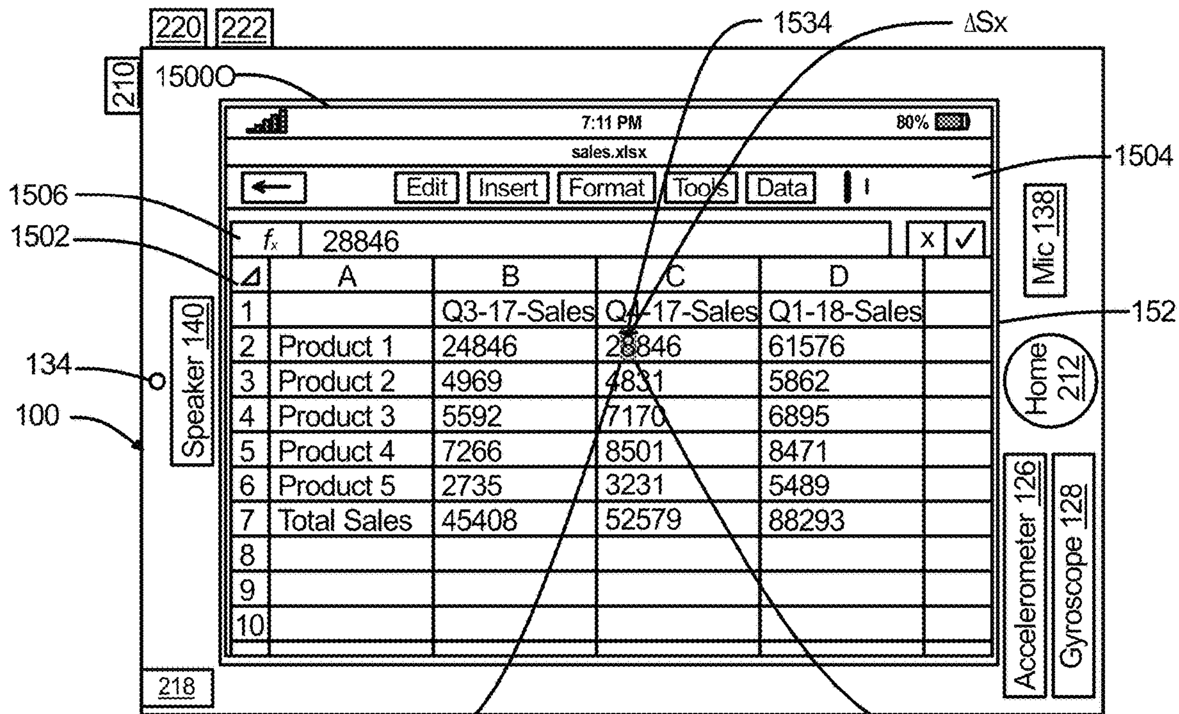

With zero-length selection 608 at a first position as illustrated in FIG. 15M, a user can perform a horizontal tap-and-slide or click-and-slide finger gesture 1530 to 1532 beginning anywhere on touchpad 156. In response to detecting a tap and change in the horizontal position (ΔFx) of an uninterrupted finger contact on the touchpad 156 as illustrated in FIG. 15N, the device changes the position of selection end point 307 on the display from a first position to a second position as illustrated in FIG. 15O. In this exemplary embodiment ΔSx (the change in the horizontal position of selection 608) is approximately proportional to ΔFx as illustrated in FIGS. 15N-15O. The device displays UI 1500O (FIG. 15O) with selection end point 307 at a second position. In this example, Kx<1. In this example, the "8" character is selected.

Figure 15P:
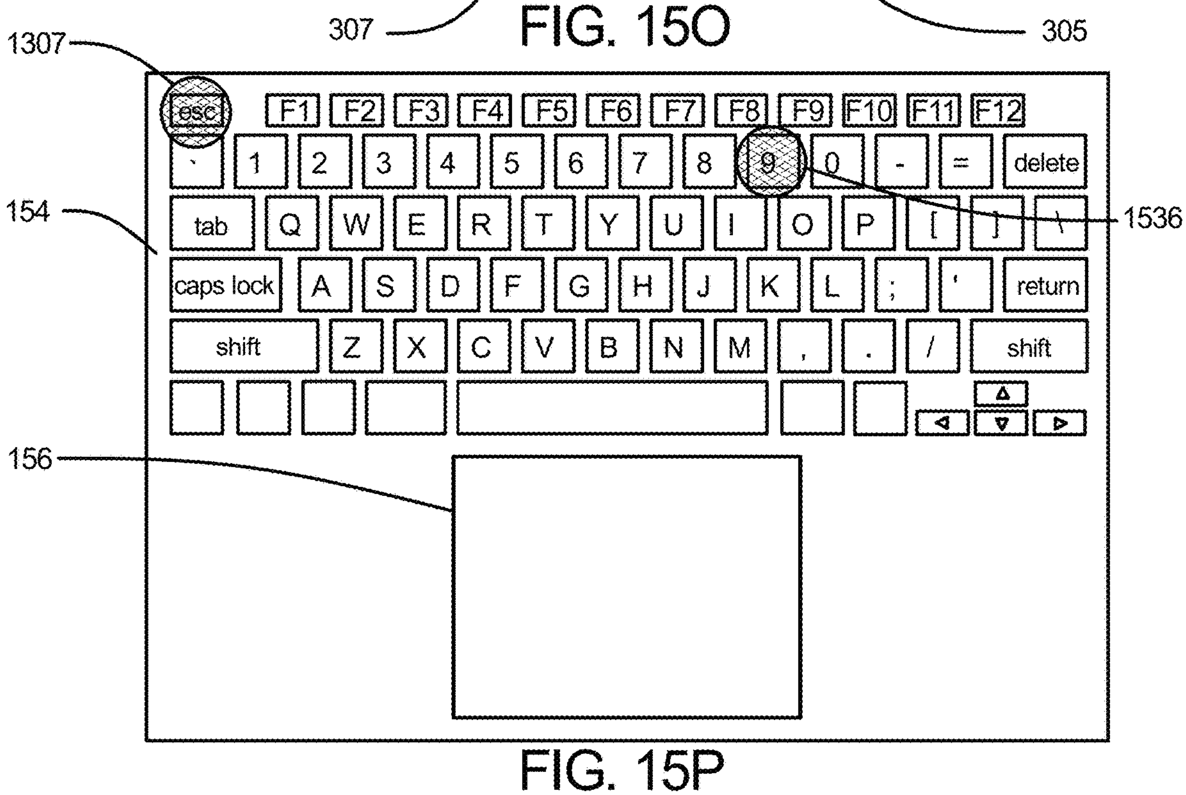
Figure 15Q:
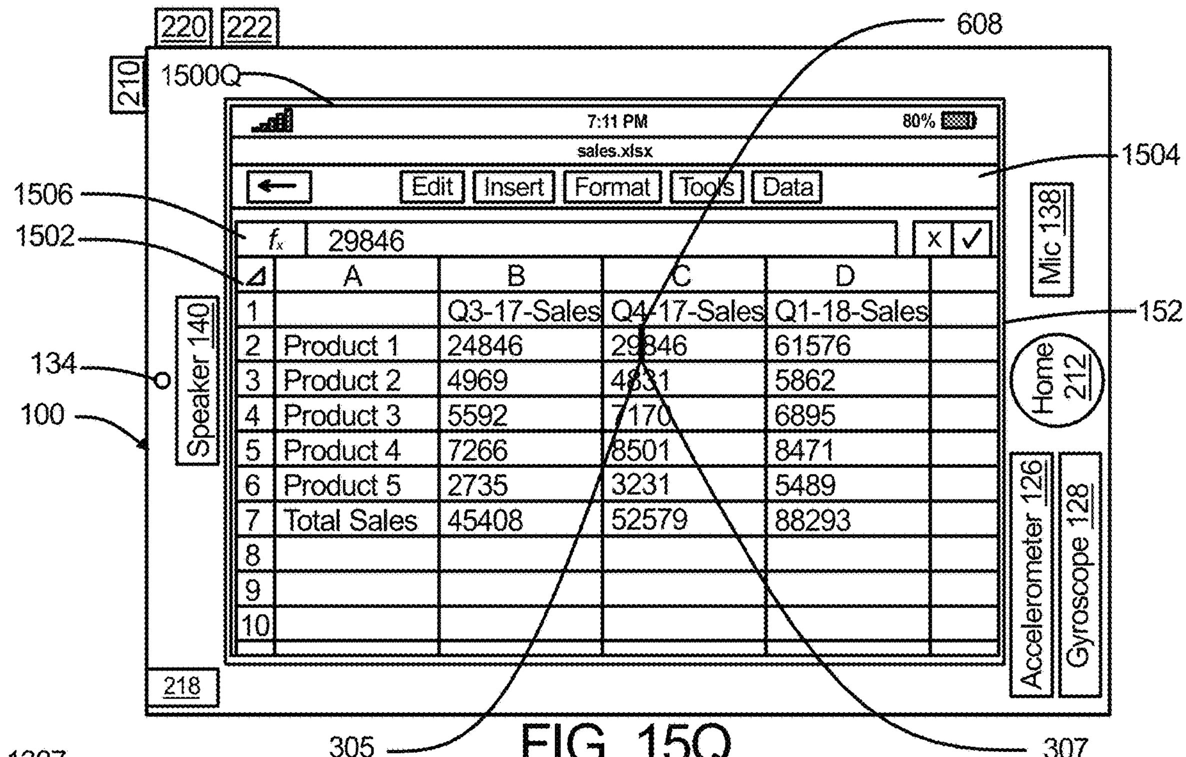
Figure 15R:
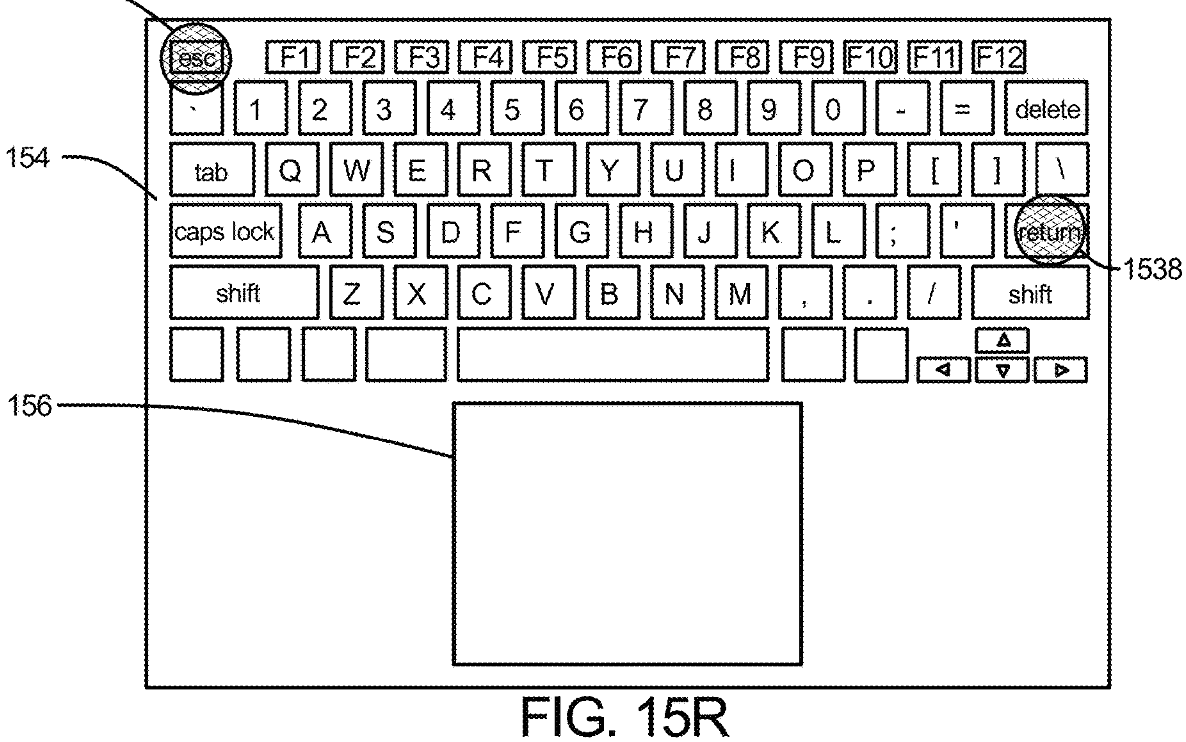
Figure 15S:
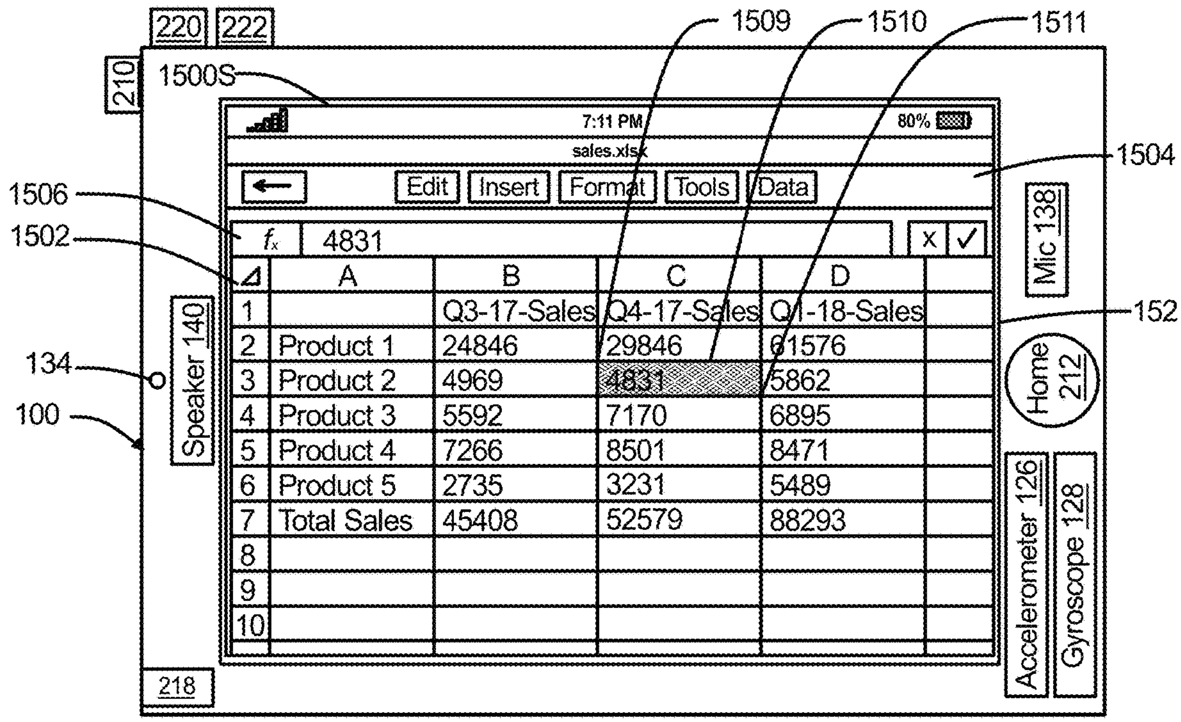

A user can perform at tap 1536 on the "9" key on keyboard 154 as illustrated in FIG. 15P. In response the device replaces the selected "8" character with the "9" character as illustrated in FIG. 15Q. A user can perform a tap 1538 on the "return" key on keyboard 154 as illustrated in FIG. 15R. In response to the user tapping on the "return" key, the device completes the edit action at the selected text object (a spreadsheet cell in this example) and updates the selected cell content from "28846" to "29846" as illustrated in FIG. 15S. In response to the user tapping on the "return" key, the device can also move text-object selection 1510 down by one cell position as illustrated in FIG. 15S. To cancel the pending action, a user can perform a tap 1307 on the "esc" key in lieu of tapping on the ""return" key. In response the device cancels the edit action and displays UI 1500I (FIG. 15I). In an alternative embodiment, the user can tap on touchpad 156 to complete the edit action in lieu of tapping on the "return" key on keyboard 154.

Figure 15T:
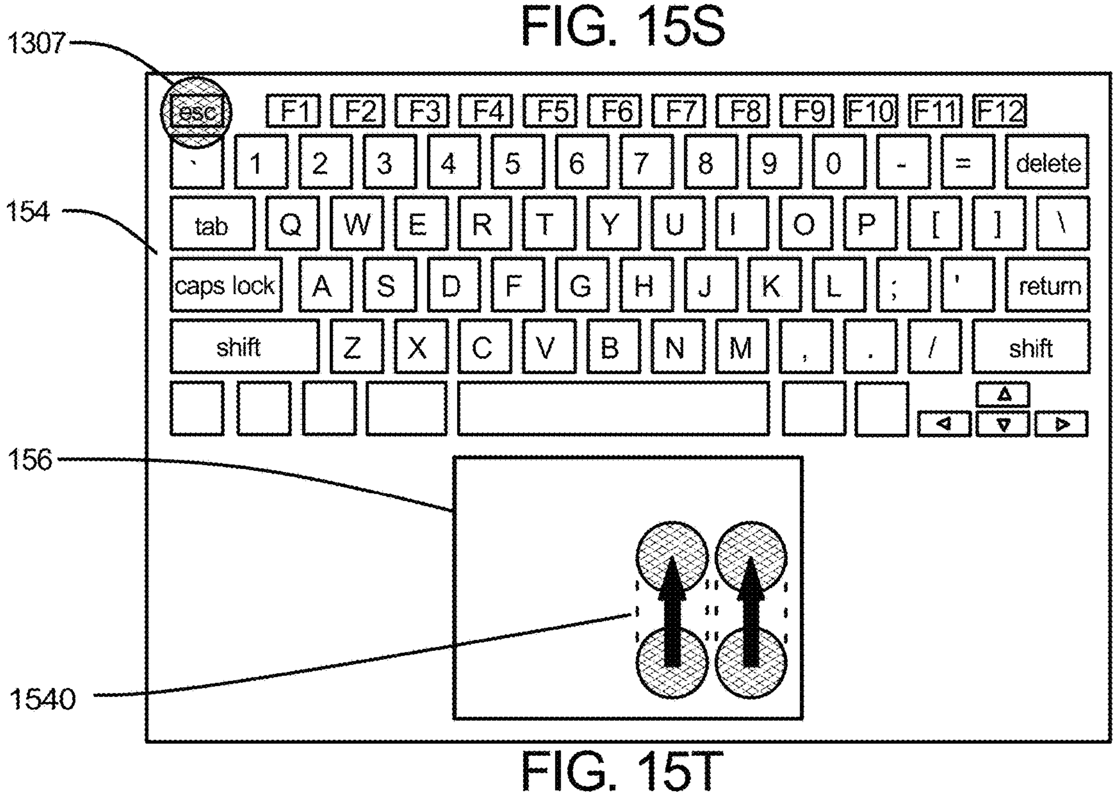
Figure 15U:
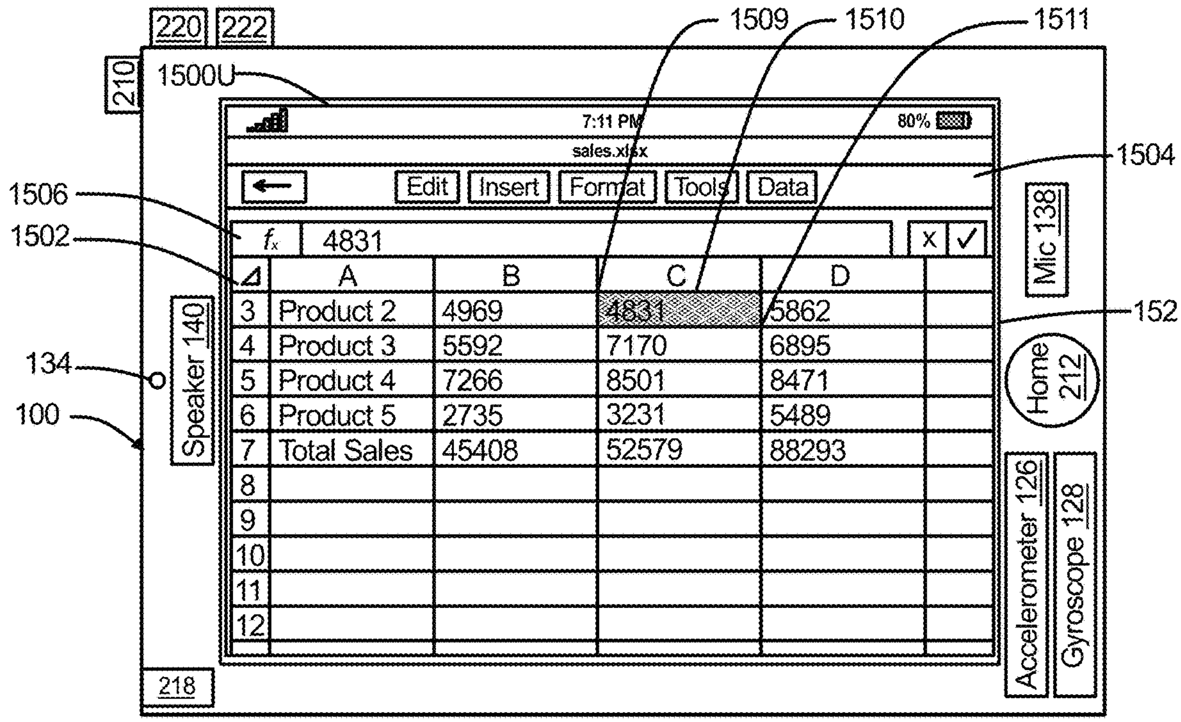
Figure 15V:
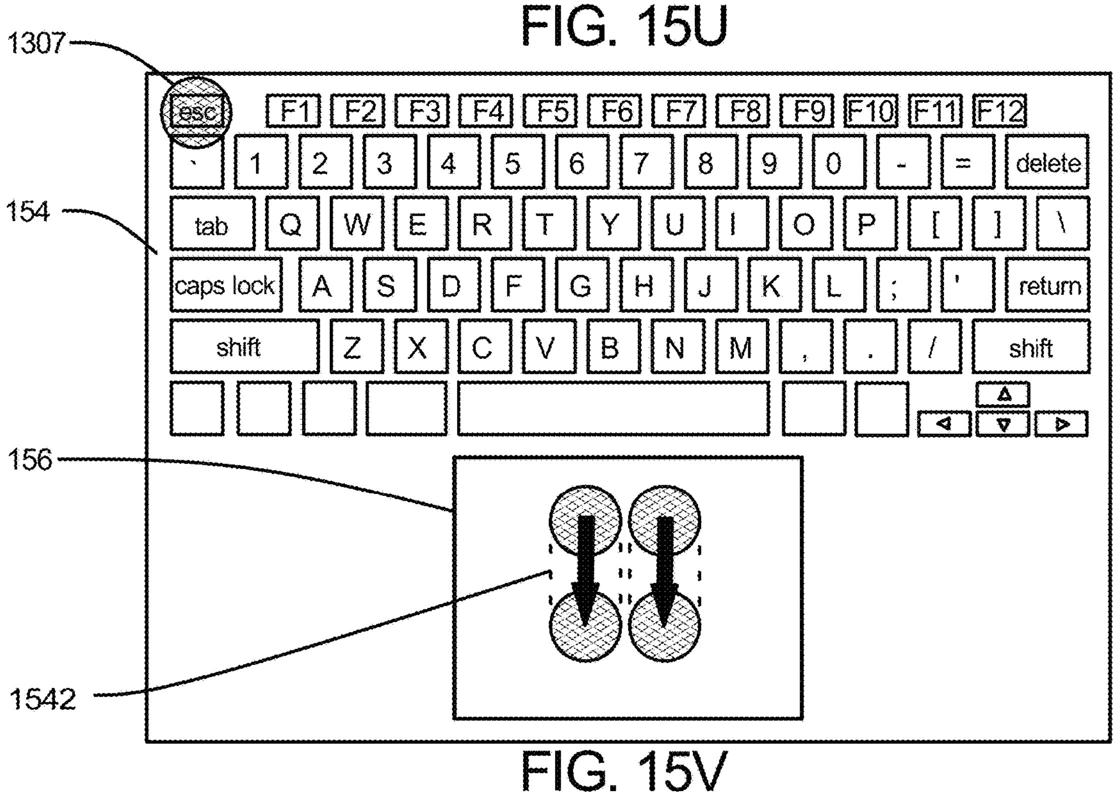
Figure 15W:
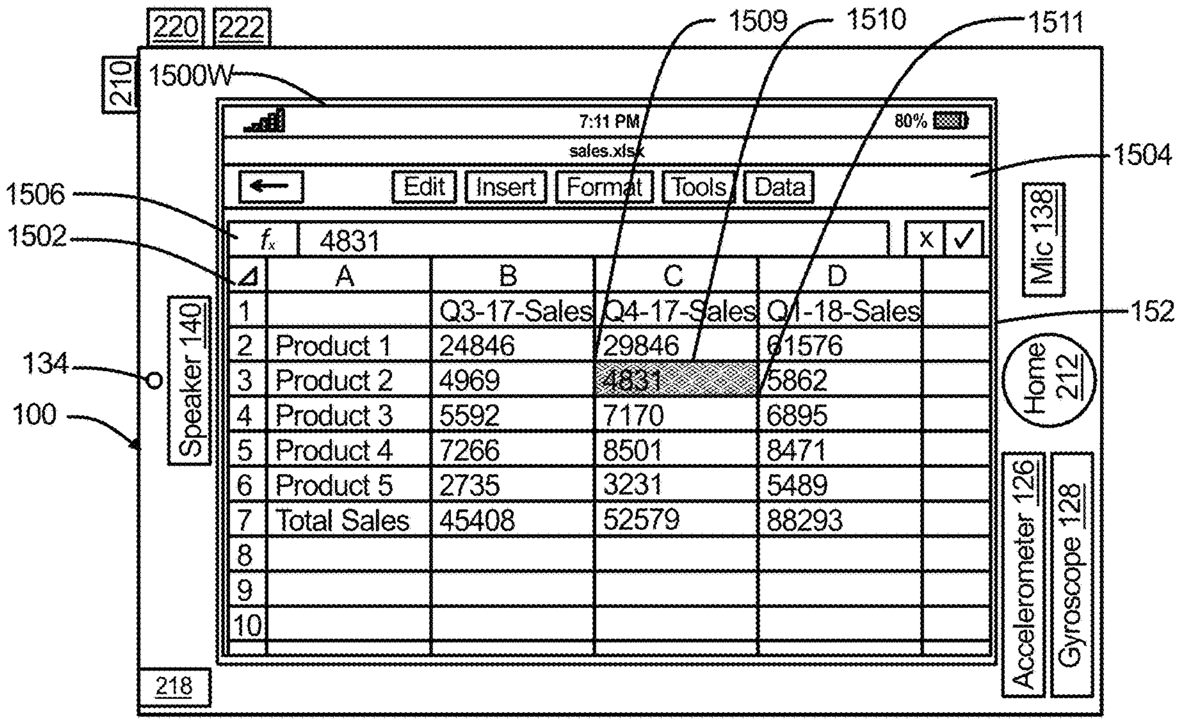

A user can perform a vertical two-finger scroll gesture 1540 on touchpad 156 as illustrated in FIG. 15T. In response to detecting scroll gesture 1540, the device can scroll up editable text-object content 1502 as illustrated in FIG. 15U. A user can perform two-finger vertical scroll gesture 1542 on touchpad 156 as illustrated in FIG. 15V. In response to detecting scroll gesture 1542, the device can scroll down editable text-object content 1502 as illustrated in FIG. 15W.

15.3 Performing a secondary-click action with respect to selected text-objects (spreadsheet cells for example) within editable text-object content (a spreadsheet for example): FIGS. 15W-15QQ—illustrate an exemplary user interface and method for performing a secondary-click action with respect to selected text-objects (spreadsheet cells for example) within editable text-object content (a spreadsheet for example), on a mobile computing device with a display, using gestures on a touchpad in accordance with some embodiments.

Figure 15X:
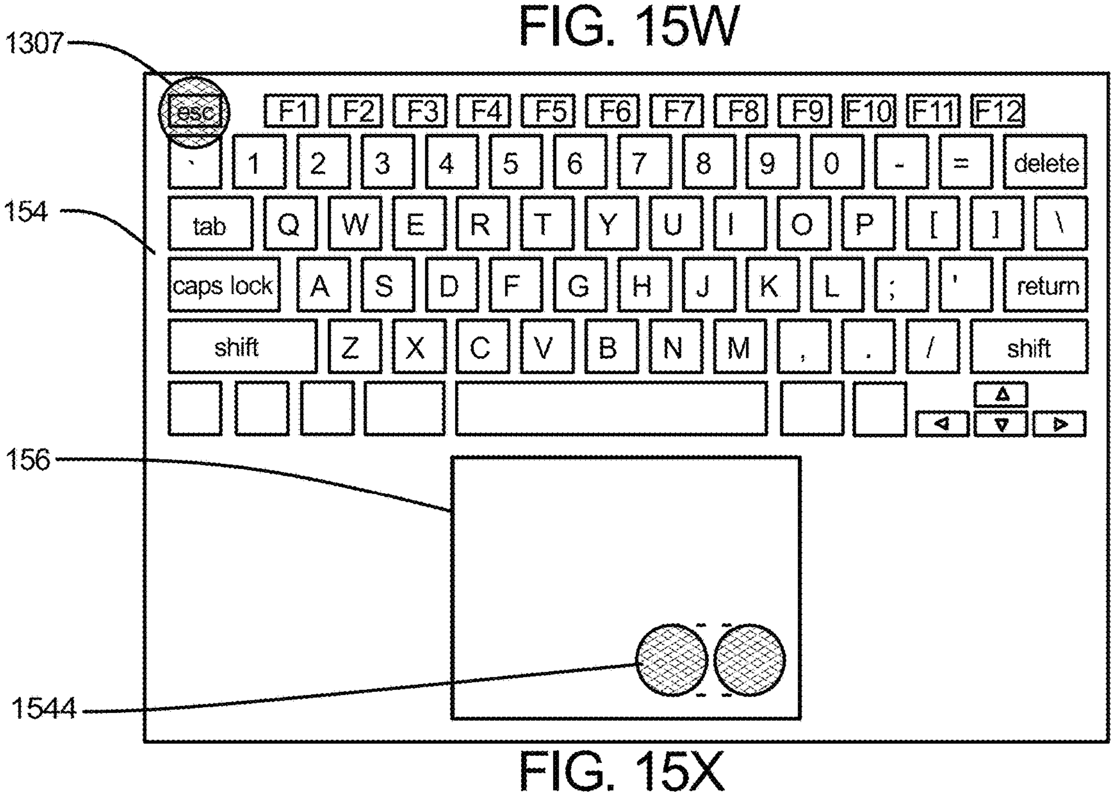
Figure 15Y:
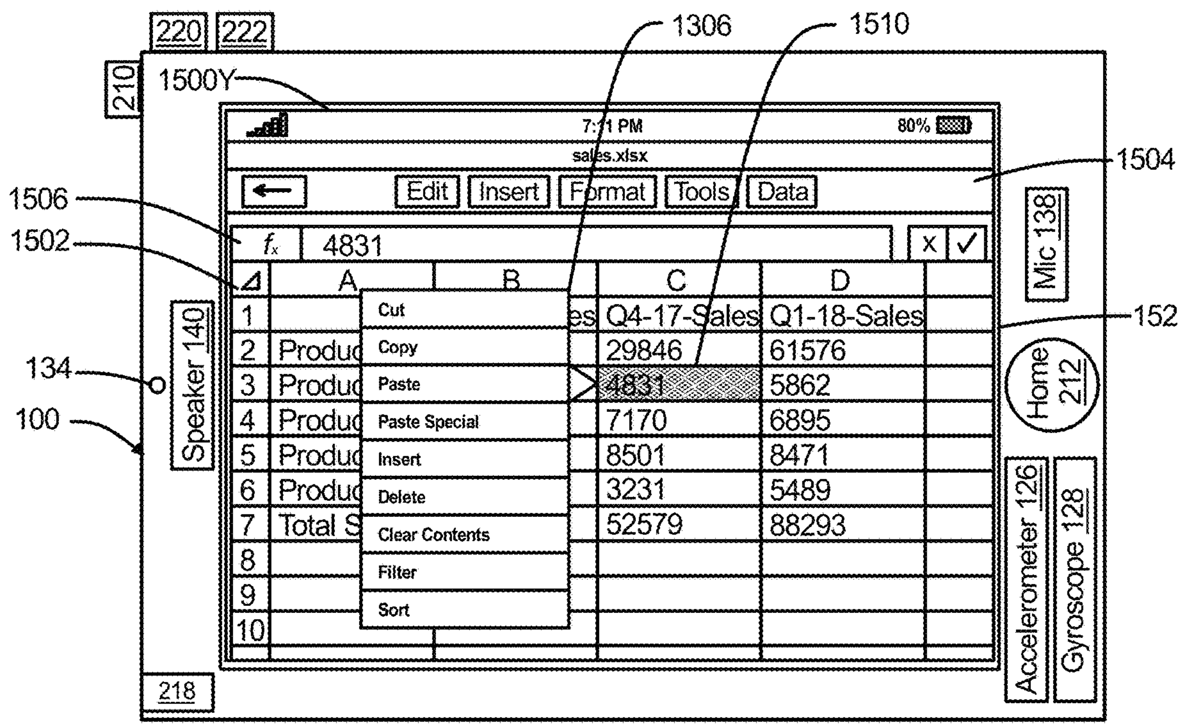

The device can display text-object selection 1510 within editable text-object content 1502 as illustrated in UI 1500W (FIG. 15W). A user can perform secondary-click gesture 1544 (a two-finger tap or two-finger click gesture for example) anywhere on touchpad 156 as illustrated in FIG. 15X. In response to detecting secondary-click gesture 1544 on touchpad 156, the device displays secondary-click menu 1306 adjacent to text-object selection 1510 as illustrated in UI 1500Y (FIG. 15Y).

Cancel action: A user can perform a tap 1307 on the "esc" key on keyboard 154. In response to detecting finger tap 1307 on "esc" key on keyboard 154, the device cancels the display of the menu and redisplays UI 1500W (FIG. 15W).

Secondary-click menu 1306 displays a list of actions that can be performed with respect to text-object selection 1510. In the example shown the text object is a spreadsheet cell. In the example shown, the secondary-click actions include, but are not limited to, Cut, Copy, Paste, Paste Special, Insert, Delete, Clear Contents, Filter, and Sort. A similar approach can be used to perform an action with respect to an extended selection comprising multiple text-objects (multiple spreadsheet cells for example) within an editable spreadsheet.

Figure 15Z:
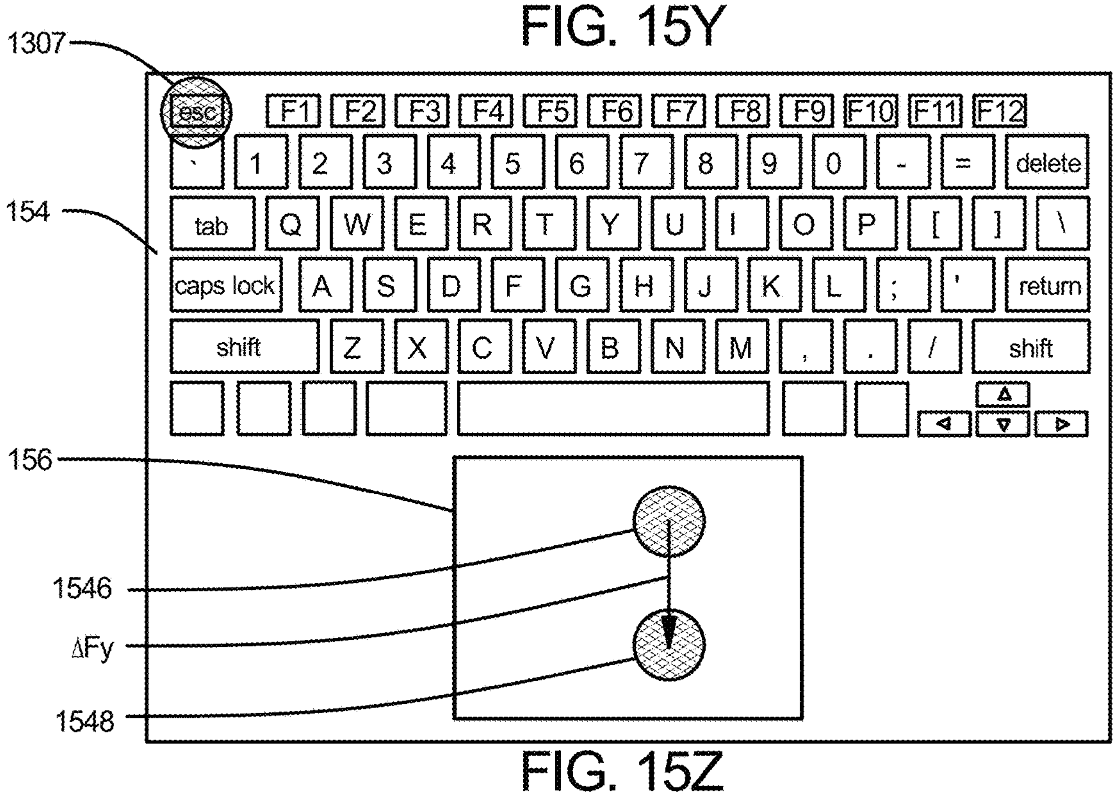
Figure 15A:
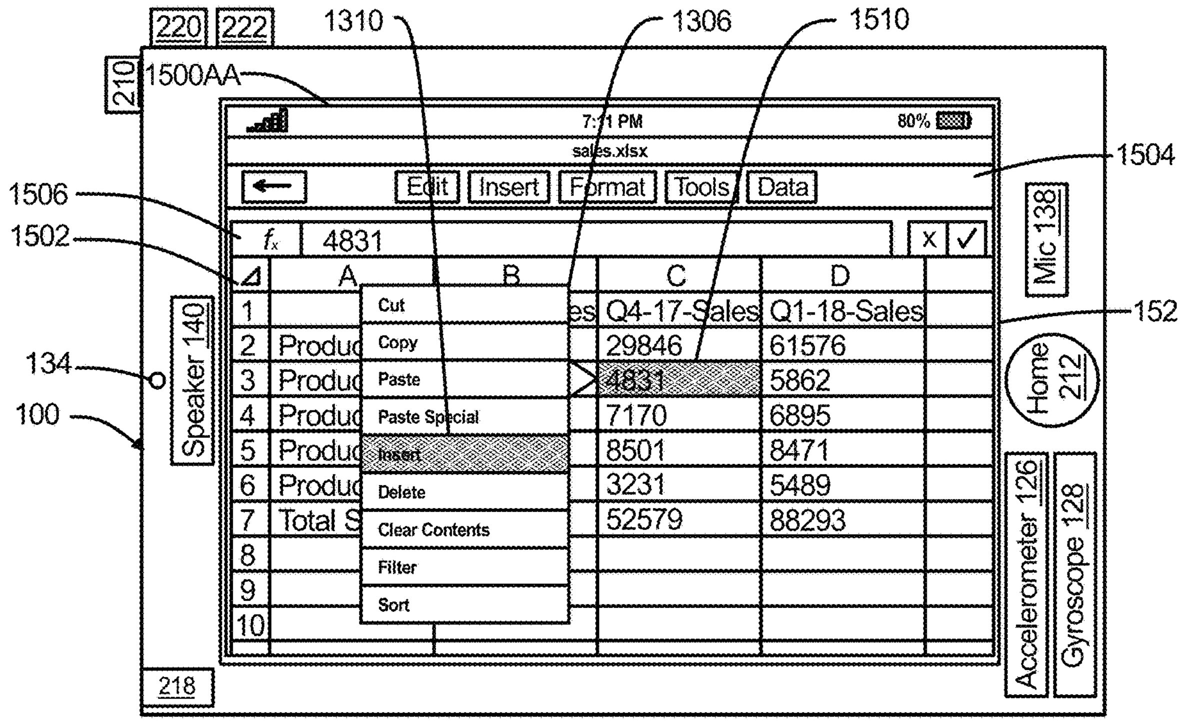
Figure 15B:
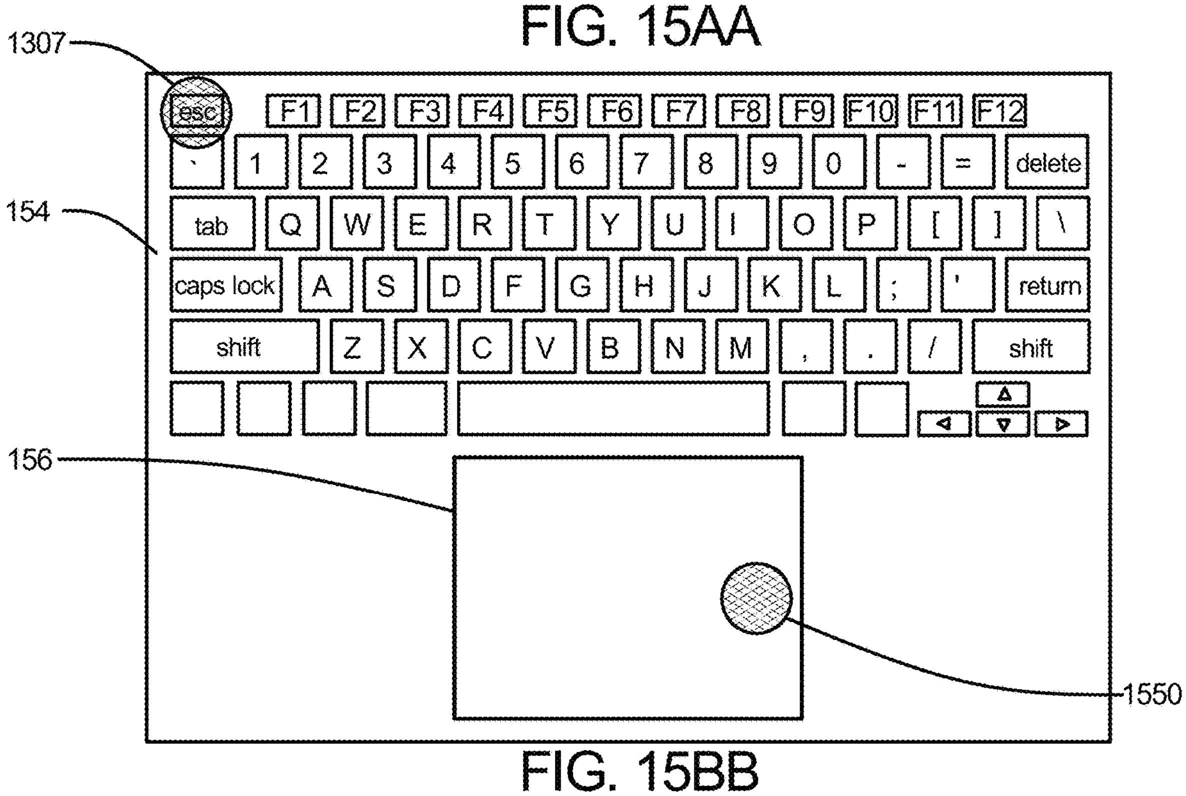
Figure 15C:
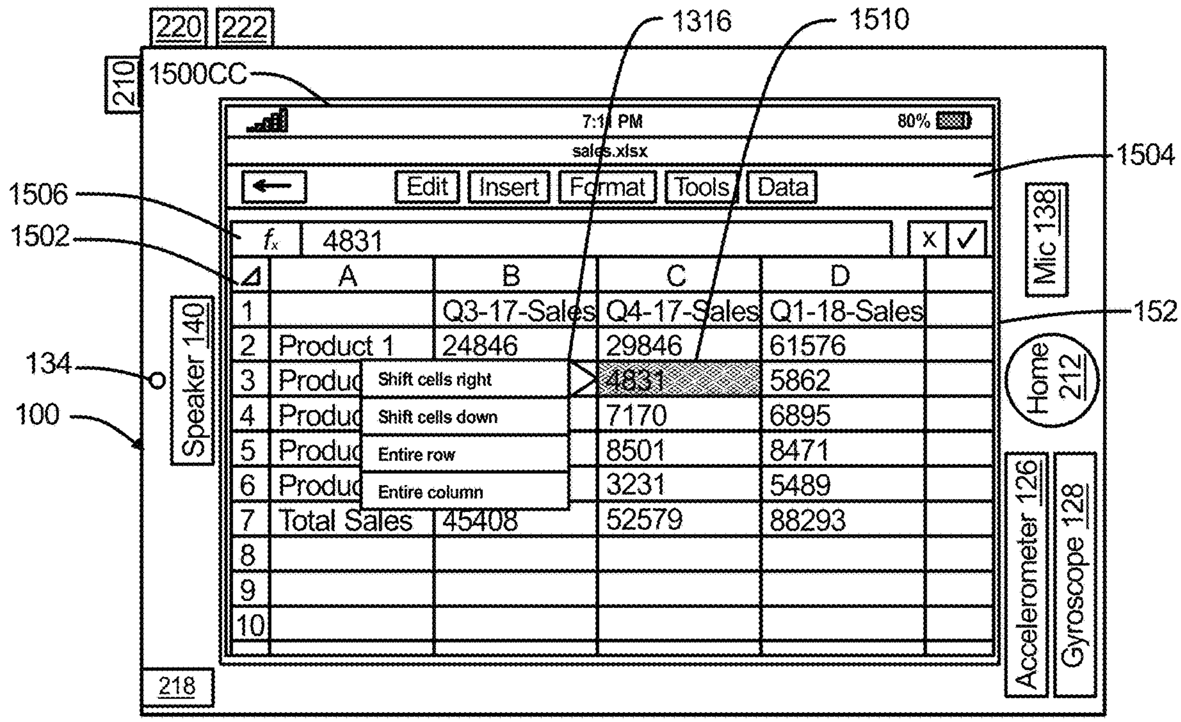
Figure 15D:
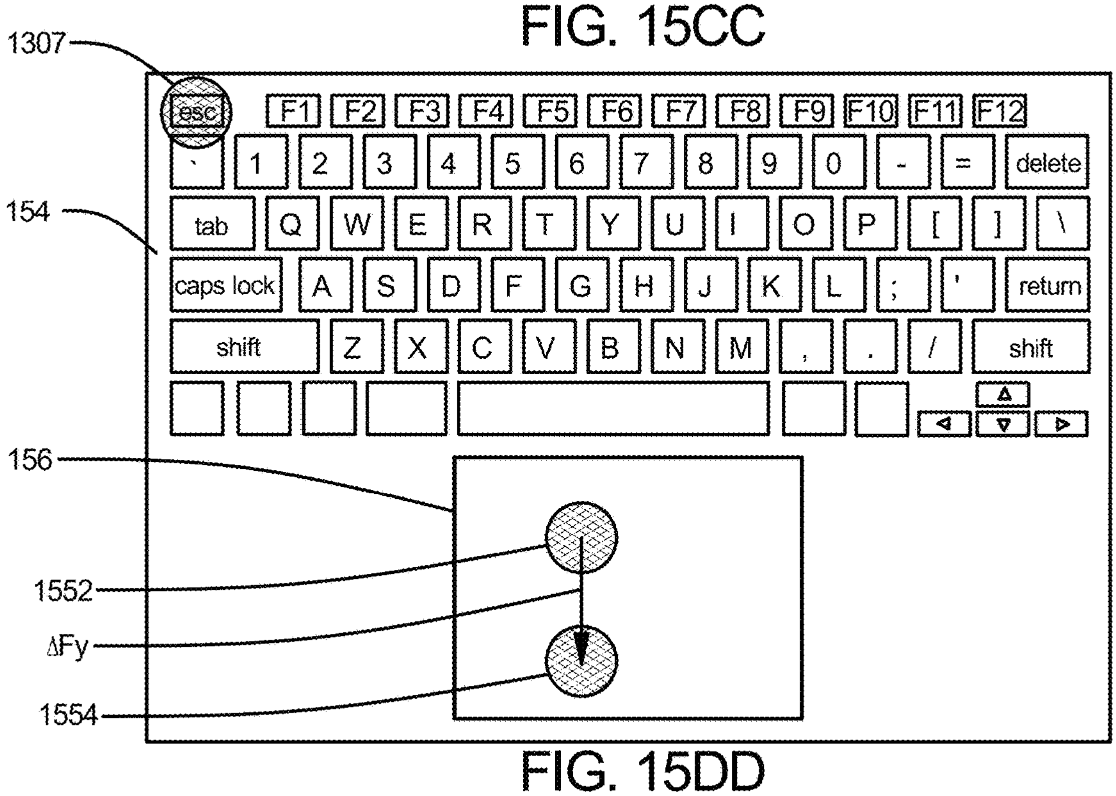
Figure 15E:
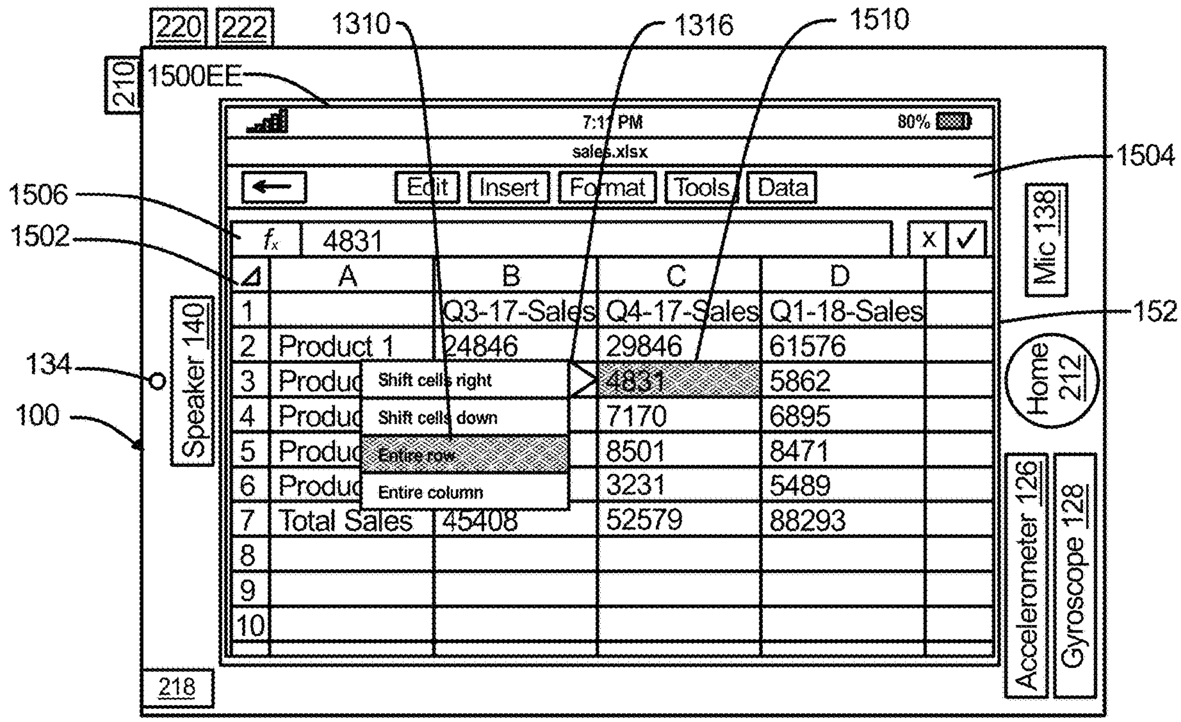
Figure 15F:
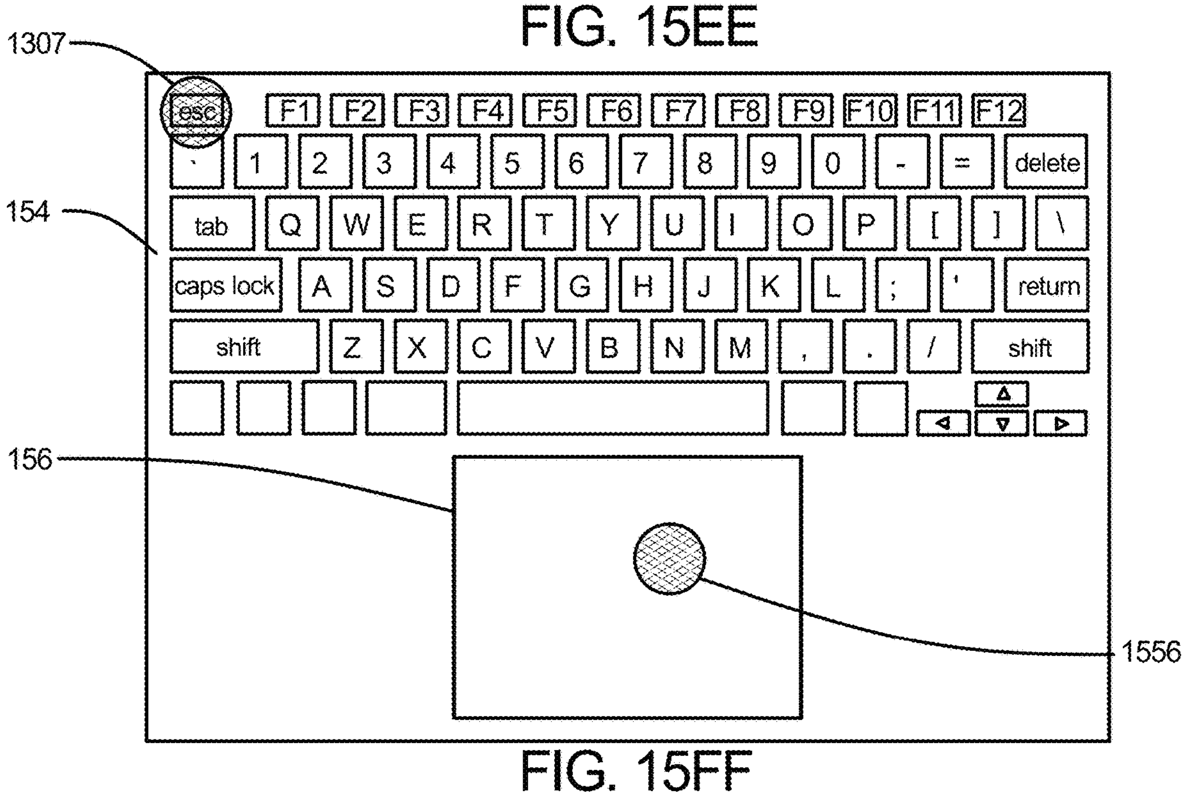
Figure 15G:
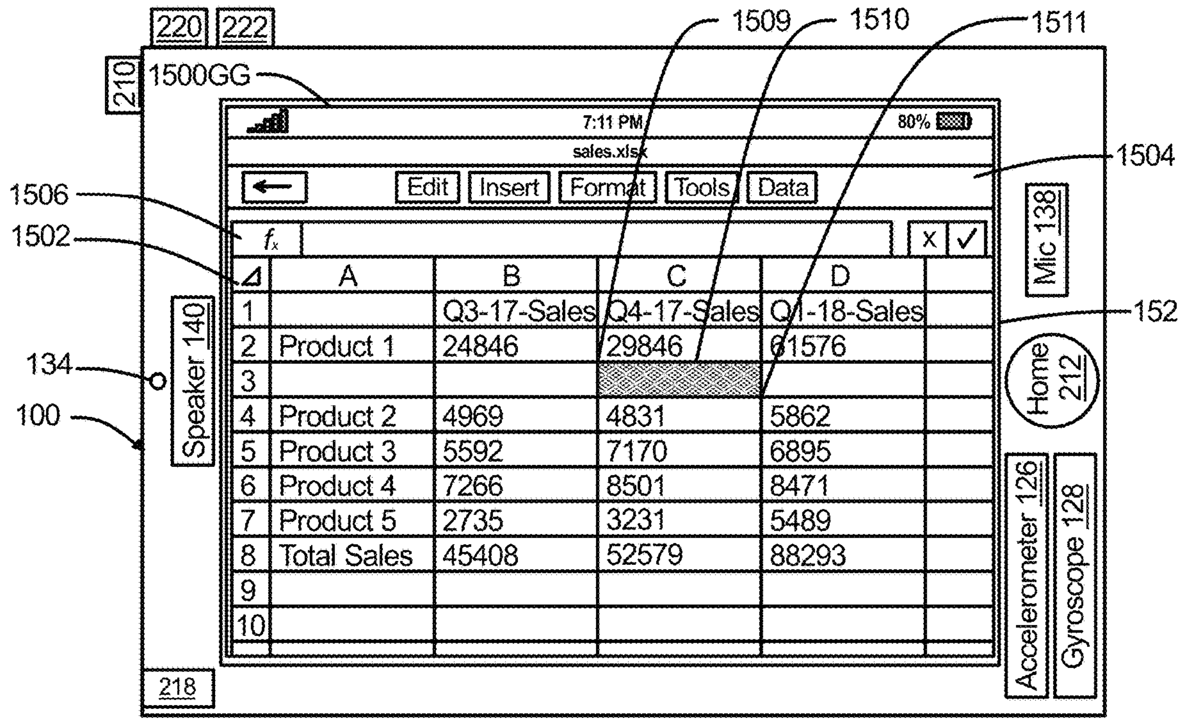
Figure 15H:
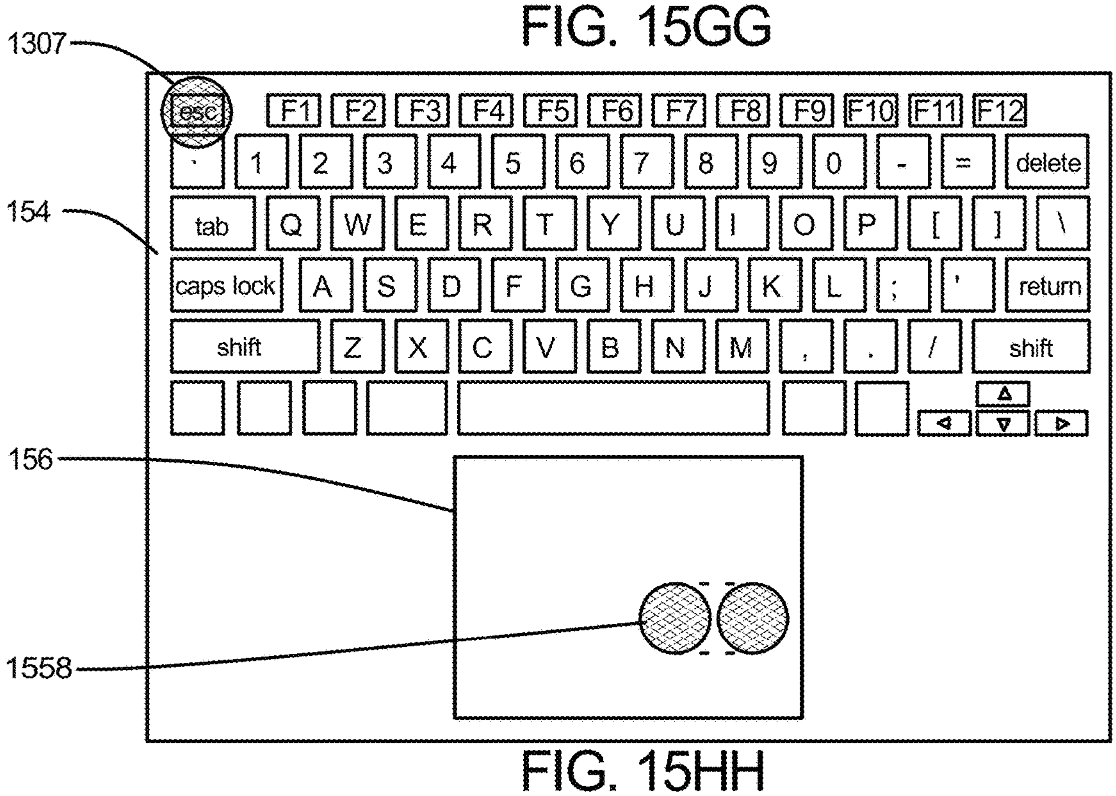
Figure 15I:
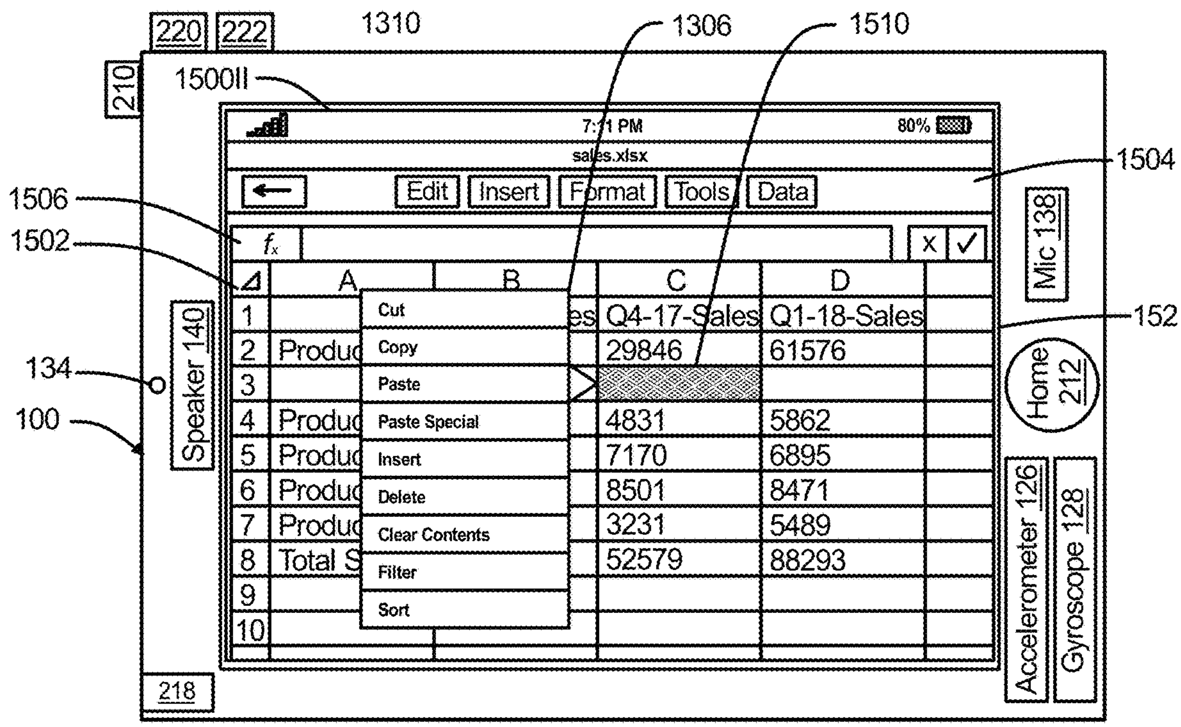
Figure 15J:
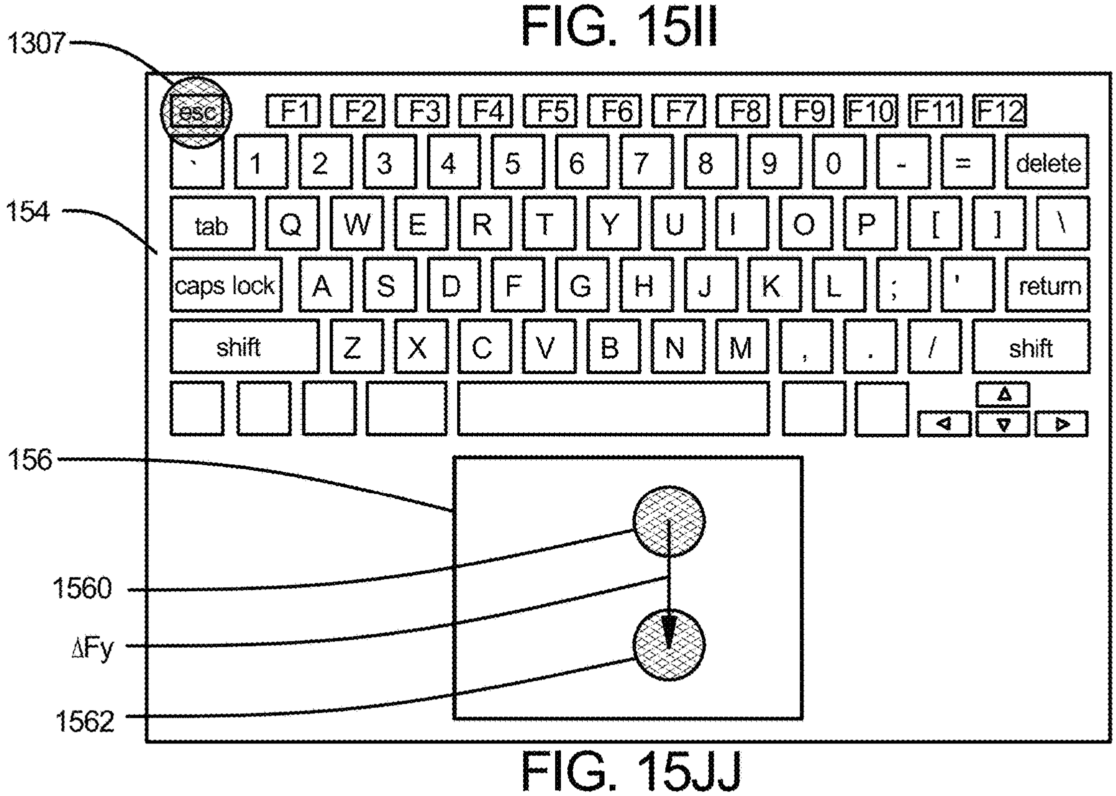
Figure 15K:
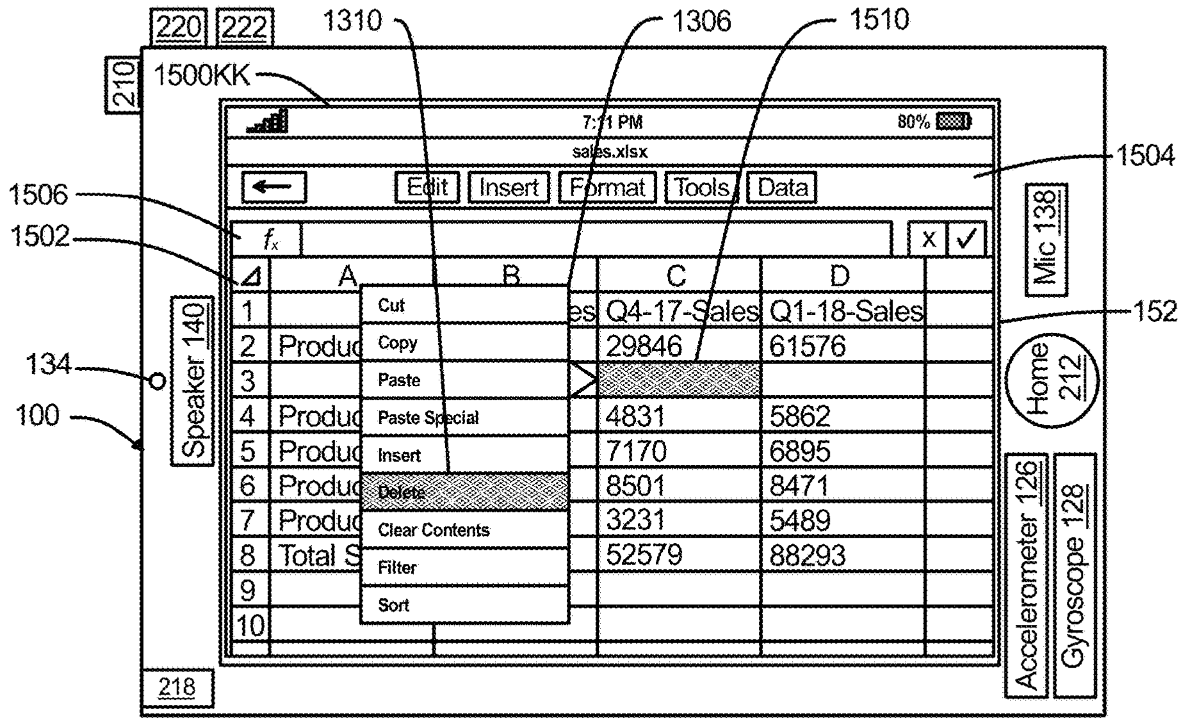
Figure 15L:
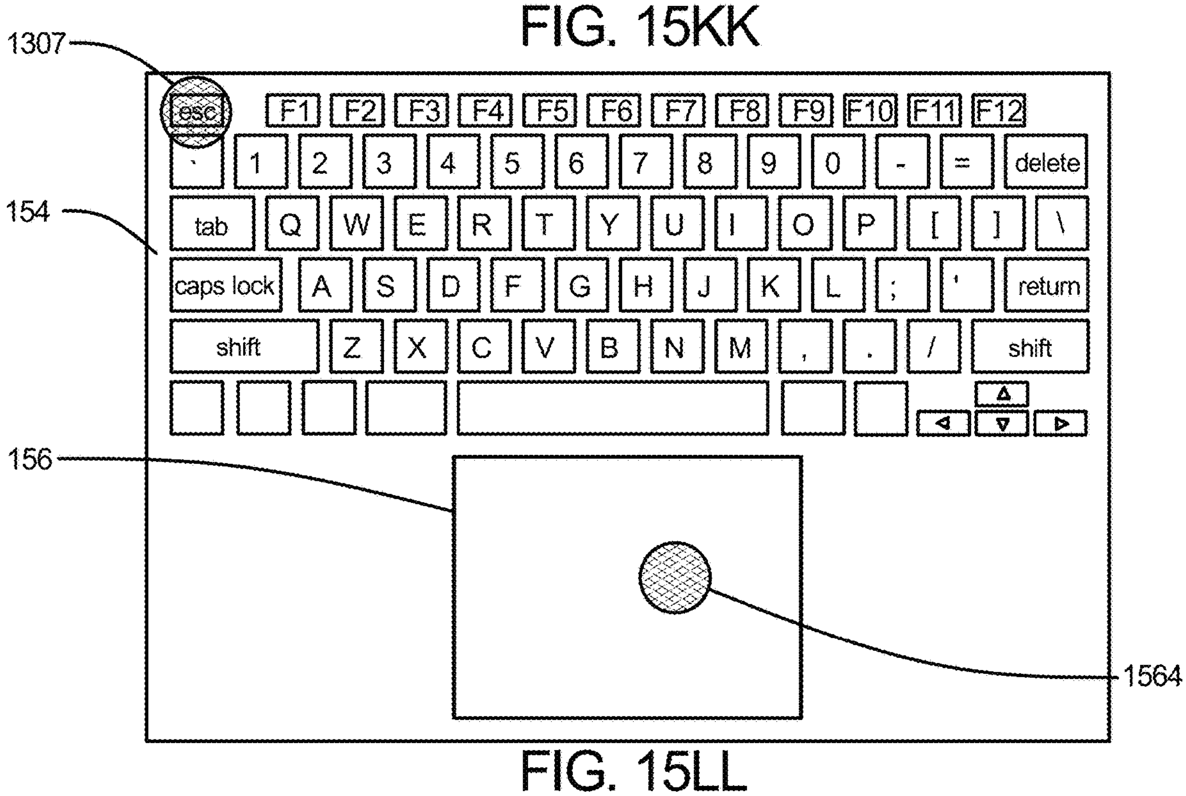
Figure 15M:
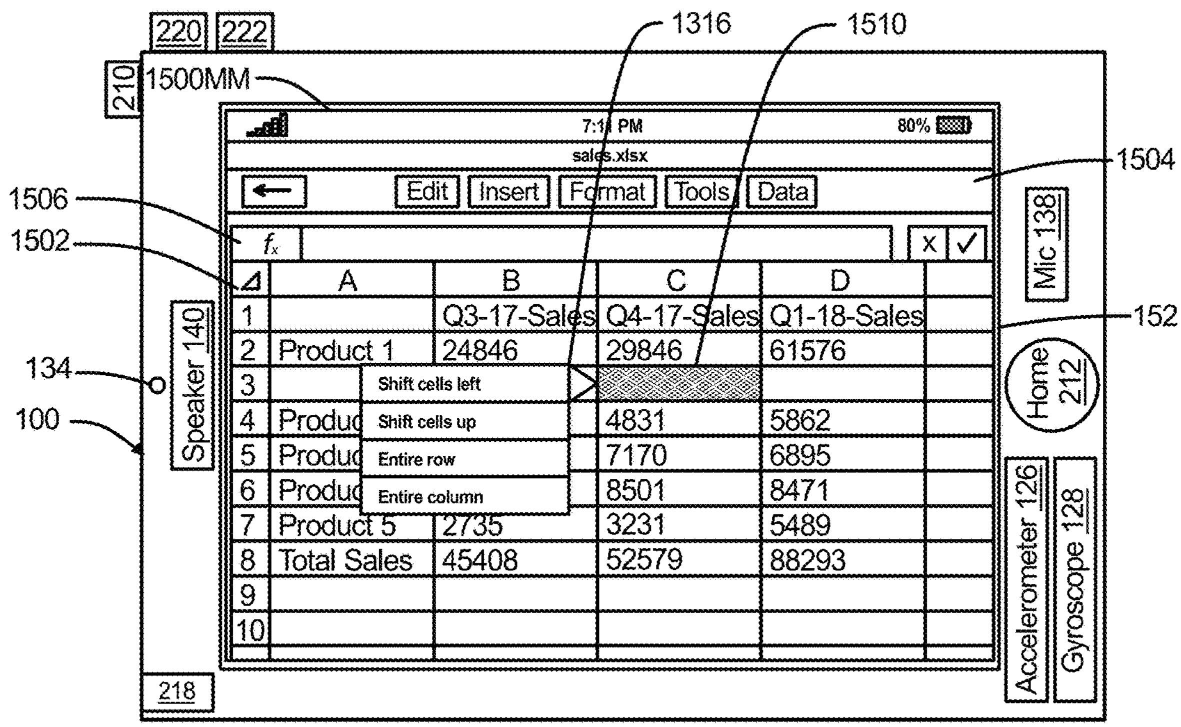
Figure 15N:
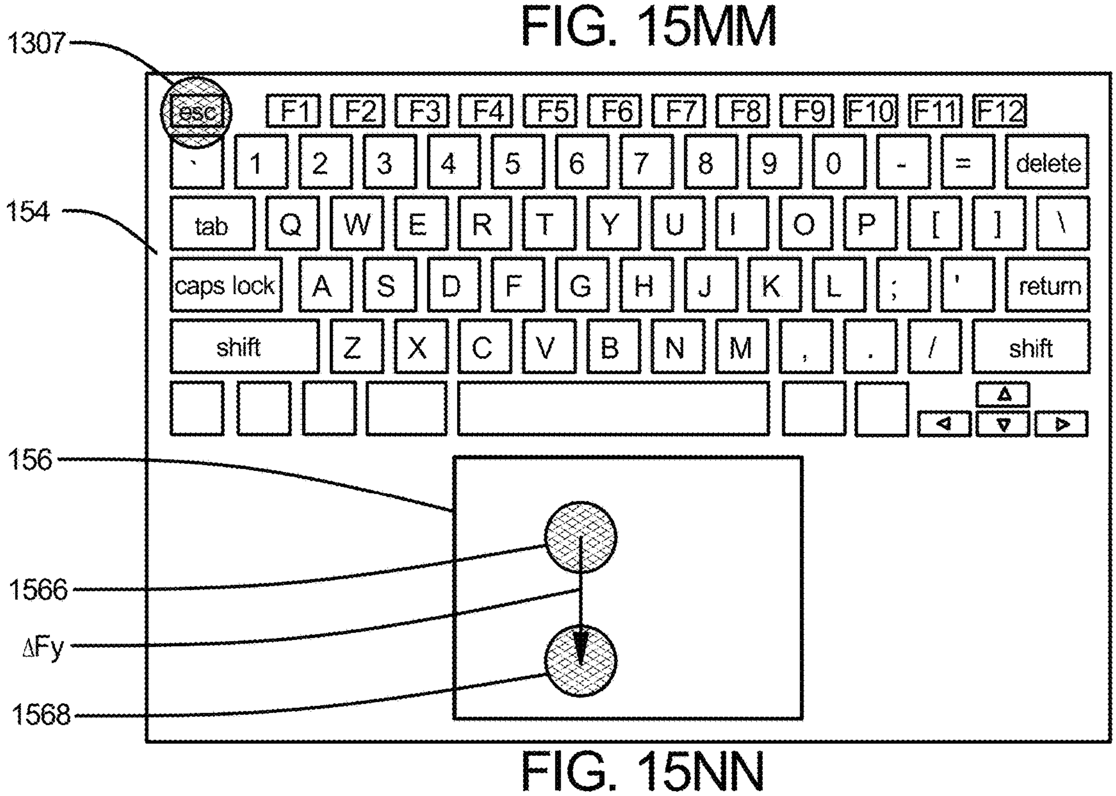
Figure 15O:
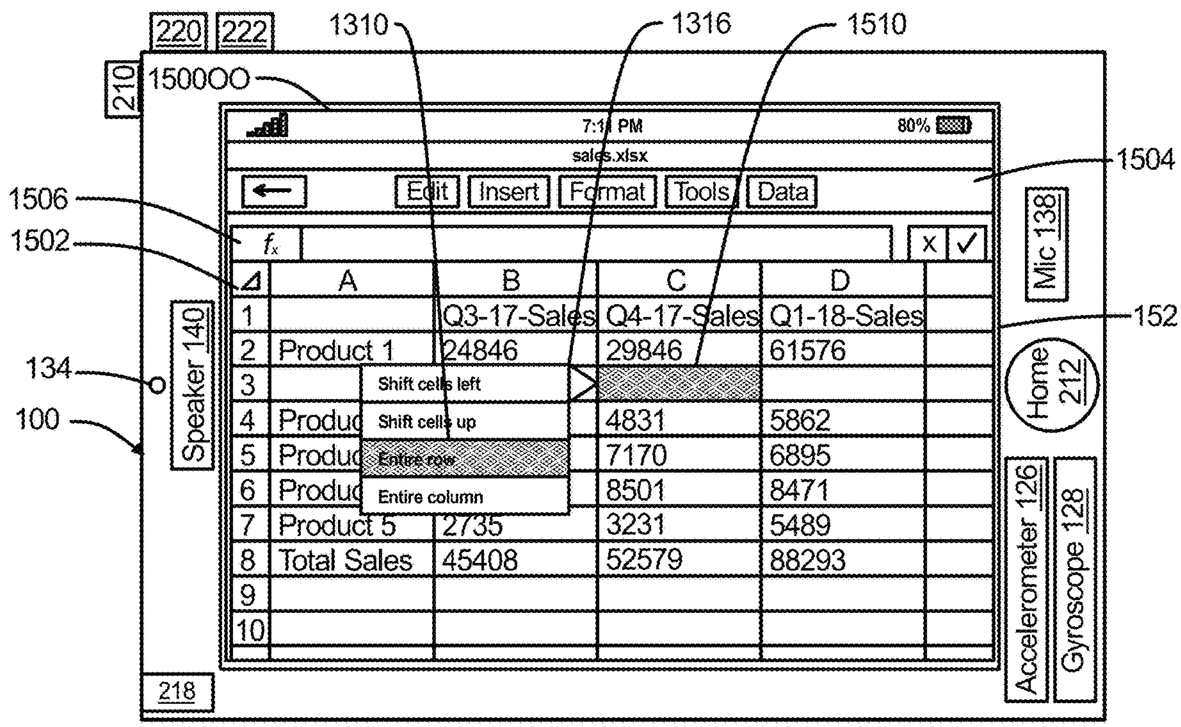
Figure 15P:
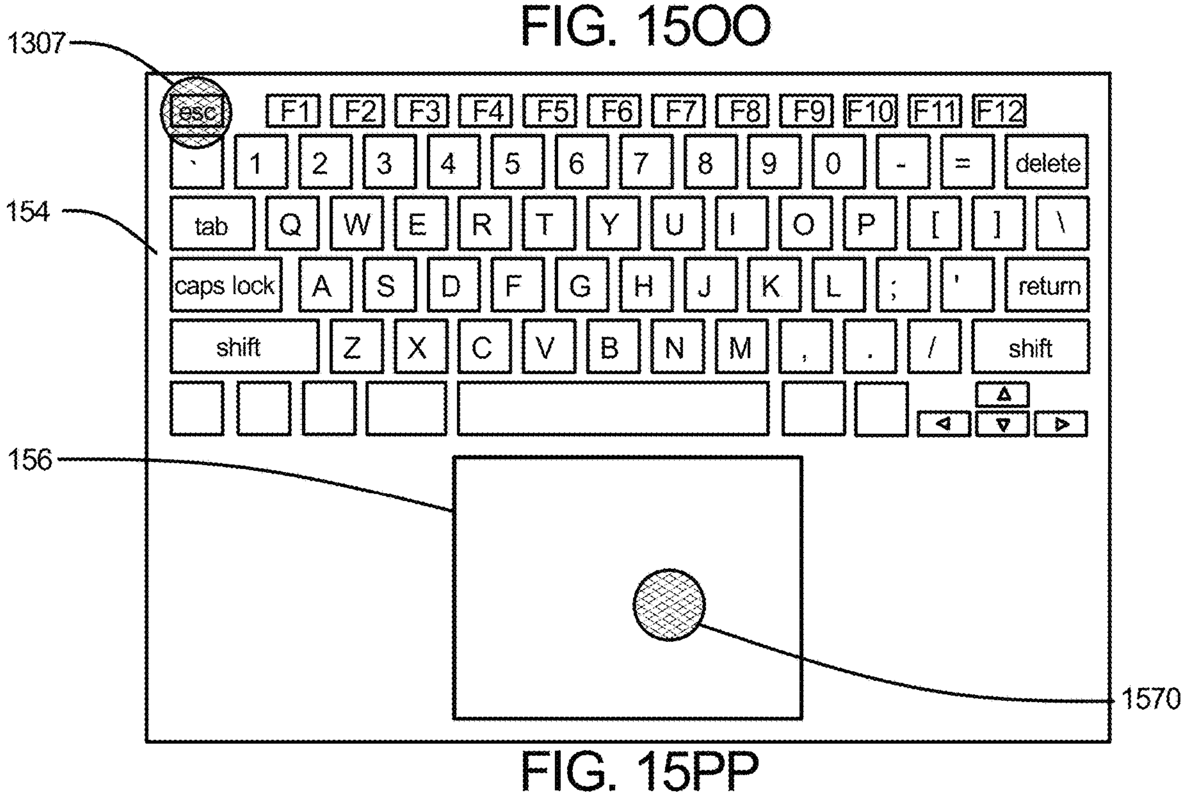
Figure 15Q:
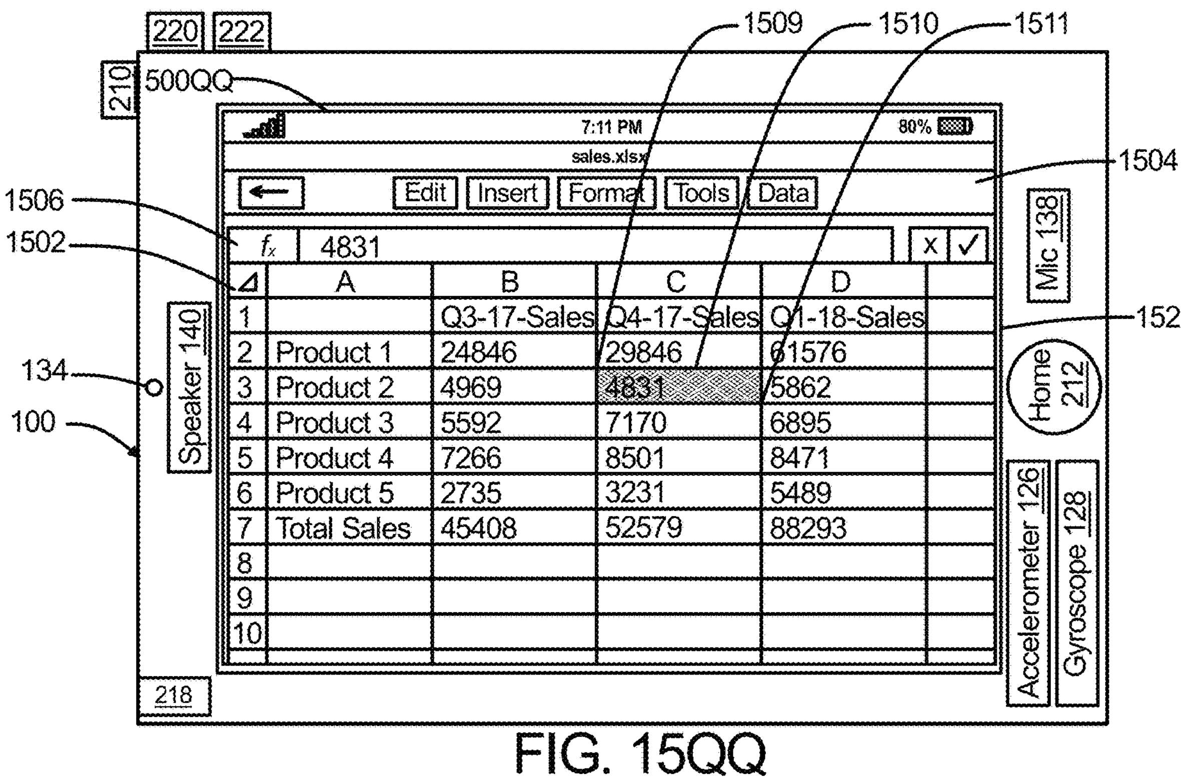

1) A user can perform a vertical slide finger gesture 1546 to 1548 beginning anywhere on touchpad 156. In response to detecting an initial ΔFy (a change in the vertical position of an uninterrupted finger contact) in a downward direction, the device displays menu-item selection 1310 initially at the first (topmost) item in the secondary-click menu (not shown). In response to detecting ΔFy (a change in the vertical position of an uninterrupted finger contact), the device changes the position of menu-item selection 1310 on secondary-click menu 1306. In this exemplary embodiment ΔSy (the change in the vertical position of menu-item selection 1310) is approximately proportional to ΔFy as illustrated in FIGS. 15Z-15AA. This can be written as $\Delta Sy = Ky \Delta Fy$ where Ky is a proportionality constant for the y-component of the finger motion. ΔSy is not exactly proportional to ΔFy because the selection moves in discrete steps corresponding the vertical distance between menu-items in the menu. The value of Ky can be less than one, equal to one, or greater than one. In some embodiments, Ky can be a function of the y-component of the slide gesture speed.

In the example shown the user has performed a slide gesture in the downward direction, until the device changes the vertical position of menu-item selection 1310 to the text-object "Insert" on secondary-click menu 1306 as illustrated in UI 1500AA (FIG. 15AA).

Cancel action: A user can perform a tap 1307 on the "esc" key on keyboard 154. In response to detecting finger tap 1307 on "esc" key on keyboard 154, the device cancels the display of secondary-click menu 1306 and redisplays UI 1500W (FIG. 15W).

2) A user can perform tap gesture 1550 anywhere on touchpad 156 as illustrated in FIG. 15BB. In response, the device selects the text-object "Insert" in menu 1306 and displays sub-menu 1316 showing a list of "Insert" actions as illustrated in UI 1500CC (FIG. 15CC). The list of "Insert" actions is for the text-object (spreadsheet cell) at the position of text-object selection 1510 when the secondary-click gesture is performed. In this example, the text-object is the spreadsheet cell at text-object selection 1510 and the "Insert" actions are "Shift cells right", "Shift cells down", "Entire row", and "Entire column".

3) A user can perform a vertical slide finger gesture 1552 to 1554 beginning anywhere on touchpad 156. In response to detecting an initial ΔFy (a change in the vertical position of an uninterrupted finger contact), the device displays menu-item selection 1310 at the first item in the sub-menu (not shown). In response to detecting ΔFy (a change in the vertical position of an uninterrupted finger contact), the device changes the position of menu-item selection 1310 on sub-menu 1316. In the example shown the user has performed a slide gesture in the downward direction, until the device changes the vertical position of menu-item selection 1310 to the text object "Entire row" on sub-menu 1316 as illustrated in UI 1500EE (FIG. 15EE).

4) A user can perform tap gesture 1556 anywhere on touchpad 156 as illustrated in FIG. 15 FF. In response to detecting the tap gesture touchpad 156, the device inserts an entire row of cells in the spreadsheet below the text-object selection 1510 as illustrated in FIG. 15GG. In response to the user tapping on touchpad 156, the device can also move text-object selection 1510 down by one cell position as illustrated in FIG. 15GG. In an alternative embodiment, the user can tap on the "return" key on keyboard 154 to complete the insert action in lieu of tapping on touchpad 156.

Cancel action: To cancel the pending action, a user can perform a tap 1307 on the "esc" key in lieu of tapping on the "return" key or tapping on touchpad 156. In response to detecting finger tap 1307 on "esc" key on keyboard 154, the device cancels the display of the menu and redisplays UI 1500AA (FIG. 15AA).

A user can delete the row just inserted using the method described below in reference to FIGS. 15HH-15QQ.

A user can perform secondary-click gesture 1558 on touchpad 156 as illustrated in FIG. 15HH. In response to detecting secondary-click gesture 1558 on touchpad 156, the device displays secondary-click menu 1306 adjacent to text-object selection 1510 as illustrated in UI 1500II (FIG. 15II).

Secondary-click menu 1306 displays a list of actions that can be performed with respect to text-object selection 1510. In the example shown the text object is a spreadsheet cell. In the example shown, the actions include, but are not limited to, Cut, Copy, Paste, Paste Special, Insert, Delete, Clear Contents, Filter, and Sort.

1) A user can perform a vertical slide finger gesture 1560 to 1562 beginning anywhere on touchpad 156. In the example shown the user has performed a slide gesture in the downward direction, until the device changes the vertical position of menu-item selection 1310 to the menu-item "Delete" on secondary-click menu 1306 as illustrated in UI 1500KK (FIG. 15KK).

2) A user can perform tap gesture 1564 anywhere on touchpad 156 as illustrated in FIG. 15BB. In response, the device selects the menu-item "Delete" in menu 1306 and displays sub-menu 1316 showing a list of Delete actions as illustrated in UI 1500MM (FIG. 15MM). The list of "Delete" actions is for the text-object (spreadsheet cell) at the position of text-object selection 1510 when the secondary-click gesture is performed. In this example, the "Delete" actions are "Shift cells left", "Shift cells up", "Entire row", and "Entire column".

3) A user can perform a vertical slide finger gesture 1566 to 1568 beginning anywhere on touchpad 156. In the example shown the user has performed a slide gesture in the downward direction, until the device changes the vertical position of menu-item selection 1310 to the text object "Entire row" on sub-menu 1316 as illustrated in UI 1500 OO (FIG. 15OO).

4) A user can perform tap gesture 1570 anywhere on touchpad 156 as illustrated in FIG. 15 PP. In response to detecting the tap gesture touchpad 156, the device deletes the entire row of cells in the spreadsheet as illustrated in FIG. 15GG. In response to the user tapping on touchpad 156, the device can also move text-object selection 1510 down by one cell position as illustrated in FIG. 15QQ. In an alternative embodiment, the user can tap on the "return" key on keyboard 154 to complete the delete action in lieu of tapping on touchpad 156.

Vertical auto-scroll of text content: When a selection is moved near the last (first) line of displayed text, the device can automatically scroll content up (down). The device can continue to scroll the content up (down), either until the user moves the selection up (down) from the last (first) line displayed text, or until the content has scrolled to last (first) line of the text content. The selection can be unit-length selection 310 within read-only text content, or zero-length selection 608 within editable text content, or selection end point 307 within text content.

Vertical auto-scroll of text-object content: When menu-item selection 1310 is moved by the user near the last (first) displayed item in the secondary-click menu, the device can automatically scroll secondary-click menu up (down). The device can continue to scroll the secondary click menu up (down), either until the user moves selection 1310 up (down) from the last (first) displayed menu item, or until the secondary-click menu has scrolled to last (first) menu item.

Auto-Scroll of menu: In some instances, secondary-click menu 1306 can have a vertical extent that exceeds the display vertical extent (not shown). When a user moves menu-item selection 1310 to a position near the last (first) displayed item in secondary-click menu 1306, the device can automatically scroll secondary-click menu 1306 up (down). The device can continue to scroll secondary-click menu 1306 up (down), either until the user moves selection 1310 up (down) from the last (first) displayed menu item, or until the secondary-click menu has scrolled to last (first) menu item. In some instances, sub-menu 1316 can have a vertical extent that exceeds the display vertical extent (not shown). When a user moves menu-item selection 1310 to a position near the last (first) displayed item in sub-menu 1316, the device can automatically scroll sub-menu 1316 up (down). The device can continue to scroll sub-menu 1316 up (down), either until the user moves selection 1310 up (down) from the last (first) displayed menu item, or until the sub-menu has scrolled to last (first) menu item.

Figure 16A:
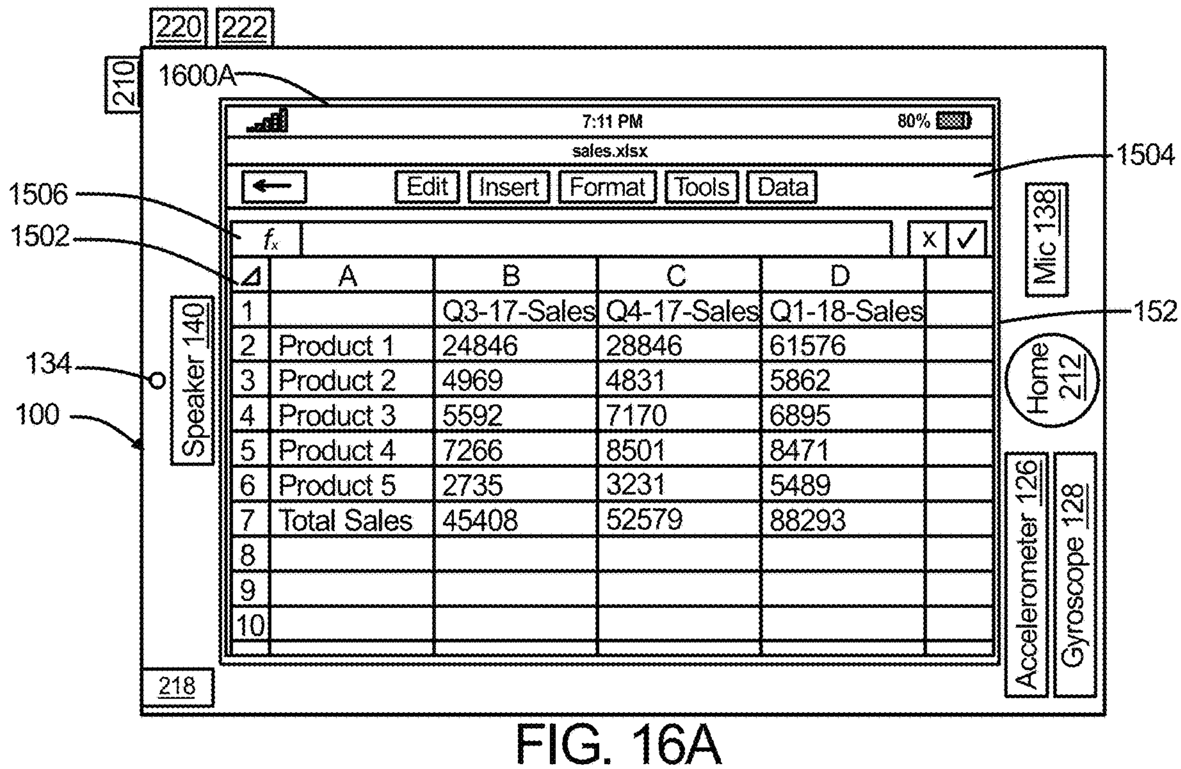
FIGS. 16A-16O—illustrate an exemplary user interface and method for displaying a text-object selection, moving a text-object selection within text-object content (a spreadsheet), and selecting multiple text objects (spreadsheet cells) within text-object content (a spreadsheet), on a mobile computing device with a display, using gestures on a touchpad in accordance with some embodiments with drag-lock off.
Figure 16B:
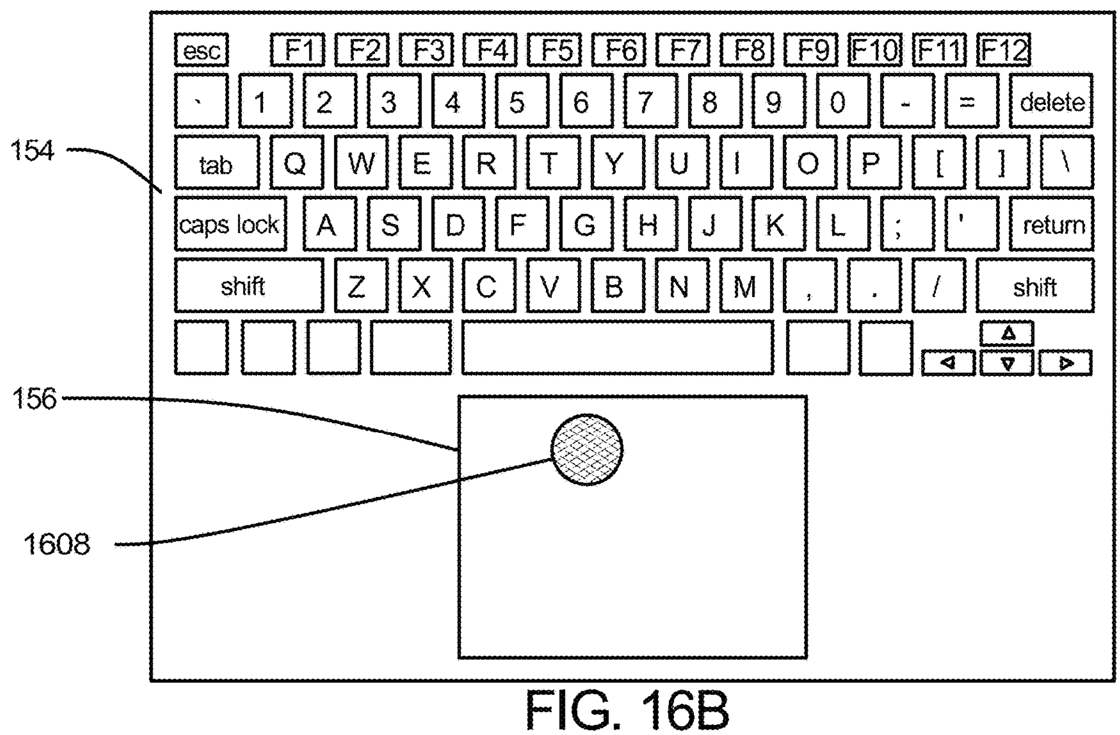
Figure 16C:
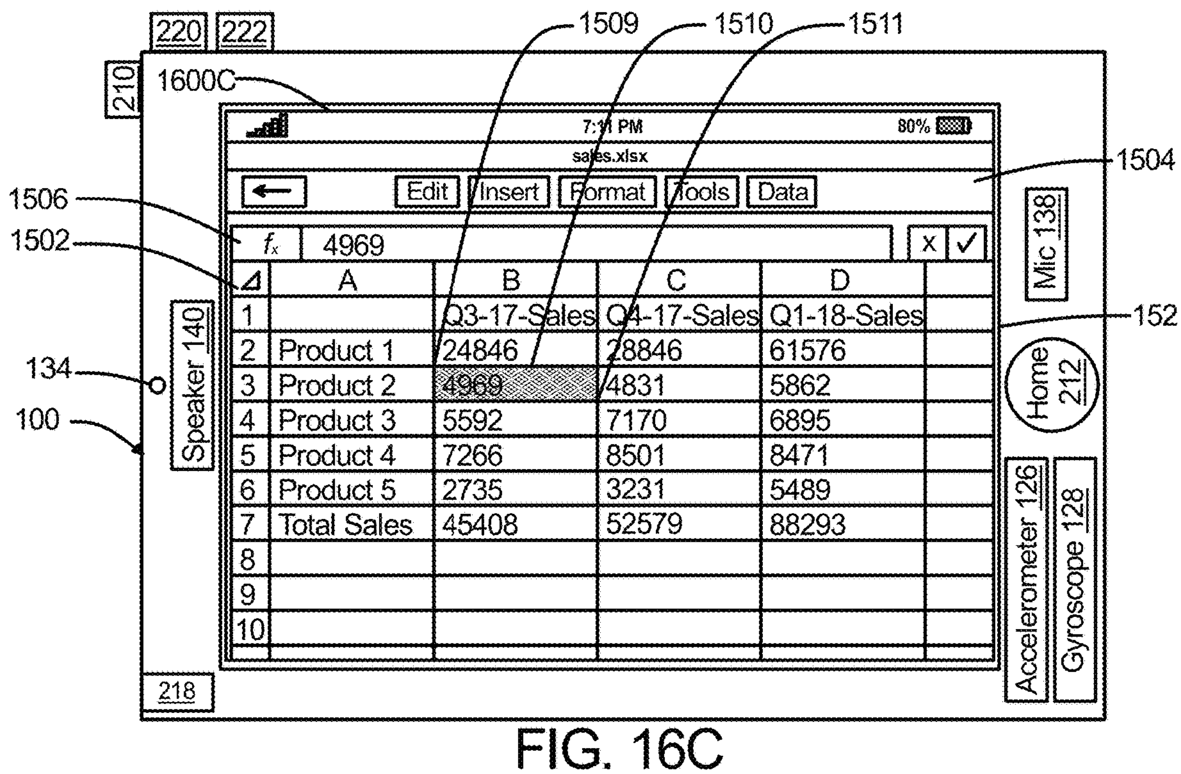

16.0 Displaying and moving a text-object selection, and selecting multiple text objects (spreadsheet cells) within editable text-object content (a spreadsheet): FIGS. 16A-16O—illustrate an exemplary user interface and method for displaying a text-object selection, moving a text-object selection within editable text-object content (a spreadsheet), and selecting multiple text objects (spreadsheet cells) within editable text-object content (a spreadsheet), on a mobile computing device with a display, using gestures on a touch-pad in accordance with some embodiments with drag-lock off.

The device can display editable text-object content 1502 as illustrated in FIG. 16A. The device can also display application navigation bar 1504. A user can perform a finger gesture 1608 (a tap or click or long-press or long-click finger gesture for example) on touchpad 156 as illustrated in FIG. 16B. In response to detecting finger gesture 1608 on touch-pad 156, the device displays text-object selection 1510 at a first selection position as illustrated in FIG. 16C. The text-object selection 1510 has a start point 1509 and end point 1511.

In one exemplary embodiment, the first selection position is at approximately the same relative position on the display as finger gesture 1608 on touchpad 156 as illustrated in FIGS. 16B-16C. In other exemplary embodiment, the first selection position is at the first text-object in editable text-object content 1502.

Figure 16D:
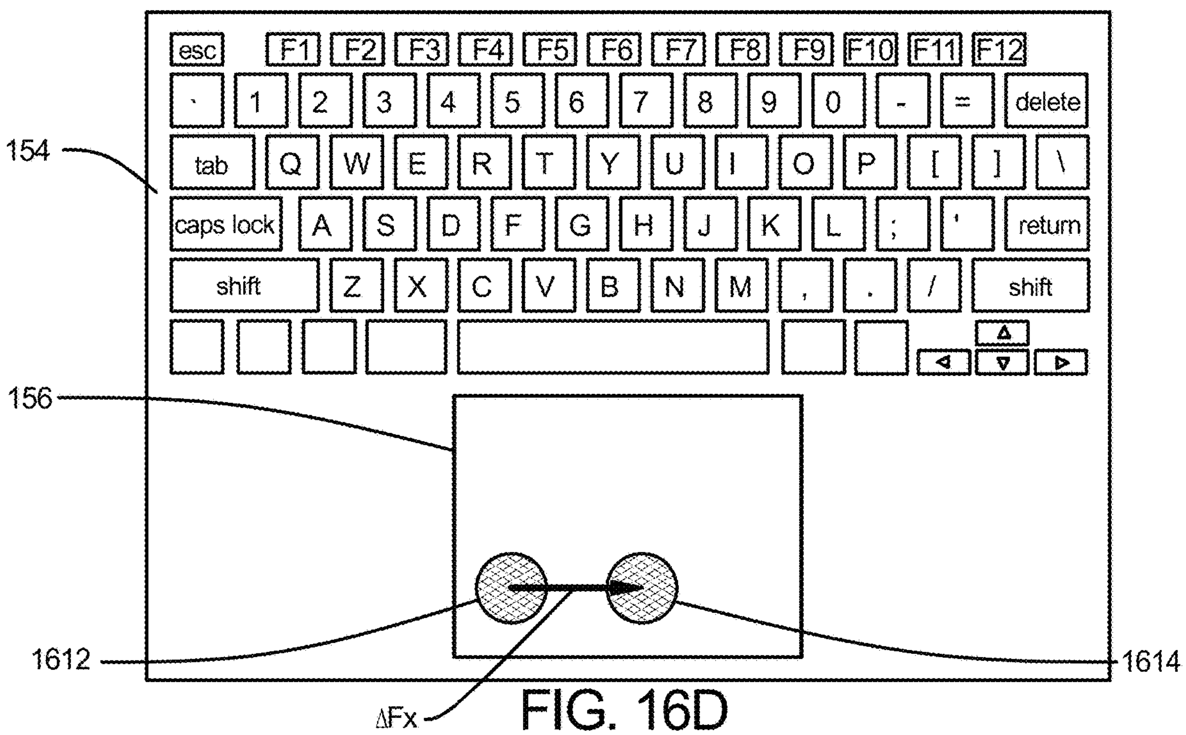
Figure 16E:
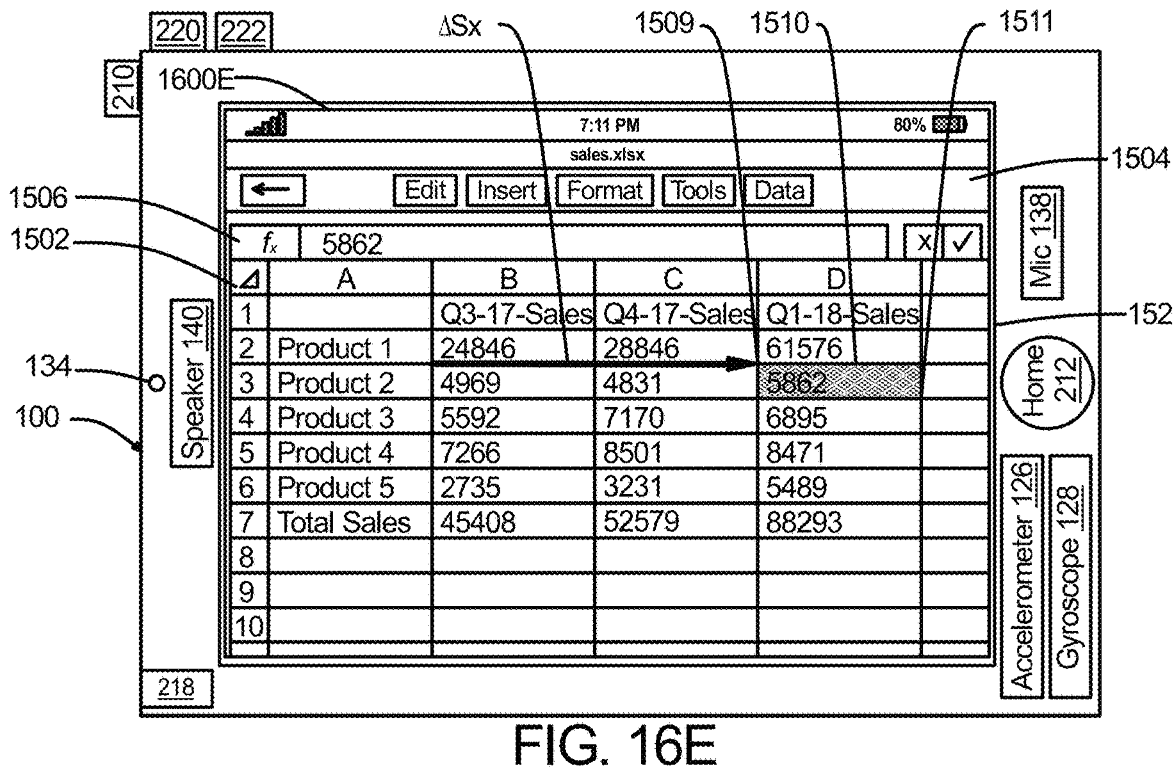

A user can perform a horizontal slide finger gesture 1612 to 1614 on touchpad 156 as illustrated in FIG. 16D. In response to detecting ΔFx (a change in the horizontal position of an uninterrupted finger contact), the device changes the horizontal position of text-object selection 1510 on the display from the first selection position to a second selection position as illustrated in FIGS. 16C-16E. In one exemplary embodiment ΔSx (the change in the horizontal position of selection 1510) is approximately proportional to ΔFx as illustrated in FIGS. 16D-16E. This can be written as ΔSx=KxΔFx where Kx is a proportionality constant for the x-component of the finger motion. ΔSx is not exactly proportional to ΔFx because the selection moves in discrete steps corresponding to the horizontal distance between text-objects. The value of Kx can be less than one, equal to one, or greater than one. In some embodiments, Kx can be a function of the x-component of the slide gesture speed. In this example, Kx>1.

Figure 16F:
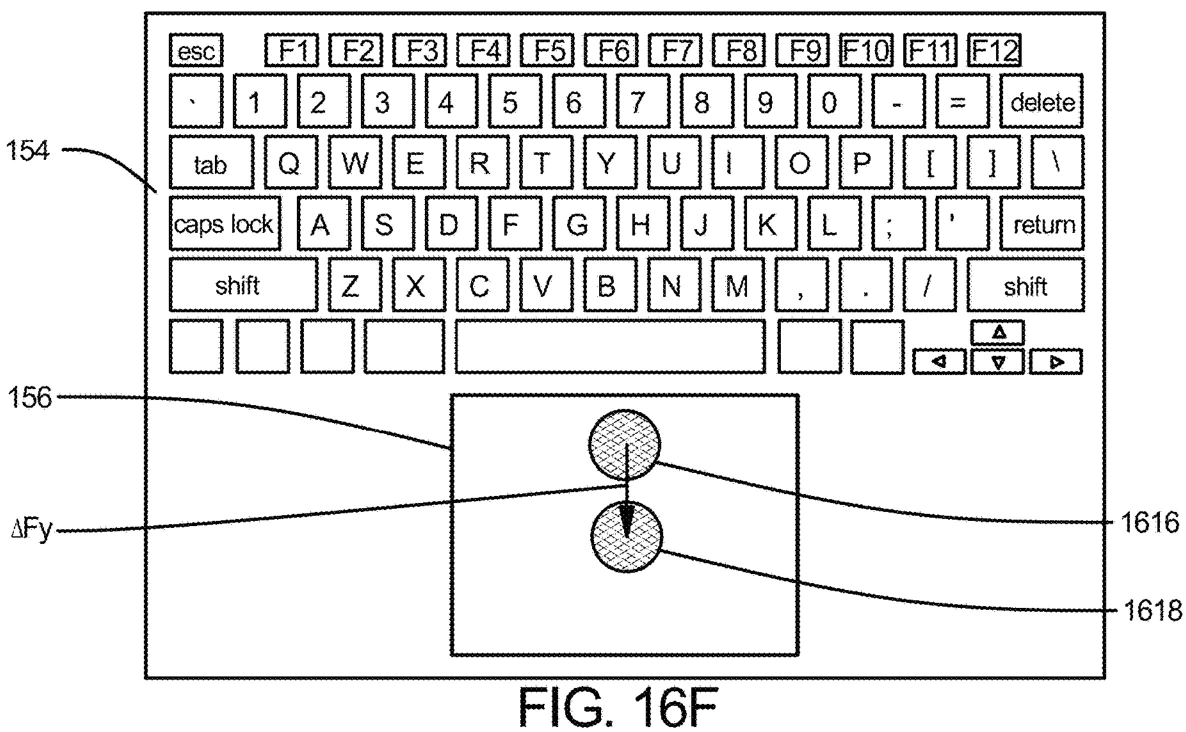
Figure 16G:
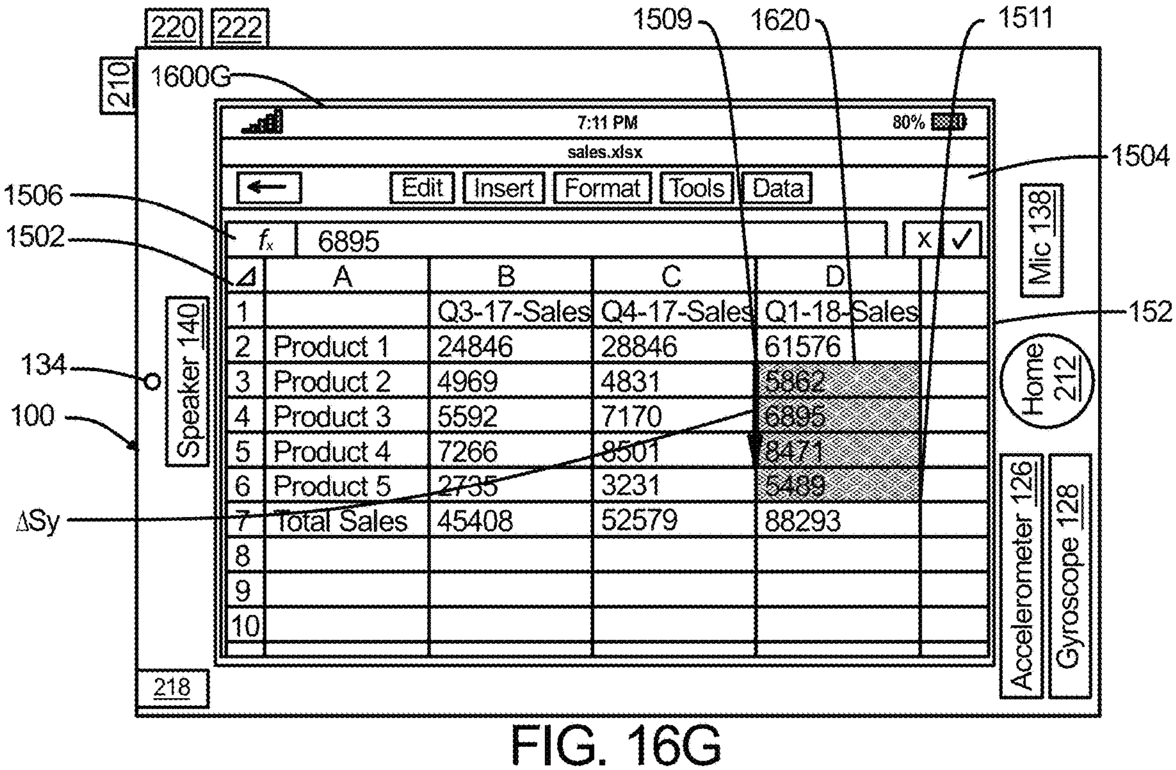

With text-object selection 1510 at a first position as illustrated in FIG. 16E, a user can perform a vertical tap-and-slide or click-and-slide finger gesture 1616 to 1618 beginning anywhere on touchpad 156. In response to detecting a tap and change in the vertical position (ΔFy) of an uninterrupted finger contact on the touchpad 156 as illustrated in FIG. 16F, the device changes the position of text-object selection end point 1511 on the display from a first position to a second position as illustrated in FIG. 16G. In this exemplary embodiment ΔSy (the change in the vertical position of text-object selection end point 1511) is approximately proportional to ΔFy as illustrated in FIGS. 16F-16G. The device displays UI 1600G (FIG. 16G) with text-object selection end point 1511 at a second position. In this example, Ky~1.

Figure 16H:
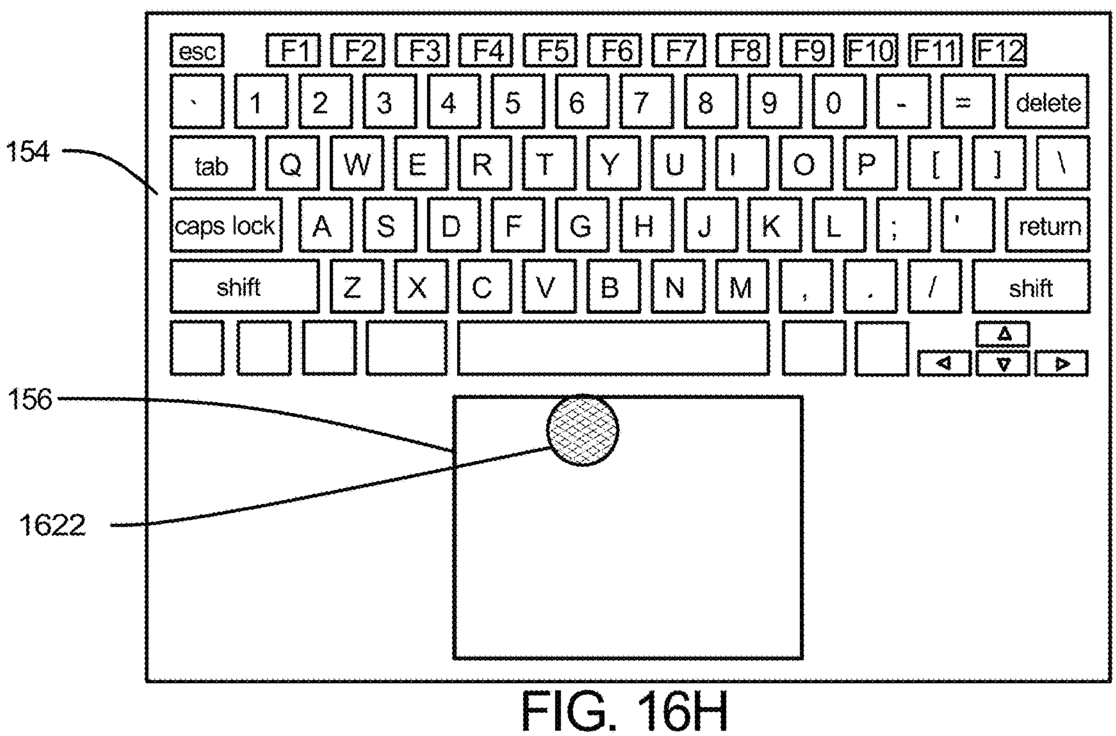

A user can perform finger gesture 1622 (a tap or click finger gesture for example) anywhere on touchpad 156 as illustrated in FIG. 16H. In response to detecting finger gesture 1622 on touchpad 156, the device cancels the selection of multiple text-objects (spreadsheet cells in this example) and displays text-object selection 1510 at a first selection position as illustrated in FIG. 16I.

In one exemplary embodiment, the first selection position is at approximately the same relative position on the display as finger gesture 1622 on touchpad 156 as illustrated in FIGS. 16H-161. In another exemplary embodiment, the first selection position is at the first text-object in editable text-object content 1502.

Figure 16I:
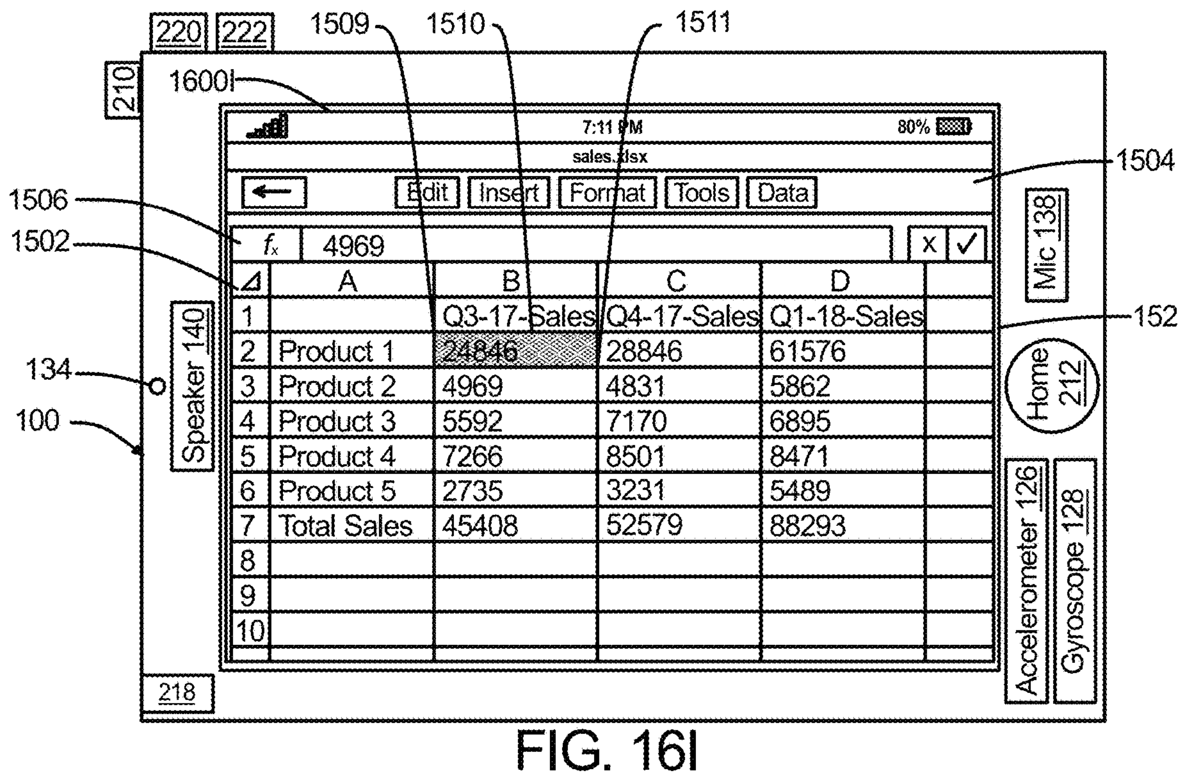
Figure 16J:
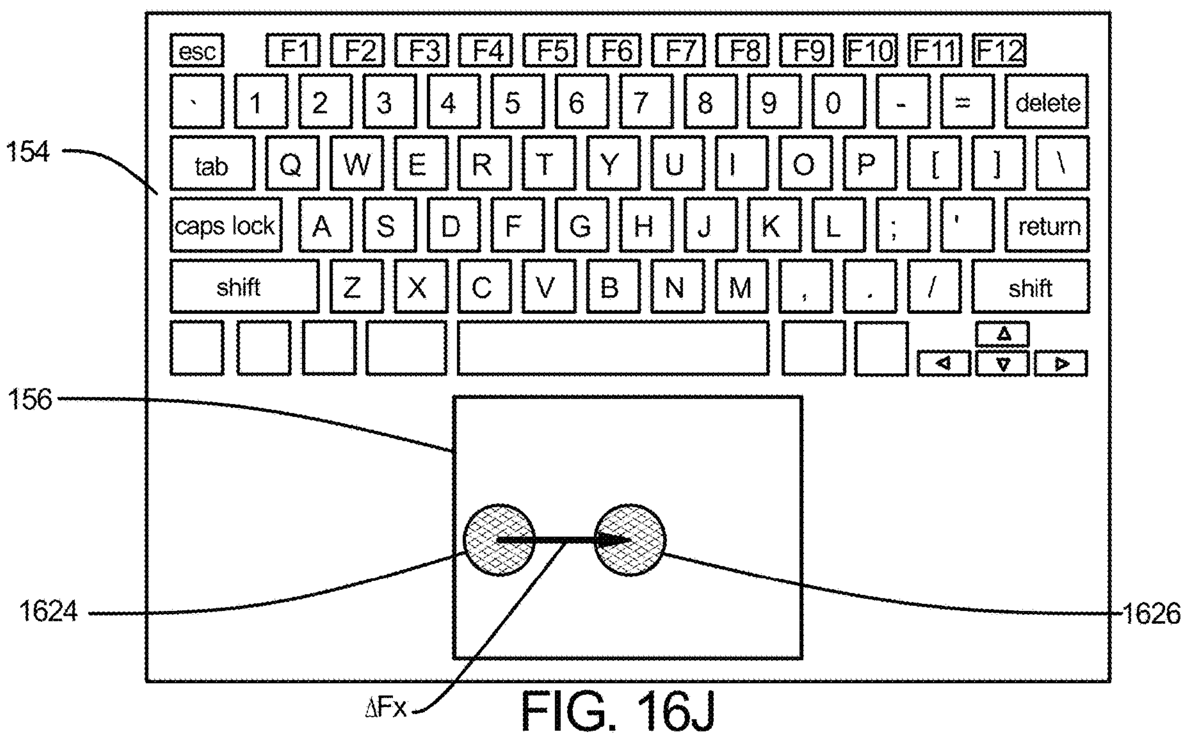
Figure 16K:
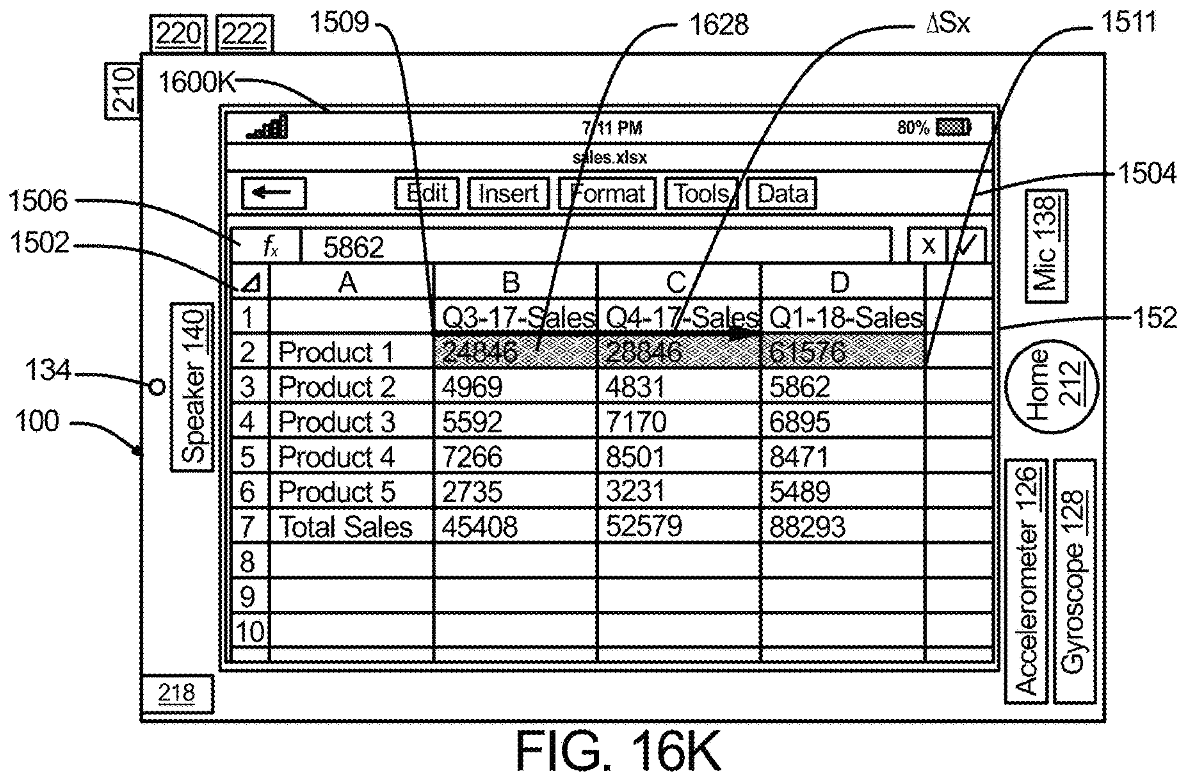

With text-object selection 1510 at a first position as illustrated in FIG. 16I, a user can perform a horizontal tap-and-slide or click-and-slide finger gesture 1624 to 1626 beginning anywhere on touchpad 156. In response to detecting a tap and change in the horizontal position (ΔFx) of an uninterrupted finger contact on the touchpad 156 as illustrated in FIG. 16J, the device changes the position of text-object selection end point 1511 on the display from a first position to a second position as illustrated in FIG. 16K. In this exemplary embodiment ΔSx (the change in the horizontal position of text-object selection end point 1511) is approximately proportional to ΔFx as illustrated in FIGS. 16J-16K. The device displays UI 1600K (FIG. 16K) with text-object selection end point 1511 at a second position. In this example, Kx>1.

Figure 16L:
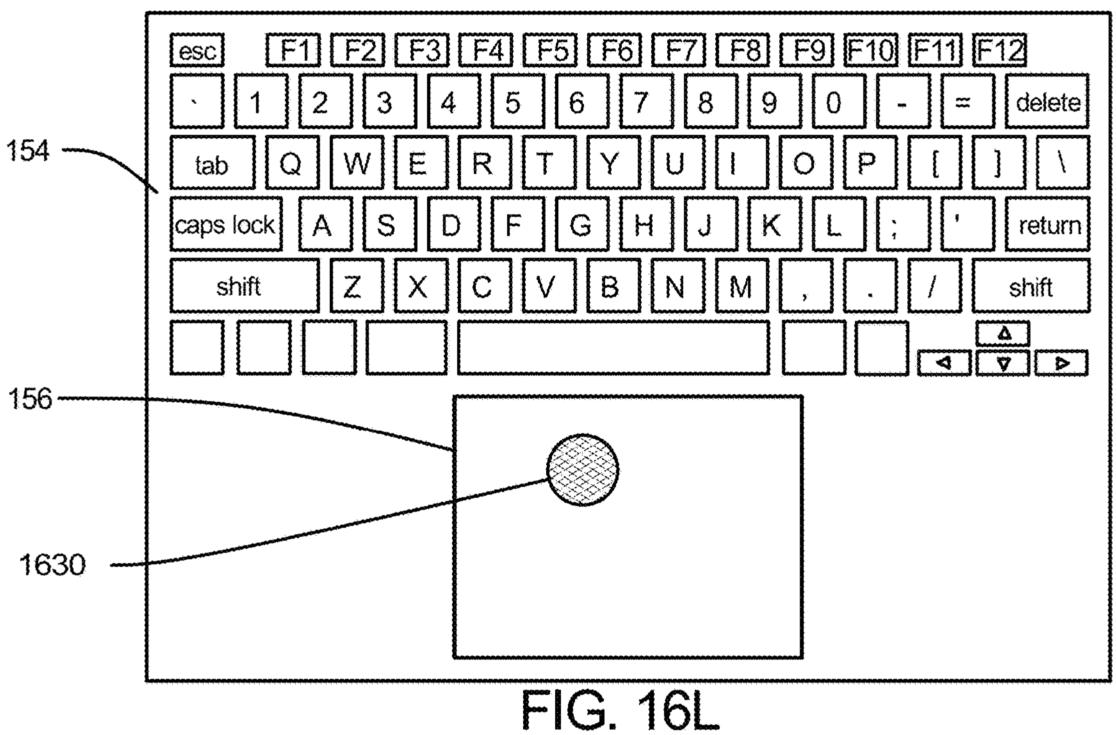
Figure 16M:
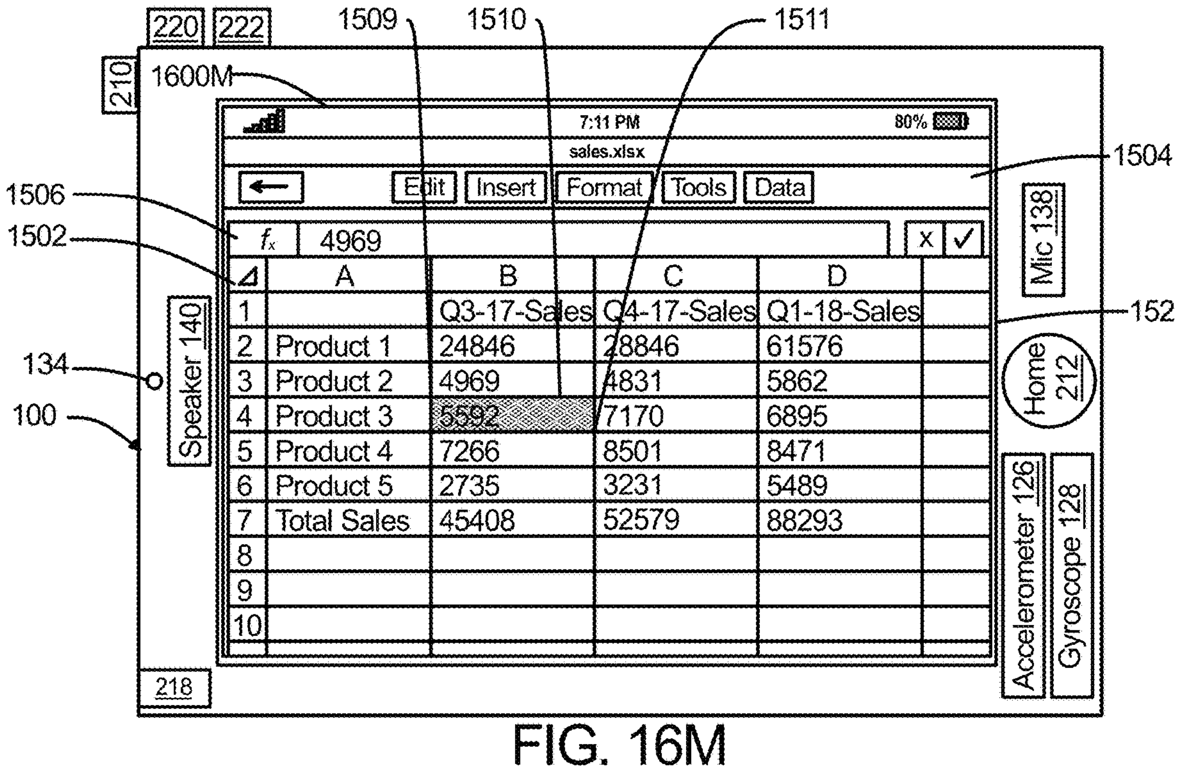

A user can perform finger gesture 1630 (a tap or click finger gesture for example) anywhere on touchpad 156 as illustrated in FIG. 16L. In response to detecting finger gesture 1630 on touchpad 156, the device cancels the selection of multiple text-objects (multiple spreadsheet cells in this example) and displays text-object selection 1510 at a first selection position as illustrated in FIG. 16M.

Figure 16N:
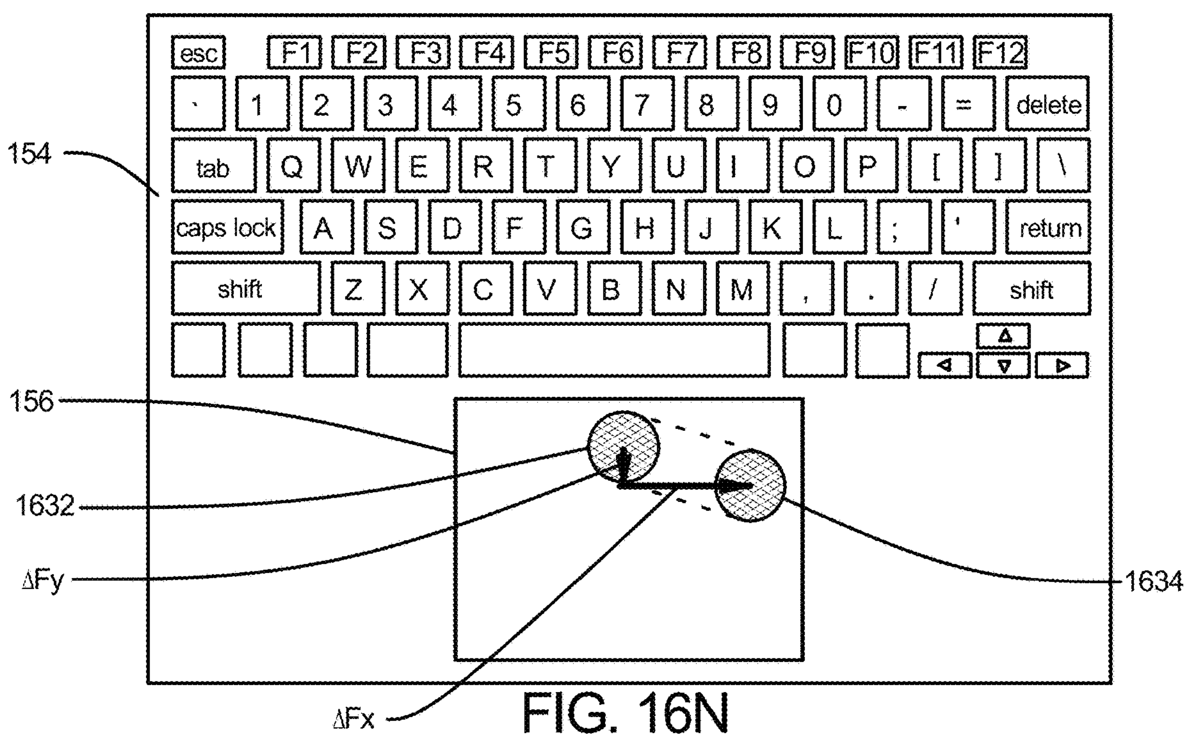
Figure 16O:
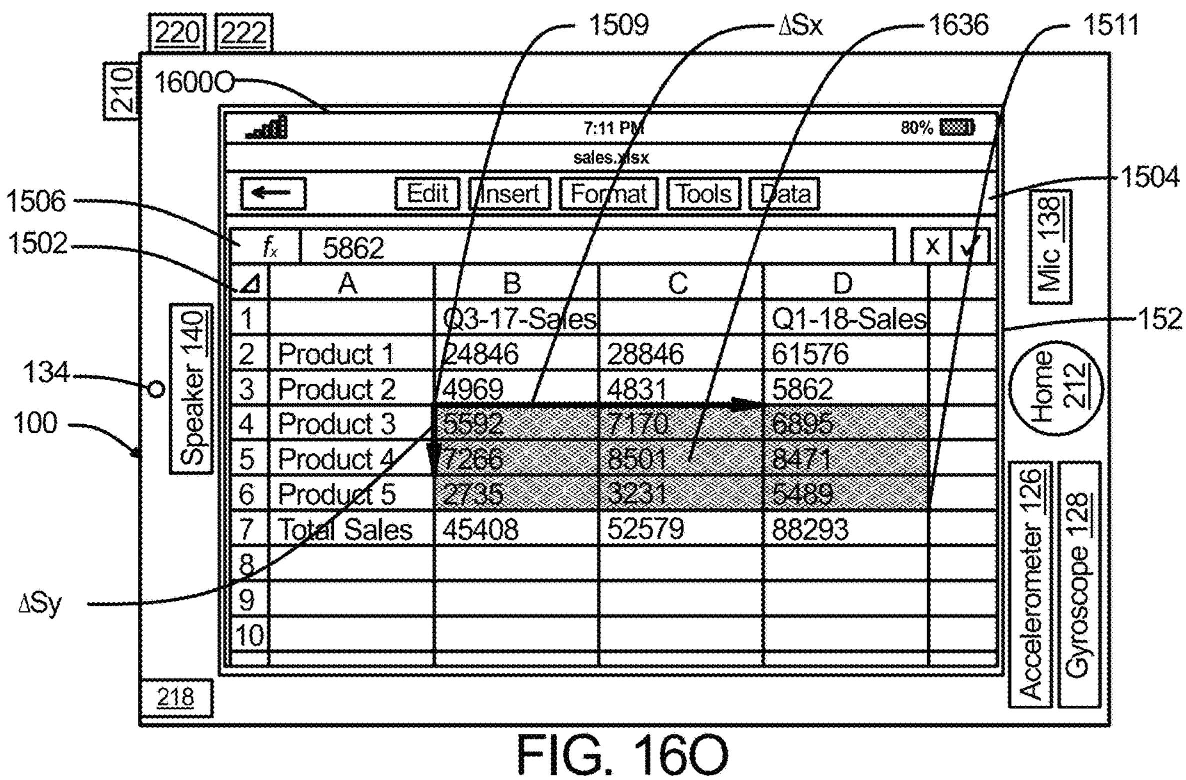

A user can select multiple text-objects (spreadsheet cells in this example) with a single diagonal tap-and-slide finger gesture on touchpad 156 as illustrated in FIGS. 16N-16O. With text-object selection 1510 at a first position, a user can perform a diagonal tap-and-slide or click-and-slide finger gesture 1632 to 1634 beginning anywhere on touchpad 156. In response to detecting a tap or click and ΔFx (a change in the horizontal position) and ΔFy (a change in the vertical position) of an uninterrupted finger contact on touchpad 156, the device changes the position of text-object selection end point 1511 on the display from a first position to a second position as illustrated in FIGS. 16M-16O. In this exemplary embodiment ΔSx is approximately proportional to ΔFx and ΔSy is approximately proportional to ΔFy as illustrated in FIGS. 16N-16O. The device displays UI 1600O (FIG. 16O) with text-object selection end point 1511 at a second position. In this example, Kx>1 and Ky>1.

A user can select multiple text-objects within read-only text-object content using gestures on a touchpad employing methods analogous to those used to select multiple text-objects within editable text-object content.

Figure 17A:
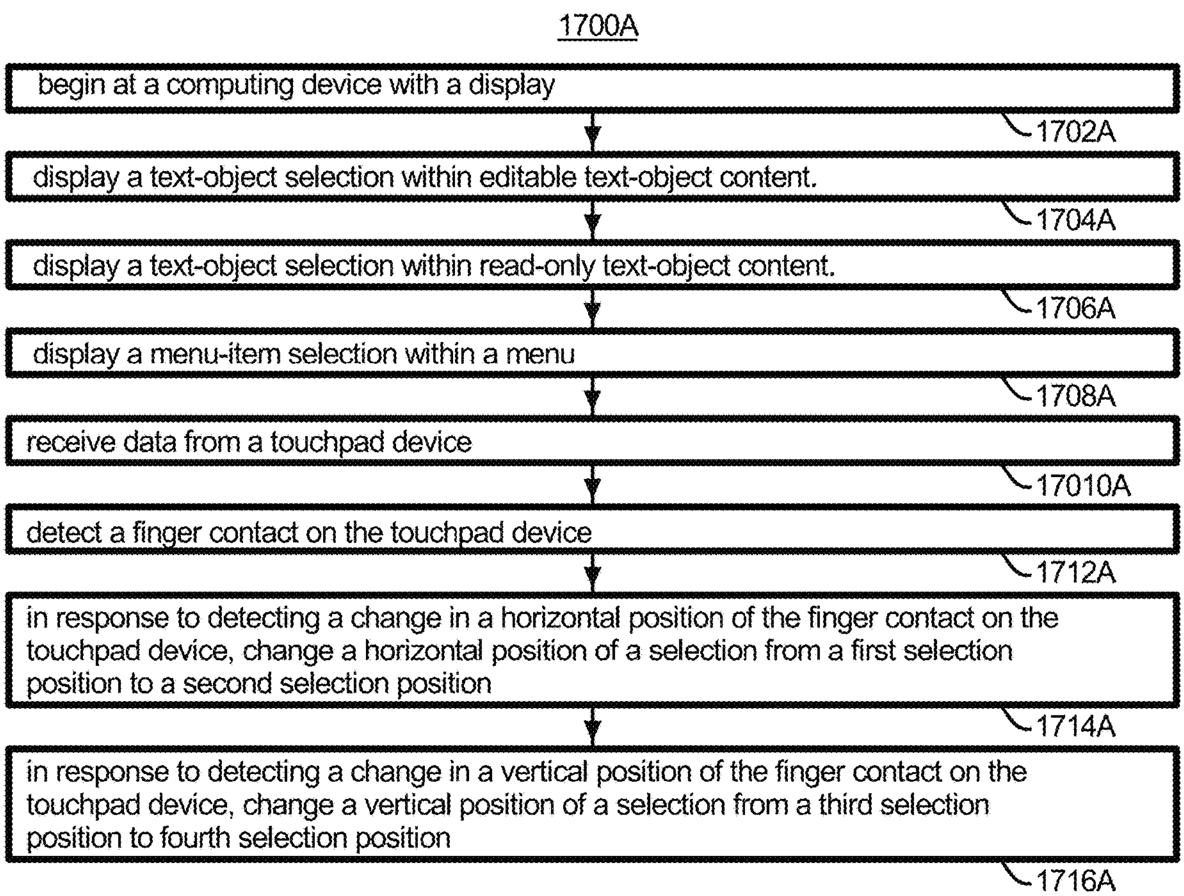
FIGS. 17A-17B are flow diagrams illustrating a method for positioning a text-object selection within editable or read-only text-object content (a spreadsheet for example) on a computing device with a display using gestures on a touchpad in accordance with some embodiments.
Figure 17B:
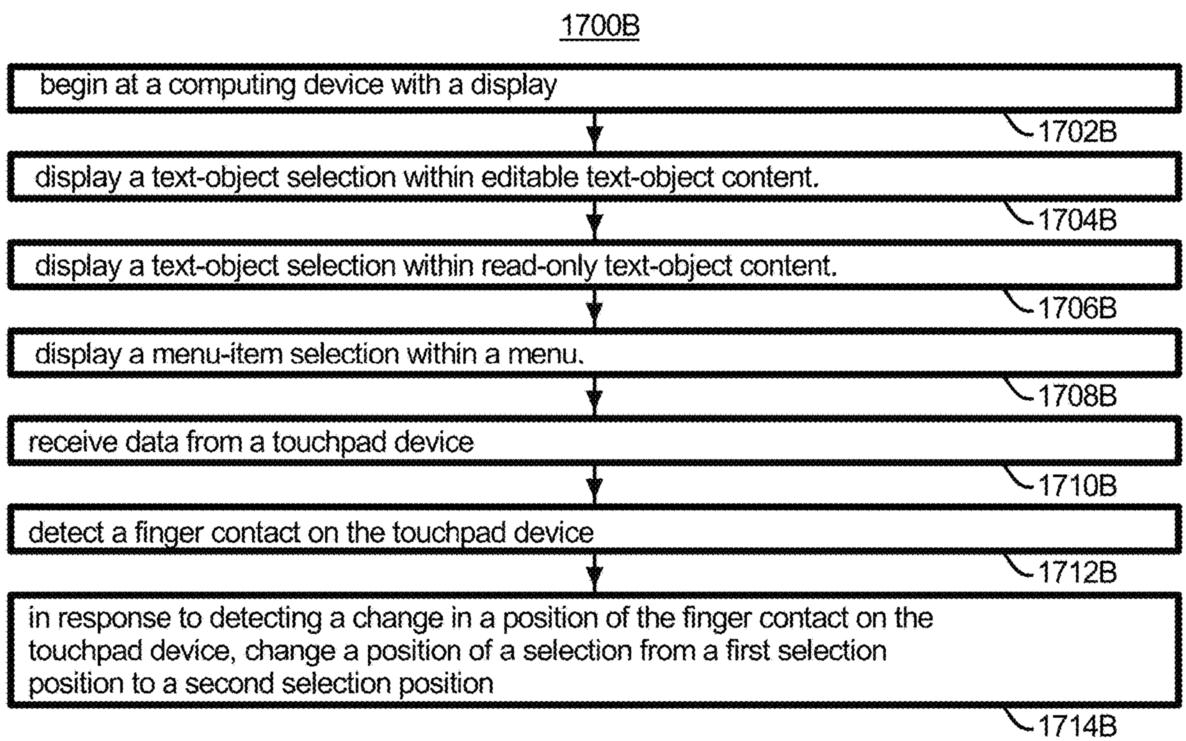

17.0 Methods for positioning a text-object selection within editable or read-only text-object content using gestures on a touchpad: FIGS. 17A-17B are flow diagrams illustrating a method for positioning a text-object selection within editable or read-only text-object content (a spreadsheet for example) on a computing device with a display using gestures on a touchpad in accordance with some embodiments.

Figure 18A:
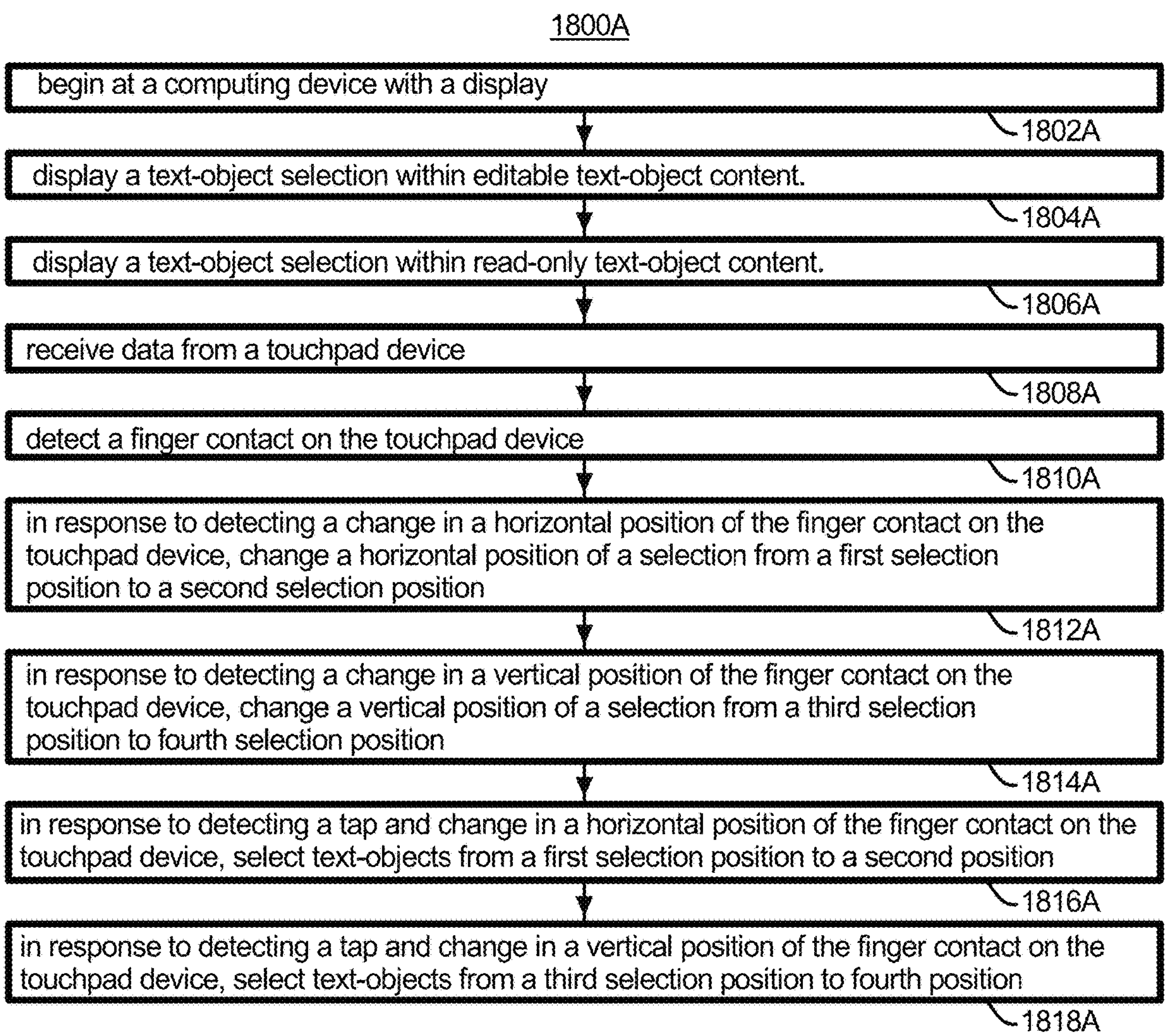
FIGS. 18A-18B are flow diagrams illustrating a method for positioning a text-object selection within editable or read-only text-object content (a spreadsheet for example) and selecting multiple text-objects (spreadsheet cells for example) on a computing device with a display using gestures on a touchpad in accordance with some embodiments.
Figure 18B:
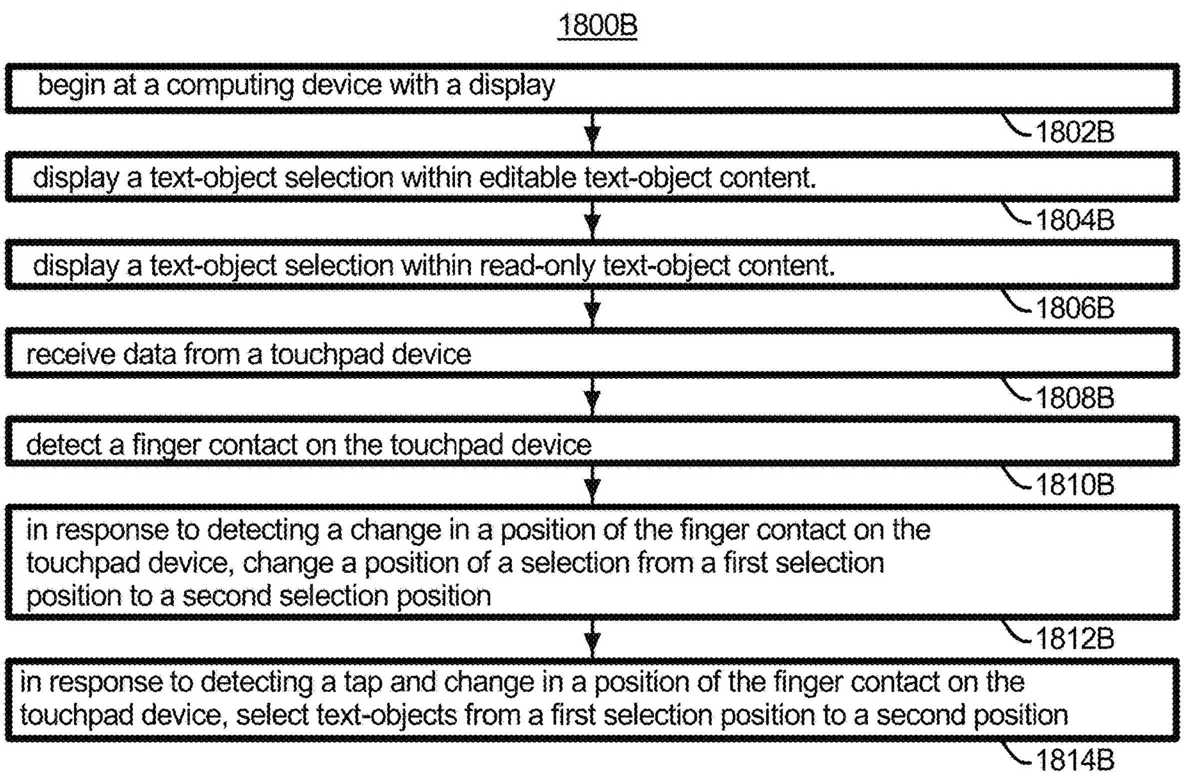

18.0 Methods for positioning a text-object selection and selecting multiple text-objects within editable or read-only text-object content using gestures on a touchpad: FIGS. 18A-18B are flow diagrams illustrating a method for positioning a text-object selection within editable or read-only text-object content (a spreadsheet for example) and selecting multiple text-objects (spreadsheet cells for example) on a computing device with a display using gestures on a touchpad in accordance with some embodiments.

Figure 19A:
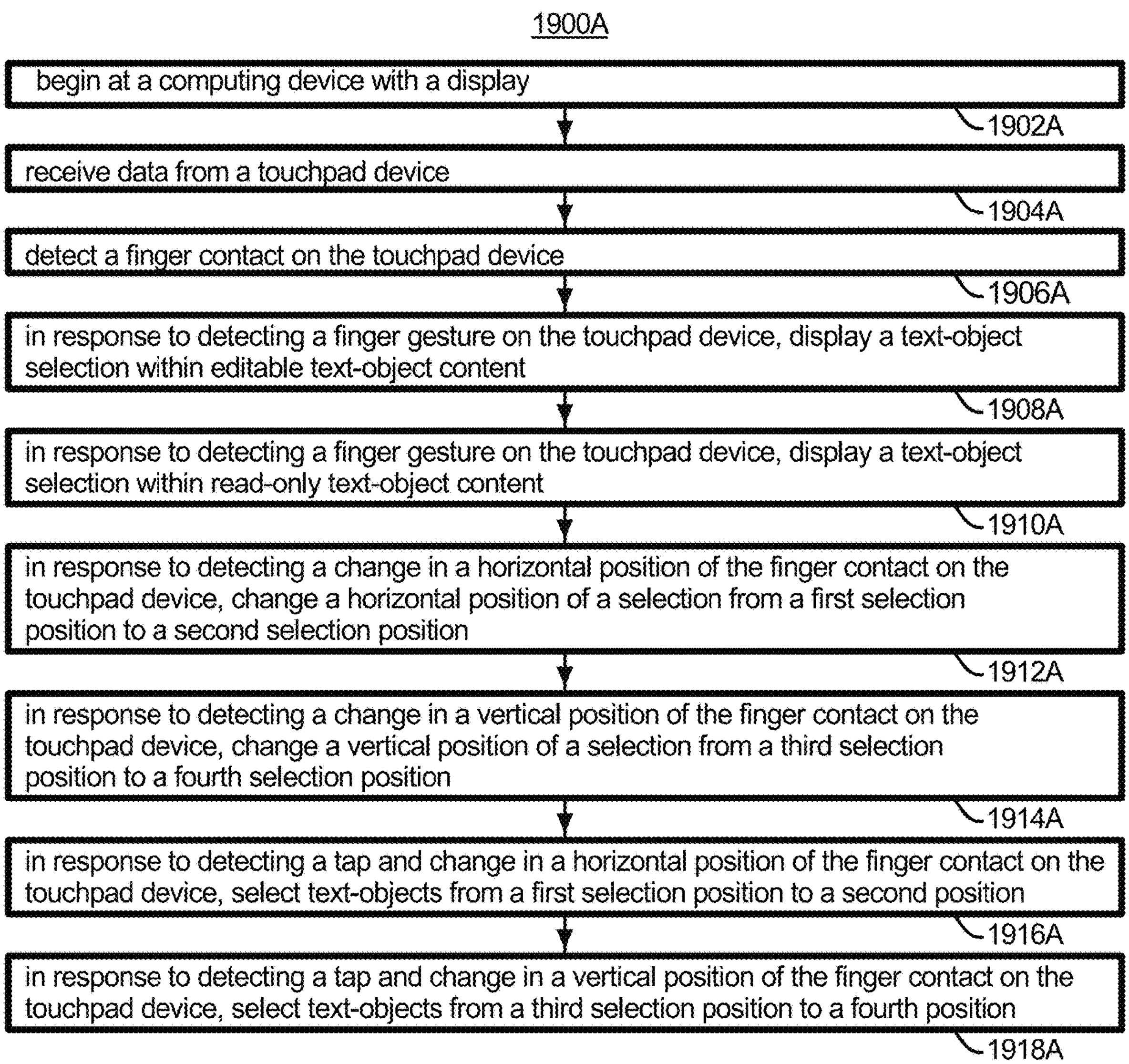
FIGS. 19A-19B are flow diagrams illustrating a method for displaying a text-object selection, positioning the text-object selection within editable or read-only text-object content (a spreadsheet for example), and selecting multiple text-objects (spreadsheet cells for example) on a computing device with a display using gestures on a touchpad in accordance with some embodiments.
Figure 19B:
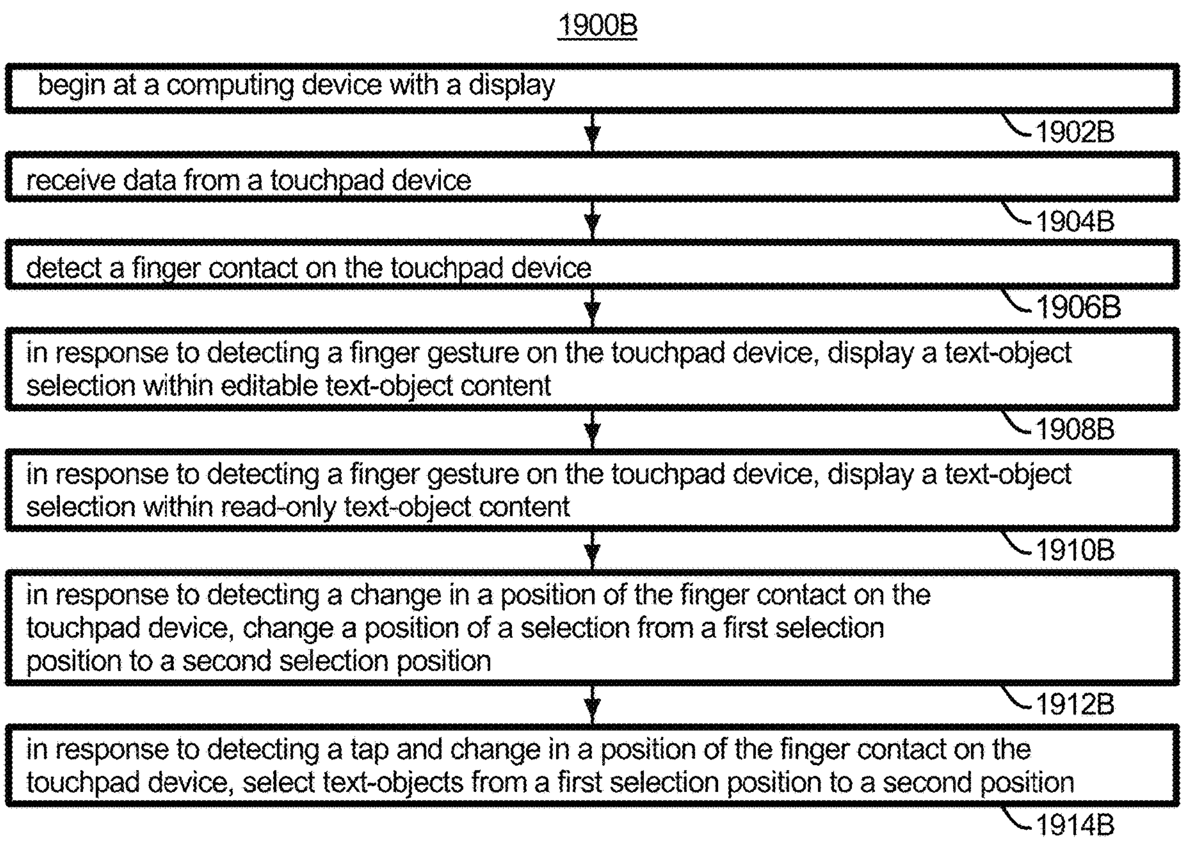

19.0 Methods for displaying and positioning a text-object selection and selecting multiple text-objects within editable or read-only text-object content using gestures on a touchpad: FIGS. 19A-19B are flow diagrams illustrating a method for displaying a text-object selection, positioning the text-object selection within editable or read-only text-object content (a spreadsheet for example), and selecting multiple text-objects (spreadsheet cells for example) on a computing device with a display using gestures on a touchpad in accordance with some embodiments.

Figure 20A:
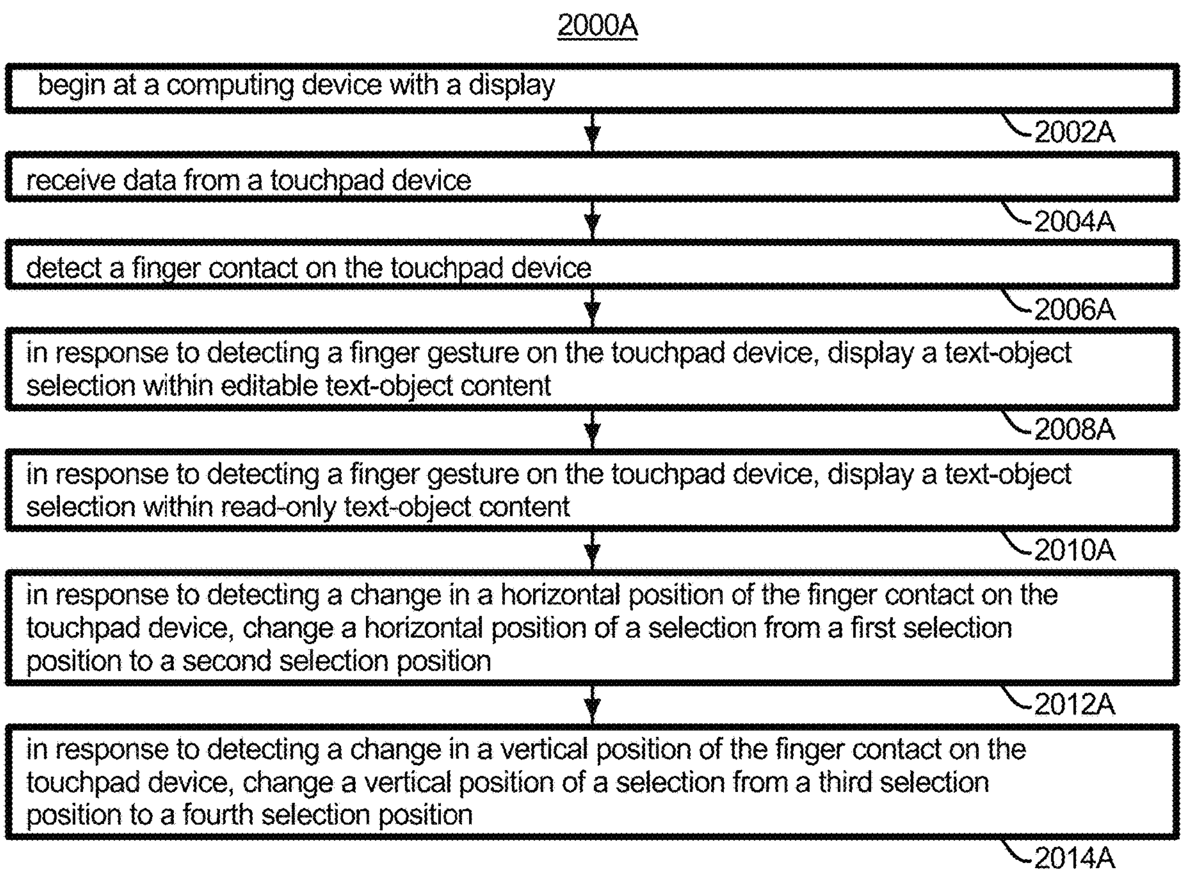
FIGS. 20A-20B are flow diagrams illustrating a method for displaying a text-object selection and positioning the text-object selection within editable or read-only text-object content (a spreadsheet for example) on a computing device with a display using gestures on a touchpad in accordance with some embodiments.
Figure 20B:
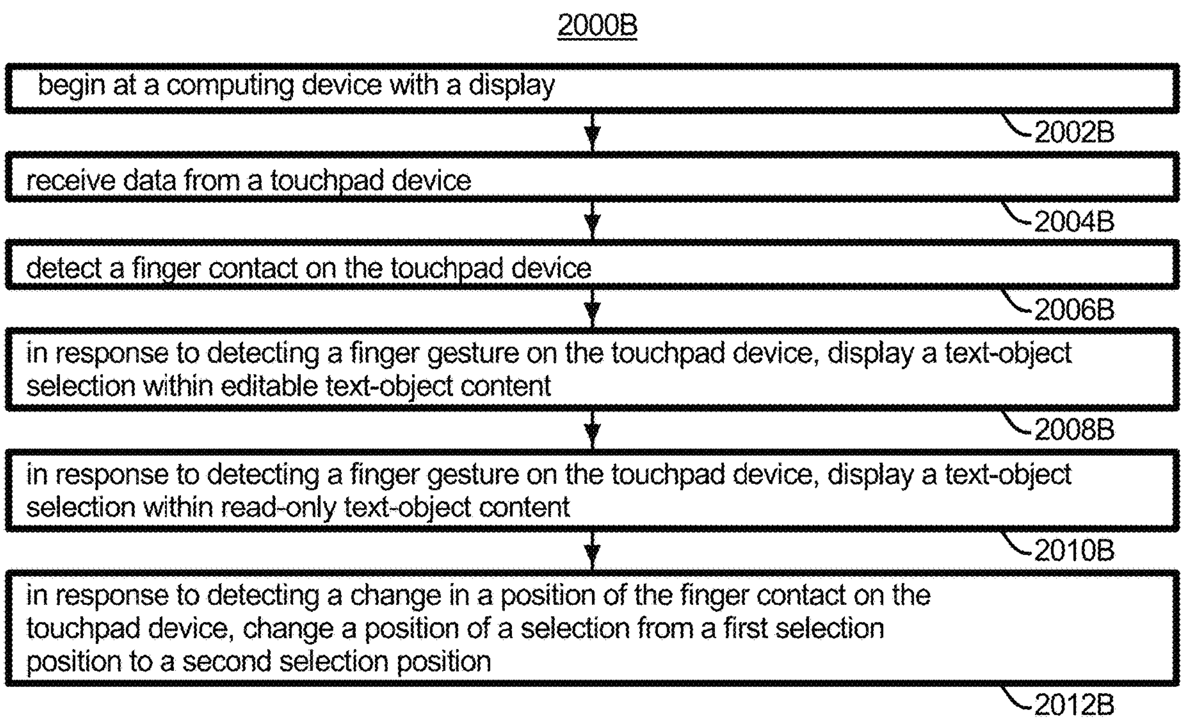

20.0 Methods for displaying and positioning a text-object selection within editable or read-only text-object content using gestures on a touchpad: FIGS. 20A-20B are flow diagrams illustrating a method for displaying a text-object selection and positioning the text-object selection within editable or read-only text-object content (a spreadsheet for example) on a computing device with a display using gestures on a touchpad in accordance with some embodiments.

Figure 21A:
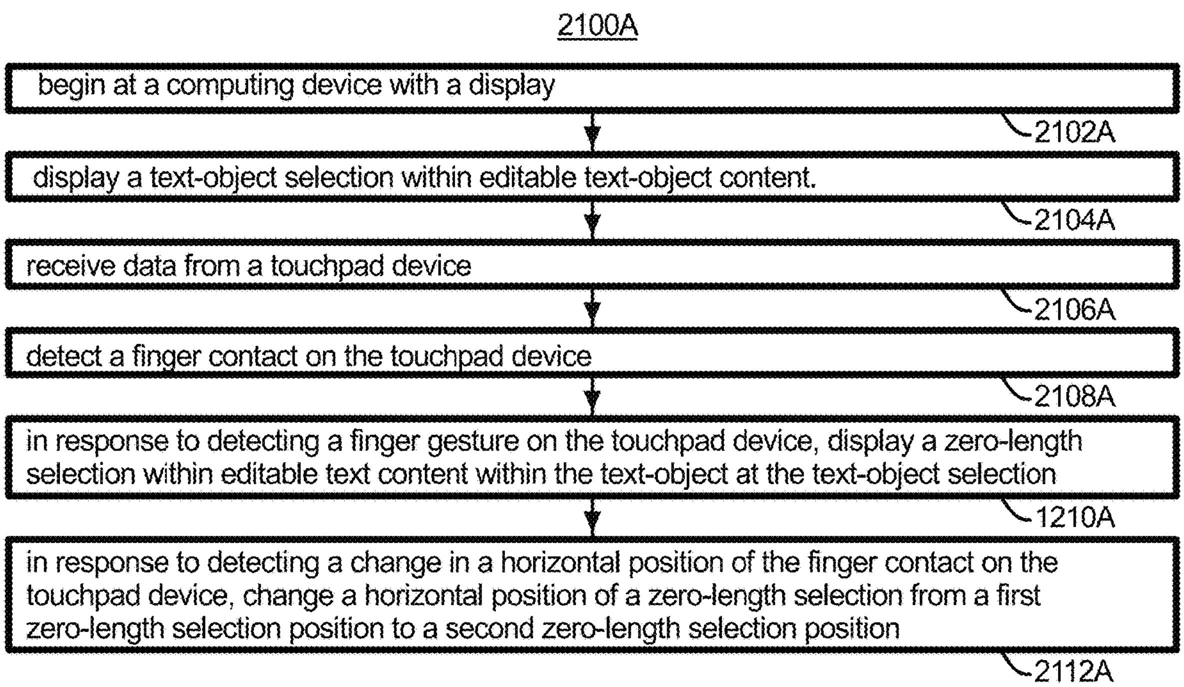
FIGS. 21A-21B are flow diagrams illustrating a method for displaying a zero-length selection within an editable text-object (a spreadsheet cell for example) and positioning the zero-length selection within the editable text-object (a spreadsheet cell for example) on a computing device with a display using gestures on a touchpad in accordance with some embodiments.
Figure 21B:
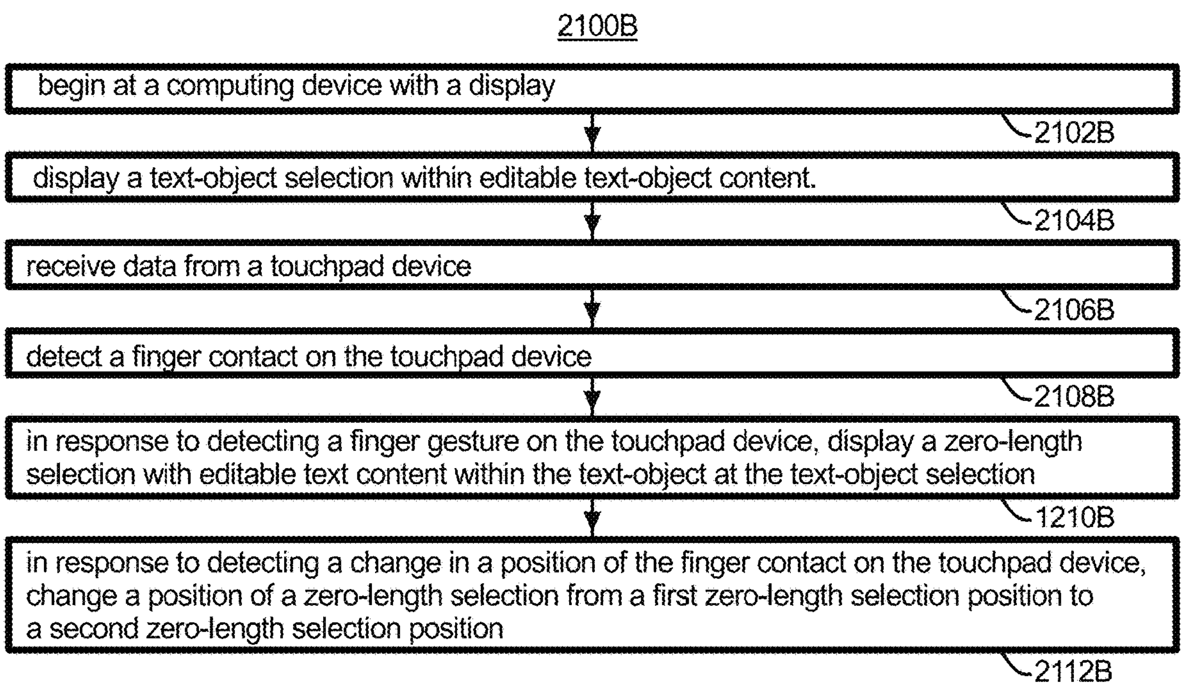

21.0 Methods for displaying and positioning a zero-length selection within editable text-object content using gestures on a touchpad: FIGS. 21A-21B are flow diagrams illustrating a method for displaying a zero-length selection within an editable text-object (a spreadsheet cell for example) and positioning the zero-length selection within the editable text-object (the spreadsheet cell for example) on a computing device with a display using gestures on a touchpad in accordance with some embodiments.

22.0 Dragging-and-dropping selected editable text within an application using gestures on a touchpad:

22.1 Dragging-and-dropping selected editable text with drag-lock off: FIGS. 22A-22K illustrate an exemplary user interface and method for moving zero-length selection, selecting text, and dragging-and-dropping the selected text within an application with drag-lock off, on a mobile computing device with a display, using gestures on a touchpad in accordance with some embodiments.

Figure 22A:
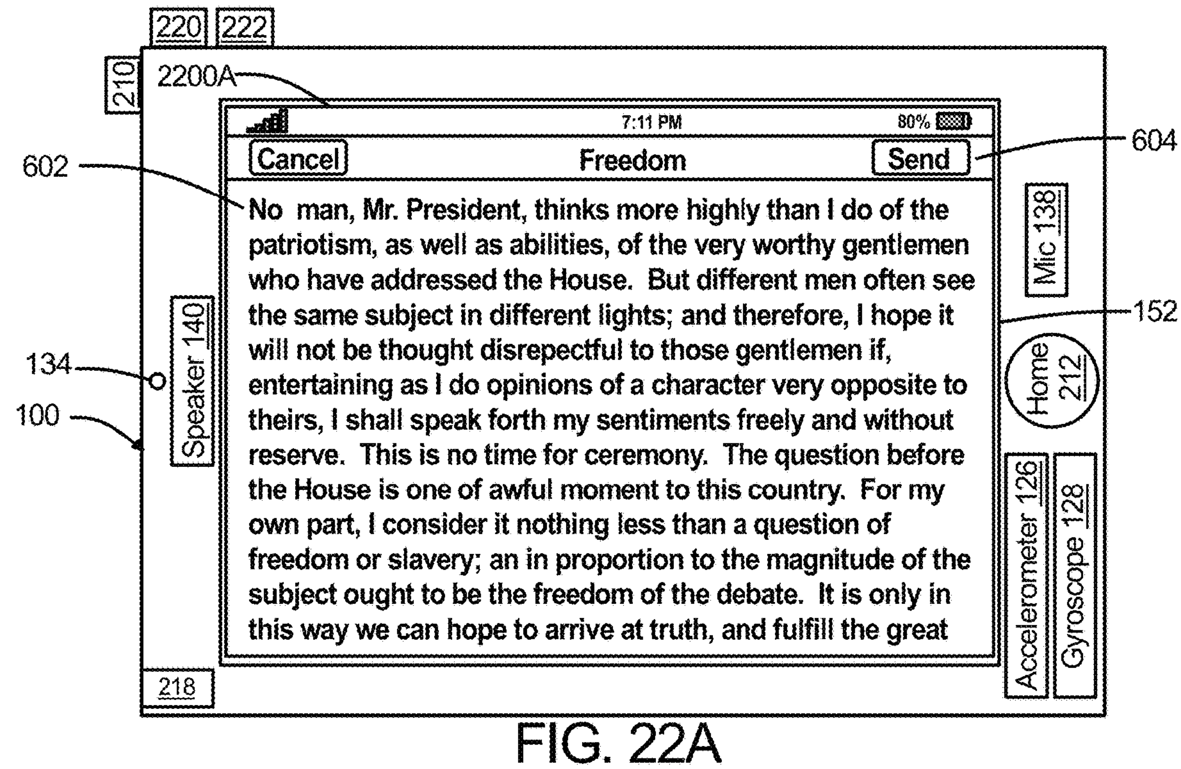
FIGS. 22A-22K illustrate an exemplary user interface and method for moving zero-length selection, selecting text, and dragging-and-dropping the selected text from a first position to a second position within editable text content, with drag-lock off, on a mobile computing device with a display, using gestures on a touchpad in accordance with some embodiments.
Figure 22B:
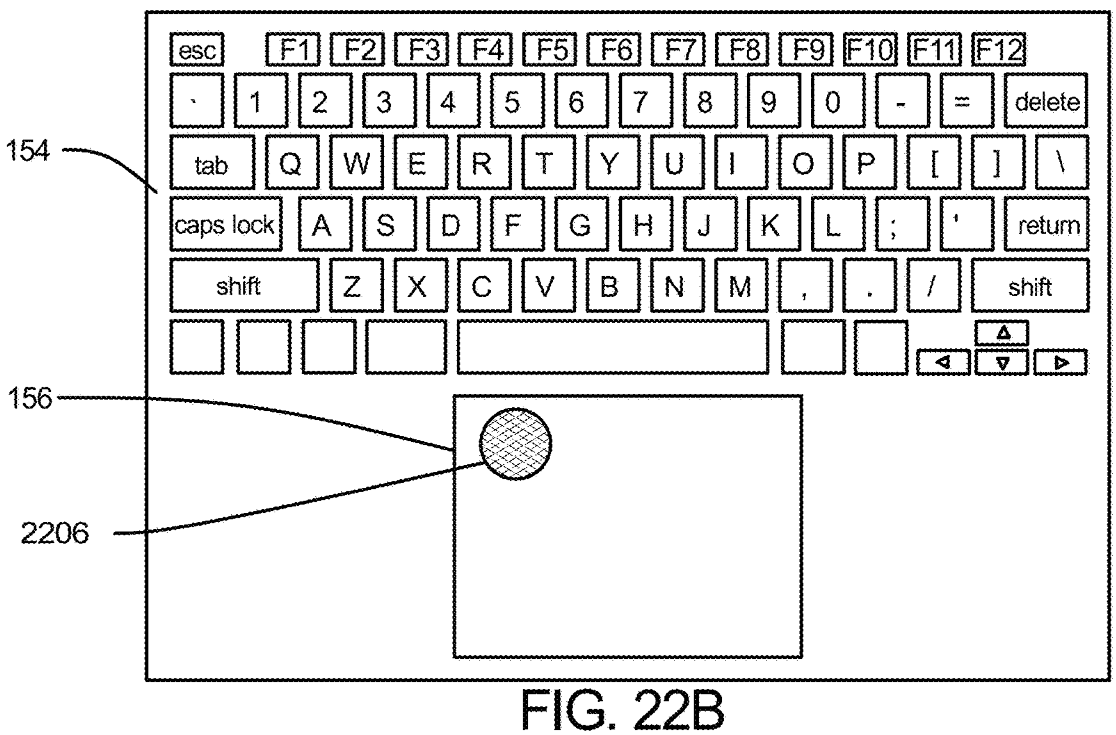
Figure 22C:
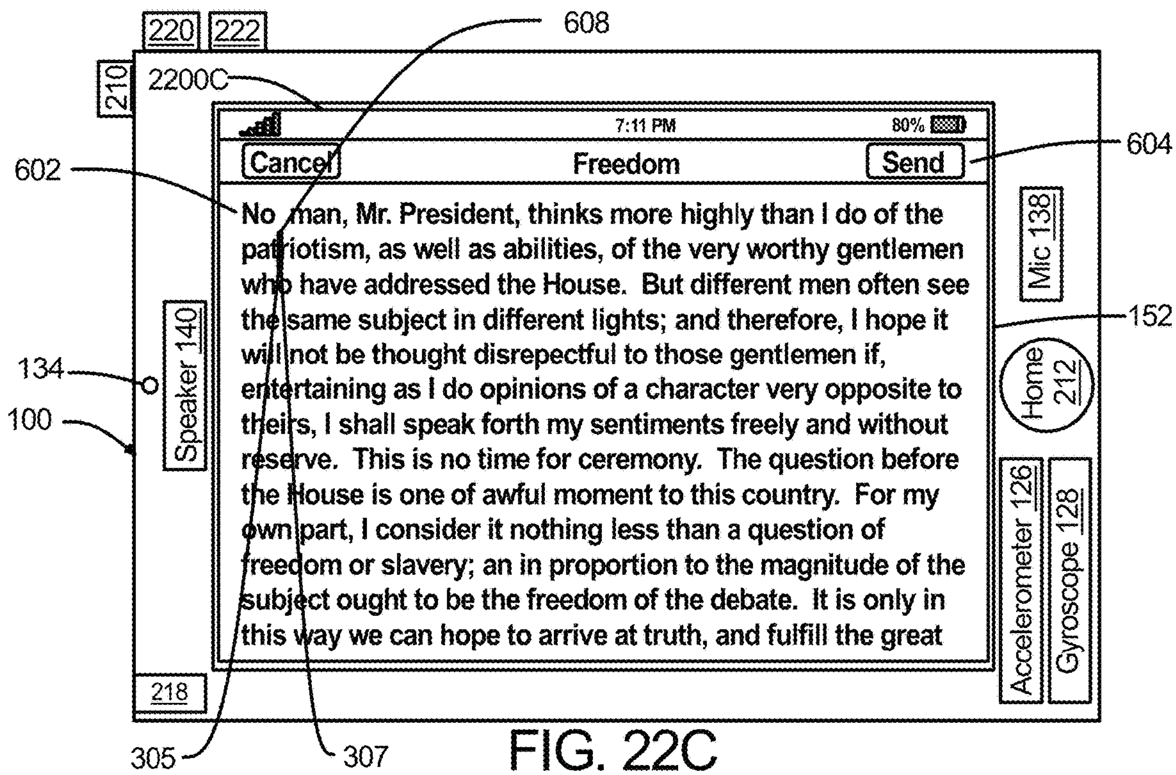

The device can display editable text content 602 in UI 2200A (FIG. 22A). The device can also display application navigation bar 604. A user can perform a finger gesture 2206 (a tap or click or long-press or long-click finger gesture for example) on touchpad 156 as illustrated in FIG. 22B. In response to detecting the finger gesture 2206 on touchpad 156, the device displays zero-length selection 608 at a first selection position as illustrated in UI 2200C (FIG. 22C). The selection 608 has a selection start point 305 and a selection end point 307. In the case of zero-length selection 608, selection start point 305 and selection end point 307 are coincident. In one exemplary embodiment, the first selection position is at approximately the same relative position on the display as the tap or click or long-press or long-click gesture on the touchpad as illustrated in FIGS. 22B-22C. In other exemplary embodiments, the first selection position is before the first character, or after the last character, in editable text content 602. In this disclosure we will often refer to "selection 608 of length equal to zero" simply as "zero-length selection 608" or "selection 608".

Figure 22D:
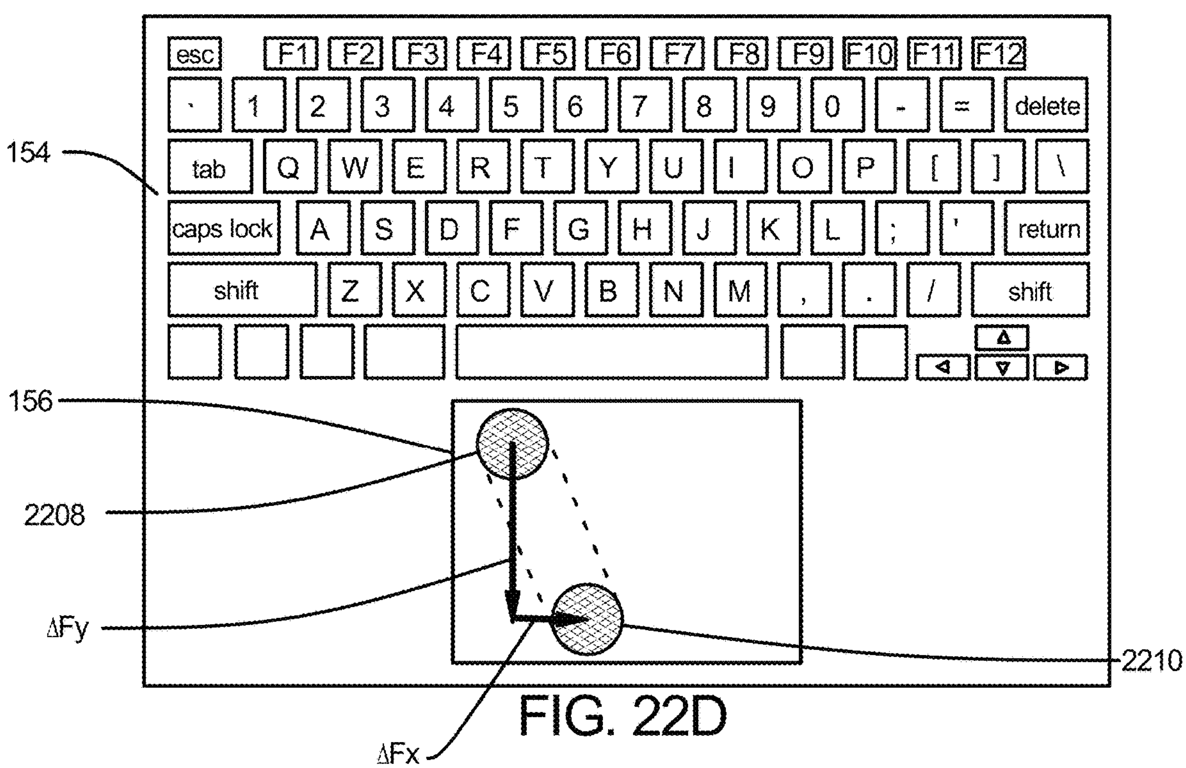
Figure 22E:
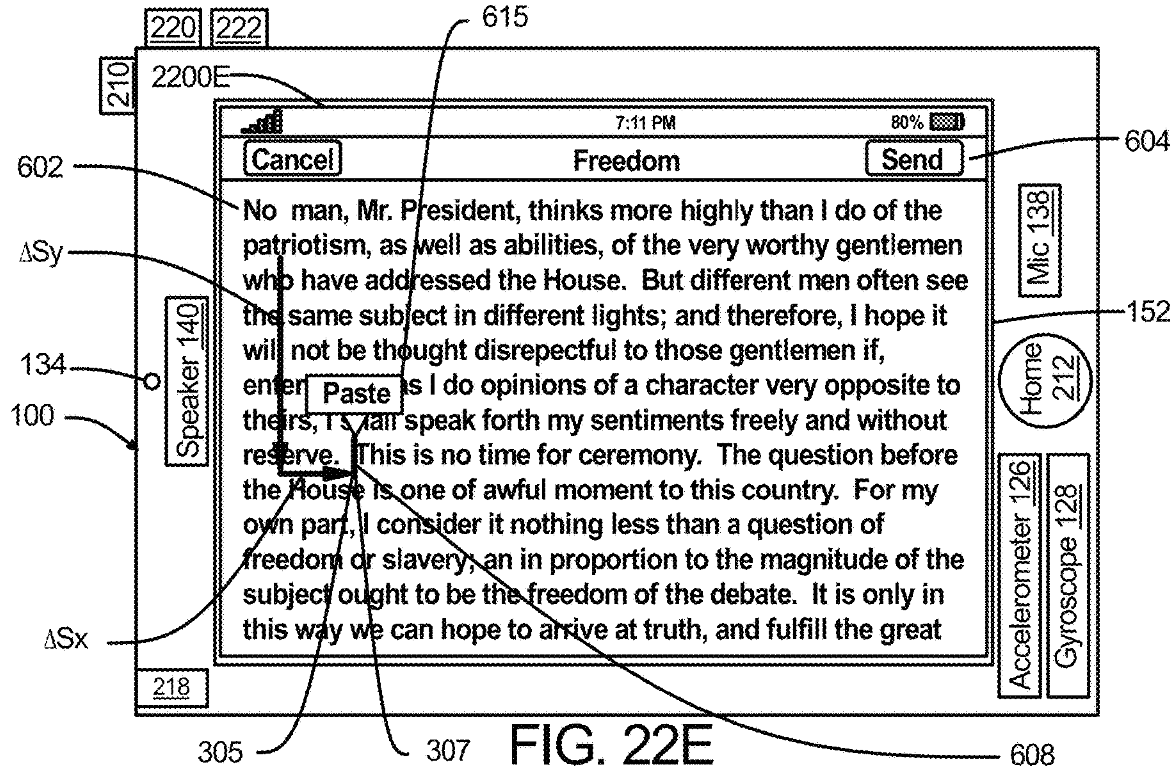

With zero-length selection 608 at a first position, a user can perform a diagonal slide finger gesture 2208 to 2210 beginning anywhere on touchpad 156. In response to detecting a change in the horizontal position (ΔFy) and change in the vertical position (ΔFy) of an uninterrupted finger contact on the touchpad 156 as illustrated in FIG. 22D, the device changes the position of selection 608 on the display from a first position to a second position as illustrated in FIG. 22E. In this exemplary embodiment ΔSx is approximately proportional to ΔFx and ΔSy is approximately proportional to ΔFy as illustrated in FIGS. 22D-22E. The device displays UI 2200E (FIG. 22E) with selection 608 at a second position. In this example, Kx~1 and Ky~1. The device can also display menu 615 for zero-length selection 608. Menu 615 displays available actions with respect to the selection.

Figure 22F:
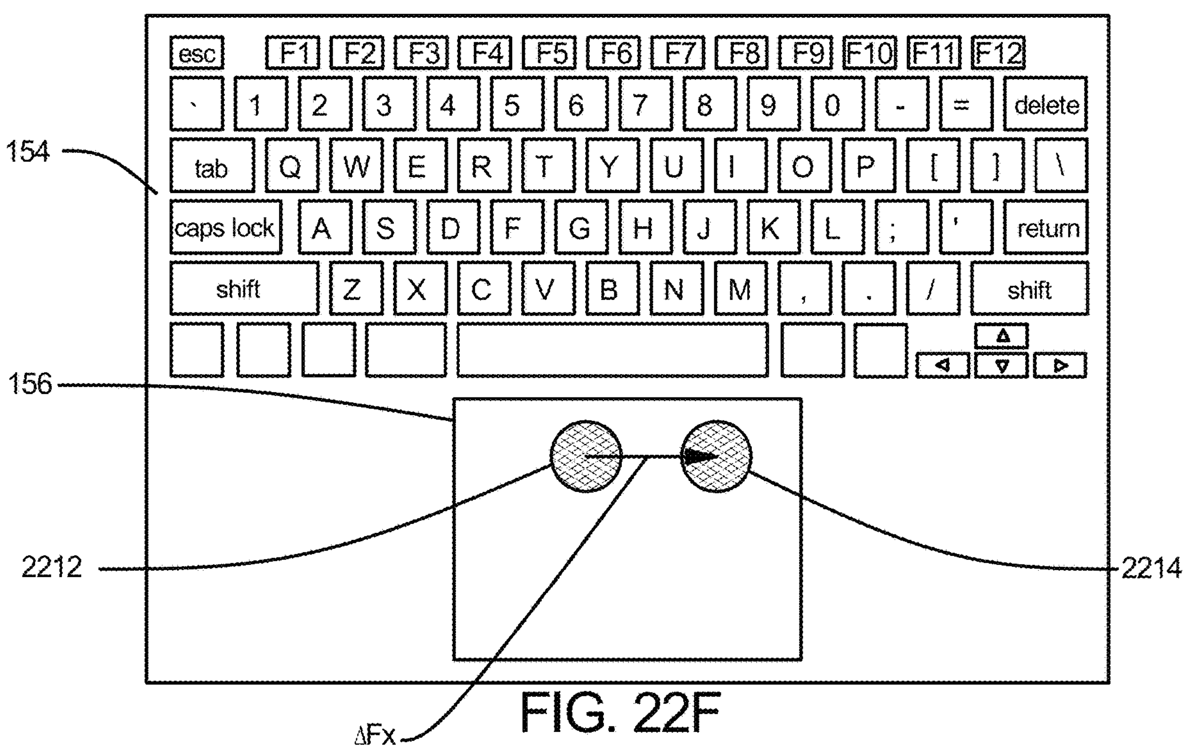
Figure 22G:
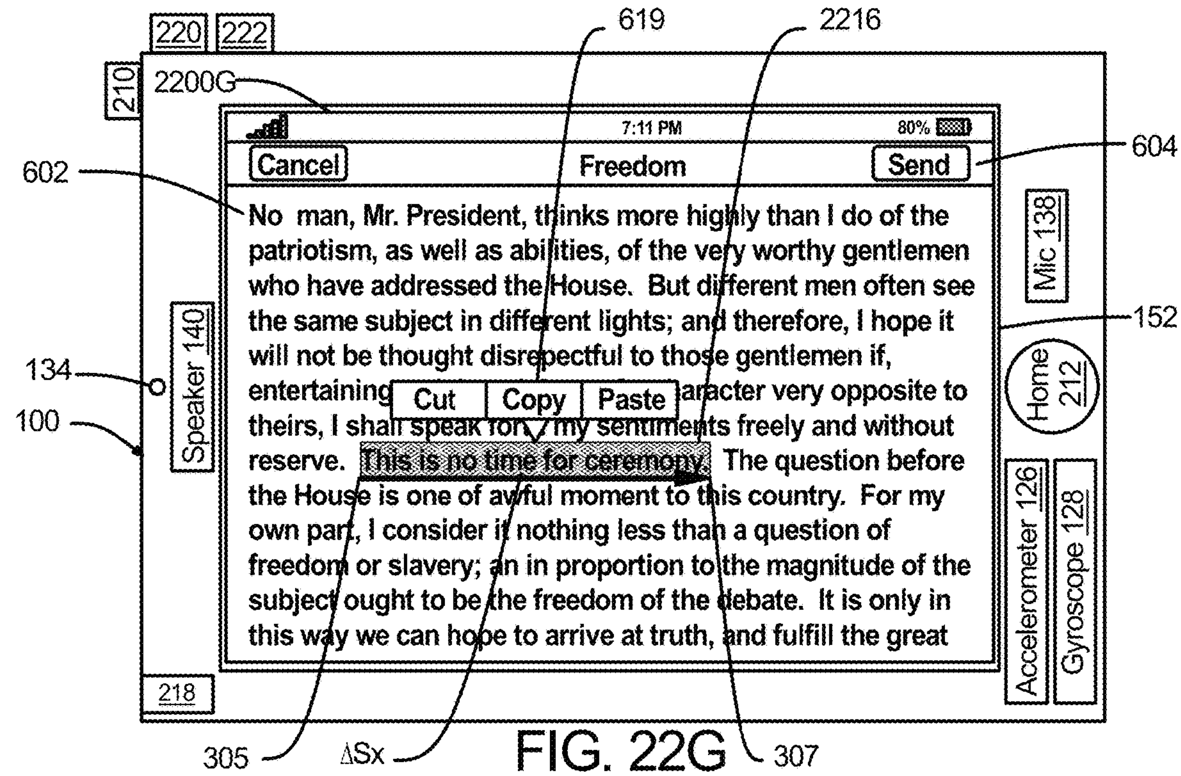

With zero-length selection 608 at a first position, a user can perform a horizontal tap-and-slide or click-and-slide finger gesture 2212 to 2214 beginning anywhere on touchpad 156. In response to detecting a tap and change in the horizontal position (ΔFx) of an uninterrupted finger contact on the touchpad 156 as illustrated in FIG. 22F, the device changes the position of selection end point 307 on the display from a first position to a second position as illustrated in FIGS. 22F-22G. In this exemplary embodiment ΔSx is approximately proportional to ΔFx as illustrated in FIGS. 22F-22G. The device displays UI 2200G (FIG. 22G) with selection end point 307 at a second position. Selection 2216 in this example is the sentence "This is no time for ceremony." In this example, Kx~1.

Figure 22H:
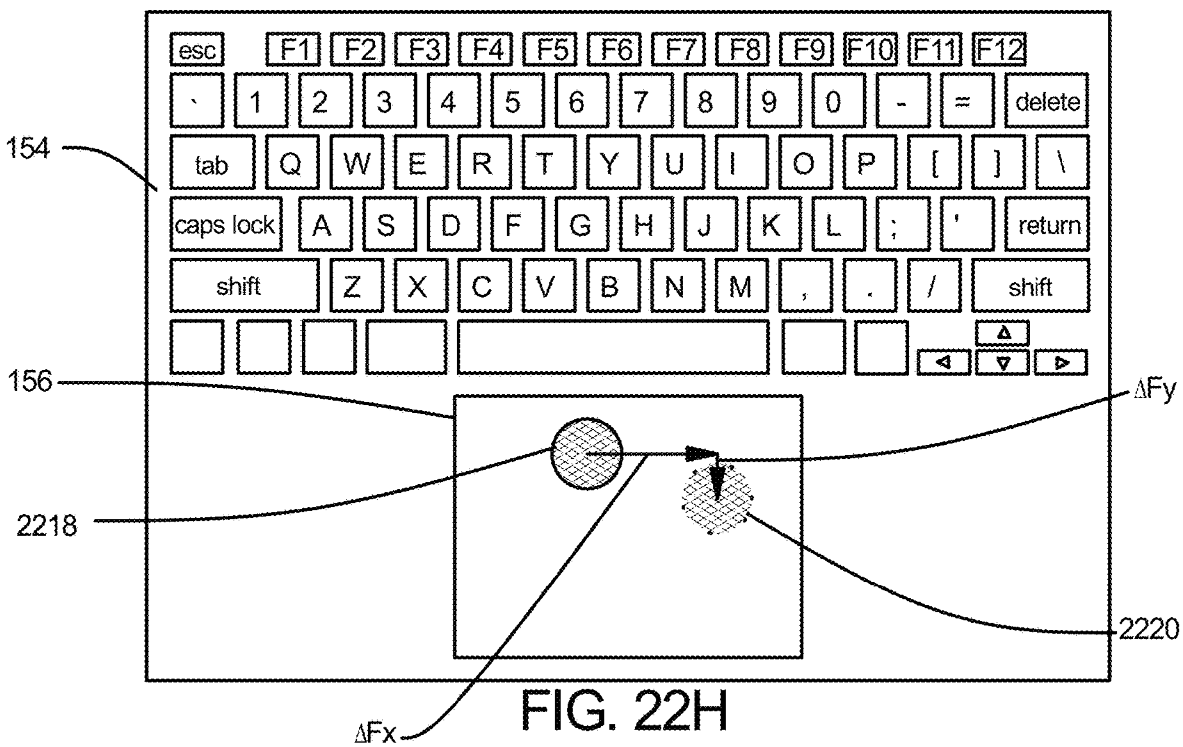
Figure 22I:
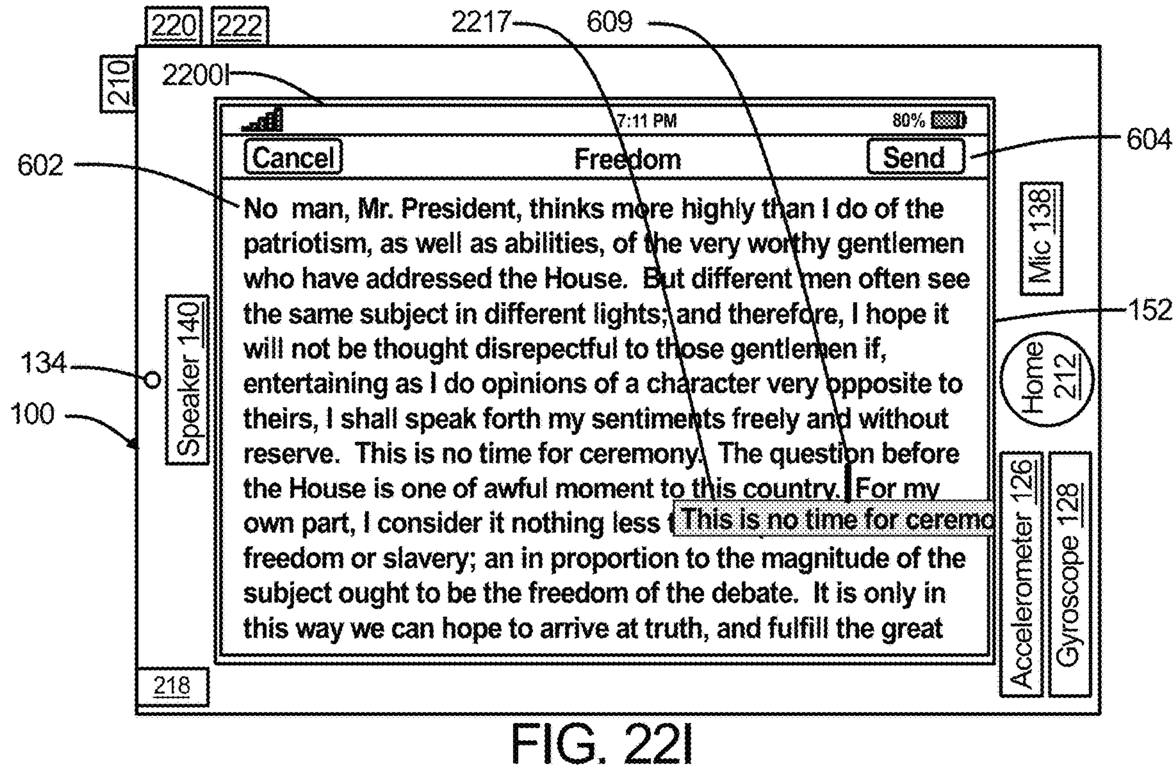
Figure 22J:
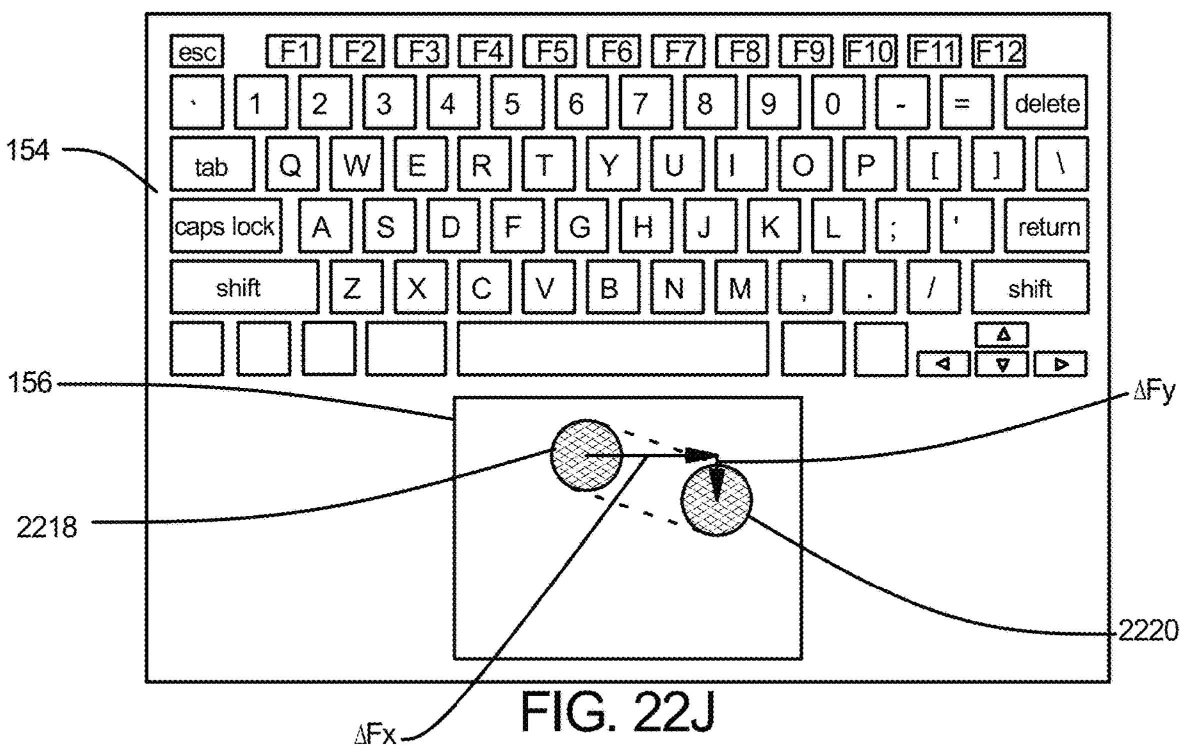
Figure 22K:
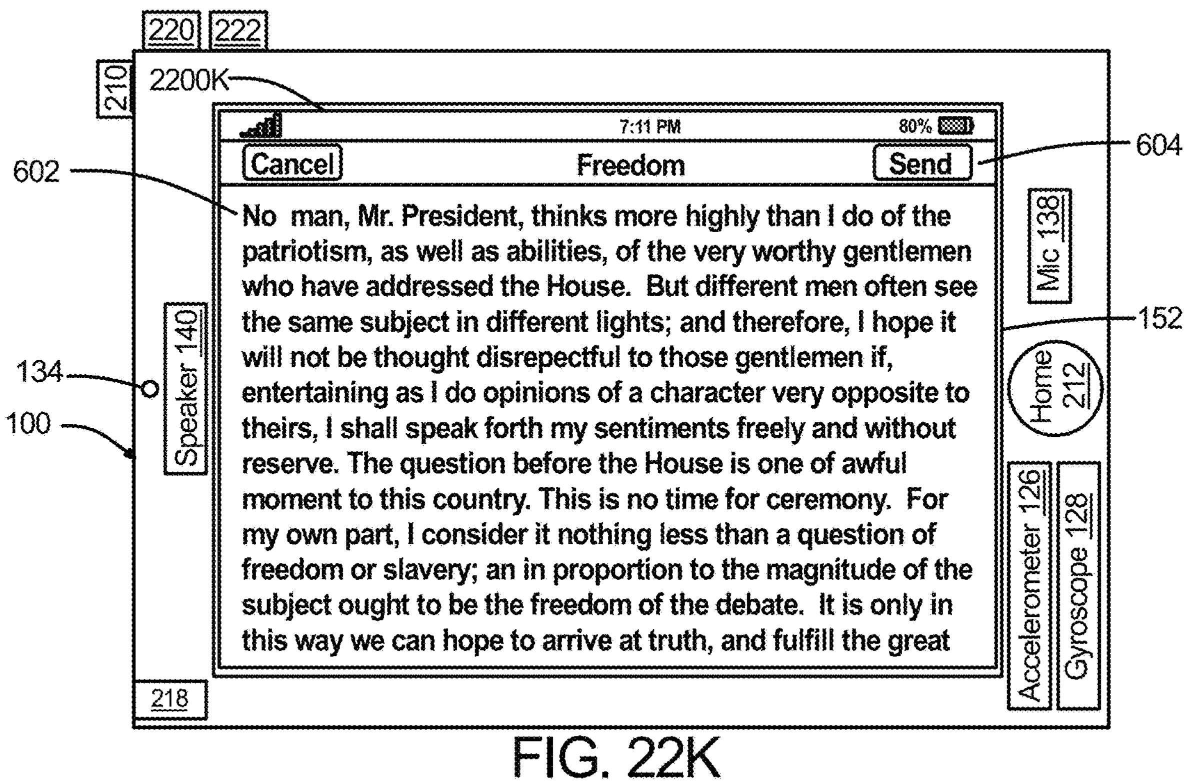

With selection 2216 at a first position, a user can perform a diagonal tap-and-slide or click-and-slide finger gesture 2218 to 2220 beginning anywhere on touchpad 156 as illustrated in FIGS. 22G-22H. In response to detecting a tap and change in the horizontal position (ΔFx) and change in the vertical position (ΔFy) of an uninterrupted finger contact on the touchpad 156 as illustrated in FIG. 22H, the device changes the position of selection 2216 "This is no time for ceremony." on the display from a first position to a second position within editable text content 602 as illustrated in FIGS. 22G-22K.

During the first portion of the gesture before the finger lift at the end of the tap and slide finger gesture, the device changes the position of temporary copy 2217 of selection 2216 on the display from a first position to a second position as illustrated in FIGS. 22H-221. During this first portion of the gesture the device also displays a temporary zero-length selection 609 above temporary copy 2217 of selection 2216 to aid in dropping the selection "This is no time for ceremony" at a new position in editable text content 602. In this exemplary embodiment ΔSx is approximately proportional to ΔFx and ΔSy is approximately proportional to ΔFy as illustrated in FIGS. 22H-221. In this example, Kx~1 and Ky~1.

During the second portion of the gesture after the finger lift at the end of the tap and slide finger gesture, the device inserts selection 2216 "This is no time for ceremony" at the position of the temporary zero-length selection 609 as illustrated in FIGS. 22H-22K. During this second portion of the gesture the device also removes the selection "This is no time for ceremony" from its prior position. During this second portion the device also ceases displaying the temporary copy 2217 of selection 2216 and ceases displaying temporary zero-length selection 609. The final result of this drag and drop operation in this example is equivalent to a cut operation at the first position and a paste operation at the second position.

A similar approach can be used to drag and drop a copy of a selection, either within the same application, or from a first application to a second application such as from a note text content to an email text content, for example.

Drag-and-drop of selected text, with drag-lock set OFF, has been described in reference to FIGS. 22G-22K. With drag-lock set OFF, the selection is dropped upon the detection of a finger lift and the end of the slide gesture.

Drag-and-drop of selected text with drag-lock set ON is described below in reference to FIGS. 22L-22T. With drag-lock set ON, the selection is dropped upon the detection of a finger tap after a finger lift and the end of a slide gesture.

Figure 22L:
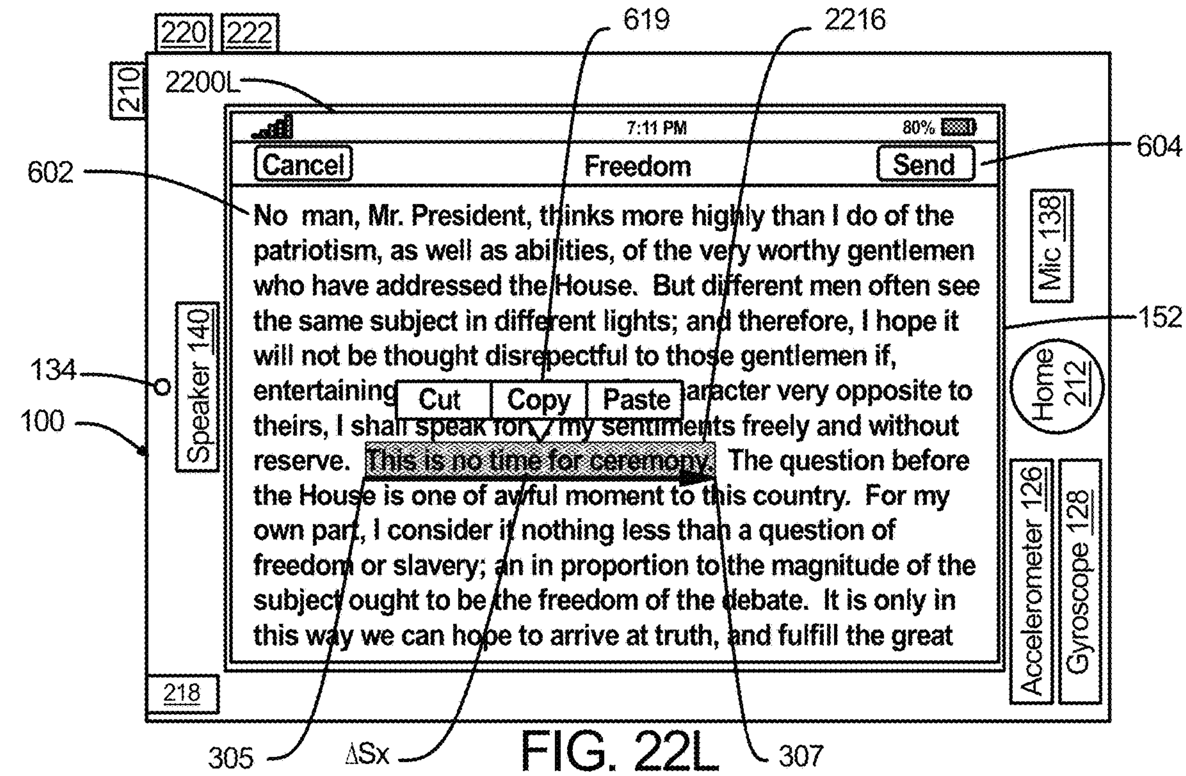
FIGS. 22L-22T illustrate an exemplary user interface and method for dragging-and-dropping selected text from a first position to a second position, and from a second position to a third position, within editable text content, with drag-lock on, on a mobile computing device with a display, using gestures on a touchpad in accordance with some embodiments.
Figure 22M:
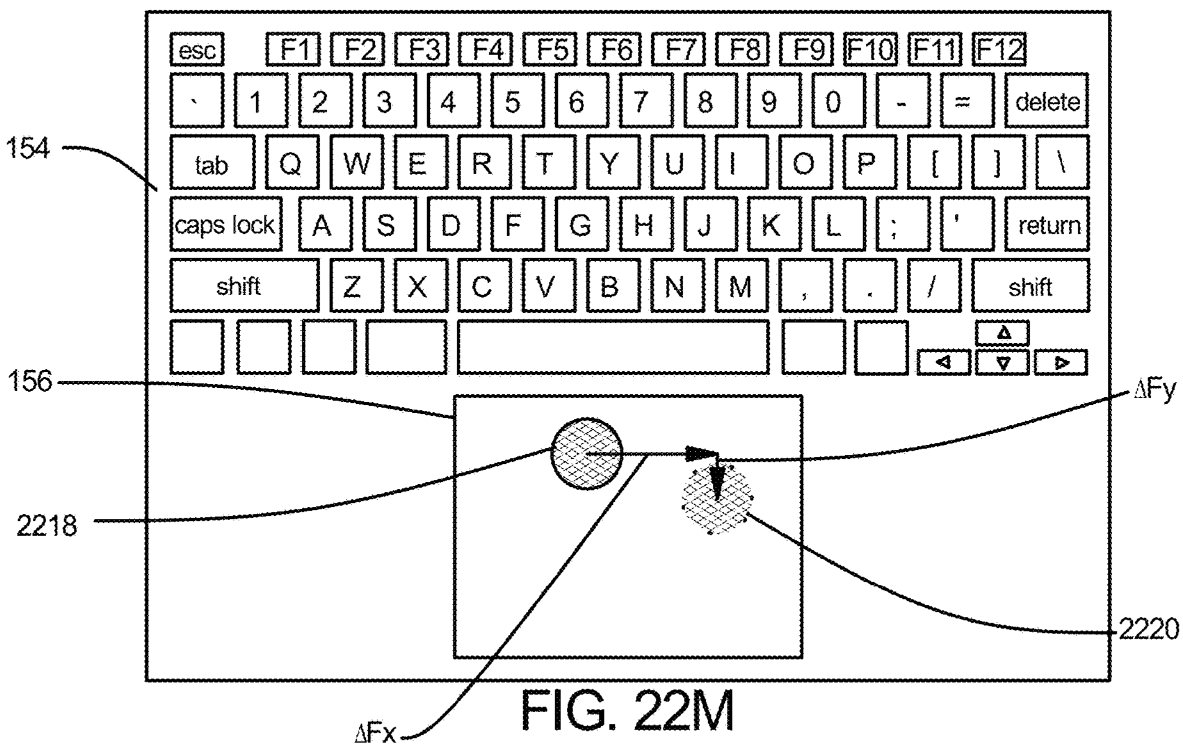
Figure 22N:
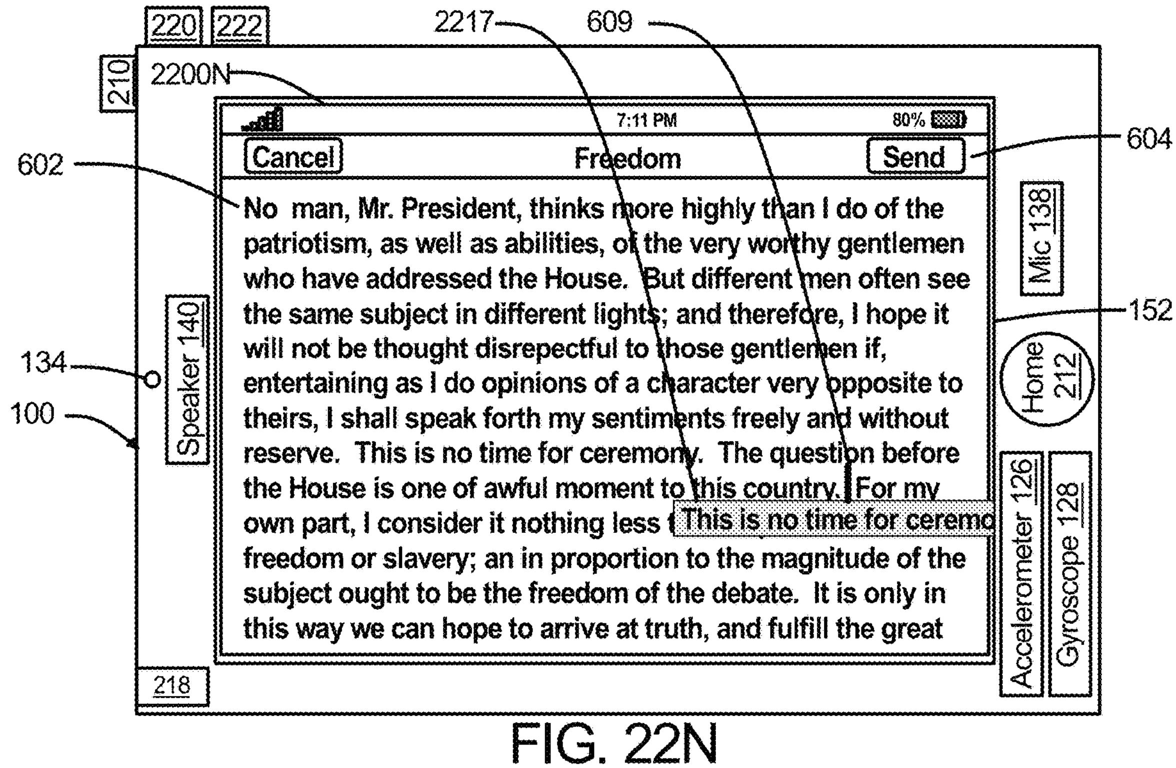
Figure 22O:
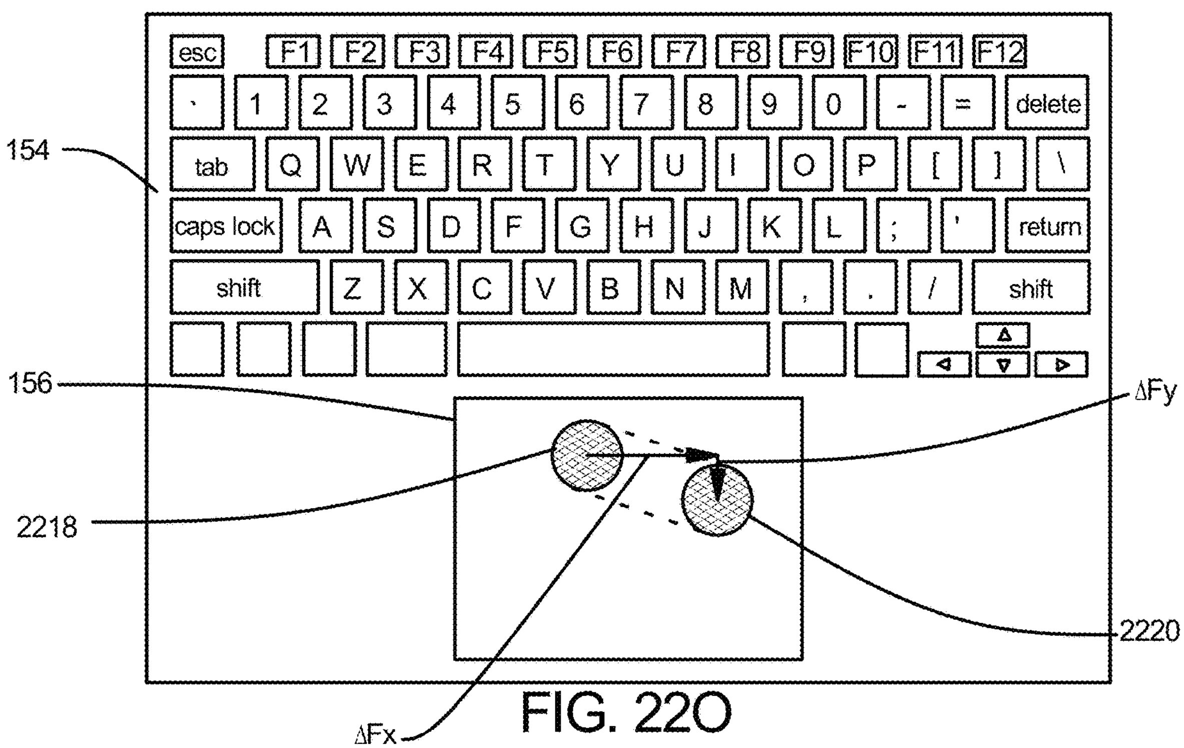

22.2 Dragging-and-dropping selected text with drag-lock on: FIGS. 22L-22T illustrate an exemplary user interface and method for dragging-and-dropping the selected editable text within an app (application) with drag-lock on, on a mobile computing device with a display, using gestures on a touchpad in accordance with some embodiments. (FIGS. 22L-22N are derived from FIGS. 22G-221 as they illustrate the first portion of a drag and drop action.)

With selection 2216 at a first position as illustrated in FIG. 22L, a user can perform a diagonal tap-and-slide or click-and-slide finger gesture 2218 to 2220 beginning anywhere on touchpad 156 as illustrated in FIGS. 22M-22N. In response to detecting a tap and change in the horizontal position (ΔFx) and change in the vertical position (ΔFy) of an uninterrupted finger contact on the touchpad 156 as illustrated in FIG. 22M, the device changes the position of selection 2216 "This is no time for ceremony." on the display from a first position to a second position within content 602 as illustrated in FIGS. 22M-22P.

During a first portion of the gesture before the finger lift at the end of the tap and slide finger gesture, the device changes the position of temporary copy of selection 2216 on the display from a first position to a second position as illustrated in FIGS. 22M-22N. During this first portion of the gesture the device also displays a temporary zero-length selection 609 above the temporary copy 2217 of selection 2216 to aid in dropping the selection "This is no time for ceremony" at a new position in editable text content 602.

Figure 22P:
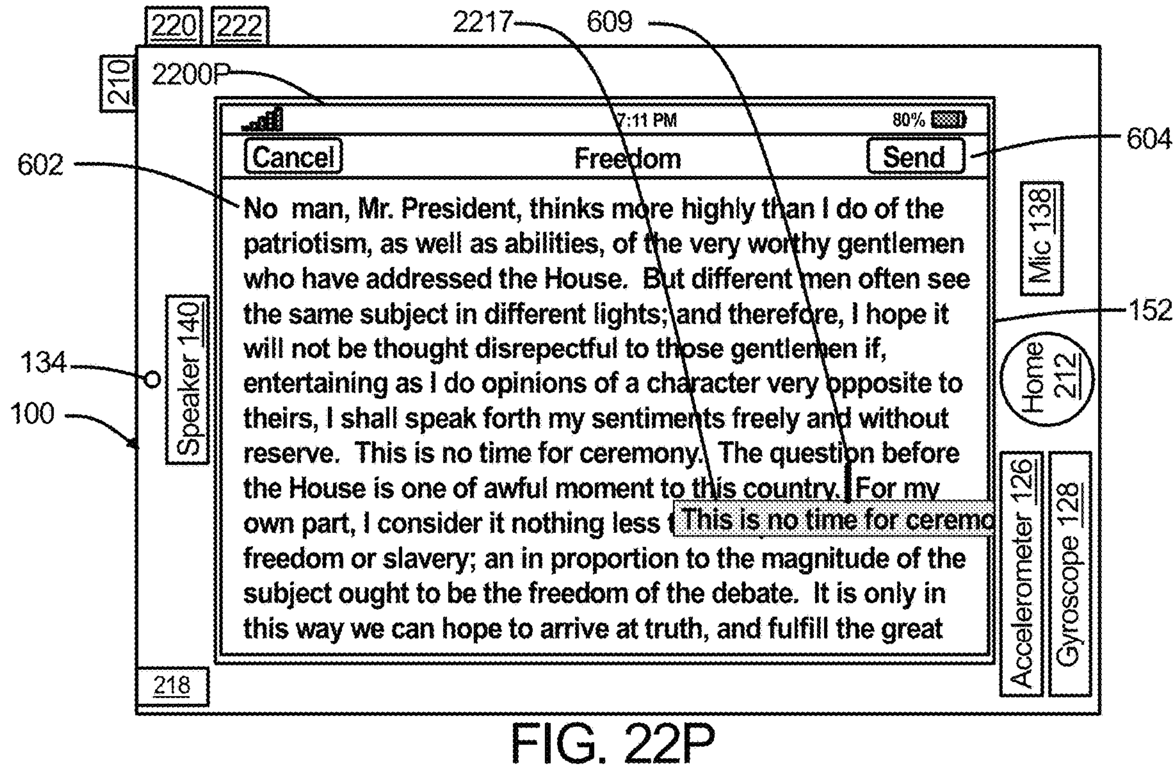
Figure 22Q:
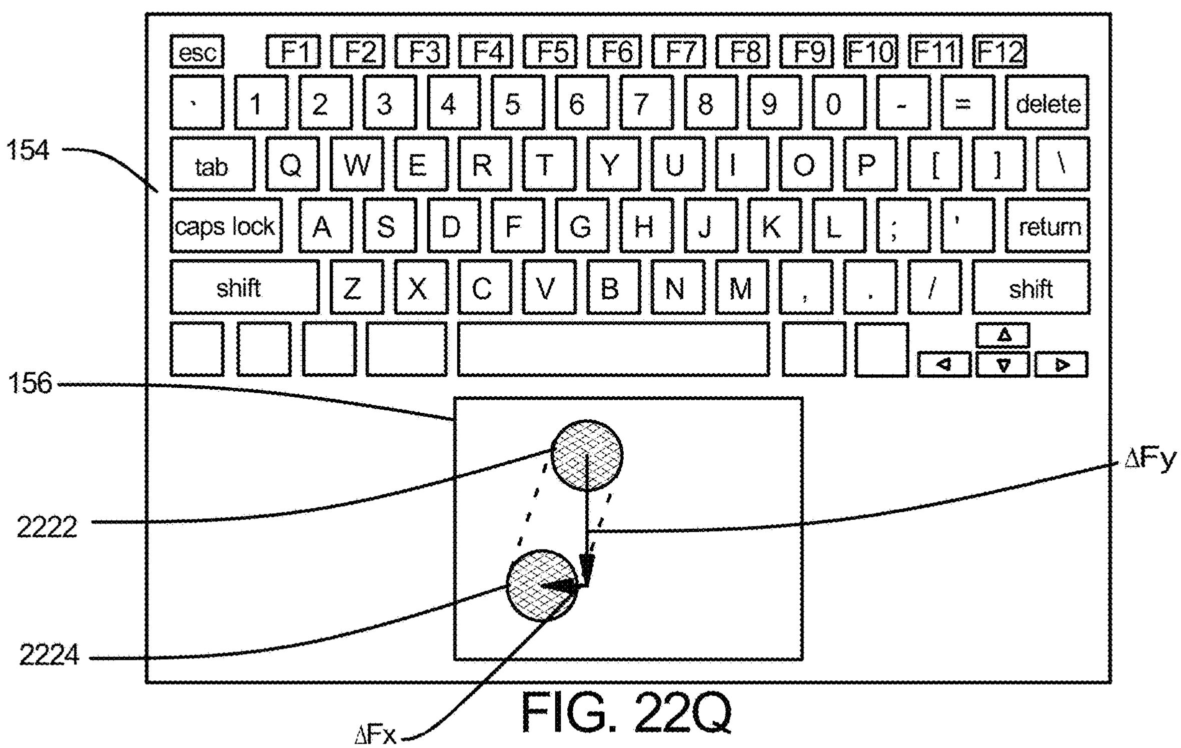
Figure 22R:
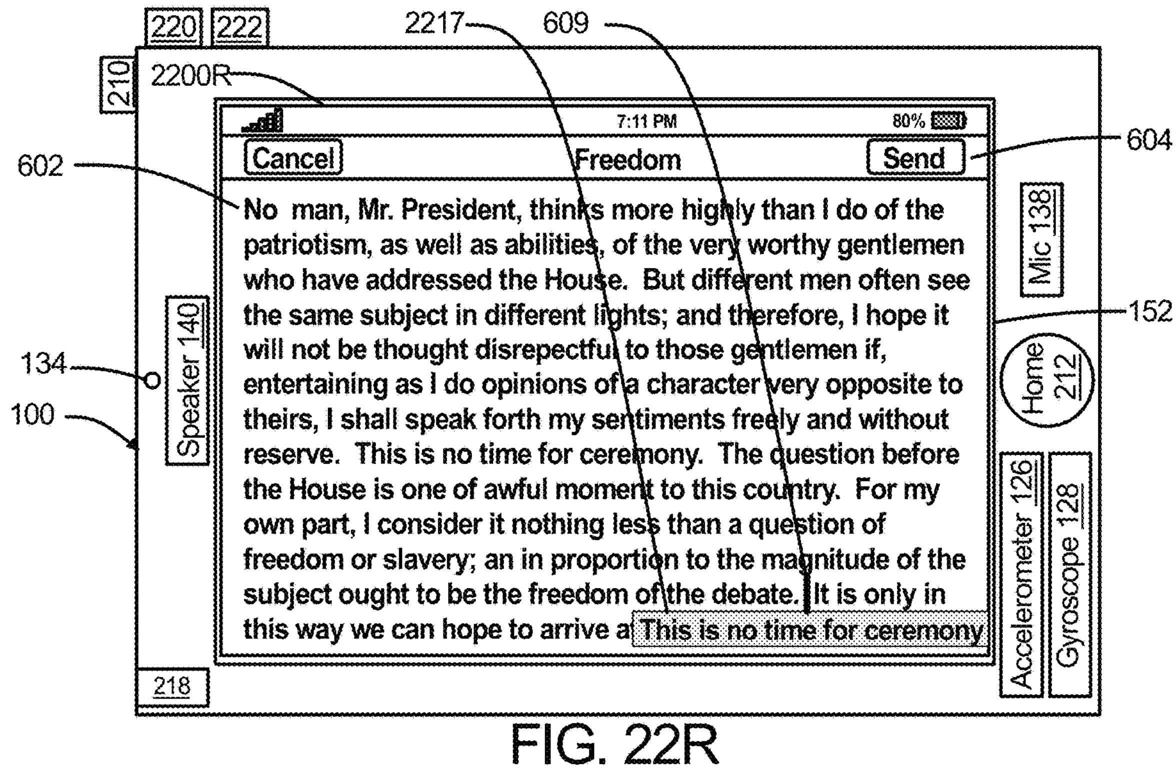
Figure 22S:
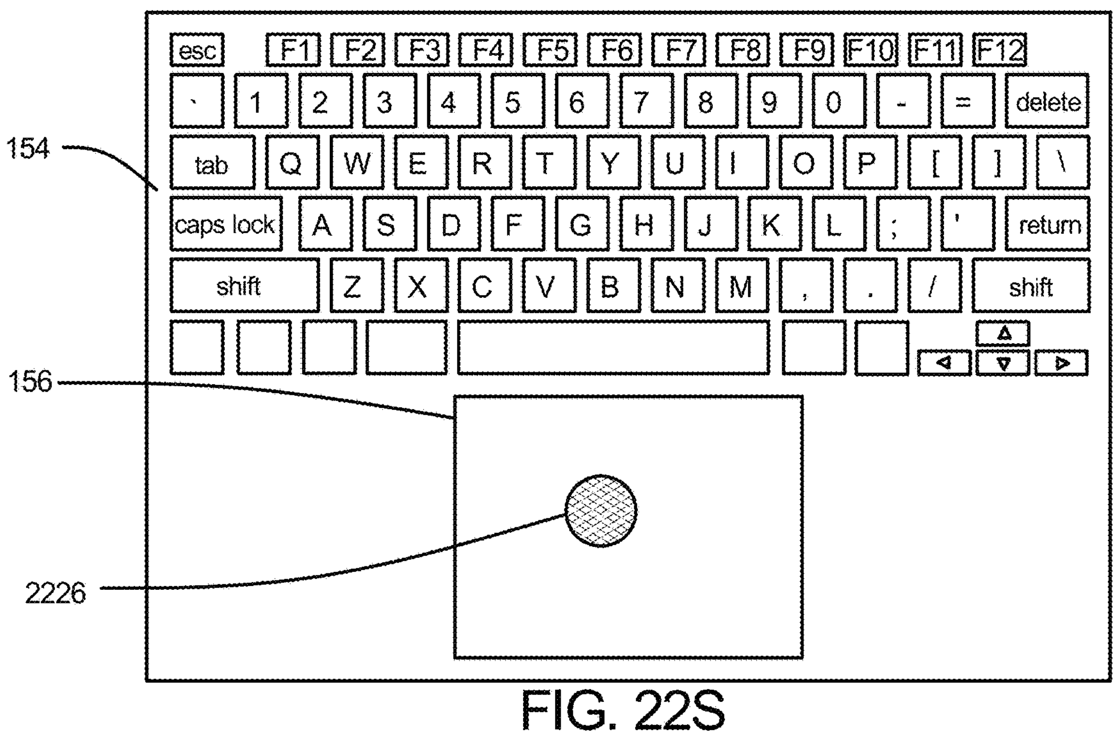
Figure 22T:
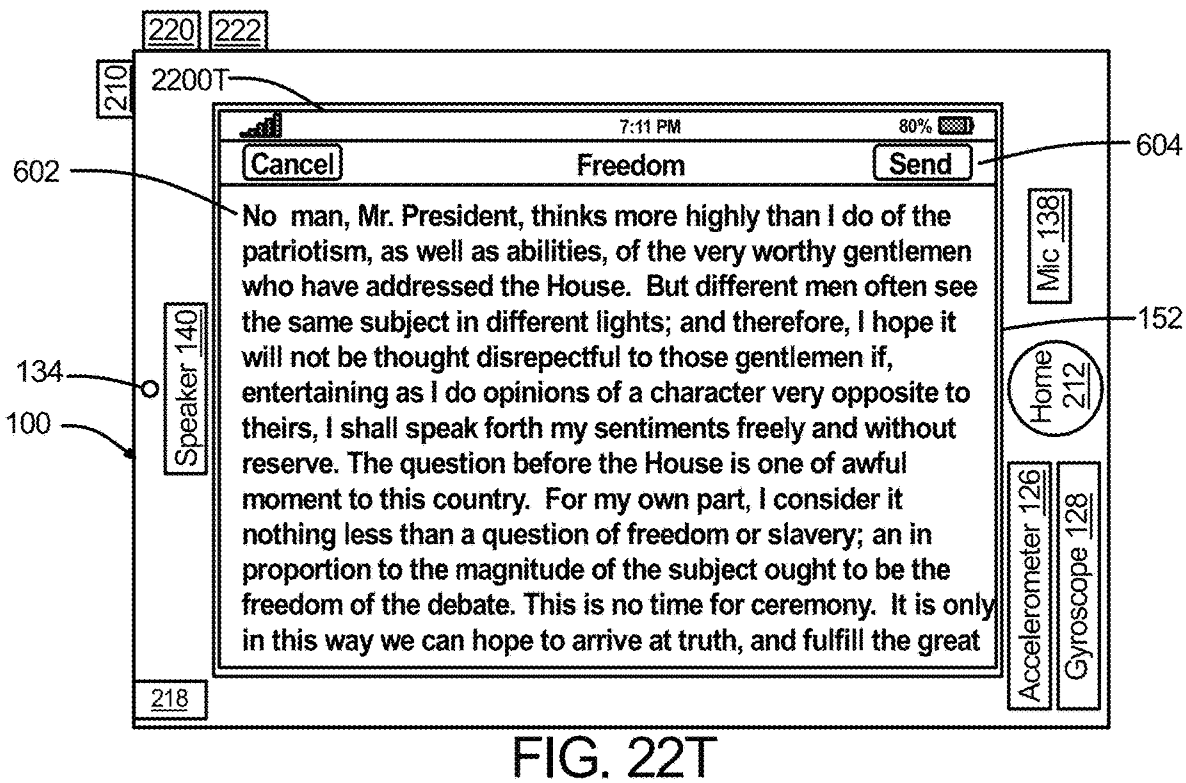

A user can perform one or more additional slide gestures on touchpad to adjust the position of selection 2216. For example, a user can perform a diagonal slide gesture 2222 to 2224 beginning anywhere on touchpad 156 as illustrated in FIG. 22Q. In response to detecting a change in the horizontal position (ΔFx) and change in the vertical position (ΔFy) of an uninterrupted finger contact on the touchpad 156 as illustrated in FIG. 22Q, the device changes the position of temporary copy 2217 of selection 2216 "This is no time for ceremony." on the display from a first position to a new second position within content 602 as illustrated in FIGS. 22P-22R. The user can continue to change the position of temporary copy 2217 of selection 2216 with additional gestures until satisfied with the position (not shown). The user can then perform finger gesture 2226 (a tap or click gesture for example) anywhere on touchpad 156 as illustrated in FIG. 22S. In response to detecting finger gesture 2226, the device inserts selection 2216 "This is no time for ceremony" at the final position of the temporary zero-length selection 609 as illustrated in FIG. 22T. During this final portion of the gesture the device also removes the selection "This is no time for ceremony" from its prior position. During this final portion the device also ceases displaying temporary copy 2217 of selection 2216 and ceases displaying temporary zero-length selection 609. The final result of this drag and drop operation in this example is equivalent to a cut operation at the first position and a paste operation at a final position.

Figure 22U:
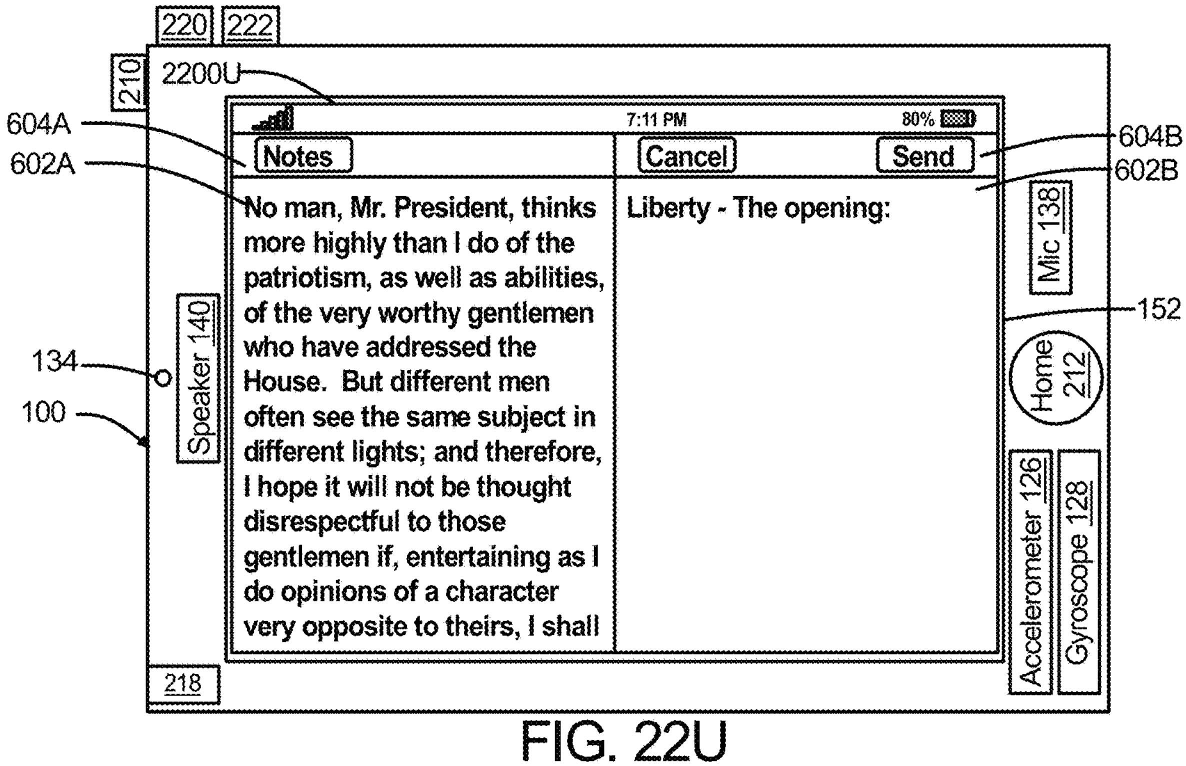

22.3 Dragging-and-dropping selected text with drag-lock off: FIGS. 22U-22CC illustrate an exemplary user interface and method for selecting text, and dragging-and-dropping the selected text from a first application to a second application with drag-lock off, on a mobile computing device with a display, using gestures on a touchpad in accordance with some embodiments.

Figure 22V:
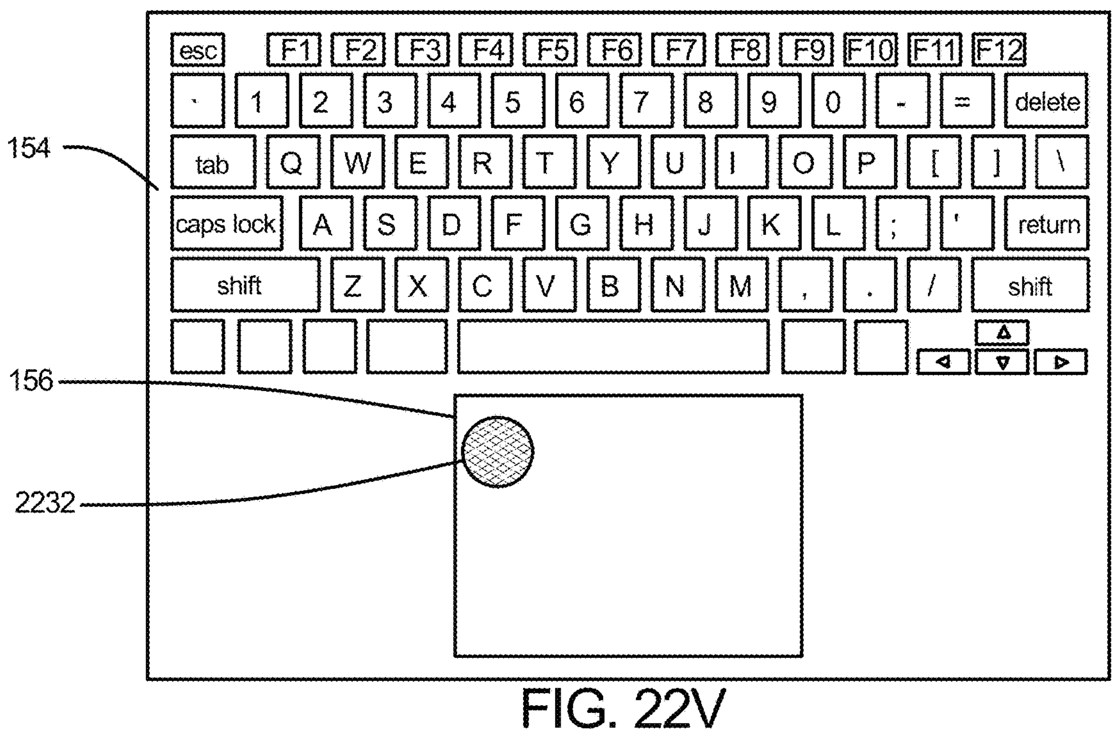
Figure 22W:
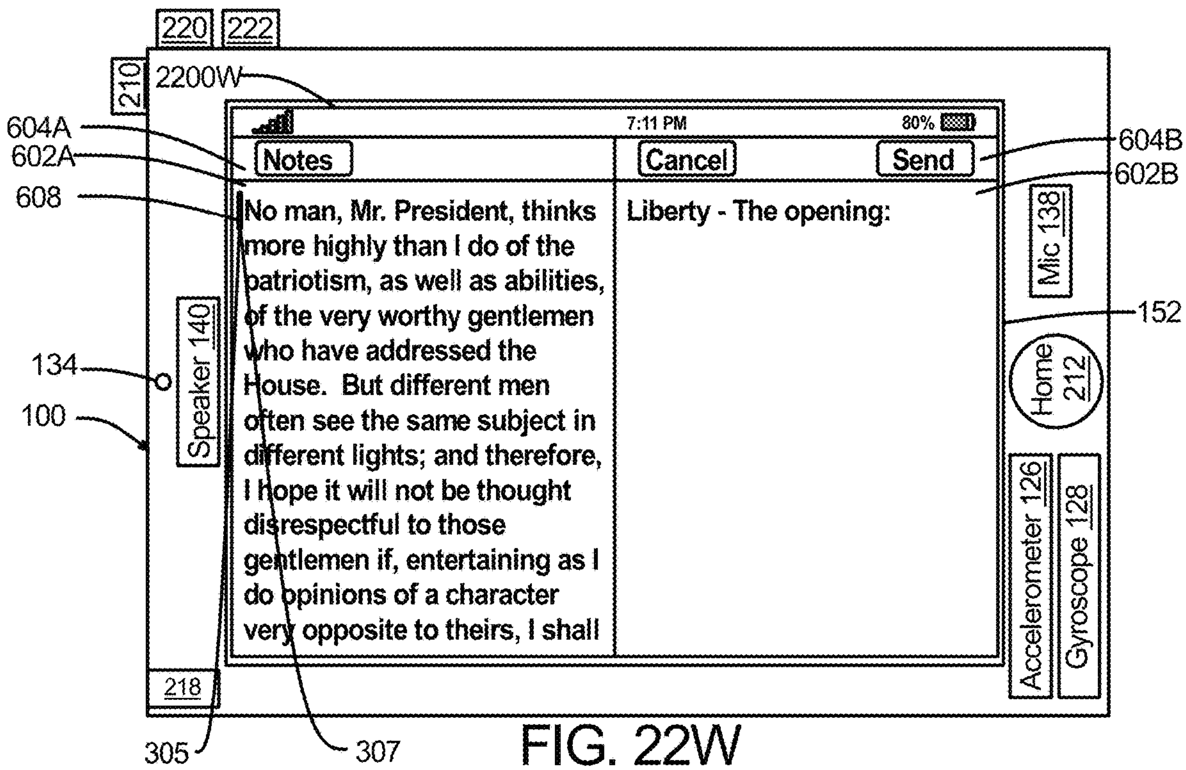

The device can display two applications in a split screen view as illustrated in UI 2200U (FIG. 22U). The device can display editable text content 602A in a first application and editable text content 602B in a second application as illustrated UI 2200U (FIG. 22U). The device can also display application navigation bar 604A for the first application and application navigation bar 604B for the second application. In this example, the first application is a note application and the second application is an email application. A user can perform a finger gesture 2232 (a tap or click or long-press or long-click finger gesture for example) on touchpad 156 as illustrated in FIG. 22V. In response to detecting the finger gesture 2232 on touchpad 156, the device displays zero-length selection 608 at a first selection position as illustrated in UI 2200W (FIG. 22W). The selection 608 has a selection start point 305 and a selection end point 307. In the case of zero-length selection 608, selection start point 305 and selection end point 307 are coincident. In one exemplary embodiment, the first selection position is at approximately the same relative position on the display as the tap or click or long-press or long-click gesture on the touchpad as illustrated in FIGS. 22V-22W. In other exemplary embodiments, the first selection position is before the first character, or after the last character, in editable text content at approximately the same relative position on the display as the tap or click or long-press or long-click gesture on the touchpad. In this disclosure we will often refer to "selection 608 of length equal to zero" simply as "zero-length selection 608" or "selection 608".

Figure 22X:
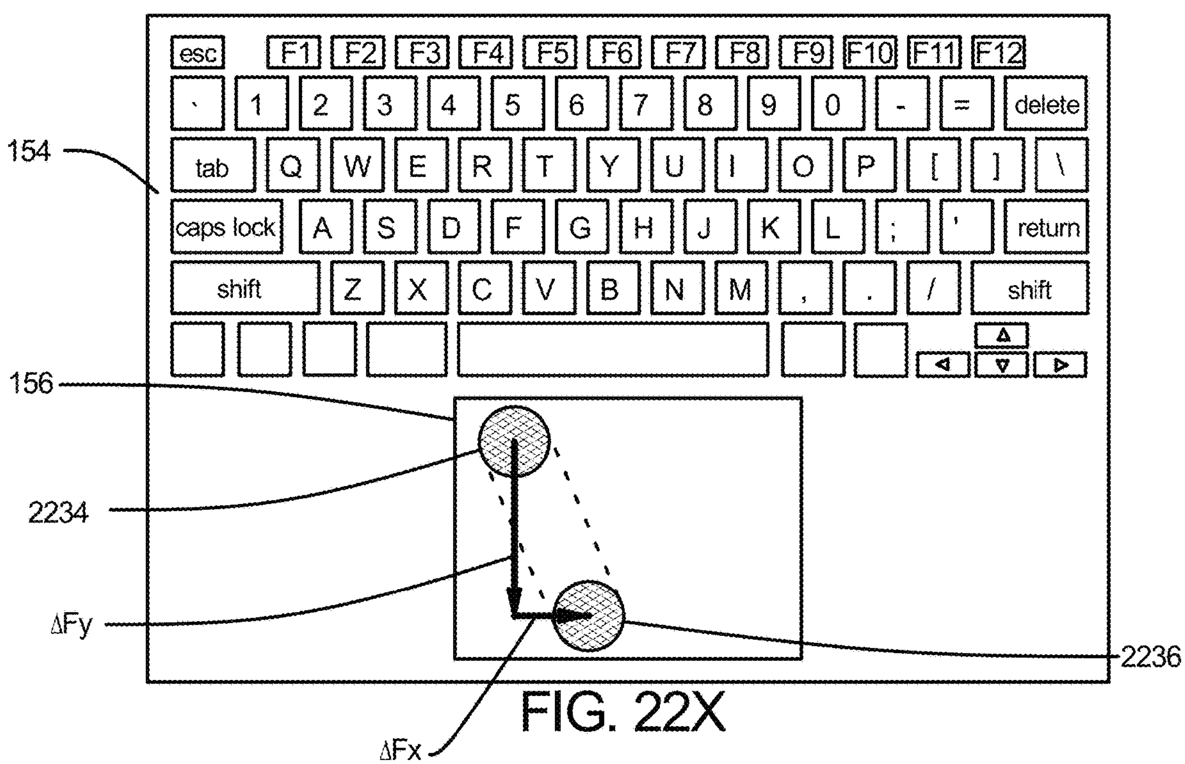
Figure 22Y:
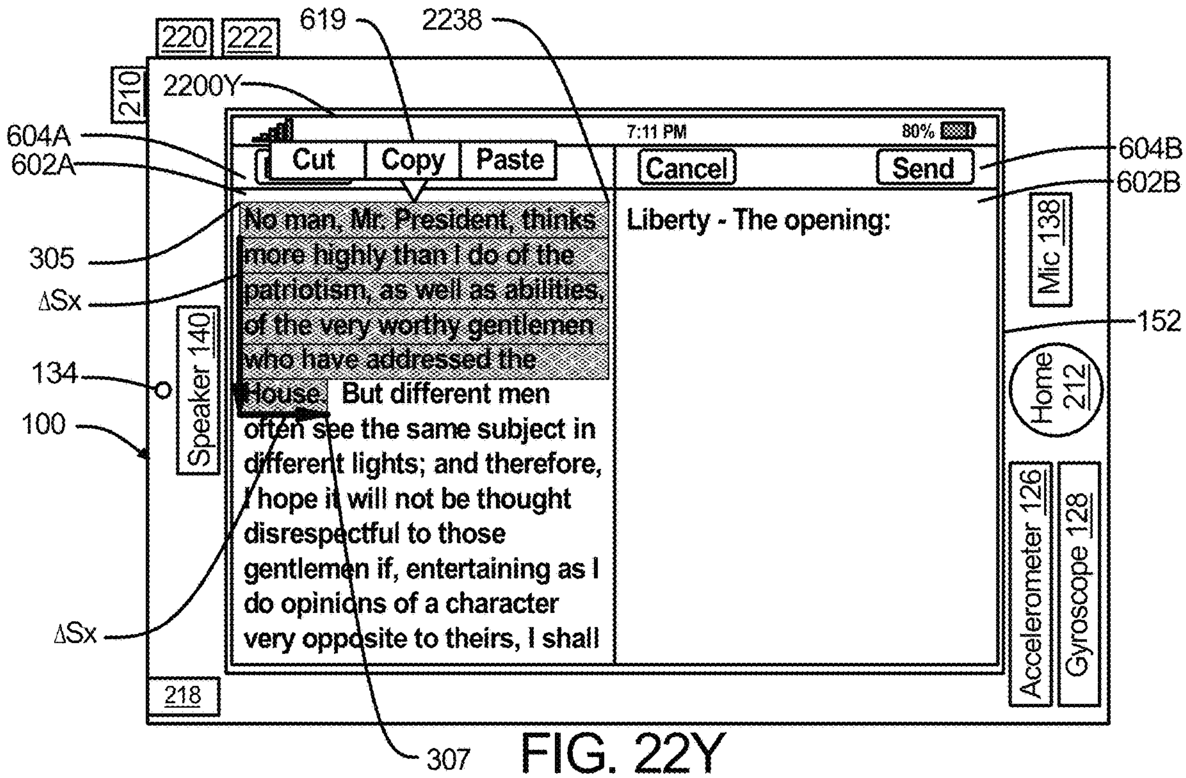

With zero-length selection 608 at a first position, a user can perform a diagonal tap and slide finger gesture 2234 to 2236 beginning anywhere on touchpad 156. In response to detecting a tap and change in the horizontal position (ΔFy) and change in the vertical position (ΔFy) of an uninterrupted finger contact on the touchpad 156 as illustrated in FIG. 22X, the device selects text from a first position to a second position as illustrated in FIG. 22Y. In this exemplary embodiment ΔSx is approximately proportional to ΔFx and ΔSy is approximately proportional to ΔFy as illustrated in FIGS. 22X-22Y. The device displays UI 2200Y (FIG. 22Y) with text selected from a first position to a second position. In this example, Kx~1 and Ky~1. The device can also display menu 619 for zero-length selection 2238. Menu 619 displays available actions with respect to the selection. (As described above, a secondary click action on touchpad 156 can display a menu of actions that can be performed with respect to a selection where gestures on touchpad 156 can be used to select and execute an action from the menu without requiring any on-screen gestures as required for a displayed on-screen menu such as menu 619.)

Figure 22Z:
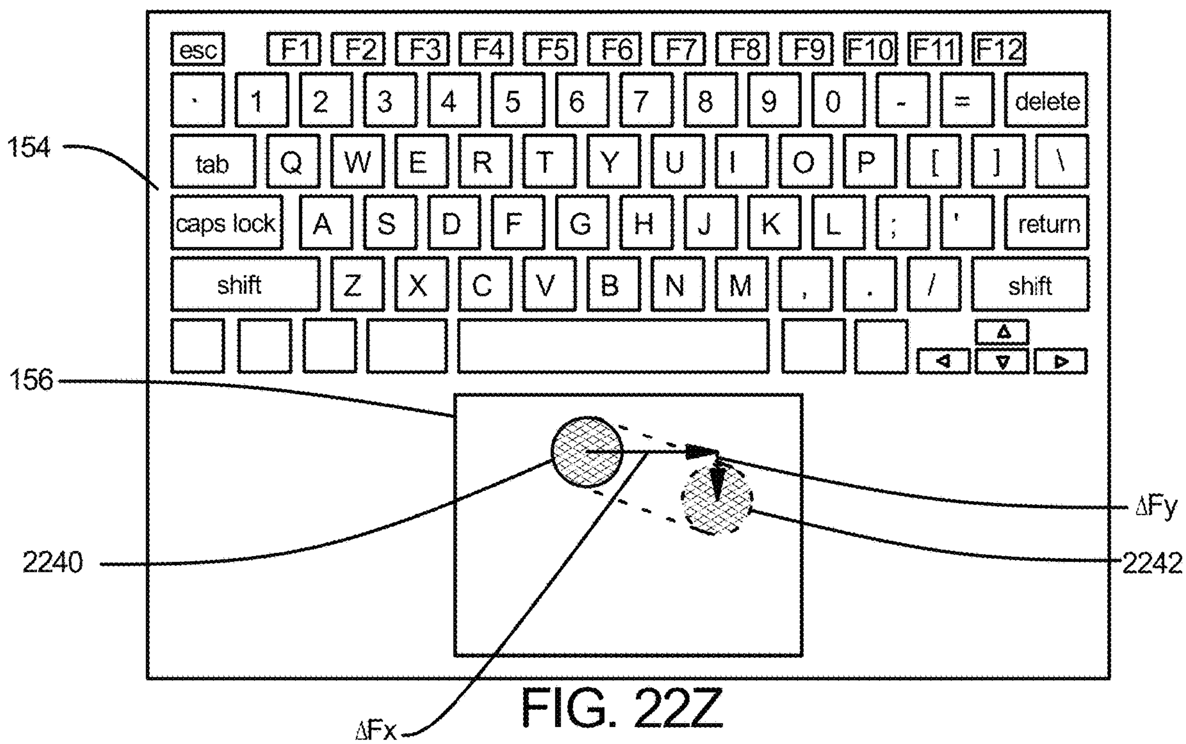
Figure 22A:
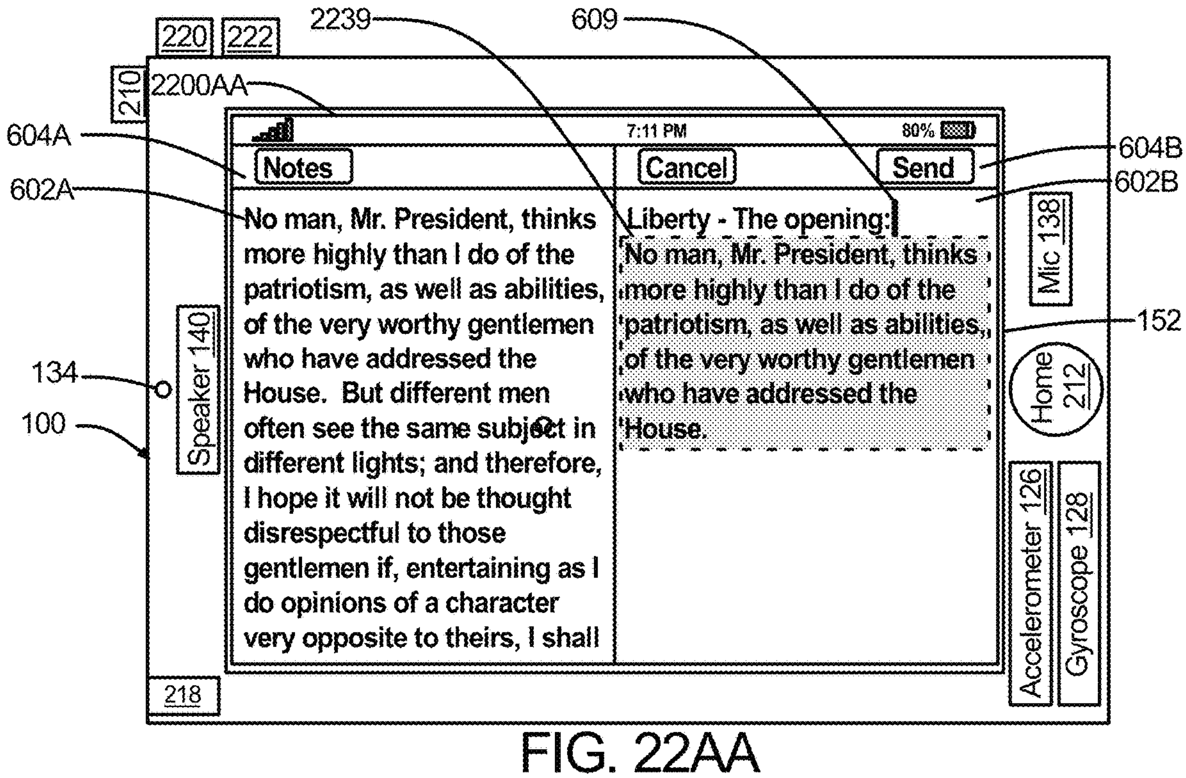
Figure 22B:
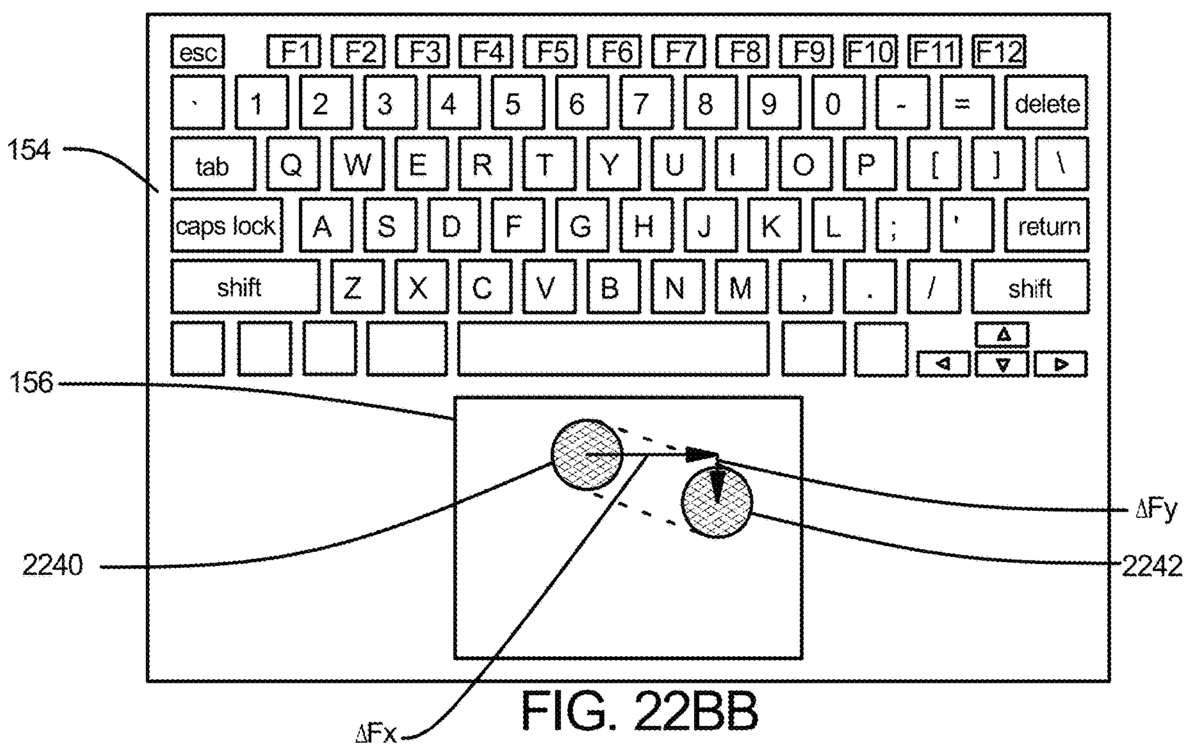
Figure 22C:
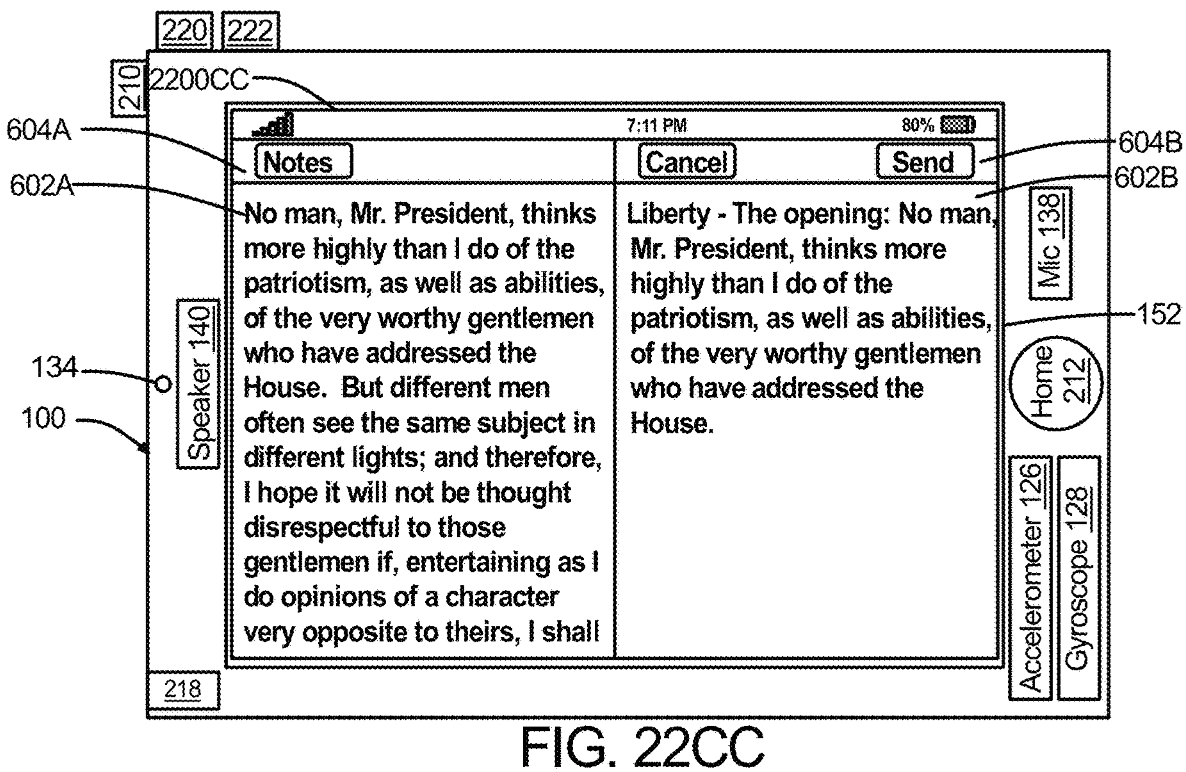

With selection 2238 in text content in a first application (the Note application), a user can perform a diagonal tap-and-slide or click-and-slide finger gesture 2240 to 2242 beginning anywhere on touchpad 156 as illustrated in FIG. 22Z. In response to detecting a tap and change in the horizontal position (ΔFx) and change in the vertical position (ΔFy) of an uninterrupted finger contact on the touchpad 156 as illustrated in FIG. 22Z, the device changes the position of a copy of selection 2238 "No man, Mr. President, thinks more highly than I do of the patriotism, as well as abilities, of the very worthy gentlemen who have address the House" from the first application to a position within editable text content 602B within the second application as illustrated in FIGS. 22Y-22CC.

During the first portion of the gesture before the finger lift at the end of the tap and slide finger gesture, the device changes the position of temporary copy 2239 of selection 2238 on the display from a position in the first application to a position within the second as illustrated in FIGS. 22Y-22AA. During this first portion of the gesture the device also displays a temporary zero-length selection 609 above temporary copy 2239 of selection 2238 to aid in dropping a copy of selection 2238 to a position in editable text content 602B in the second application. In this exemplary embodiment ΔSx is approximately proportional to ΔFx and ΔSy is approximately proportional to ΔFy as illustrated in FIGS. 22Y-22Z. In this example, Kx~1 and Ky~1.

During the second portion of the gesture after the finger lift at the end of the tap and slide finger gesture, the device inserts selection 2238 at the position of the temporary zero-length selection 609 within editable text content 602B as illustrated in FIGS. 22Y-22CC. During this second portion of the gesture the device also leaves the selected text ""No man, Mr. President, thinks more highly than I do of the patriotism, as well as abilities, of the very worthy gentlemen who have address the House."" in its original position within the first application. During this second portion the device also ceases displaying temporary copy 2239 of selection 2238 and ceases displaying temporary zero-length selection 609. The final result of this drag and drop operation in this example is equivalent to a copy operation at a position in the first application and a paste operation at a position in the second application.

Methods used to drag and drop a copy of selected editable text from a first application to a second application have been described in reference to FIGS. 22A-22K and FIGS. 22L-22T. Similar methods can be used to drag and drop a copy of selected read-only text from a first application to a second application.

A method used to drag and drop selected text, from a first application to a second application, with drag-lock off, has been described in reference to FIGS. 22U-22CC. A method used to drag and drop selected text, from a first position to a second position within an application, with drag-lock on, has been described in reference to FIGS. 22L-22T. A similar method can be used to drag and drop selected text, from a first application to a second application, with drag-lock on.

Figure 23A:
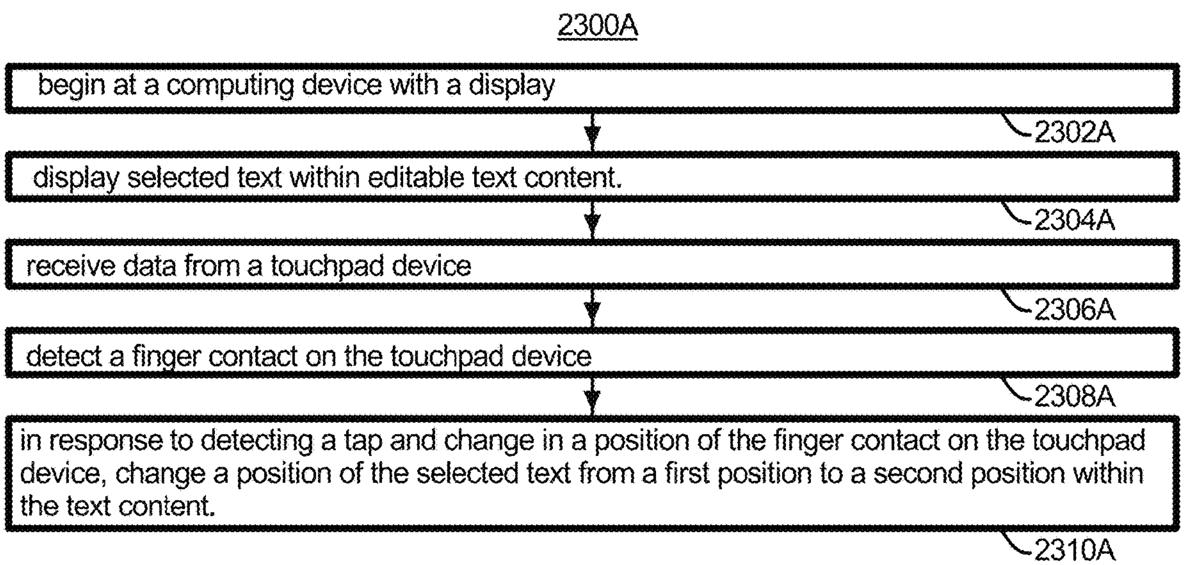
FIG. 23A is a flow diagram illustrating a method for dragging-and-dropping selected text from a first position to a second position, within editable text content, using gestures on a touchpad in accordance with some embodiments.

23.0 Method for dragging-and-dropping selected text using gestures on a touchpad:

23.1 Method for dragging-and-dropping selected text within an application: FIG. 23A is a flow diagram illustrating a method for dragging-and-dropping selected text from a first position to a second position, within editable text content, using gestures on a touchpad in accordance with some embodiments.

Figure 23B:
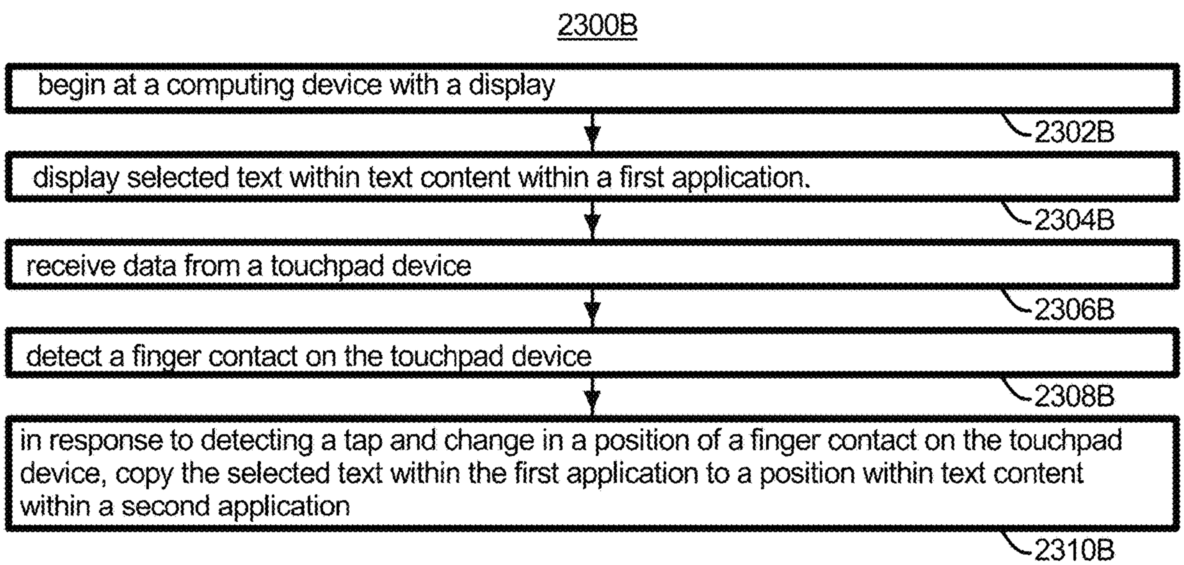
FIG. 23B is a flow diagram illustrating a method for dragging-and-dropping a copy of selected text from a first application to a position within a second application, using gestures on a touchpad in accordance with some embodiments.

23.2 Method for selecting a single word and dragging-and-dropping selected word between applications: FIG. 23B is a flow diagram illustrating a method for dragging-and-dropping a copy of selected word from a first application to a position within a second application, using gestures on a touchpad in accordance with some embodiments.

Figure 24A:
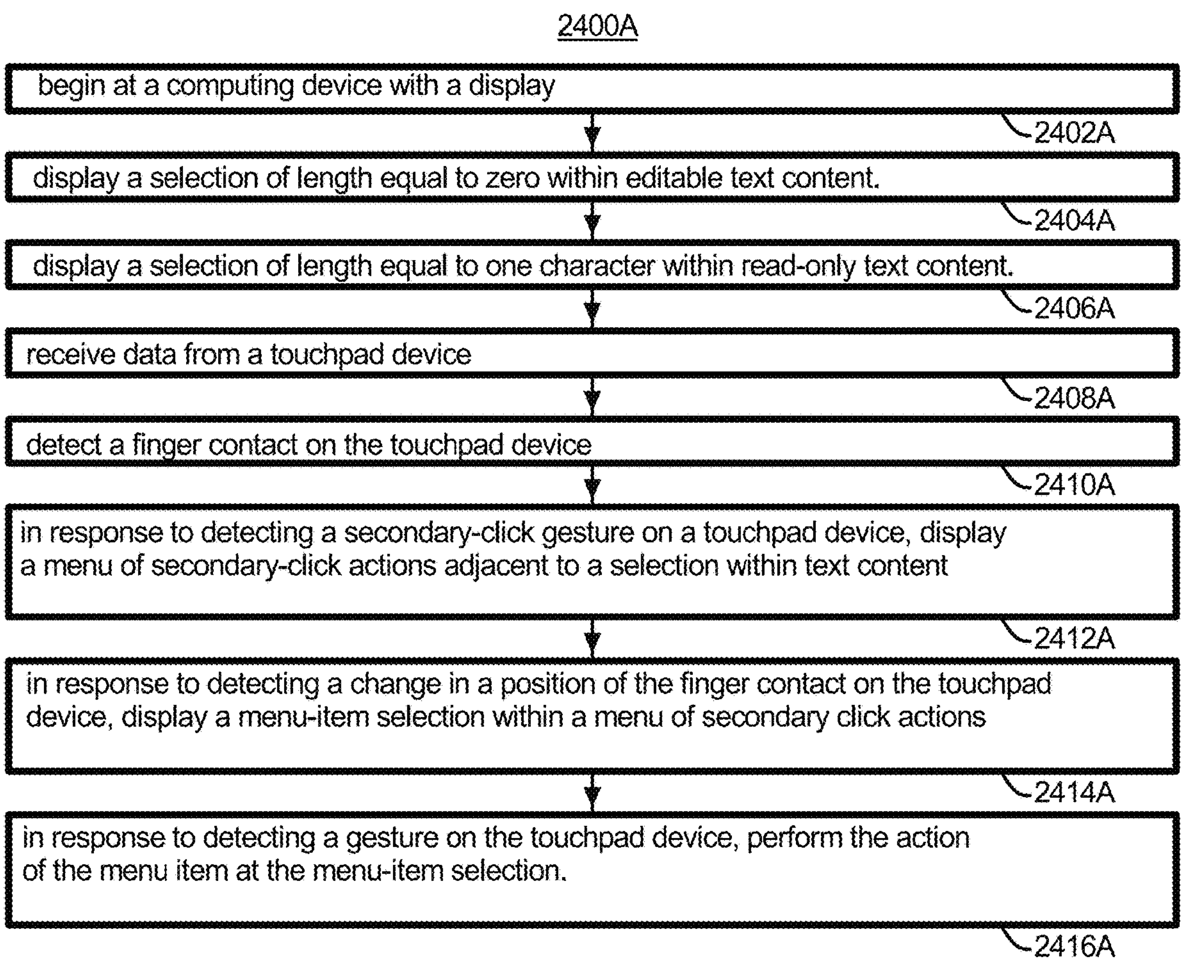
FIG. 24A is a flow diagram illustrating a method for performing a secondary-click action with respect to a selection within editable or read-only text content, on a computing device with a display, using gestures on a touchpad in accordance with some embodiments.

24.0 Method for performing a secondary-click action with respect to a selection:

24.1 Method for performing a secondary-click action with respect to a selection within editable or read-only text: FIG. 24A is a flow diagram illustrating a method for performing a secondary-click action with respect to a selection within editable or read-only text content, on a computing device with a display, using gestures on a touchpad in accordance with some embodiments.

Figure 24B:
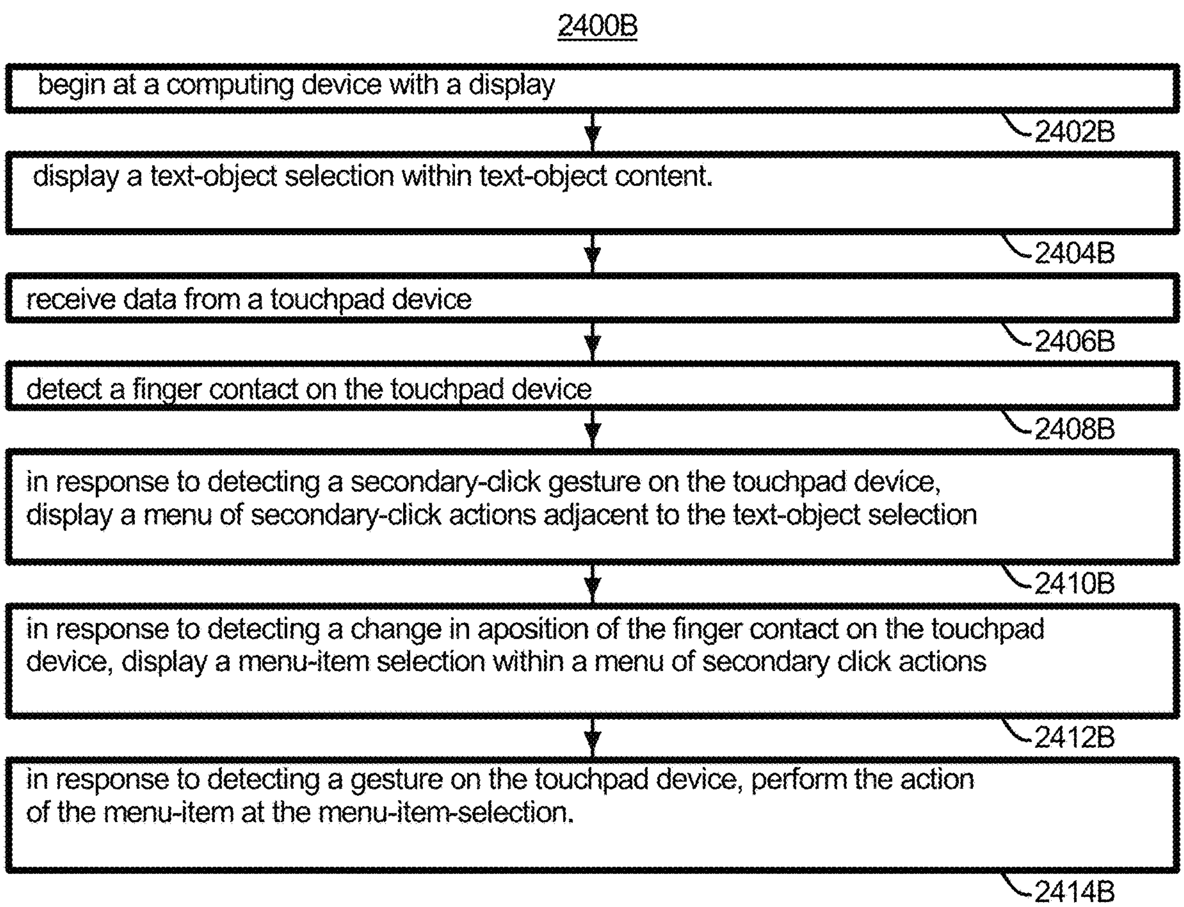
FIG. 24B is a flow diagram illustrating a method for performing a secondary-click action with respect to a text-object selection within editable or read-only text-object content (spreadsheet for example), on a computing device with a display, using gestures on a touchpad in accordance with some embodiments.

24.2 Method for performing a secondary-click action with respect to a text-object selection with editable or read-only text-object content: FIG. 24B is a flow diagram illustrating a method for performing a secondary-click action with respect to a text-object selection within editable or read-only text-object (a spreadsheet for example) content, on a computing device with a display, using gestures on a touchpad in accordance with some embodiments.

25.0 Additional Disclosure:

25.1 Definition of terms: In this disclosure we have referred to four items: 1) unit-length selection 310 displayed within read-only text content 302, 2) zero-length selection 608 displayed within editable text content 602, 3) selection from selection start point 305 to selection end point 307 displayed within read-only text content 302 or displayed within editable text content 602, and 4) the user interface pointer displayed in a pointer-based operating system.

To insure there is no opportunity for confusion, each of these is described below in the context of existing computing devices, existing computer operating systems, and existing user interfaces for computing devices: 1) As disclosed and defined herein, unit-length selection 310 displayed within read-only text content 302 is the counterpart to zero-length selection 608 displayed within editable text content 602. In this disclosure, the unit-length selection is displayed as a one-character long selection. A unit-length selection 310 is associated with the content. If the text content is moved by scrolling or panning for example, then selection 310 moves with the content; 2) As disclosed and defined herein, zero-length selection 608 displayed within editable text content 602 defines the position where text can be added to, or removed from, the text content. The text can be added, for example with a keyboard entry or with a paste operation. In this disclosure the selection of zero-length is displayed as a narrow vertical bar. This zero-length selection is sometimes called an insertion mark or text cursor. A zero-length selection 608 is associated with the content. If the text content is moved by scrolling or panning, for example, then selection 608 moves with the content. The zero-length selection 608 is familiar to any user of a word processing application; 3) As disclosed and defined herein, a selection from selection start point 305 to selection end point 307 displayed within read-only or editable text content, is a selected range of words or characters within read-only or editable text content. A user can perform an operation with respect to the selected read-only text content 302—for example, a copy action. A user can perform an operation with respect to the selected editable text content 602—for example, a cut, copy, or paste action. If the text content is moved by scrolling or panning, for example, then the selection moves with the content. A selection from a selection start point to a selection end point, either within read-only text content or within editable text content, is familiar to any user of a word processing application; 4) A described and defined herein, the pointer is the graphical user interface pointer displayed on a computing device with a pointer-based operating system. A pointer-based operating system is familiar to any user of a notebook or desktop computer. The pointer is used to perform an action at any position on the display. The pointer is not associated with displayed content. Accordingly, a change in the position of the content on the display does not cause a change in the position of the pointer on the display. In a touch-based operating system, there is no separate user interface pointer. In a touch-based operating system, the user's finger is the pointer. A touch-based operating system is familiar to any user of a modern smart phone or tablet such as the Phone or Pad sold by Apple.

In this disclosure we have referred to two additional items: 1) menu-item selection 1310 displayed within a secondary-click menu for example), 2) text-object selection 1510 displayed within text-object content (a spreadsheet for example).

To insure there is no opportunity for confusion, each of these is described below in the context of existing computing devices, existing computer operating systems, existing user interfaces for computing devices, and existing computer applications: 1) As disclosed and defined herein, menu-item selection 1310 displayed within a menu can be a displayed within a menu of secondary-click actions that can be performed with respect to selected text content or selected text-object content. 2) As disclosed and defined herein, text-object selection 1510 displayed within text-object content can be a selection of one or more spreadsheet cells displayed within a spreadsheet, for example. A text object selection 1510 within content is associated with the content. If text-object content is moved by scrolling or panning, for example, then text-object selection 1510 moves with the content, 3) As disclosed and defined herein, a text-object selection from text-object selection start point 1509 to text-object selection end point 1511 displayed within text-object content (a spreadsheet for example), is a selected range of text-objects (spreadsheet cells for example) within text-object content.

25.2 Methods: This disclosure includes methods comprising a computing device 100 with a display implementing one or more of the methods selected from those described in reference to FIGS. 3A-3Z, FIGS. 4A-4U, FIGS. 5A-5I, FIGS. 6A-6O, FIGS. 7A-7I, FIGS. 8A-8I, FIGS. 13A-13V, FIGS. 15A-15QQ, FIGS. 16A-16O, and FIGS. 22A-22CC and those described in FIG. 10A, FIG. 10B, FIG. 10C, FIG. 11A, FIG. 11B, FIG. 11C, FIG. 12A, FIG. 12B, FIG. 12C, FIG. 14A, FIG. 14B, FIG. 14C, FIGS. 17A-17B, FIGS. 18A-18B, FIGS. 19A-19B, FIGS. 20A-20B, FIGS. 21A-21B, FIGS. 23A-23B, and FIGS. 24A-24B.

25.3 Device: This disclosure includes a device 100 comprising a display, one or more processors, memory; and one or more programs, wherein one or more programs are stored in memory and configured to be executed by the one or more processors, the one or more programs including instructions for implementing one or more of the methods selected from those described in reference to FIGS. 3A-3Z, FIGS. 4A-4U, FIGS. 5A-5I, FIGS. 6A-6O, FIGS. 7A-7I, FIGS. 8A-8I, and FIGS. 13A-13V, FIGS. 15A-15QQ, FIGS. 16A-16O, and FIGS. 22A-22CC, and those described in FIG. 10A, FIG. 10B, FIG. 10C, FIG. 11A, FIG. 11B, FIG. 11C, FIG. 12A, FIG. 12B, FIG. 12C, FIG. 14A, FIG. 14B, FIG. 14C, FIGS. 17A-17B, FIGS. 18A-18B, FIGS. 19A-19B, FIGS. 20A-20B, FIGS. 21A-21B, FIGS. 23A-23B, and FIGS. 24A-24B.

25.4 Computer readable storage medium: This disclosure includes a computer readable storage medium storage medium storing one or more programs, the one or more programs comprising instructions, which when executed by a device 100 with a display, cause the device to implement one or more of the methods selected from those described in in reference to FIGS. 3A-3Z, FIGS. 4A-4U, FIGS. 5A-5I, FIGS. 6A-6O, FIGS. 7A-7I, FIGS. 8A-8I, and FIGS. 13A-13V, FIGS. 15A-15QQ, FIGS. 16A-16O, and FIGS. 22A-22CC, and those described in FIG. 10A, FIG. 10B, FIG. 10C, FIG. 11A, FIG. 11B, FIG. 11C, FIG. 12A, FIG. 12B, FIG. 12C, FIG. 14A, FIG. 14B, FIG. 14C, FIGS. 17A-17B, FIGS. 18A-18B, FIGS. 19A-19B, FIGS. 20A-20B, FIGS. 21A-21B, FIGS. 23A-23B, and FIGS. 24A-24B.

25.5 User interfaces: This disclosure includes user interfaces on a computing device 100 with a display selected from those described in reference to FIGS. 3A-3Z, FIGS. 4A-4U, FIGS. 5A-5I, FIGS. 6A-6O, FIGS. 7A-7I, FIGS. 8A-8I, and FIGS. 13A-13V, FIGS. 15A-15QQ, FIGS. 16A-16O, and FIGS. 22A-22CC, and those described in FIG. 10A, FIG. 10B, FIG. 10C, FIG. 11A, FIG. 11B, FIG. 11C, FIG. 12A, FIG. 12B, FIG. 12C, FIG. 14A, FIG. 14B, FIG. 14C, FIGS. 17A-17B, FIGS. 18A-18B, FIGS. 19A-19B, FIGS. 20A-20B, FIGS. 21A-21B, FIGS. 23A-23B, and FIGS. 24A-24B.

25.6 Suppression of display of on-screen keyboard: Upon detection of the connection of an external keyboard, the system can suppress the display of an on-screen keyboard.

25.7 Suppression of display of on-screen edit menus and edit icons: Upon detection of the connection of an external touchpad device 156, the system can suppress the display of on-screen edit menus. Example menus, include, but are not limited to menus displaying cut, copy, and paste icons. These on-screen icons are displayed for selection by a user with on-screen tap gestures. A user can access all of these actions and more, without requiring any on-screen gestures, via a secondary-click gesture on touchpad 156 to display a secondary click menu. A described above in reference to FIGS. 13A-13V and FIGS. 15W-15QQ, a user can, for example, perform a two-finger secondary-click gesture on touchpad 156, display a selection and move the selection to a secondary click menu item with a slide gesture on touchpad 156, and perform the selected action with respect to the selection with a tap gesture on touchpad 156 or a tap gesture on the enter key on keyboard 154. A secondary-click action (sometimes called a right-click action) can be performed with respect to a selection displayed within read-only text content, editable text content, or text-object content.

25.8 Alternatives to touchpad device: The methods and UI of this disclosure can include movement of a mouse on a work surface in lieu of movement of a finger contact on a touchpad to: 1) move unit-length selection 310 and select text within read-only text content, 2) move zero-length selection 608 and select text within editable text content, and 3) move text-object selection 1510 within text-object content and select multiple text-objects. The methods and UI of this disclosure can include a left-click or right-click gesture on a mouse in lieu of a tap or click on a touchpad or a secondary-tap or secondary-click gesture on a touchpad.

25.9 Gestures to Display a Selection:

Display an initial selection within read-only text content: A user can perform a long-press or long-click gesture on touchpad 156 for displaying unit-length selection 310 within read-only content.

Display an initial selection within editable text content: A user can perform a tap or long-press or click or long-click gesture on touchpad 156 for displaying zero-length selection 608 within editable content.

Display an initial selection within editable text-object content: A user can perform a tap or long-press gesture or click or long-click on touchpad 156 for displaying text-object selection 1510 (a spreadsheet cell selection for example) within editable text-object content (a spreadsheet for example).

Display zero-length selection 608 within a selected editable text-object: A user can perform a double-tap or double-click gesture on touchpad 156 for displaying zero-length selection 608 within a selected text-object for implementing one or more of the methods selected from those described at least in reference to FIGS. 15J-15W.

25.10 Selection Display Position:

Displaying a Selection: Alternative locations for displaying unit-length selection 310, zero-length selection 608, or text-object selection 1510, upon the detection of the finger gesture on touchpad 156 include, but are not limited to, the following: 1) In one exemplary embodiment, the selection can be displayed at the same approximate relative position on the displayed content as the position of the finger gesture on touchpad 156, 2) In another exemplary embodiment, the selection can be displayed at a position offset from the same relative position on the displayed content as the position of the finger gesture on touchpad 156, 3) In other exemplary embodiments: a) unit-length selection 310 can be displayed at the first or at the last displayed character in read-only text, b) zero-length selection 608 can be displayed before the first or after last displayed character in editable text, c) zero-length selection 608 can be displayed at the first position in a "blank" editable text document containing no content, d) text-object selection 1510 within text-object content can be displayed at the first or at the last displayed text-object, e) text-object selection 1310 can be displayed at the first position in a "blank" editable spreadsheet containing no content, f) unit-length selection 310, zero-length selection 608, and text-object selection 1510 can be displayed at position defined by a particular application.

25.11 Gestures to Display and Move a Selection:

Display selection and move selection within text content: A user can perform a gesture on touchpad 156 to display unit-length selection 310 within read-only text content or perform a gesture on touchpad 156 to display zero-length selection 608 within editable text content. A user can perform a slide gesture beginning anywhere on touchpad 156 for moving unit-length selection 310 within read-only text content or moving zero-length 608 within editable text content and implementing one or more of the methods selected from those described in reference to FIGS. 3A-3U, FIGS. 4A-4O, FIGS. 5A-5I, FIGS. 6A-6O, and FIGS. 7A-7I, and those described in FIG. 10A, FIG. 10C, FIG. 11A, FIG. 11C, FIG. 12A, and FIG. 12C. Alternatively, once unit-length selection 310 is displayed within read-only text content, a user can tap on an arrow key to move unit-length selection 310 within read-only text content. This is described at least in reference to FIGS. 3V-3Z and FIG. 10B, FIG. 11B, and FIG. 12B. Alternatively, once zero-length selection 608 is displayed within editable text content, a user can tap on an arrow key to move zero-length selection 608 within editable text content.

Display selection and move selection within a menu: A user can perform a gesture on touchpad 156 to display a secondary-click menu. A user can perform a gesture on touchpad 156 to display menu-item selection 1310 within the secondary-click menu. A user can perform a slide gesture beginning anywhere on touchpad 156 for moving menu-item selection 1310 within a menu (a secondary-click menu for example) and implementing one or more of the methods selected from those described in reference to FIGS. 13L-13V, FIGS. 15W-15QQ and those described in FIGS. 24A-24B. Alternatively, once selection 1310 is displayed within a menu, a user can tap on an arrow key to move selection 1310 within the menu. This is described at least in reference to FIGS. 13A-13K.

Display selection and move selection within text-object content: A user can perform a gesture on touchpad 156 to display text-object selection 1510 within text-object content. A user can perform a slide gesture beginning anywhere on touchpad 156 for moving text-object selection 1510 within text-object content (a spreadsheet for example) and implementing one or more of the methods selected from those described in reference to FIGS. 15A-15I, and FIGS. 16A-16O and those described in FIGS. 17A-17B, FIGS. 18A-18B, FIGS. 19A-19B, and FIGS. 20A-20. Alternatively, once text-object selection 1510 is displayed, a user can tap on an arrow key to move selection 1510 within text-object content.

Display selection and move zero-length selection within an editable text-object: A user can perform a gesture on touchpad 156 to display zero-length selection 608 within a selected text-object. A user can perform a slide gesture beginning anywhere on touchpad 156 for moving zero-length selection 608 (text-cursor) within editable content in a selected text-object (within a spreadsheet cell for example) and implementing one or more of the methods selected from those described in reference to FIGS. 15J-15W, and those described in FIGS. 21A-21B. Alternatively, once zero-length selection 608 is displayed within a selected text-object, a user can tap on an arrow key to move zero-length selection 608 within the editable text-object.

25.11 Proportional Movement:

Change in a horizontal position of a selection for a change in a horizontal position of finger contact. In some embodiments the change in the horizontal position of a selection ($\Delta Sx$) can be approximately proportional to the change in the horizontal position of a finger contact ($\Delta Fx$.) This can be written as $\Delta Sx = Kx \Delta Fx$ where Kx is a proportionality constant for the x-component of the finger motion. $\Delta Sx$ is not exactly proportional to $\Delta Fx$ because the selection moves in discrete steps corresponding to the horizontal distance between characters within text content, or the horizontal distance between text-objects within text-object content, or the horizontal distance between menu-items in a menu. The value of Kx can be less than one, equal to one, or greater than one. In some embodiments, Kx can be a function of the x-component of the slide gesture speed. The selection includes, but is not limited to, unit-length selection 310 within read-only text content, zero-length selection 608 within editable text content, menu-item selection 1310 within a menu, and text-object selection 1510 within text-object content. The selection includes, but is not limited to, selection end point 307 within text content and text-object selection end point 1511 within text-object content.

Change in a vertical position of a selection for a change in a vertical position of finger contact. In some embodiments the change in the vertical position of a selection ($\Delta Sy$) can be approximately proportional to the change in the vertical position of a finger contact ($\Delta Fy$.) This can be written as $\Delta Sy = Ky \Delta Fy$ where Ky is a proportionality constant for the y-component of the finger motion. $\Delta Sy$ is not exactly proportional to $\Delta Fy$ because the selection moves in discrete steps corresponding to the vertical distance between characters within text content, or the vertical distance between text-objects within text-object content, or the vertical distance between menu-items in a menu. The value of Ky can be less than one, equal to one, or greater than one. In some embodiments, Ky can be a function of the y-component of the slide gesture speed. The selection includes, but is not limited to, unit-length selection 310 within read-only text content, zero-length selection 608 within editable text content, menu-item selection 1310 within a menu, and text-object selection 1510 within text-object content. The selection includes, but is not limited to, selection end point 307 within text content and text-object selection end point 1511 within text-object content.

Kx and Ky dependence on slide gesture speed: A user can change the dependence of Kx and Ky on the x-component and y-component of the slide gestures speed to better serve the needs of the user for quick and accurate positioning of the selection using gestures on touchpad 156 as previously described in reference to FIG. 9A. As previously described in reference to FIG. 9B, Kx and Ky can be a weak function of the x-component and y-component of the slide gesture speed, at a tracking-speed setting of 2 for example, or Kx and Ky can be a strong function of the x-component and y-component of the slide gesture speed, at a tracking-speed setting of 8 for example. The selection includes, but is not limited to, unit-length selection 310 within read-only text content, zero-length selection 608 within editable text content, menu-item selection 1310 within a menu, and text-object selection 1510 within text-object content. The selection includes, but is not limited to, selection end point 307 within text content and text-object selection end point 1511 within text-object content. If a mouse device is used in lieu of a touchpad device, then Kx and Ky are a function of the speed of motion of the mouse device relative to a work surface in lieu of slide gesture speed of a finger contact on a touchpad device.

25.12 Gestures to Display a Selection and Select Multiple Characters or Text-Objects:

Display selection and select multiple characters within text content: A user can perform a gesture on touchpad 156 to display unit-length selection 310 within read-only text content or perform a gesture on touchpad 156 to display zero-length selection 608 within editable text content. A user can perform a tap-and-slide or click-and-slide gesture beginning anywhere on touchpad 156 for selecting text beginning at unit-length selection 310 within read-only text content or beginning at zero-length selection 608 within editable text content and implementing one or more of the methods selected from those described in reference to FIGS. 4A-4O, FIGS. 5A-5I, FIGS. 6A-6O, and FIGS. 7A-7I, and those described in FIG. 10A, FIG. 10B, FIG. 10C, FIG. 11A, FIG. 11B, FIG. 11C, FIG. 12A, FIG. 12B, and FIG. 12C. Alternatively, once unit-length selection 310 is displayed within read-only text content, a user can hold the shift key and tap on an arrow key to begin the selection at unit-length selection 310 within the read-only text content. This is described at least in reference to FIGS. 4Q-4U, FIG. 11B, and FIG. 12B. Alternatively, once zero-length selection 608 is displayed within editable text content, a user can hold the shift key and tap on an arrow key to begin the selection at zero-length selection 608 within editable text content.

Display selection and select multiple text-objects within text-object content: A user can perform a gesture on touchpad 156 to display text-object selection 1510 within text-object content. A user can perform a tap-and-slide or click-and-slide gesture beginning anywhere on touchpad 156 for selecting multiple text-objects (multiple spreadsheet cells for example) beginning at text-object selection 1510 within text-object content within text-object content (a spreadsheet for example) and implementing one or more of the methods selected from those described in reference to FIGS. 16A-16O and those described in FIGS. 18A-18B, FIGS. 19A-19B, and FIGS. 20A-20B. Alternatively, once text-object selection 1510 is displayed, a user can hold the shift key and tap on an arrow key to begin the selection at text-object selection 1510 within text-object content.

Selecting text or text-object content w/ drag-lock off: The user can set "drag-lock" OFF for gestures on Touchpad 156. With "drag-lock" OFF, the user can select characters within read-only text, or within editable text, with a finger lift at the end of a tap-and-slide (or click-and-slide) finger gesture beginning anywhere on touchpad 156. With "drag-lock" OFF, the user can select text-objects within read-only text-object content, or within editable text-object content, with a finger lift at the end of a tap-and-slide (or click-and-slide) finger gesture beginning anywhere on touchpad 156. The selection extent is finalized with the finger lift at the end of the tap-and-slide (or click-and-slide) finger gesture on touchpad 156.

Selecting text or text-object content w/ drag-lock on: The user can set "drag-lock" ON for gestures on Touchpad 156. With "drag-lock" ON, the user can make an initial selection of characters within read-only text, or within editable text, with a finger lift at the end of a tap-and-slide (or click-and-slide) finger gesture beginning anywhere on touchpad 156. With "drag-lock" ON, the user can make an initial selection of text-objects within read-only text-object content, or within editable text-object content, with a finger lift at the end of a tap-and-slide (or click-and-slide) finger gesture beginning anywhere on touchpad 156. The user can modify the selection extent with one or more additional slide gestures on touchpad 156. The selection extent is finalized with a finger tap (or click) after the finger lift at the end of the slide finger gesture on touchpad 156.

Display selection and select a single word within text content: A user can perform a gesture on touchpad 156 to display unit-length selection 310 within read-only text content or perform a gesture on touchpad 156 to display zero-length selection 608 within editable text content. A user can perform a double-tap or double-click gesture on touchpad 156 for selecting a word at the position of unit-length selection 310 or zero-length selection 608 and for implementing one or more of the methods selected from those described at least in reference to FIGS. 4L-4O, FIGS. 6M-6O.

25.13 Gestures to Drag and Drop a Selection:

Drag and drop selected text within an application: A user can perform a tap-and-slide gesture beginning anywhere on touchpad 156 for dragging and dropping selected text within editable text content and implementing one or more of the methods selected from those described in reference to FIGS. 22A-22T, and those described in FIG. 23A.

Drag and drop selected text between applications: A user can perform a tap-and-slide gesture beginning anywhere on touchpad 156 for dragging and dropping selected text and implementing one or more of the methods selected from those described in reference to FIGS. 22U-22CC, and those described in FIG. 23B.

Dragging-and-dropping selected text w/ drag-lock off: The user can set "drag-lock" OFF for gestures on Touchpad 156. With "drag-lock" OFF, the user can drag and drop selected text from a first position to a second position with a finger lift at the end of a tap-and-slide (or click-and-slide) finger gesture beginning anywhere on touchpad 156. The drop position is finalized with the finger lift at the end of the tap-and-slide (or click-and-slide) finger gesture on touchpad 156.

Dragging-and-dropping selected text w/ drag-lock on: The user can set "drag-lock" ON for gestures on Touchpad 156. With "drag-lock" ON, the user can drag and drop selected text from a first position to an initial second position, with a finger lift at the end of a tap-and-slide (or click-and-slide) finger gesture beginning anywhere on touchpad 156. The user can modify the drop position with one or more additional slide gestures on touchpad 156. The drop position is finalized with a finger tap (or click) after the finger lift at the end of the slide finger gesture on touchpad 156.

25.14 Gestures to Display Secondary-Click Menu at a Selection:

Secondary-click-gesture—text content: A user can perform a two-finger tap gesture on touchpad 156 for displaying secondary-click menu with respect to a unit-length selection 310 or zero-length selection 608 or a multiple-character selection. Alternatively, a user can perform a two-finger click gesture on touchpad 156. Alternatively, a user can perform a tap or click gesture in a particular region of touchpad 156. Alternatively, a different secondary-click gesture can be defined.

Secondary-click-gesture—text-object content: A user can perform a two-finger tap gesture on touchpad 156 for displaying secondary-click menu with respect to text-object selection 1510 or a multiple-text-object selection within text-object content (a spreadsheet for example). Alternatively, a user can perform a two-finger click gesture on touchpad 156. Alternatively, a user can perform a tap or click gesture in a particular region of touchpad 156. Alternatively, a different secondary-click gesture can be defined.

25.15 Auto-Scroll of Content:

Vertical auto-scroll of text content: When a selection is moved near the last (first) line of displayed text, the device can automatically scroll content up (down). The device can continue to scroll the content up (down), either until the user moves the selection up (down) from the last (first) line displayed text, or until the content has scrolled to last (first) line of the text content. The selection can be unit-length selection 310 within read-only text content, or zero-length selection 608 within editable text content, or selection end point 307 within text content.

Vertical auto-scroll of text-object content: When a selection is moved near the last (first) line of displayed text-object content, the device can automatically scroll content up (down). The device can continue to scroll the content up (down), either until the user moves the selection up (down) from the last (first) text-object of displayed text-object content, or until the content has scrolled to last (first) row of text-objects within the text-object content. The selection can be text-object selection 1510 or a multiple-text-object selection within text-object content (a spreadsheet for example).

Vertical auto-scroll of menu: When a menu-item selection 1310 is moved near the last (first) line of a displayed menu, the device can automatically scroll the menu up (down). The device can continue to scroll the menu up (down), either until the user moves the menu-item selection up (down) from the last (first) menu-item of displayed menu, or until the menu has scrolled to last (first) row of menu-items within the menu.

Horizontal auto-scroll of text content: When a selection is moved near the first (last) displayed character near the left (right) boundary of the displayed text, the device can scroll content right (left), either until the user moves the selection off the first displayed character to stop the scrolling, or until the content has scrolled to last (first) character of the text content. The selection can be unit-length selection 310 within read-only text content, or zero-length selection 608 within editable text content, or selection end point 307 within text content.

Horizontal auto-scroll of text-object content: When a selection is moved near the first (last) displayed text object near the left (right) boundary of the displayed text-object content, the device can scroll content right (left), either until the user moves the selection off the first displayed text-object to stop the scrolling, or until the content has scrolled to last (first) column of text-objects within the text-object content. The selection can be text-object selection 1510 or a multiple-text-object selection within text-object content (a spreadsheet for example).

Horizontal auto-scroll of menu: When a menu-item selection 1310 is moved near the leftmost (rightmost) item of a displayed menu, the device can automatically scroll the menu right (left). The device can continue to scroll the menu right (left), either until the user moves the menu-item selection right (left) from the leftmost (rightmost) menu-item of displayed menu, or until the menu has scrolled to leftmost (rightmost) column of menu-items within the menu.

Additional gestures on touchpad 156, including other multi-finger tap gestures and multi-finger slide gestures, can be defined to perform additional functions. To enhance discoverability, those additional gestures can be defined in a manner consistent with the way they are defined in leading pointer-based operating systems. Additional gestures and user actions for performing actions include, but are not limited to, keyboard gestures, voice commands, hand gestures, gaze gestures. In addition, a stylus can be used in lieu of, or in combination with, a finger for making gestures on a touchpad.

The foregoing disclosure, for the purpose of explanation, has included reference to specific embodiments. However, the illustrative discussions above are not intended to be exhaustive or to limit the invention to the precise forms disclosed. Many modifications and variations are possible in view of the above teachings. The embodiments were chosen and described in order to explain the principals of the invention and its practical applications, to thereby enable others skilled in the art to best utilize the invention and various embodiments with various modifications as are suited to the particular use contemplated.

A portion of the disclosure of this patent document contains material that is subject to copyright protection. The applicant and copyright owner has no objection to the facsimile reproduction by anyone of the patent document or the patent disclosure, as it appears in the Patent and Trademark Office patent file or records, but otherwise reserves all copyright rights whatsoever.

I claim:

1. A computing device, comprising: a display;

a processor;

a memory configured to store one or more programs;

the processor is configured to execute the one or more programs to cause the computing device to:

receive data from a touchpad device; detect a contact on the touchpad device; display a selection having a selection length and a selection start point within a content having a content type;

display the selection within the content wherein the selection length is a zero-length when the content type is editable text content;

display the selection within content wherein the selection length is a one-character-length when the content type is read-only text content; and in response to detecting a change in a position of the contact on the touchpad device, change a position of the selection start point within the content.

2. The device of claim 1, further including instructions to cause the computing device to: display the selection within the content wherein the selection length is one-text-object-length when the content type is text-object content.

3. The device of claim 1, further including instructions to cause the computing device to: detect a gesture on the touchpad device; and in response to detecting a selection gesture, change the selection length.

4. The device of claim 3, wherein the selection gesture comprises a tap and change in a position of a contact on the touchpad device.

5. The device of claim 3, wherein the selection gesture comprises a click and change in a position of a contact on the touchpad device.

6. The device of claim 1, further including instructions to cause the computing device to: detect a gesture on the touchpad device; and wherein the display of a selection having a selection start point within the content is in response to detecting a first gesture on the touchpad device.

7. The device of claim 1, further including instructions to cause the computing device to: detect a gesture on the touchpad device; and in response to detecting a secondary-click gesture, display a secondary-click menu comprising one or more menu-items.

8. The device of claim 1, further including instructions to cause the computing device to: display a menu-item selection within the secondary-click menu; and in response to detecting a change in a position of a contact on the touchpad device, change a position of the menu-item selection within the secondary-click menu.

9. The device of claim 8, further including instructions to cause the computing device to: detect a gesture on the touchpad device; and in response to detecting an item selection gesture, select a menu-item at the position of the menu-item selection within the secondary-click menu.

10. The device of claim 8, further including instructions to cause the computing device to: detect a gesture on the touchpad device; and in response to detecting an item selection gesture, select a menu-item at the position of the menu-item selection within the secondary-click menu and apply the menu-item to the content at the position of the selection within the content.

11. The device of claim 8, further including instructions to cause the computing device to: in response to detecting an item selection gesture, select a menu-item at a position of the menu-item selection within the secondary-click menu and display a sub-menu.

12. A computing device, comprising: a display;
a processor;
a memory configured to store one or more programs;
the processor is configured to execute the one or more programs to cause the computing device to:
receive data from a touchpad device;
detect a contact on the touchpad device;
display a selection having a selection length and a selection start point within read-only text content wherein the selection length is one-character length;
in response to detecting a change in a position of the contact on the touchpad device, change a position of the selection start point within the read-only text content;
detect a gesture on the touchpad device; and in response to detecting a selection gesture, change the selection length within the read-only text content.

13. A method, comprising:
at a computing device with a display:
receiving data from a touchpad device;
detecting a contact on the touchpad device;
displaying a selection having a selection length and a selection start point within a content having a content type;
displaying the selection within the content wherein the selection length is zero-length when the content type is editable text content;
displaying the selection within the content wherein the selection length is a one-character-length when the content type is read-only text content; and
in response to detecting a change in a position of the contact on the touchpad device, changing a position of the selection start point within the content.

14. A non-transitory computer readable storage medium storing one or more programs, the one or more programs comprising instructions, when executed, cause a computing device with a display to:
receive data from a touchpad device;
detect a contact on the touchpad device;
display a selection having a selection length and a selection start point within a content having a content type;
display the selection within the content wherein the selection length is zero-length when the content type is editable text content;
display the selection within the content wherein the selection length is one-character-length when the content type is read-only text content; and
in response to detecting a change in a position of the contact on the touchpad device, change a position of the selection start point within the content.

15. The non-transitory computer readable storage medium of claim 14, further including instructions that, when executed, cause the computing device to: display the selection within the content wherein the selection length is one-text-object-length when the content type is text-object content.

16. The non-transitory computer readable storage medium of claim 14, further including instructions that, when executed, cause the computing device to: detect a gesture on the touchpad device; and in response to detecting a selection gesture on the touchpad, change the selection length.

17. The non-transitory computer readable storage medium of claim 16, wherein the selection gesture comprises a tap and change in a position of a contact on the touchpad device.

18. The non-transitory computer readable storage medium of claim 16, wherein the selection gesture comprises a click and change in a position of a contact on the touchpad device.

19. The non-transitory computer readable storage medium of claim 14, further including instructions that, when executed, cause the computing device to: detect a gesture on the touchpad device; and wherein the display of a selection having a selection start point within a content is in response to detecting a first gesture on the touchpad device.

20. The non-transitory computer readable storage medium of claim 14, further including instructions that, when executed, cause the computing device to: detect a gesture on the touchpad device; and in response to detecting a secondary-click gesture, display a secondary-click menu comprising one or more menu-items.

21. The non-transitory computer readable storage medium of claim 20, further including instructions that, when executed, cause the computing device to: display a menu-item selection within the secondary-click menu; and in response to detecting a change in a position of a contact on the touchpad device, change a position of the menu-item selection within the secondary-click menu.

22. The non-transitory computer readable storage medium of claim 21, further including instructions that, when executed, cause the computing device to: in response to detecting an item selection gesture, select a menu-item at a position of the menu-item selection within the secondary-click menu.

23. The non-transitory computer readable storage medium of claim 21, further including instructions that, when executed, cause the computing device to: in response to detecting an item selection gesture, select a menu-item at a position of the menu-item selection within the secondary-click menu and apply the menu-item to the content at a position of the selection within the content.

24. The non-transitory computer readable storage medium of claim 21, further including instructions that, when executed, cause the computing device to: in response to detecting an item selection gesture, select a menu-item at a position of the menu-item selection within the secondary-click menu and display a sub-menu.

25. A non-transitory computer readable storage medium storing one or more programs, the one or more programs comprising instructions, when executed, cause a computing device with a display to:

receive data from a touchpad device;

detect a contact on the touchpad device;

display a selection having a selection length and a selection start point within read-only text content wherein the selection length is one-character-length;

in response to detecting a change in a position of the contact, change a position of the selection start point within the read-only text content;

detect a gesture on the touchpad device; and in response to detecting a selection gesture, change the selection length within the read-only text content.

* * * * *